United States Patent
Yamada et al.

(10) Patent No.: US 8,616,624 B2
(45) Date of Patent: Dec. 31, 2013

(54) SEAT STRUCTURE AND VEHICLE

(71) Applicants: Masayuki Yamada, Aichi (JP); Hideki Kobayashi, Aichi (JP); Takeshi Tokai, Okazaki (JP); Masaki Mori, Tajimi (JP); Keisuke Onoda, Nagoya (JP); Makoto Ito, Miyoshi (JP)

(72) Inventors: Masayuki Yamada, Aichi (JP); Hideki Kobayashi, Aichi (JP); Takeshi Tokai, Okazaki (JP); Masaki Mori, Tajimi (JP); Keisuke Onoda, Nagoya (JP); Makoto Ito, Miyoshi (JP)

(73) Assignees: Toyota Jidosha Kabushiki Kaisha, Toyota-shi, Aichi (JP); Toyota Boshoku Kabushiki Kaisha, Kariya-shi, Aichi (JP)

( * ) Notice: Subject to any disclaimer, the term of this patent is extended or adjusted under 35 U.S.C. 154(b) by 0 days.

(21) Appl. No.: 13/932,362

(22) Filed: Jul. 1, 2013

(65) Prior Publication Data
US 2013/0292980 A1 Nov. 7, 2013

Related U.S. Application Data

(62) Division of application No. 13/547,962, filed on Jul. 12, 2012, which is a division of application No. 12/094,133, filed as application No. PCT/JP2006/322648 on Nov. 14, 2006, now Pat. No. 8,235,466.

(30) Foreign Application Priority Data

Nov. 16, 2005 (JP) ................................. 2005-331894

(51) Int. Cl.
*B60N 2/32* (2006.01)
*A47C 7/14* (2006.01)
*B60N 2/02* (2006.01)

(52) U.S. Cl.
USPC .... 297/14; 297/284.1; 297/378.1; 296/65.05; 296/65.09

(58) Field of Classification Search
USPC ..................... 297/378.1, 14, 284.1, 331, 341; 296/65.09, 65.05
See application file for complete search history.

(56) References Cited

U.S. PATENT DOCUMENTS 5,492,389 A * 2/1996 McClintock et al. ............ 297/14
5,984,397 A * 11/1999 Dawson et al. ............. 296/65.09
(Continued)

FOREIGN PATENT DOCUMENTS

DE 19836907 11/1999
JP 2003-316663 11/2000
(Continued)

OTHER PUBLICATIONS

Communication from the European Patent Office for EP 06832610 mailed Aug. 6, 2009.
(Continued)

*Primary Examiner* — Milton Nelson, Jr.
(74) *Attorney, Agent, or Firm* — Finnegan, Henderson, Farabow, Garrett & Dunner, LLP

(57) ABSTRACT

In a seat, in a state in which tilting of a back main frame around a tilting center is locked by a reclining mechanism, a lower end of a back joint link is turnably joined to a vehicle side. Thus, turning of a first link, a back sub frame and the back joint link is locked, and operation of a back link mechanism is locked. Therefore, a supporting rigidity from rear side of a back side portion can be enhanced by the back link mechanism (the back sub frame), and a crew sitting in the seat can be thoroughly retained.

4 Claims, 91 Drawing Sheets

(56) References Cited

U.S. PATENT DOCUMENTS

| | | | |
|---|---|---|---|
| 6,460,929 B2 * | 10/2002 | Kamida | 297/344.1 |
| 6,736,459 B1 | 5/2004 | Sturt | |
| 6,843,526 B2 * | 1/2005 | Honda et al. | 297/14 |
| 7,367,625 B2 | 5/2008 | Mori et al. | |
| 7,458,637 B2 | 12/2008 | Norman et al. | |
| 2005/0093355 A1 | 5/2005 | Habedank | |
| 2005/0110324 A1 | 5/2005 | Mori et al. | |
| 2009/0127904 A1 | 5/2009 | Yamada et al. | |

FOREIGN PATENT DOCUMENTS

| | | |
|---|---|---|
| JP | 2002-264708 | 9/2002 |
| JP | 2005-59765 | 3/2005 |
| JP | 2005-280679 | 10/2005 |
| WO | WO 99/08894 | 2/1999 |

OTHER PUBLICATIONS

Notice of Decision to Grant Patent for Korean Patent Appl. No. 2008-7014459 dated Dec. 13, 2010.

* cited by examiner

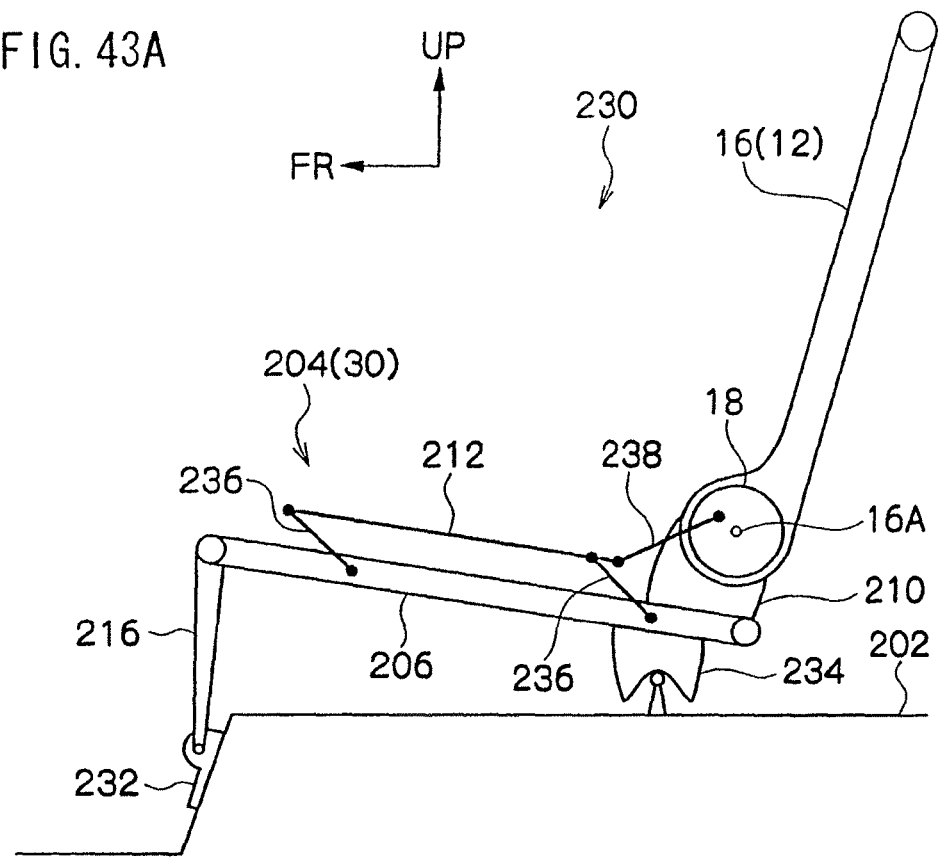
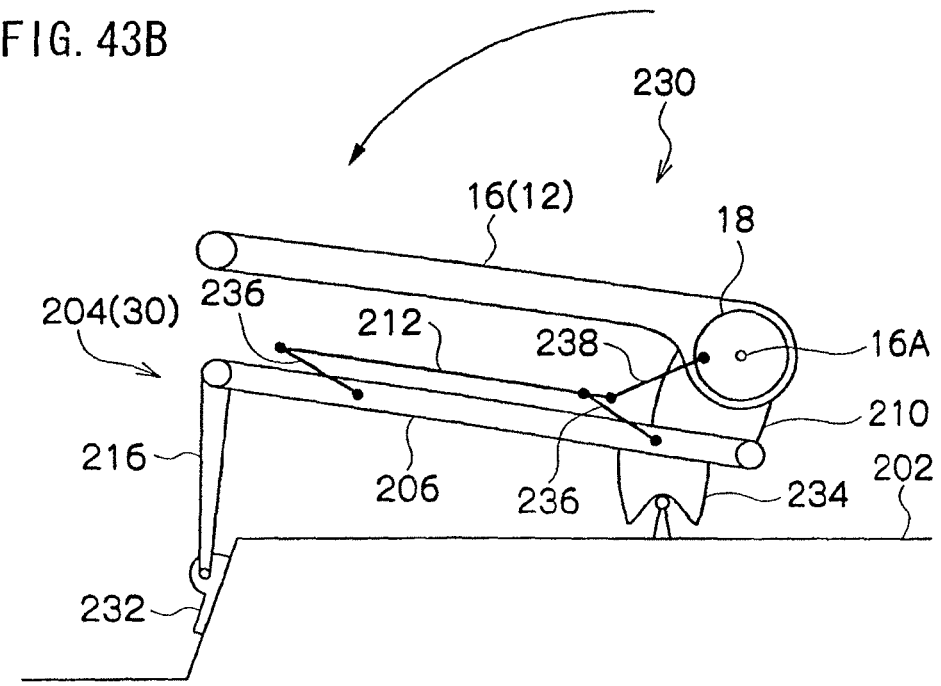

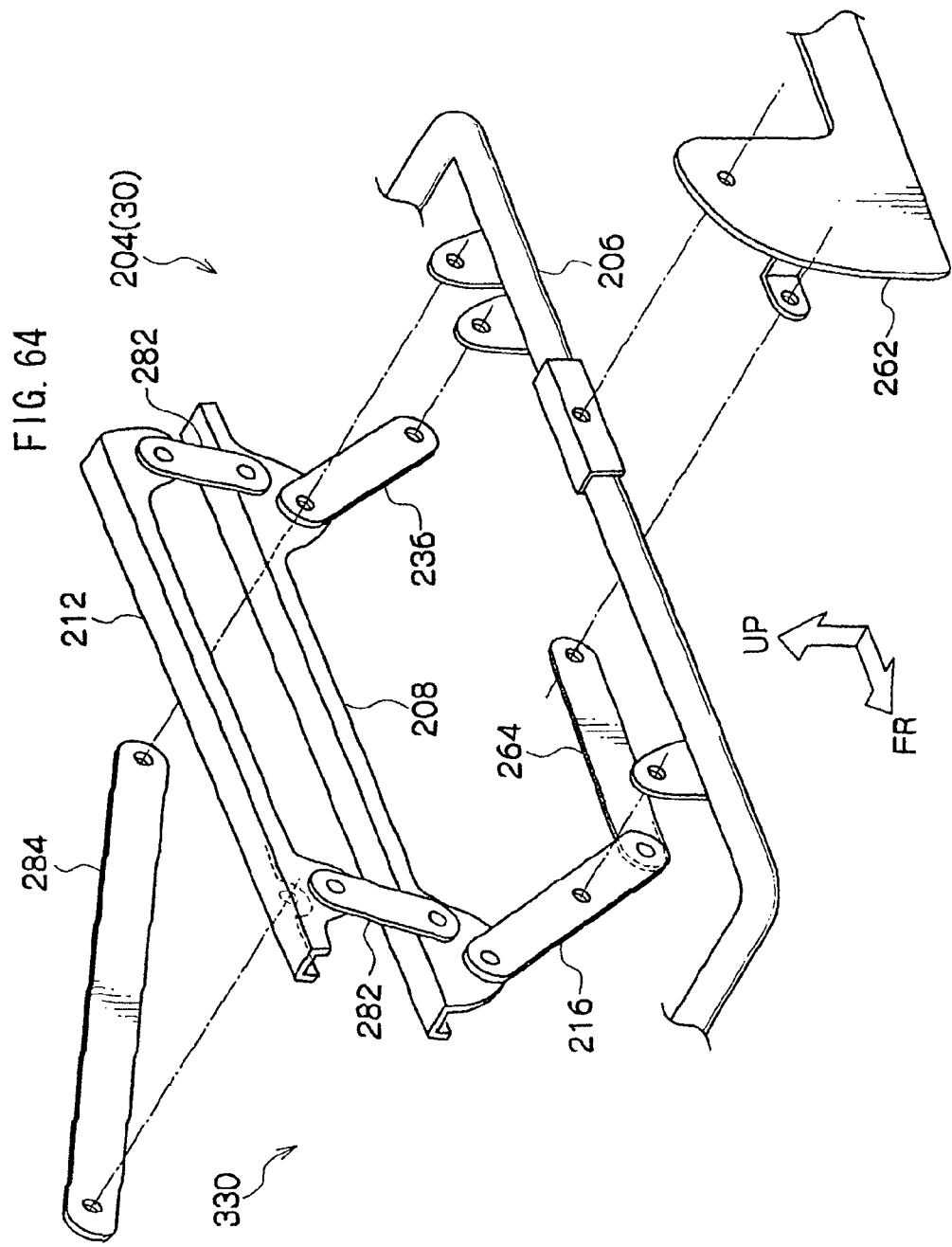

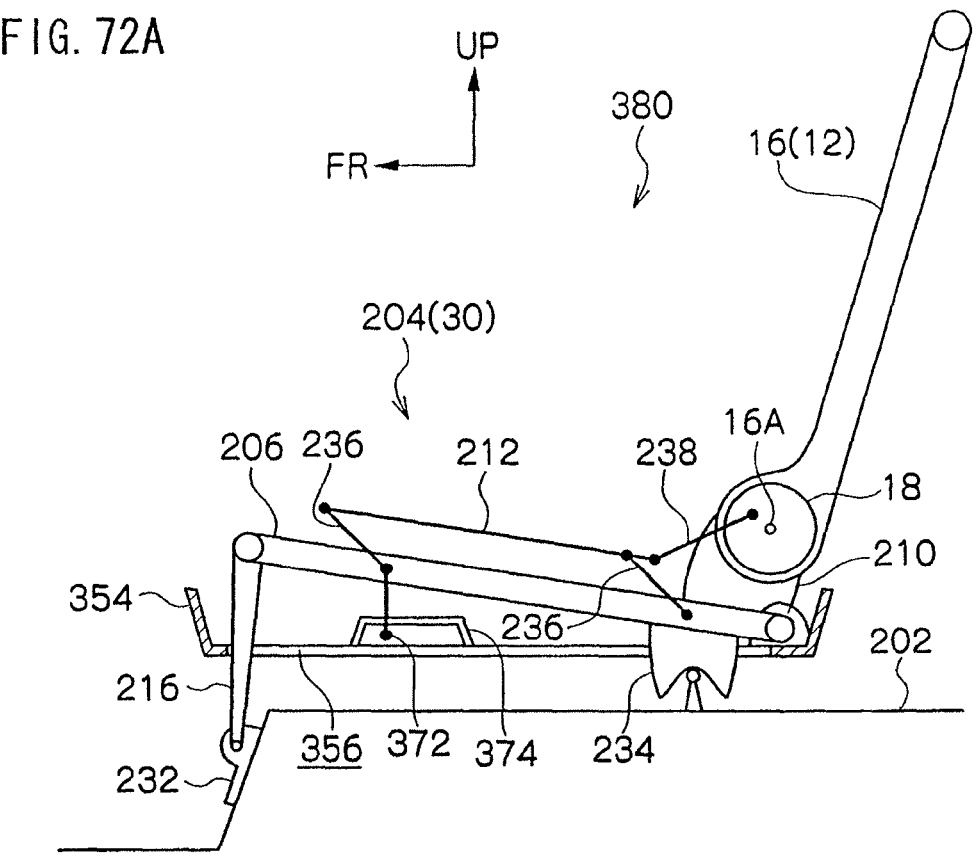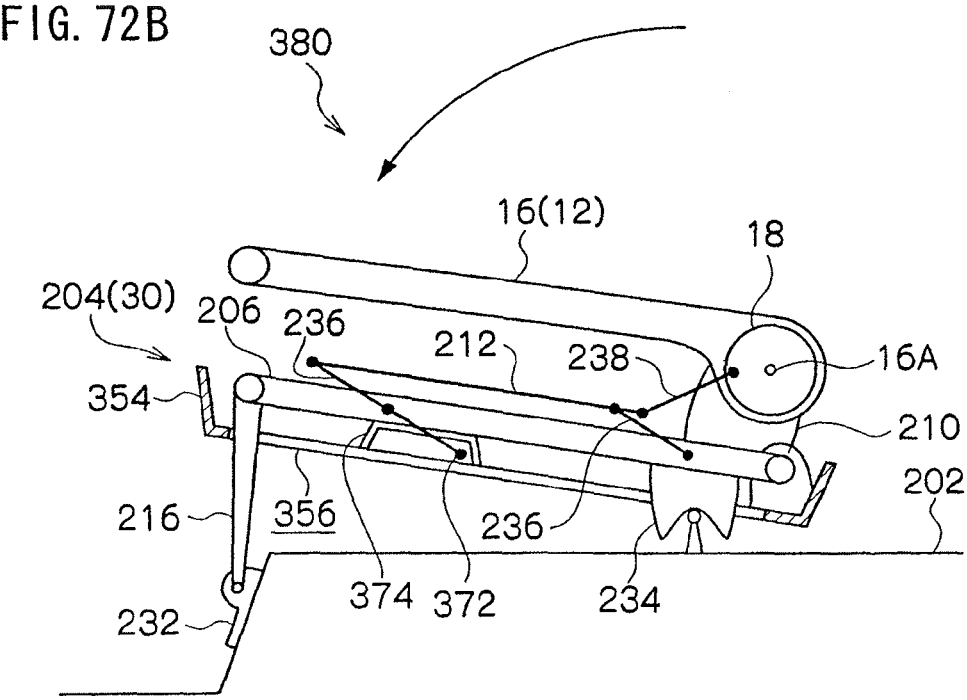

SEAT STRUCTURE AND VEHICLE

This is a divisional of U.S. application Ser. No. 13/547,962 filed on Jul. 12, 2012, which is a divisional of U.S. application Ser. No. 12/094,133, which is a national stage of PCT/JP2006/322648, filed Nov. 14, 2006, which claims priority to Japanese Application No. 2005-331894, filed Nov. 16, 2005. The contents of each of these applications are incorporated herein by reference.

TECHNICAL FIELD

The present invention relates to a seat structure in which a thickness of a seat side portion is made flexible, and a vehicle provided with a seat that is structured with this seat structure.

BACKGROUND ART

As a seat structure, there is a structure in which a thickness of a seat side portion is made flexible by left and right seat side portions of a seat cushion being made movable to a high position and a low position relative to a central top panel portion (for example, see patent reference 1).

However, in this seat structure, a support wire that supports the seat side portion from a reverse side is only urged toward a face side of the seat cushion by a torsion spring. Moreover, a turning plane of the support wire (a plane including a turning direction) is made perpendicular to a front-rear direction of the seat cushion. Therefore, a support rigidity of the seat side portion from the support wire with respect to a load in a left-right direction of the seat cushion is low.

Patent reference 1: Japanese Patent Application Laid-Open (JP-A) No. 2000-316663

DISCLOSURE OF INVENTION

Problem to be Solved by the Invention

In consideration of the circumstances described above, an objective of the present invention is to provide a seat structure and vehicle capable of enhancing a support rigidity of a seat side portion.

Means for Solving the Problem

An embodiment of a seat structure includes a seat side portion provided at a left-right direction side portion of a seat back; and a link mechanism that, along with supporting the seat side portion, is joined to at least one of a seat cushion and a vehicle side, operation being locked in a condition of use of a seat, is operated by operation of at least one of the seat back and the seat cushion, and flexes a thickness of the seat side portion, wherein the link mechanism including: a back main frame provided inside the seat back; a back flexing component including a back face side frame, which is provided in the seat back at a face side relative to the back main frame, and a first link, which is turnably joined to the back main frame and the back face side frame; and a back joint mechanism that is joined to the back flexing component, at the face side of the seat back relative to a position of joining to the back main frame of the first link, and operates the back flexing component in accordance with operation of at least one of the seat back and the seat cushion.

According to some embodiments, the link mechanism supports the seat side portion provided at the left-right direction (a transverse direction of the seat) side portion of the seat back, the link mechanism is operated by operation of at least one of the seat back and the seat cushion, and the thickness of the seat side portion is flexed.

Here, the link mechanism is joined to the at least one of the seat cushion and the vehicle side, and in the condition in which the seat is used (a state in which sitting is possible), the operation is locked. Therefore, supporting rigidity of the seat side portion can be enhanced.

Further, the back main frame is provided inside the seat back. Furthermore, the back flexing component includes the back face side frame and the first link, and the back face side frame is provided in the seat back at the face side relative to the back main frame, along with which the first link is turnably joined to the back main frame and the back face side frame.

Here, the back joint mechanism is joined to the back flexing component, and the back flexing component is operated (that is, the link mechanism is operated) by the operation of the at least one of the seat back and the seat cushion. Accordingly, the thickness of the seat side portion of the seat back can be flexed.

According to some embodiments, the operation plane of the link mechanism being is made parallel to a direction perpendicular to the left-right direction and a thickness direction of the seat back.

According to some embodiments, the operation plane of the link mechanism is made parallel with the direction perpendicular to the left-right direction and the thickness direction of the seat back. Therefore, the supporting rigidity of the seat side portion with respect to the load in the left-right direction of the seat back can be more enhanced.

According to some embodiments, the back joint mechanism is turnably joined to a vehicle side at a position which is offset from a tilting center of the seat back.

According to some embodiments, the back joint mechanism is turnably joined to the vehicle side at the position which is offset from the tilting center of the seat back. Therefore, the back flexing component can be operated by a tilting operation of the seat back.

According to some embodiments, the back joint mechanism is turnably joined to the seat cushion.

According to some embodiments, the back joint mechanism is turnably joined to the seat cushion. Therefore, the back flexing component can be operated by operation of the seat cushion.

According to some embodiments, the back flexing component includes: a back face frame provided in the seat back at the face side relative to the back face side frame; a second link turnably joined to the back face side frame and the back face frame; and a third link turnably joined to the back main frame and the back face frame.

According to some embodiments, the back flexing component includes the back face frame, the second link and the third link. The back face frame is provided at the face side relative to the face side frame in the seat back, the second link is turnably joined to the back face side frame and the back face frame, and the third link is turnably joined to the back main frame and the back face frame. Therefore, the back face side frame turns via the first link with respect to the back main frame, along with which the back face frame turns via the second link with respect to the back face side frame, and the back flexing component is operated. Accordingly, a flexing amount of the thickness of the seat side portion can be increased.

According to some embodiments, the back flexing component includes a back reverse side frame that is provided in the seat back at a reverse side relative to the back main frame, and to which the first link is turnably joined.

According to some embodiments, the back flexing component includes the back reverse side frame, and the back reverse side frame is provided at the reverse side relative to the back main frame in the seat back, along with which the first link is turnably joined to the back reverse side frame. Therefore, the thickness of the seat side portion can be flexed at the reverse side relative to the back main frame.

Another embodiment of a seat structure includes a back cover member that covers the seat back and accommodates the back reverse side frame.

According to some embodiments, the back cover member that covers the seat back accommodates the back reverse side frame. Therefore, appearance of the seat back can be improved.

Another embodiment of a seat structure includes a seat side portion provided at a left-right direction side portion of a seat cushion; and a link mechanism that, along with supporting the seat side portion, is joined to at least one of a seat back and a vehicle side, operation being locked in a condition of use of a seat, is operated by operation of at least one of the seat back and the seat cushion, and flexes a thickness of the seat side portion, wherein the link mechanism including: a cushion main frame provided inside the seat cushion; a cushion flexing component including a cushion face side frame, which is provided in the seat cushion at a face side relative to the cushion main frame, and a cushion joining component, which turnably joins the cushion main frame and the cushion face side frame; and a cushion connection mechanism that is connected to the cushion flexing component, at the face side of the seat cushion relative to a position of joining to the cushion main frame of cushion joining component, and operates the cushion flexing component in accordance with operation of at least one of the seat back and the seat cushion.

According to some embodiments, the link mechanism supports the seat side portion provided at the left-right direction (a transverse direction of the seat) side portion of the seat cushion, the link mechanism is operated by operation of at least one of the seat back and the seat cushion, and the thickness of the seat side portion is flexed.

Here, the link mechanism is joined to the at least one of the seat back and the vehicle side, and in the condition in which the seat is used (a state in which sitting is possible), the operation is locked. Therefore, supporting rigidity of the seat side portion can be enhanced.

Further, the cushion main frame is provided inside the seat cushion. Furthermore, the cushion flexing component includes the cushion face side frame and the cushion joining component, and the cushion face side frame is provided in the seat cushion at the face side relative to the cushion main frame, along with which the cushion joining component is turnably joined to the cushion main frame and the cushion face side frame.

Here, the cushion connection mechanism is connected to the cushion flexing component, and the cushion flexing component is operated (that is, the link mechanism is operated) by the operation of the at least one of the seat back and the seat cushion. Accordingly, the thickness of the seat side portion of the seat cushion can be flexed.

According to some embodiments, the operation plane of the link mechanism is made parallel to a direction perpendicular to the left-right direction and a thickness direction of the seat cushion.

According to some embodiments, the operation plane of the link mechanism is made parallel with the direction perpendicular to the left-right direction and the thickness direction of the seat cushion. Therefore, the supporting rigidity of the seat side portion with respect to the load in the left-right direction of the seat cushion can be more enhanced.

Another embodiment of a seat structure includes a seat side portion provided at a left-right direction side portion of a seat cushion; and a link mechanism that, along with supporting the seat side portion, is joined to at least one of a seat back and a vehicle side, operation being locked in a condition of use of a seat, is operated by operation of at least one of the seat back and the seat cushion, and flexes a thickness of the seat side portion, wherein the link mechanism including: a cushion main frame provided inside the seat cushion; a cushion flexing component including a cushion face side frame, which is provided in the seat cushion at a face side relative to the cushion main frame, and a cushion joining component, which turnably joins the cushion main frame and the cushion face side frame; and a cushion connection mechanism that, along with being turnably joined to the cushion main frame and the vehicle side, supports the cushion face side frame, is connected to the cushion flexing component, and operates the cushion flexing component in accordance with operation of at least one of the seat back and the seat cushion.

According to some embodiments, the link mechanism supports the seat side portion provided at the left-right direction (a transverse direction of the seat) side portion of the seat cushion, the link mechanism is operated by operation of at least one of the seat back and the seat cushion, and the thickness of the seat side portion is flexed.

Here, the link mechanism is joined to the at least one of the seat back and the vehicle side, and in the condition in which the seat is used (a state in which sitting is possible), the operation is locked. Therefore, supporting rigidity of the seat side portion can be enhanced.

Further, the cushion main frame is provided inside the seat cushion. Furthermore, the cushion flexing component includes the cushion face side frame and the cushion joining component, and the cushion face side frame is provided in the seat cushion at the face side relative to the cushion main frame, along with which the cushion joining component is turnably joined to the cushion main frame and the cushion face side frame.

Here, the cushion connection mechanism is connected to the cushion flexing component, and the cushion flexing component is operated (that is, the link mechanism is operated) by the operation of the at least one of the seat back and the seat cushion. Accordingly, the thickness of the seat side portion of the seat cushion can be flexed.

Further, the cushion connection mechanism is turnably joined to the cushion main frame and the vehicle side, along with which it supports the cushion face side frame. Therefore, the cushion flexing component can be operated by operation of the seat cushion.

According to some embodiments, the cushion connection mechanism is turnably joined to the seat back at a position which is offset from a tilting center of the seat back.

According to some embodiments, the cushion connection mechanism is turnably joined to the seat back at the position which is offset from the tilting center of the seat back. Therefore, the cushion flexing component can be operated by a tilting operation of the seat back.

Another embodiment of a seat structure includes a seat side portion provided at a left-right direction side portion of a seat cushion; and a link mechanism that, along with supporting the seat side portion, is joined to at least one of a seat back and a vehicle side, operation being locked in a condition of use of a seat, is operated by operation of at least one of the seat back and the seat cushion, and flexes a thickness of the seat side portion, wherein the link mechanism including: a cushion main frame provided inside the seat cushion; a cushion flexing component including a cushion face side frame, which is provided in the seat cushion at a face side relative to the cushion main frame, and a cushion joining component, which turnably joins the cushion main frame and the cushion face side frame; a cushion connection mechanism that, along with being turnably joined to the vehicle side, is connected to the cushion flexing component, and operates the cushion flexing component in accordance with operation of at least one of the seat back and the seat cushion; and a fourth link that, along with being joined to the cushion main frame, is turnably joined to the vehicle side at a position which is offset from a turning center of the cushion connection mechanism.

According to some embodiments, the link mechanism supports the seat side portion provided at the left-right direction (a transverse direction of the seat) side portion of the seat cushion, the link mechanism is operated by operation of at least one of the seat back and the seat cushion, and the thickness of the seat side portion is flexed.

Here, the link mechanism is joined to the at least one of the seat back and the vehicle side, and in the condition in which the seat is used (a state in which sitting is possible), the operation is locked. Therefore, supporting rigidity of the seat side portion can be enhanced.

Further, the cushion main frame is provided inside the seat cushion. Furthermore, the cushion flexing component includes the cushion face side frame and the cushion joining component, and the cushion face side frame is provided in the seat cushion at the face side relative to the cushion main frame, along with which the cushion joining component is turnably joined to the cushion main frame and the cushion face side frame.

Here, the cushion connection mechanism is connected to the cushion flexing component, and the cushion flexing component is operated (that is, the link mechanism is operated) by the operation of the at least one of the seat back and the seat cushion. Accordingly, the thickness of the seat side portion of the seat cushion can be flexed.

Further, the cushion connection mechanism is turnably joined to the vehicle side, in addition to which the fourth link is joined to the cushion main frame, along with which it is turnably joined to the vehicle side at the position which is offset from the tilting center of the cushion connection mechanism. Therefore, the cushion flexing component can be operated by operation of the seat cushion.

Another embodiment of a seat structure includes a seat side portion provided at a left-right direction side portion of a seat cushion; and a link mechanism that, along with supporting the seat side portion, is joined to at least one of a seat back and a vehicle side, operation being locked in a condition of use of a seat, is operated by operation of at least one of the seat back and the seat cushion, and flexes a thickness of the seat side portion, wherein the link mechanism including: a cushion main frame provided inside the seat cushion and turnably joined to the vehicle side; a cushion flexing component including a cushion face side frame, which is provided in the seat cushion at a face side relative to the cushion main frame, and a cushion joining component, which turnably joins the cushion main frame and the cushion face side frame; and a cushion connection mechanism that, along with being turnably joined to the vehicle side at a position which is offset from a turning center of the cushion main frame, is connected to the cushion flexing component, and operates the cushion flexing component in accordance with operation of at least one of the seat back and the seat cushion.

According to some embodiments, the link mechanism supports the seat side portion provided at the left-right direction (a transverse direction of the seat) side portion of the seat cushion, the link mechanism is operated by operation of at least one of the seat back and the seat cushion, and the thickness of the seat side portion is flexed.

Here, the link mechanism is joined to the at least one of the seat back and the vehicle side, and in the condition in which the seat is used (a state in which sitting is possible), the operation is locked. Therefore, supporting rigidity of the seat side portion can be enhanced.

Further, the cushion main frame is provided inside the seat cushion. Furthermore, the cushion flexing component includes the cushion face side frame and the cushion joining component, and the cushion face side frame is provided in the seat cushion at the face side relative to the cushion main frame, along with which the cushion joining component is turnably joined to the cushion main frame and the cushion face side frame.

Here, the cushion connection mechanism is connected to the cushion flexing component, and the cushion flexing component is operated (that is, the link mechanism is operated) by the operation of the at least one of the seat back and the seat cushion. Accordingly, the thickness of the seat side portion of the seat cushion can be flexed.

Further, the cushion main frame is turnably joined to a vehicle side, along with which the cushion connection mechanism is turnably joined to the vehicle side, at the position which is offset from the tilting center of the cushion main frame. Therefore, the cushion flexing component can be operated by operation of the seat cushion.

According to some embodiments, the cushion flexing component includes: a cushion face frame provided in the seat cushion at the face side relative to the cushion face side frame; and a fifth link turnably joined to the cushion face side frame and the cushion face frame.

According to some embodiments, the cushion flexing component includes the cushion face frame and the fifth link. The cushion face frame is provided at the face side relative to the cushion face side frame in the seat cushion, and the fifth link is turnably joined to the cushion face side frame and the cushion face frame. Therefore, the cushion face side frame turns via the cushion joining component with respect to the cushion main frame, along with which the cushion face frame turns via the fifth link with respect to the cushion main frame, and the cushion flexing component is operated. Accordingly, a flexing amount of the thickness of the seat side portion can be increased.

According to some embodiments, the cushion flexing component includes a cushion reverse side member that is provided in the seat cushion at a reverse side relative to the cushion main frame and at which a separation from the cushion main frame in the thickness direction of the seat side portion is made flexable.

According to some embodiments, the cushion flexing component includes the cushion reverse side member, and the cushion reverse side member is provided at the reverse side relative to the cushion main frame in the seat cushion, along with which the separation of the cushion reverse side member in the seat side portion thickness direction from the cushion main frame is made flexable. Therefore, the thickness of the seat side portion can be flexed at the reverse side relative to the cushion main frame.

Another embodiment of a seat structure includes a cushion cover member that covers the seat cushion and accommodates the cushion reverse side member.

According to some embodiments, the cushion cover member that covers the seat cushion accommodates the cushion reverse side member. Therefore, appearance of the seat cushion can be improved.

An embodiment of a vehicle includes a seat that is structured with an embodiment of a seat structure.

Another embodiment of a vehicle includes a seat that is structured with another embodiment of a seat structure.

Effect of the Invention

With the present invention, supporting rigidity of a seat side portion can be enhanced.

BRIEF DESCRIPTION OF THE DRAWINGS

FIG. 43A is a side view, viewed from leftward, showing principal elements of a seat relating to a nineteenth embodiment of the present invention.

FIG. 43B is a side view, viewed from leftward, showing a stowed state of the principal elements of the seat relating to the nineteenth embodiment of the present invention.

FIG. 64 is an exploded perspective view, viewed from diagonally left rearward, showing the principal elements of the seat relating to the twenty-ninth embodiment of the present invention.

FIG. 72A is a side view, viewed from leftward, showing principal elements of a seat relating to a thirty-third embodiment of the present invention.

FIG. 72B is a side view, viewed from leftward, showing a stowed state of the principal elements of the seat relating to the thirty-third embodiment of the present invention.

BEST MODE FOR CARRYING OUT THE INVENTION

First Embodiment

Figure 1:
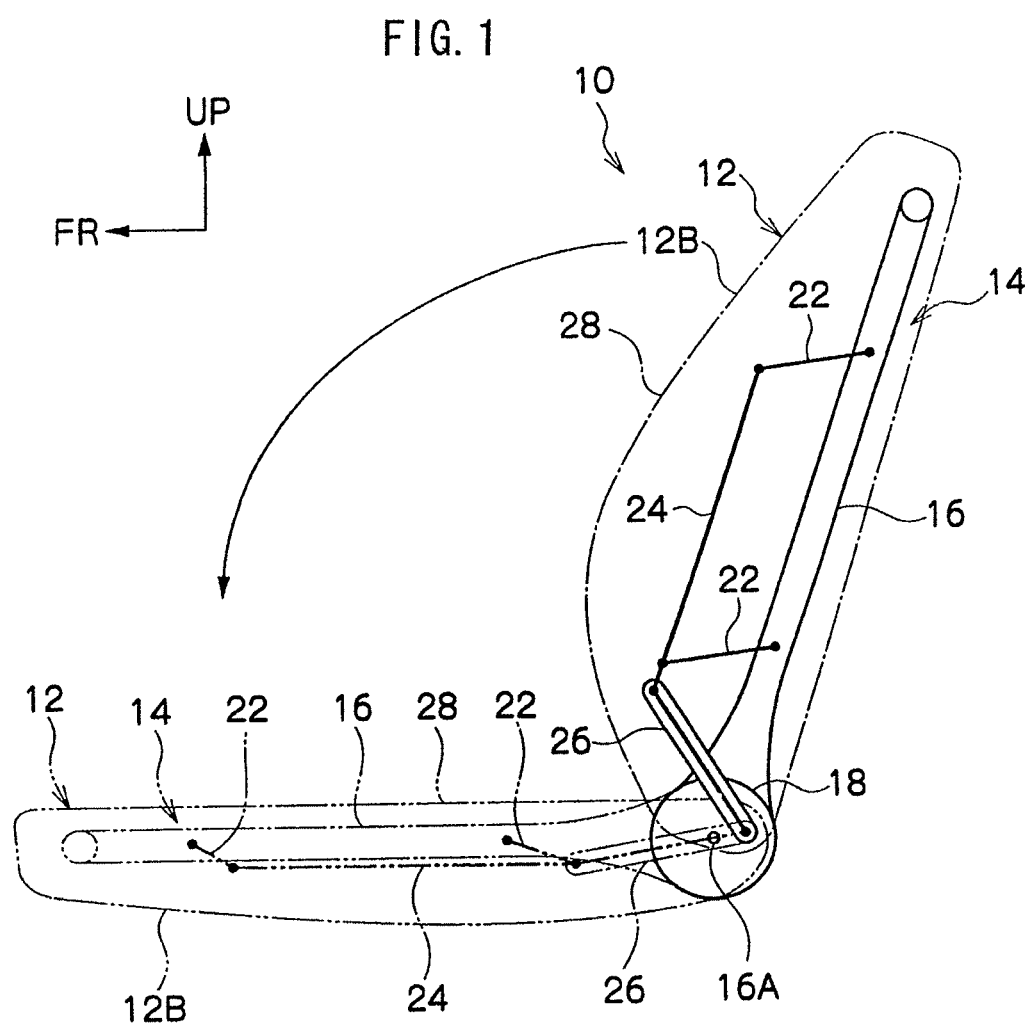
FIG. 1 is a side view, viewed from leftward, showing principal elements of a seat relating to a first embodiment of the present invention.
Figure 2:
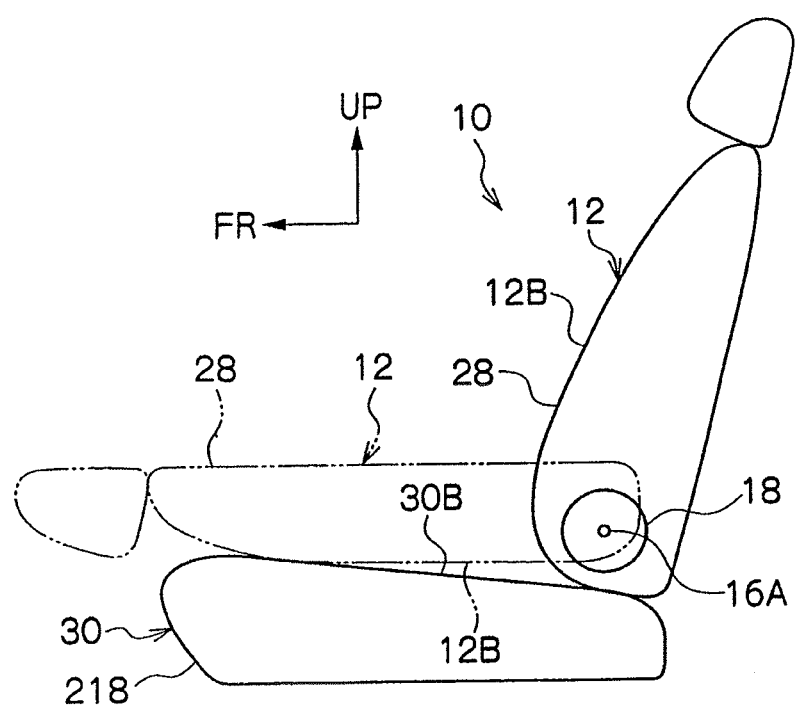
FIG. 2 is a side view, viewed from leftward, showing the seat relating to the first embodiment of the present invention.
Figure 3A:
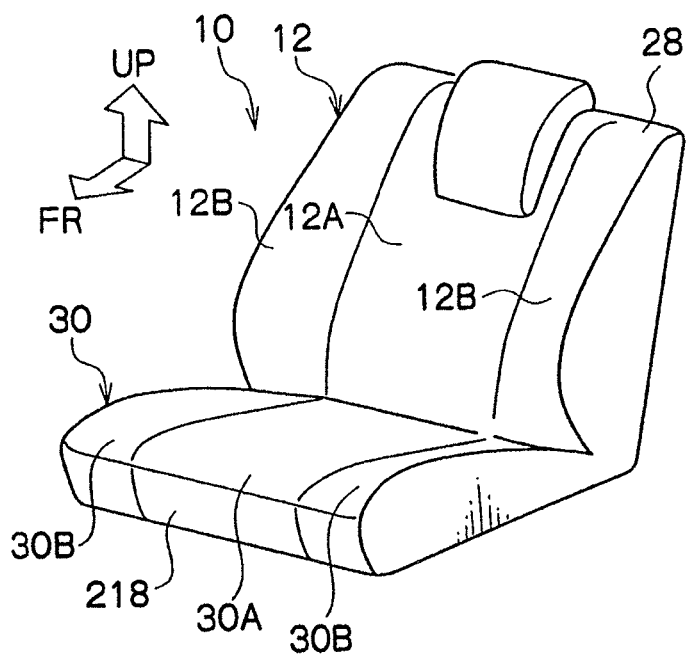
FIG. 3A is a perspective view, viewed from diagonally left forward, showing the seat relating to the first embodiment of the present invention.

FIG. 1 shows a side view, viewed from leftward, of principal elements of a seat 10 relating to a first embodiment that is structured with a seat structure of the present invention. Further, FIG. 2 shows a side view, viewed from leftward, of the seat 10, and FIG. 3A shows a perspective view, viewed from diagonally left forward, of the seat 10. Herein, in the drawings, frontward of the seat 10 is indicated by arrow FR, and upward of the seat 10 is indicated by arrow UP.

The seat 10 relating to the present embodiment is for a vehicle, and is provided on a cabin floor surface of the vehicle. The seat 10 is formed as what is known as a back forward-folding stowing type seat.

A seat back 12 is provided at the seat 10. A left-right direction (width direction) central portion of the seat back 12 is formed as a back main portion 12A, which serves as a seat main portion, along with which each of two left-right direction end portions of the seat back 12 is formed as a back side portion 12B, which serves as a seat side portion. In comparison with the back main portion 12A, the back side portion 12B protrudes to the front side (a face side of the seat back 12).

A back link mechanism 14, which serves as a link mechanism, is provided inside the seat back 12.

At the back link mechanism 14, a board-form back main frame 16 (side frame) is provided in a pair. The back main frame 16 is disposed inside the back side portion 12B. A lower end of the back main frame 16 is supported to be tiltable around a tilting center 16A at a vehicle side (a later-described seat cushion 30). Accordingly, the seat back 12 is supported to be tiltable around the tilting center 16A at the vehicle side. A reclining mechanism 18 is provided at a lower end of the back main frame 16. The reclining mechanism 18 locks tilting of the back main frame 16 around the tilting center 16A, and thus the seat back 12 is obstructed from tilting around the tilting center 16A, and is stood up substantially vertically. By the reclining mechanism 18 being controlled, the reclining mechanism 18 enables tilting of the back main frame 16 around the tilting center 16A, and tilting of the seat back 12 around the tilting center 16A is enabled.

Figure 4A:
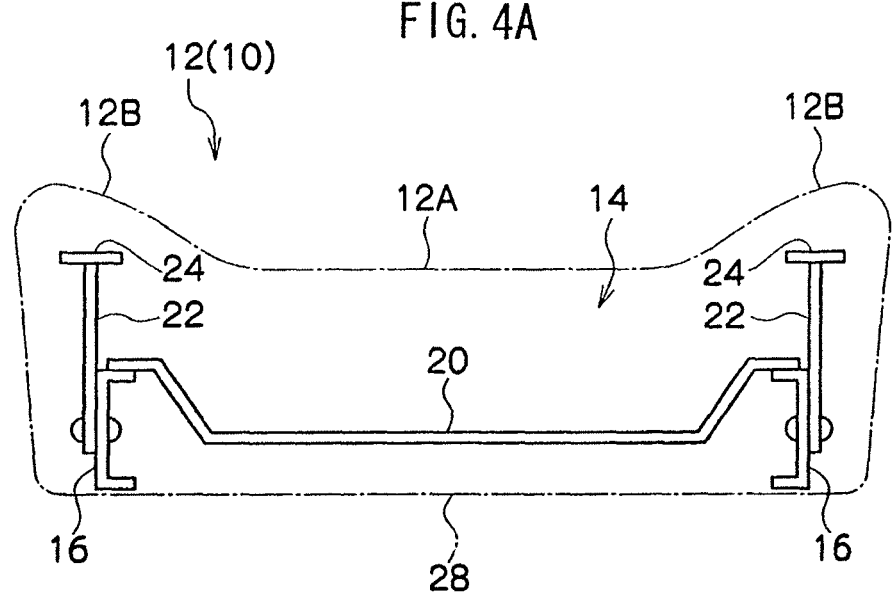
FIG. 4A is a sectional view, viewed from an upper end side, showing principal elements of the seat relating to the first embodiment of the present invention.

Between the pair of the back main frame 16, a back backrest 20 is supported (see FIG. 4A). The back backrest 20 supports a front side region of the back main portion 12A from a rear side.

First links 22, which structure a back flexing component, are turnably joined, at rear ends, to the back main frame 16 in a predetermined number (two in the present embodiment).

A board-form back sub frame 24, which serves as a back face side frame of the back flexing component, is provided at the front side of the back main frame 16. Front ends of the first links 22 are turnably joined to the back sub frame 24, and the back sub frame 24 supports a front side region of the back side portion 12B from the rear side.

An upper end of a back joint link 26, which serves as a back joint mechanism, is turnably joined to a lower end of the back sub frame 24 or a front end (anywhere other than a rear end is acceptable) of the first link 22 at the lower portion of the back main frame 16. A lower end of the back joint link 26 is turnably joined to the vehicle side at a rear side of the tilting center 16A (a position which is offset from the tilting center 16A) at the lower end of the back main frame 16. Accordingly, turning of the first link 22, the back sub frame 24 and the back joint link 26 is locked, and operation of the back link mechanism 14 is locked.

The whole of an outer peripheral surface of the seat back 12 is covered with a back face skin 28, which serves as a back cover member (see FIG. 4A).

The seat cushion 30 is provided at the front side of the seat back 12. The seat cushion 30 is supported at the vehicle side, and is disposed to be substantially horizontal according to a lower side of the seat cushion 30.

Next, operation of the present embodiment will be described.

In the seat 10 of the structure described above, in a state in which tilting of the back main frame 16 around the tilting center 16A is locked by the reclining mechanism 18, the lower end of the back joint link 26 is turnably joined to the vehicle side. Thus, turning of the first link 22, the back sub frame 24 and the back joint link 26 is locked, and operation of the back link mechanism 14 is locked. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 10, the back side portion 12B can thoroughly retain the crew.

Moreover, an operation plane of the back link mechanism 14 (a turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Figure 3B:
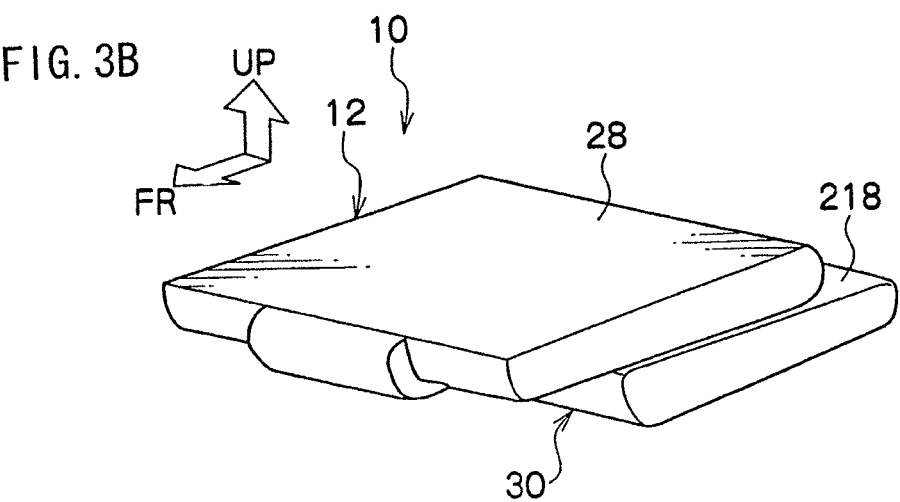
FIG. 3B is a perspective view, viewed from diagonally left forward, showing a stowed state of the seat relating to the first embodiment of the present invention.

By the reclining mechanism 18 being controlled and the seat back 12 being tilted forward around the tilting center 16A, the seat back 12 is folded onto the upper side of the seat cushion 30, and the seat 10 is stowed (known as fold-forward stowing) (see FIG. 3B).

Figure 4B:
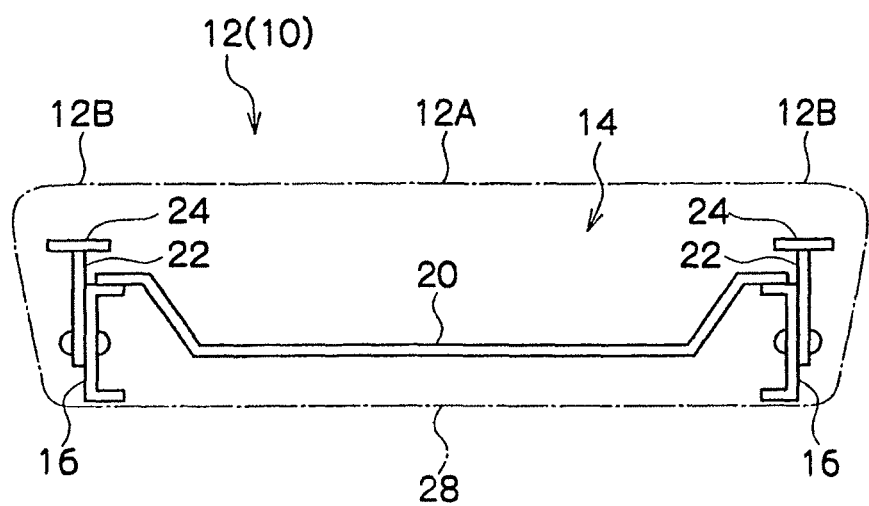
FIG. 4B is a sectional view, viewed from the upper end side, showing a stowed state of the principal elements of the seat relating to the first embodiment of the present invention.

When the seat 10 is being stowed, the seat back 12 (the back main frame 16) is tilted forward around the tilting center 16A, and the back joint link 26 is turned forward around the lower end. Thus, by movement of the back sub frame 24 which is to say the first links 22 toward the lower end side of the seat back 12, the first links 22 are turned toward the lower end side of the seat back 12, and a separation between the back main frame 16 and the back sub frame 24 in a thickness direction of the seat back 12 is contracted (see FIG. 4B). Accordingly, even in a case in which a thickness of the back side portion 12B for times of usual use is made thicker, in accordance with stowing of the seat 10, the thickness of the back side portion 12B is contracted in a region at a face side relative to the back main frame 16 and can be reduced in size to be equal to a thickness of the back main portion 12A, and space (space at the upper side of the seat 10) in the cabin at times of stowage of the seat 10 (a luggage compartment) can be made larger.

Figure 5A:
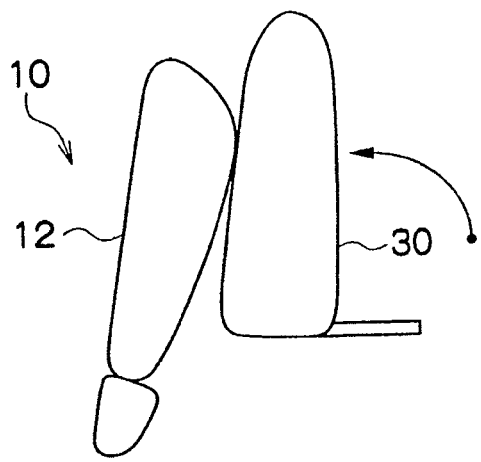
FIG. 5A is a side view, viewed from leftward, showing a tumble storage state of the seat relating to the first embodiment of the present invention.

Further, for example, as shown in FIG. 5A, a structure can be formed in which the seat 10 is formed as what is known as a tumble-storing type, and after the seat 10 is stowed, support of the seat back 12 and the seat cushion 30 to the vehicle side is released, the seat 10 is turned substantially 90° forward, and thus the seat 10 (the seat back 12 and the seat cushion 30) is stored to the front side in a state of being stood up substantially vertically. In this case, because the thickness of the back side portion 12B has been contracted in accordance with stowing of the seat 10 as described above, space (space at the front side and rear side of the seat 10) in the cabin at times of storage of the seat 10 (a luggage compartment) can be made larger.

Figure 5B:
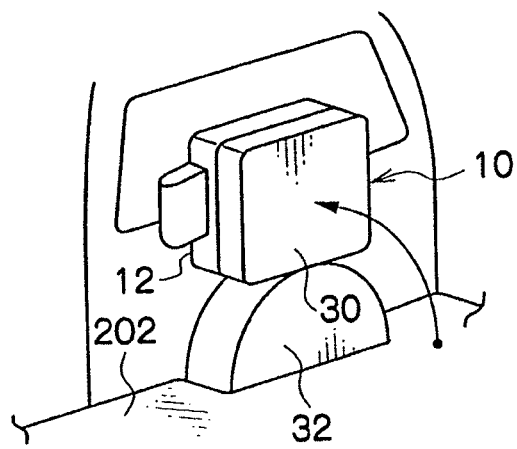
FIG. 5B is a perspective view, viewed from diagonally forward, showing a space-increasing storage state of the seat relating to the first embodiment of the present invention.

Further, for example, as shown in FIG. 5B, in a case in which a wheel housing 32 is present to sideward of the seat 10, a structure can be formed in which the seat 10 is formed as what is known as a space-increasing storage type, and after the seat 10 is stowed, support of the seat back 12 and the seat cushion 30 to the vehicle side is released, the seat 10 is turned substantially 90° to sideward, and thus the seat 10 (the seat back 12 and the seat cushion 30) is stored at the upper side of the wheel housing 32 in a state of being stood up substantially vertically. In this case, because the thickness of the back side portion 12B has been contracted in accordance with stowing of the seat 10 as described above, space (space to sideward of the seat 10) in the cabin at times of storage of the seat 10 (a luggage compartment) can be made larger.

Figure 5C:
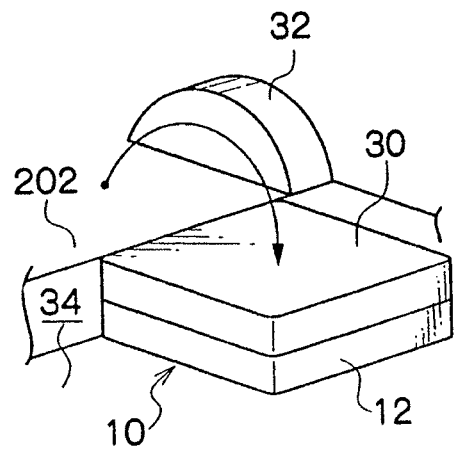
FIG. 5C is a perspective view, viewed from diagonally rearward, showing a rearward under-floor storage state of the seat relating to the first embodiment of the present invention.

Furthermore, for example, as shown in FIG. 5C, in a case in which a recess portion 34 is present to rearward of the seat 10, a structure can be formed in which the seat 10 is formed as what is known as a rearward under-floor storage type, and after the seat 10 is stowed, support of the seat back 12 and the seat cushion 30 to the vehicle side is released, the seat 10 is turned substantially 180° to rearward or is moved by a turning link or the like, and thus the seat 10 (the seat back 12 and the seat cushion 30) is stored substantially horizontally inside the recess portion 34 in a state in which the seat cushion 30 is disposed at the upper side of the seat back 12. In this case, because the thickness of the back side portion 12B has been contracted in accordance with stowing of the seat 10 as described above, space (space at the upper side of the seat 10) in the cabin at times of storage of the seat 10 (a luggage compartment) can be made larger, along with which a depth of the recess portion 34 can be made shallower.

Figure 6:
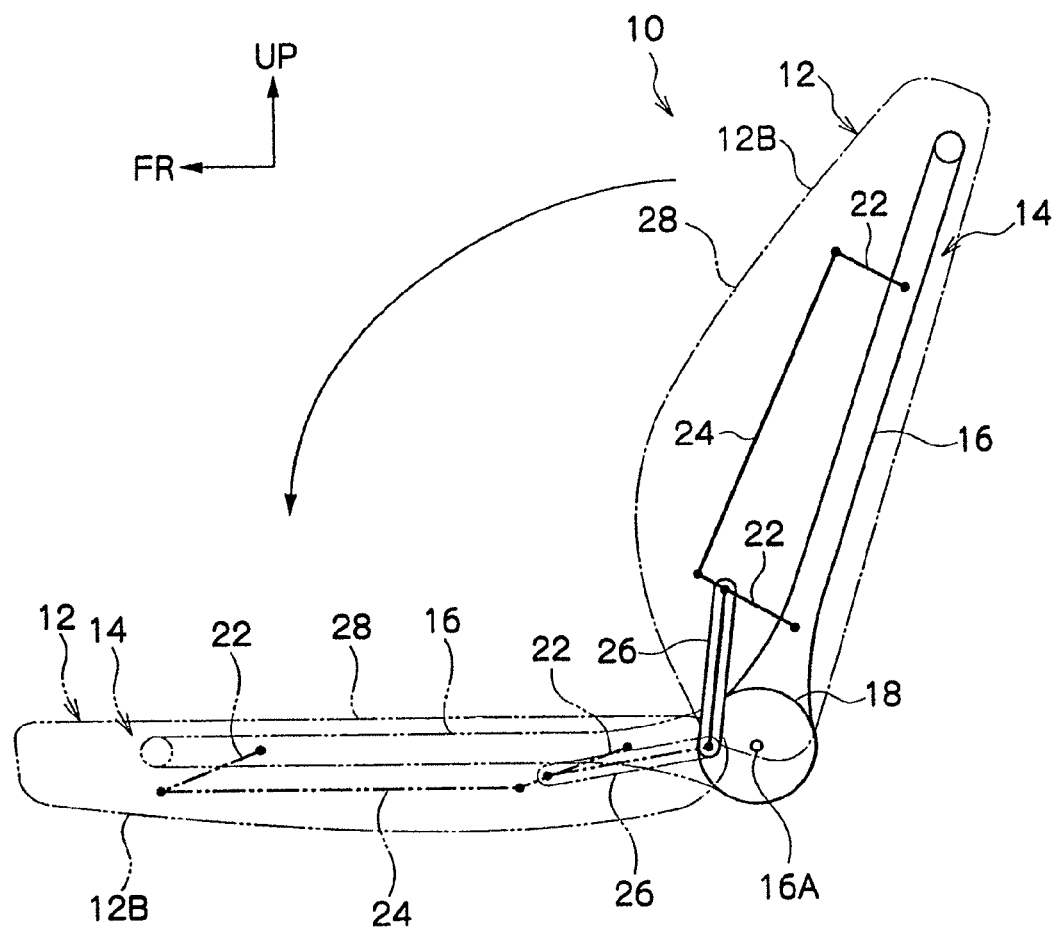
FIG. 6 is a side view, viewed from leftward, showing principal elements of a seat of a first alternative example relating to the first embodiment of the present invention.

Here, in the present embodiment, a structure is formed in which the lower end of the back joint link 26 is turnably joined to the vehicle side at the rear side of the tilting center 16A at the lower end of the back main frame 16. However, as shown in FIG. 6, a structure may be formed in which the lower end of the back joint link 26 is turnably joined to the vehicle side at the front side of the tilting center 16A (a position which is offset from the tilting center 16A) at the lower end of the back main frame 16. In this case, when the seat 10 is being stowed, the seat back 12 (the back main frame 16) is tilted forward around the tilting center 16A, and the back joint link 26 turns forward around the lower end. Thus, by movement of the back sub frame 24 which is to say the first links 22 toward the upper end side of the seat back 12, the first links 22 are turned toward the upper end side of the seat back 12, and a separation in the seat back 12 thickness direction between the back main frame 16 and the back sub frame 24 is contracted.

Figure 7A:
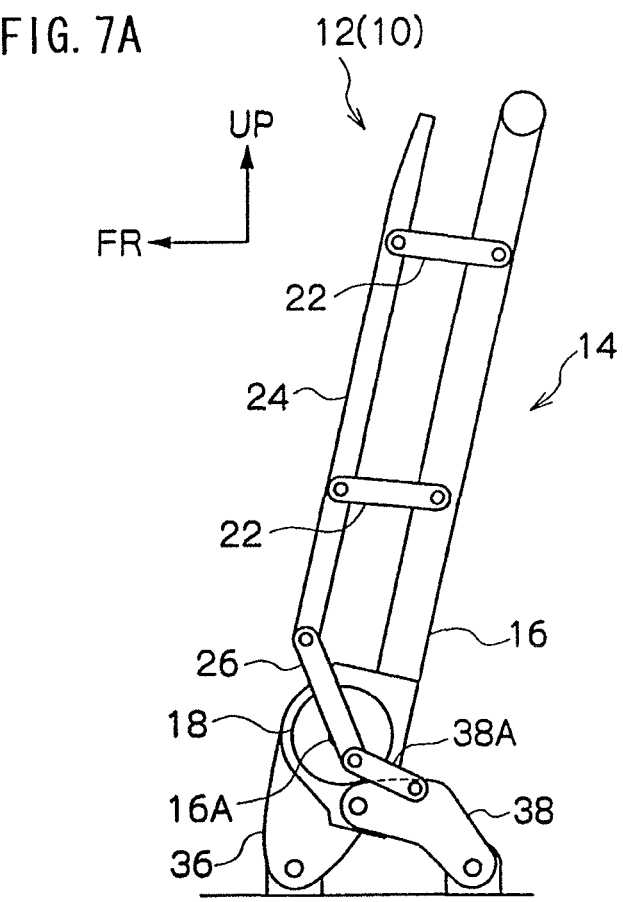
FIG. 7A is a side view, viewed from leftward, showing a seat of a second alternative example relating to the first embodiment of the present invention.
Figure 7B:
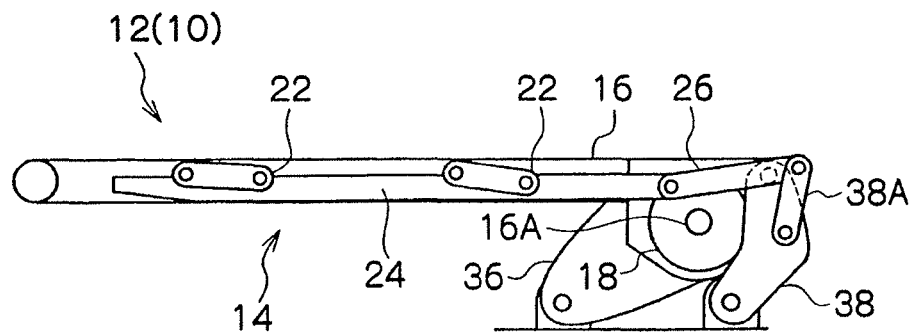
FIG. 7B is a side view, viewed from leftward, showing a stowed state of the seat of the second alternative example relating to the first embodiment of the present invention.
Figure 8A:
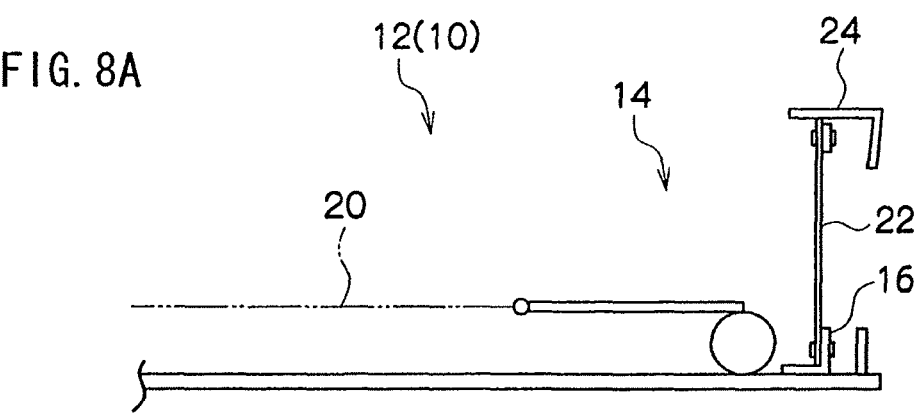
FIG. 8A is a plan view, viewed from the upper end side, showing principal elements of the seat of the second alternative example relating to the first embodiment of the present invention.
Figure 8B:
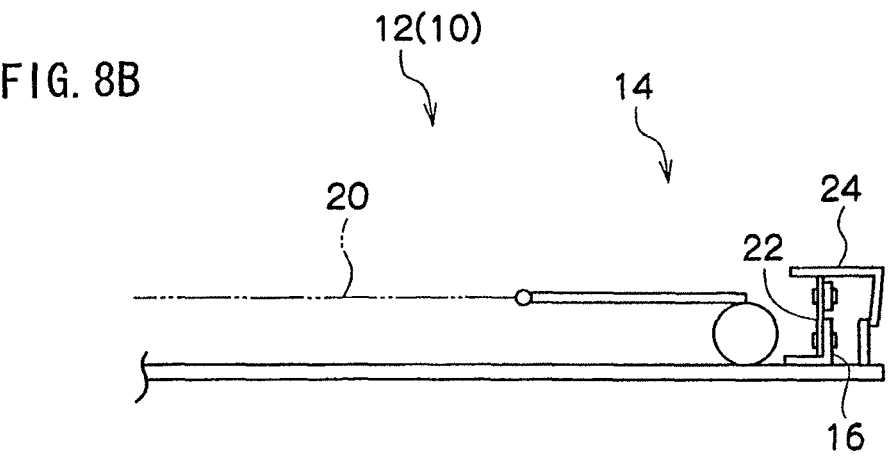
FIG. 8B is a plan view, viewed from the upper end side, showing the stowed state of the principal elements of the seat of the second alternative example relating to the first embodiment of the present invention.

Further, in the present embodiment, a structure is formed in which the tilting center 16A of the seat back 12 (the back main frame 16) and the lower end (turning center) of the back joint link 26 do not move when the seat 10 is being stowed. However, a structure may be formed in which the tilting center 16A of the seat back 12 (the back main frame 16) and the lower end (turning center) of the back joint link 26 are moved when the seat 10 is being stowed. In this case, for example, as shown in FIG. 7A, a lower end of a front support link 36 at a front side and a lower end of a rear support link 38 at a rear side are turnably supported at the vehicle side. The lower end of the back main frame 16 is supported to be turnable around the tilting center 16A at an upper end of the front support link 36, along with which the lower end of the back main frame 16 is turnably supported at the upper end of the rear support link 38, at the rear side of the tilting center 16A. Turning of the back main frame 16 relative to the front support link 36 is locked by the reclining mechanism 18. Accordingly, turning of the back main frame 16, the front support link 36 and the rear support link 38 is locked. Further, one end of an intermediate link 38A is non-turnably joined to an upper end of the rear support link 38, and another end of the intermediate link 38A is turnably joined to the lower end of the back joint link 26. Therefore, as shown in FIG. 7B, when the reclining mechanism 18 is controlled and the seat 10 is being stowed, the front support link 36, the rear support link 38 and the intermediate link 38A turn rearward, and the tilting center 16A of the back main frame 16 and the lower end of the back joint link 26 move rearward. Further, in this case too, as shown in FIGS. 8A and 8B, the thickness of the back side portion 12B is contracted in the region at the face side relative to the back main frame 16 at times of stowage of the seat 10, and can be made equal to the thickness of the back main portion 12A.

Figure 9A:
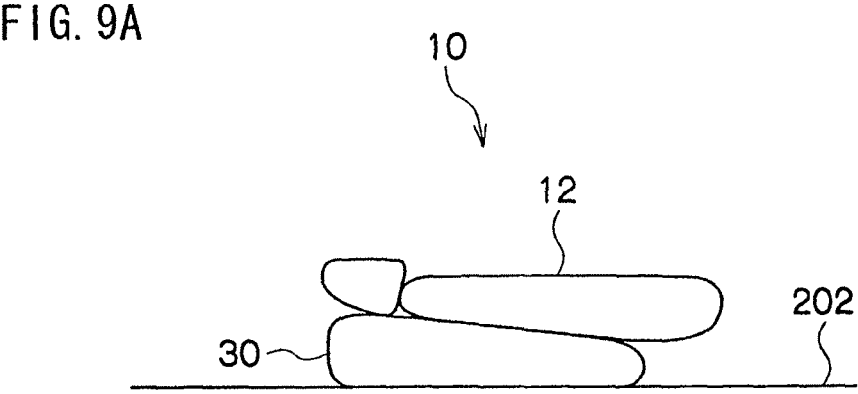
FIG. 9A is a side view, viewed from leftward, showing a forward tilt-down stowed state of the seat relating to the first embodiment of the present invention.
Figure 9B:
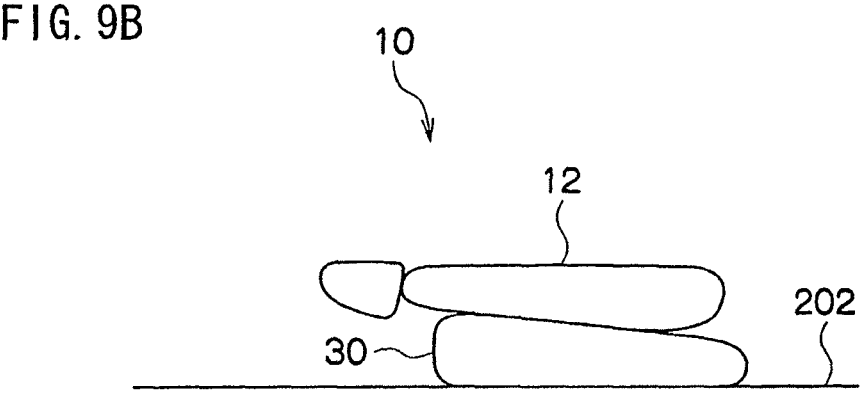
FIG. 9B is a side view, viewed from leftward, showing a rearward tilt-down stowed state of the seat relating to the first embodiment of the present invention.

Further yet, in the present embodiment, a structure may be formed in which the seat 10 is formed as what is known as a tilt-down stowage type and, as shown in FIG. 9A, when the seat 10 is being stowed, the seat cushion 30 moves downward and forward in accordance with tilting of the seat back 12 forward around the tilting center 16A, or a structure in which, as shown in FIG. 9B, when the seat 10 is being stowed, the seat cushion 30 moves downward and rearward in accordance with tilting of the seat back 12 forward around the tilting center 16A.

Figure 10:
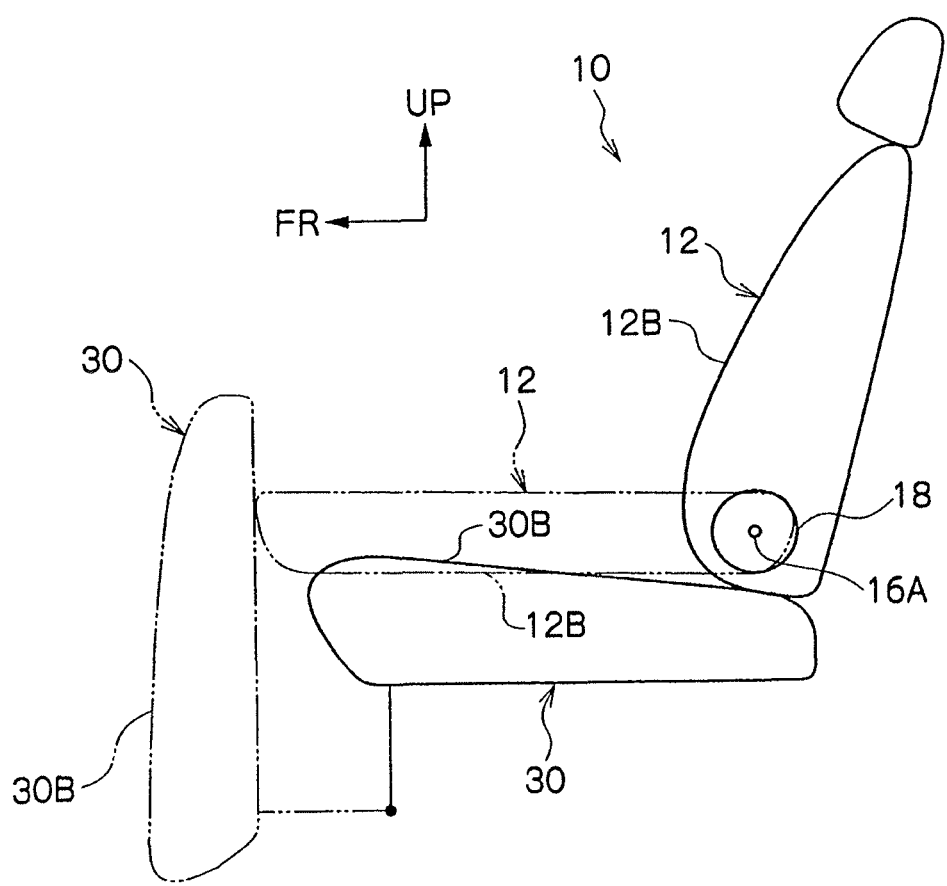
FIG. 10 is a side view, viewed from leftward, showing a double-folded stowed state of the seat relating to the first embodiment of the present invention.
Figure 11:
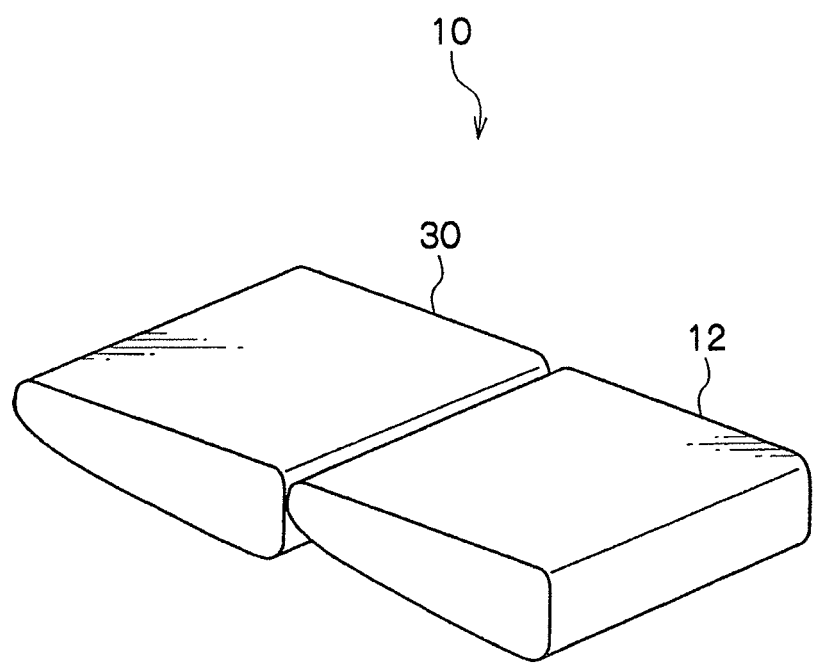
FIG. 11 is a perspective view, viewed from diagonally left rearward, showing a double-flat stowed state of the seat relating to the first embodiment of the present invention.

Further, in the present embodiment, a structure is formed in which the seat back 12 is folded onto the upper side of the seat cushion 30 and the seat 10 is stowed. However, as shown in FIG. 10, the seat 10 may be formed with a structure which is known as double-folded stowing. In this case, support of the seat cushion 30 to the vehicle side is released, the seat cushion 30 is turned forward, and thus the seat cushion 30 is stood up substantially vertically. Then, the reclining mechanism 18 is controlled, the seat back 12 turns forward around the back main frame 16, and thus the seat back 12 is disposed substantially horizontally at the rear side of the seat cushion 30 and stowed. Further, as shown in FIG. 11, the seat 10 may be formed with a structure which is known as double-flat stowing. In this case, support of the seat cushion 30 to the vehicle side is released, the seat cushion 30 is turned forward, and thus the seat cushion 30 is inverted to be substantially horizontal. Then, the reclining mechanism 18 is controlled, the seat back 12 turns forward around the tilting center 16A, and thus the seat back 12 is disposed substantially horizontally at the rear side of the seat cushion 30 and stowed. Further, in either of the cases of FIG. 10 and FIG. 11, the thickness of the back side portion 12B is contracted in accordance with stowing of the seat 10 in the same manner as described above. Therefore, space (space at the upper side of the seat back 12) in the cabin at times of stowage of the seat 10 (a luggage compartment) can be made larger, along with which interference of the seat back 12 with the cabin floor surface can be suppressed.

Second Embodiment

Figure 12:
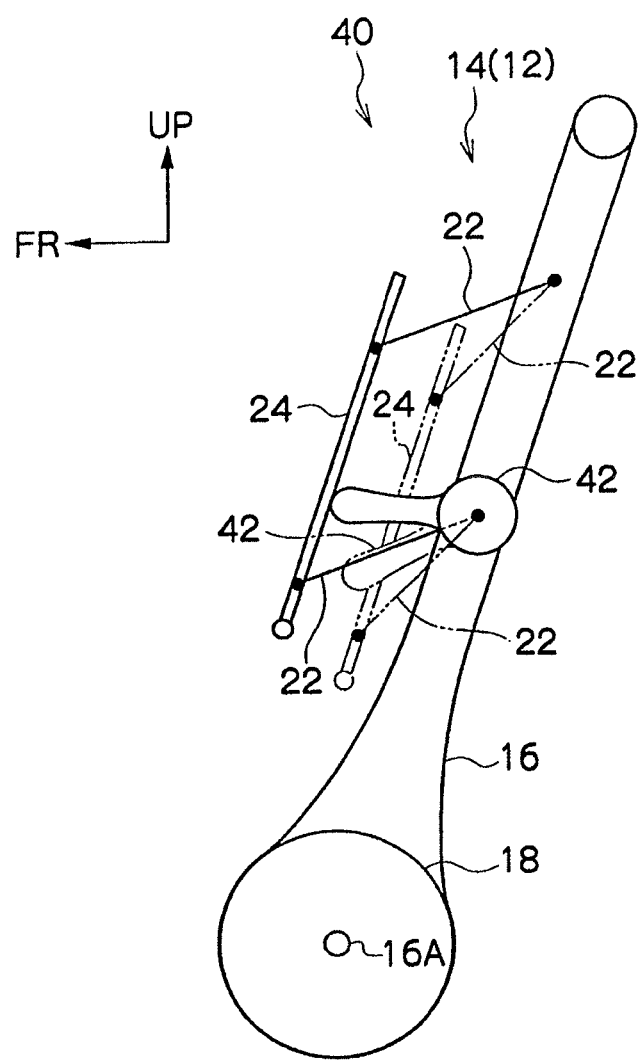
FIG. 12 is a side view, viewed from leftward, showing principal elements of a seat relating to a second embodiment of the present invention.

FIG. 12 shows a side view, viewed from leftward, of principal elements of a seat 40 relating to a second embodiment that is structured with the seat structure of the present invention.

The seat 40 relating to the present embodiment has a substantially similar structure to the above-described first embodiment, but differs in the following respects.

In the seat 40 relating to the present embodiment, a circular rod-shaped control lever 42, which serves as a control mechanism, is joined to the rear end (turning center) of one of the first links 22 at the back main frame 16. The control lever 42 is formed as a regulator or the like. A turn-locking mechanism (not shown) which serves as a locking mechanism is provided at the control lever 42. Turning of the control lever 42 is obstructed by the turn-locking mechanism, and thus turning of the first links 22 and the back sub frame 24 is locked, and operation of the back link mechanism 14 is restricted. The control lever 42 protrudes to sideward of the seat back 12, and by the control lever 42 being turningly controlled, the first links 22 are made turnable.

Further, the back joint link 26 of the above-described first embodiment is not provided in the present embodiment.

Next, operation of the present embodiment will be described.

In the seat 40 of the structure described above, in the state in which tilting of the back main frame 16 around the tilting center 16A is locked by the reclining mechanism 18, turning of the control lever 42 is obstructed by the turn-locking mechanism. Thus, turning of the first links 22 and the back sub frame 24 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 40, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

In a state in which turning obstruction by the turn locking-mechanism of the control lever 42 is released, by the control lever 42 being turningly controlled, the first links 22 are turned, and the separation in the seat back 12 thickness direction between the back main frame 16 and the back sub frame 24 is flexed. Accordingly, independently of stowing of the seat 40, the thickness of the back side portion 12B is flexed in the region at the face side relative to the back main frame 16, and can be adjusted.

Third Embodiment

Figure 13:
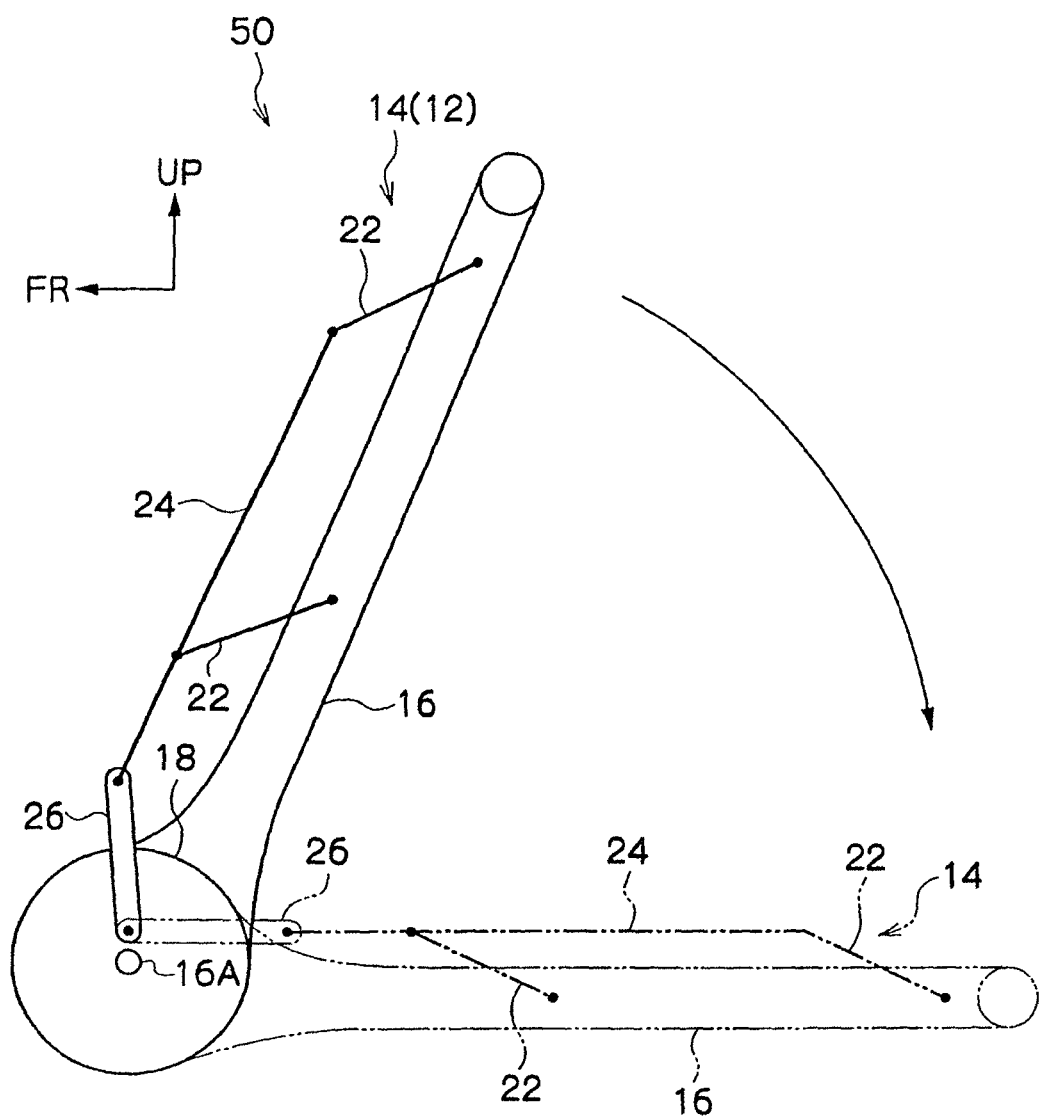
FIG. 13 is a side view, viewed from leftward, showing principal elements of a seat relating to a third embodiment of the present invention.
Figure 14:
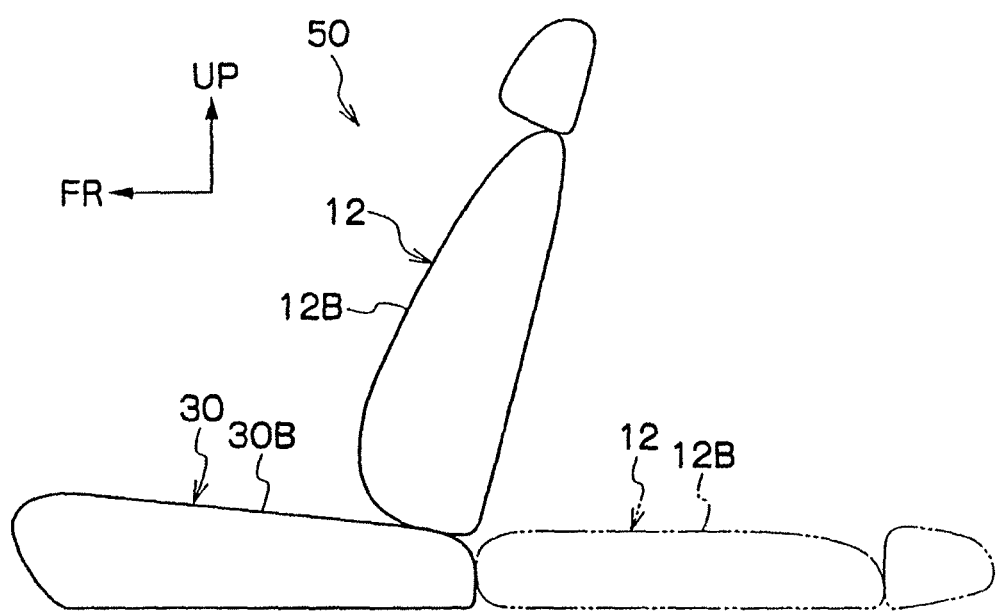
FIG. 14 is a side view, viewed from leftward, showing the seat relating to the third embodiment of the present invention.

FIG. 13 shows a side view, viewed from leftward, of principal elements of a seat 50 relating to a third embodiment that is structured with the seat structure of the present invention. FIG. 14 shows a side view, viewed from leftward, of the seat 50.

The seat 50 relating to the present embodiment has a substantially similar structure to the above-described first embodiment, but differs in the following respects.

The seat 50 relating to the present embodiment is formed as what is known as a back rearward-folding stowing type.

The lower end of the back joint link 26 is turnably joined to the vehicle side at the upper side of the tilting center 16A (a position which is offset from the tilting center 16A) at the lower end of the back main frame 16.

Here, with the present embodiment too, effects the same as in the above-described first embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 50 is stowed (known as rearward-folding stowing).

When the seat 50 is being stowed, the seat back 12 (the back main frame 16) is tilted rearward around the tilting center 16A, and the back joint link 26 is turned rearward around the lower end. Thus, by movement of the back sub frame 24 which is to say the first links 22 toward the lower end side of the seat back 12, the first links 22 are turned toward the lower end side of the seat back 12, and the separation in the seat back 12 thickness direction between the back main frame 16 and the back sub frame 24 is contracted. Accordingly, even in a case in which a thickness of the back side portion 12B for times of usual use is made thicker, in accordance with stowing of the seat 50, the thickness of the back side portion 12B is contracted in the region at the face side relative to the back main frame 16 and can be made equal to the thickness of the back main portion 12A, and space (space at the upper side of the seat back 12) in the cabin at times of stowage of the seat 50 (a luggage compartment) can be made larger.

Figure 15:
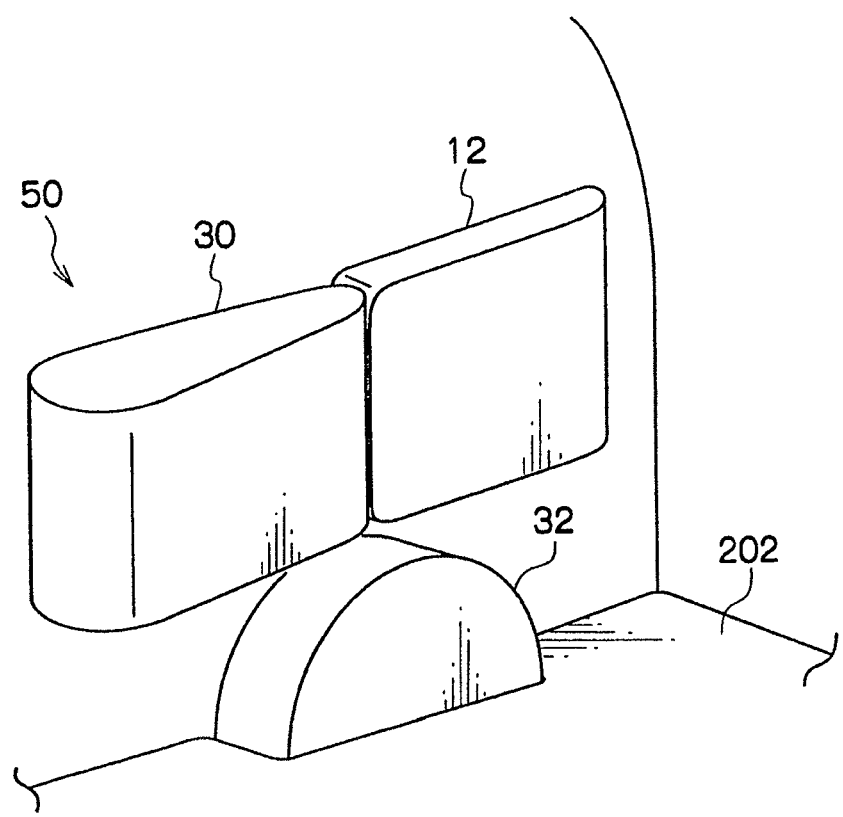
FIG. 15 is a perspective view, viewed from diagonally forward, showing a space-increasing storage state of the seat relating to the third embodiment of the present invention.

Further, for example, as shown in FIG. 15, in a case in which the wheel housing 32 is present to sideward of the seat 50, a structure can be formed in which the seat 50 is formed as what is known as a space-increasing storage type, and after the seat 50 is stowed, support of the seat back 12 and the seat cushion 30 to the vehicle side is released, the seat 50 is turned substantially 90° to sideward, and thus the seat 50 (the seat back 12 and the seat cushion 30) is stored at the upper side of the wheel housing 32 in a state of being stood up substantially vertically. In this case, because the thickness of the back side portion 12B has been contracted in accordance with stowing of the seat 50 as described above, space (space to sideward of the seat 50) in the cabin at times of storage of the seat 50 (a luggage compartment) can be made larger.

Figure 16:
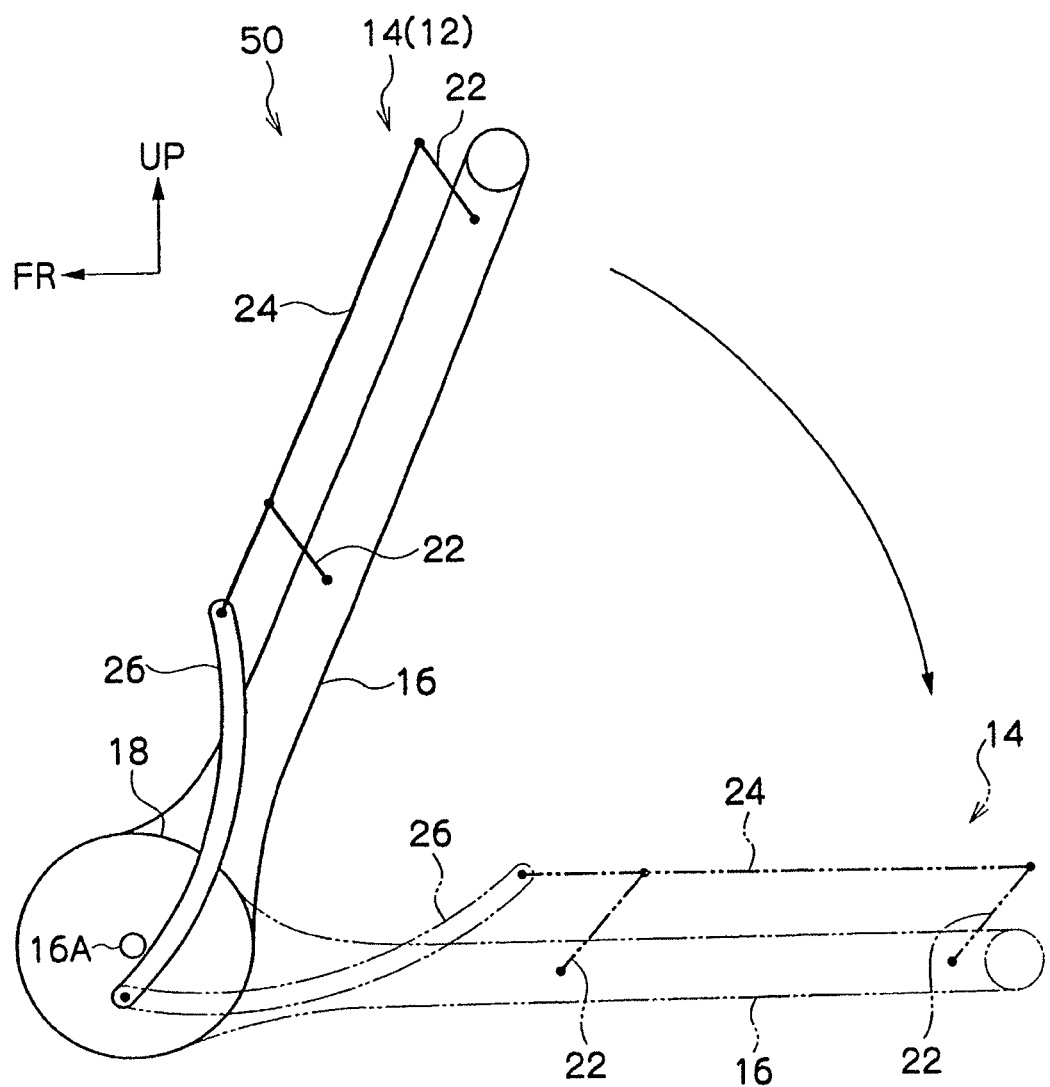
FIG. 16 is a side view, viewed from leftward, showing principal elements of a seat of an alternative example relating to the third embodiment of the present invention.

Here, in the present embodiment, a structure is formed in which the lower end of the back joint link 26 is turnably joined to the vehicle side at the upper side of the tilting center 16A at the lower end of the back main frame 16. However, as shown in FIG. 16, a structure may be formed in which the lower end of the back joint link 26 is turnably joined to the vehicle side at the lower side of the tilting center 16A (a position which is offset from the tilting center 16A) at the lower end of the back main frame 16. In this case, when the seat 50 is being stowed, the seat back 12 (the back main frame 16) is tilted rearward around the tilting center 16A, and the back joint link 26 turns rearward around the lower end. Thus, by movement of the back sub frame 24 which is to say the first links 22 toward the upper end side of the seat back 12, the first links 22 are turned toward the upper end side of the seat back 12, and a separation in the seat back 12 thickness direction between the back main frame 16 and the back sub frame 24 is contracted.

Fourth Embodiment

Figure 17:
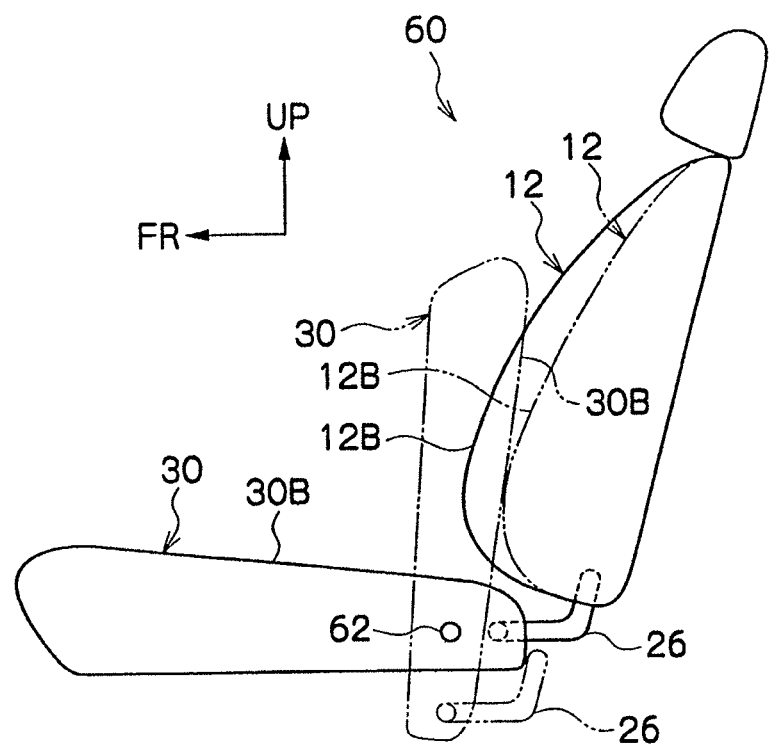
FIG. 17 is a side view, viewed from leftward, showing a seat relating to a fourth embodiment of the present invention.

FIG. 17 shows a side view, viewed from leftward, of a seat 60 relating to a fourth embodiment that is structured with the seat structure of the present invention.

The seat 60 relating to the present embodiment has a substantially similar structure to the above-described first embodiment, but differs in the following respects.

The seat 60 relating to the present embodiment is formed as what is known as a tip-up stowing type.

At both a left and a right end portion, a rear end vicinity of the seat cushion 30 is supported at the vehicle side to be turnable around a support shaft 62. Accordingly, the seat cushion 30 is supported at the vehicle side to be turnable around the support shaft 62. A rear end of the seat cushion 30 abuts against the lower end of the seat back 12, and accordingly the seat cushion 30 is disposed substantially horizontally.

The back joint link 26 is formed in a letter-L shape. An upper end of the back joint link 26 is turnably supported at the lower end of the back sub frame 24 or the front end (anywhere other than the rear end is acceptable) of the first link 22 at the lower portion of the back main frame 16. The lower end of the back joint link 26 is turnably joined to the rear end of the seat cushion 30 (at a position which is offset to the rear side from the support shaft 62). Accordingly, turning of the first links 22, the back sub frame 24 and the back joint link 26 is locked, and operation of the back link mechanism 14 is locked.

Next, operation of the present embodiment will be described.

In the seat 60 of the structure described above, in the state in which tilting of the back main frame 16 around the tilting center 16A is locked by the reclining mechanism 18 and the rear end of the seat cushion 30 is abutted against the lower end of the seat back 12, the lower end of the back joint link 26 is turnably joined to the rear end of the seat cushion 30. Thus, turning of the first links 22, the back sub frame 24 and the back joint link 26 is locked, and operation of the back link mechanism 14 is locked. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 60, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Further, by the seat cushion 30 being turned rearward around the support shaft 62 (which is known as tipping up), the seat cushion 30 is folded up onto the front side of the seat back 12, and the seat 60 is stowed.

When the seat 60 is being stowed, the seat cushion 30 is tilted rearward around the support shaft 62, and the back joint link 26 is moved downward. Thus, by movement of the back sub frame 24 which is to say the first links 22 downward, the first links 22 are turned downward, and a separation in the seat back 12 thickness direction between the back main frame 16 and the back sub frame 24 is contracted. Accordingly, even in a case in which a thickness of the back side portion 12B for times of usual use is made thicker, in accordance with stowing of the seat 60, the thickness of the back side portion 12B is contracted in the region at the face side relative to the back main frame 16 and can be made equal to the thickness of the back main portion 12A, and space (space at the front side and rear side of the seat 60) in the cabin at times of stowage of the seat 60 (a luggage compartment) can be made larger.

Further, for example, similarly to FIG. 5A, a structure can be formed in which the seat 60 is formed as what is known as a tumble-storing type, and after the seat 60 is stowed, support to the vehicle side of the seat back 12 and the seat cushion 30 is released, the seat 60 is turned substantially 180" forward, and thus the seat 60 (the seat back 12 and the seat cushion 30) is stored to the front side in a state of being stood up substantially vertically. In this case, because the thickness of the back side portion 12B has been contracted in accordance with stowing of the seat 60 as described above, space (space at the front side and rear side of the seat 60) in the cabin at times of storage of the seat 60 (a luggage compartment) can be made larger.

Further, for example, similarly to FIG. 5B, in a case in which the wheel housing 32 is present to sideward of the seat 60, a structure can be formed in which the seat 60 is formed as what is known as a space-increasing storage type, and after the seat 60 is stowed, support of the seat back 12 and the seat cushion 30 to the vehicle side is released, the seat 60 is turned substantially 90° to forward and sideward, and thus the seat 60 (the seat back 12 and the seat cushion 30) is stored at the upper side of the wheel housing 32 in a state of being stood up substantially vertically. In this case, because the thickness of the back side portion 12B has been contracted in accordance with stowing of the seat 60 as described above, space (space to sideward of the seat 60) in the cabin at times of storage of the seat 60 (a luggage compartment) can be made larger.

Moreover, for example, similarly to FIG. 5C, in a case in which the recess portion 34 is present to rearward of the seat 60, a structure can be formed in which the seat 60 is formed as what is known as a rearward under-floor storage type, and after the seat 60 is stowed, support of the seat back 12 and the seat cushion 30 to the vehicle side is released, the seat 60 is turned substantially 90° to rearward or is moved by a turning link or the like, and thus the seat 60 (the seat back 12 and the seat cushion 30) is stored substantially horizontally in the recess portion 34 in a state in which the seat cushion 30 is disposed at the upper side of the seat back 12. In this case, because the thickness of the back side portion 12B has been contracted in accordance with stowing of the seat 60 as described above, space (space at the upper side of the seat 60) in the cabin at times of storage of the seat 60 (a luggage compartment) can be made larger, along with which a depth of the recess portion 34 can be made shallower.

Fifth Embodiment

Figure 18A:
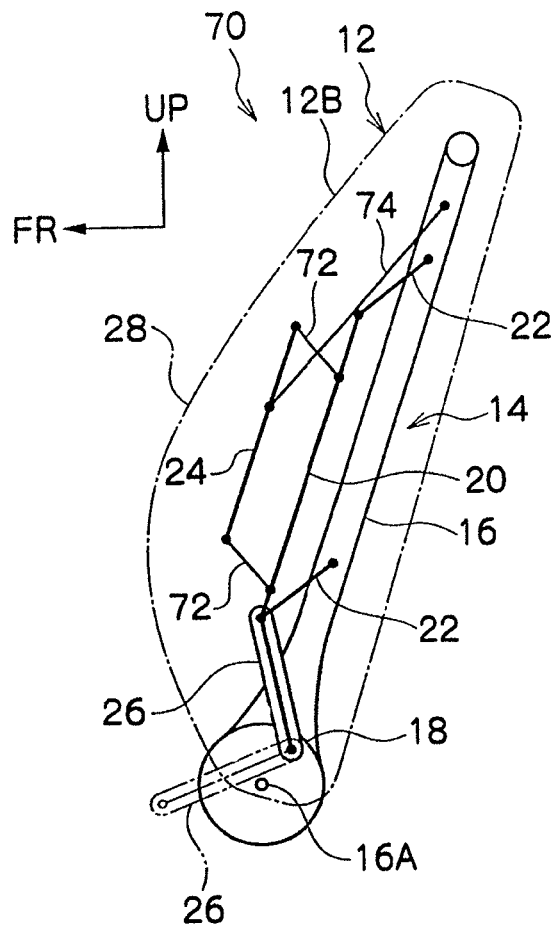
FIG. 18A is a side view, viewed from leftward, showing principal elements of a seat relating to a fifth embodiment of the present invention.
Figure 19A:
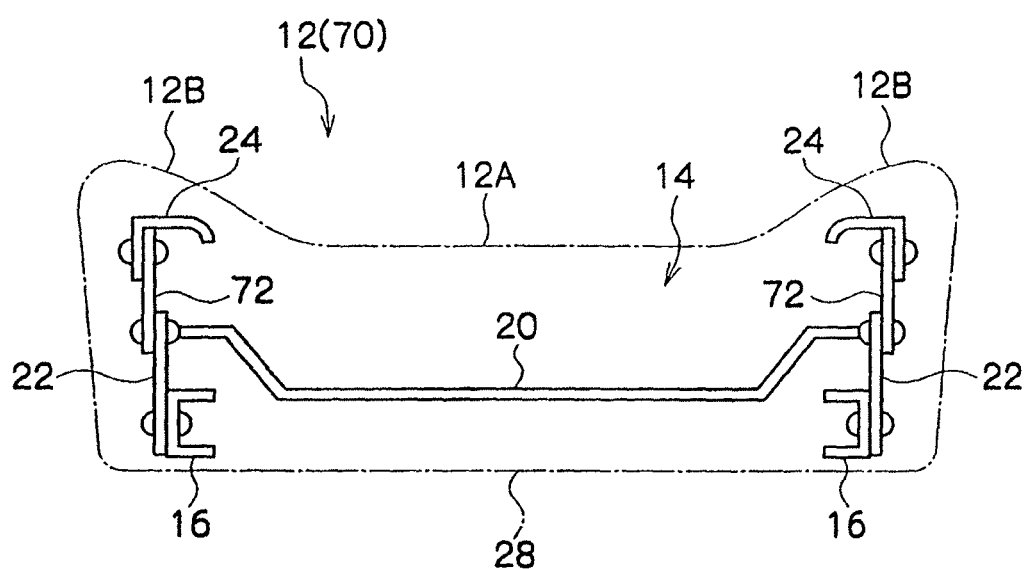
FIG. 19A is a sectional view, viewed from an upper end side, showing principal elements of the seat relating to the fifth embodiment of the present invention.

FIG. 18A shows a side view, viewed from leftward, of principal elements of a seat 70 relating to a fifth embodiment that is structured with the seat structure of the present invention. FIG. 19A shows a sectional view, viewed from upward, of the principal elements of the seat 70.

The seat 70 relating to the present embodiment has a substantially similar structure to the above-described first embodiment, but differs in the following respects.

In the seat 70 relating to the present embodiment, the back backrest 20 structures the back face side frame of the back flexing component, and a predetermined number of the first links 22 are turnably joined, at front ends, to both a left and a right end portion of the back backrest 20.

At both the left and the right end portion of the back backrest 20, a plurality (two in the present embodiment) of second links 72, which structure the back flexing component, are turnably joined at rear ends.

The back sub frame 24 structures a back face frame of the back flexing component, and is disposed at the front side of the back backrest 20. Front ends of the second links 72 are turnably joined to the back sub frame 24.

The upper end of the back joint link 26 is turnably joined to a lower end of the back backrest 20 or the front end (anywhere other than the rear end is acceptable) of the first link 22 at the lower portion of the back main frame 16. Accordingly, turning of the first links 22, the back backrest 20 and the back joint link 26 is locked, and operation of the back link mechanism 14 is locked. Further, a rear end of a third link 74, which structures the back flexing component, is turnably joined to the back main frame 16, along with which a front end of the third link 74 is turnably joined to the back sub frame 24 or a position of the second links 72 other than the rear ends (turning centers). Accordingly, turning of the back sub frame 24, the second links 72 and the third link 74 is locked, and operation of the back link mechanism 14 is locked. Therefore, operation of the back link mechanism 14 is locked.

Next, operation of the present embodiment will be described.

In the seat 70 of the structure described above, in the state in which tilting of the back main frame 16 around the tilting center 16A is locked by the reclining mechanism 18, the lower end of the back joint link 26 is turnably joined to the vehicle side (the seat cushion 30). Thus, turning of the first links 22, the back backrest 20, the back joint link 26, the back sub frame 24, the second links 72 and the third link 74 is locked, and operation of the back link mechanism 14 is locked. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 70, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Figure 18B:
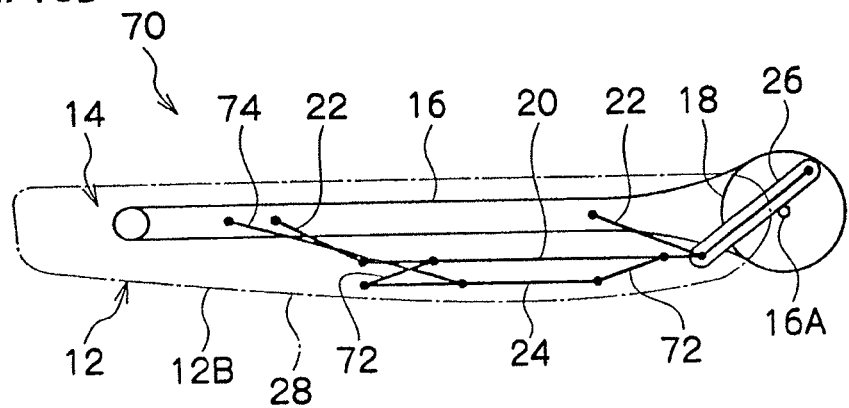
FIG. 18B is a side view, viewed from leftward, showing a stowed state of the principal elements of the seat relating to the fifth embodiment of the present invention.

By the reclining mechanism 18 being controlled and the seat back 12 being tilted forward around the tilting center 16A, the seat back 12 is folded onto the upper side of the seat cushion 30, and the seat 70 is stowed (known as fold-forward stowing) (see FIG. 18B).

Figure 19B:
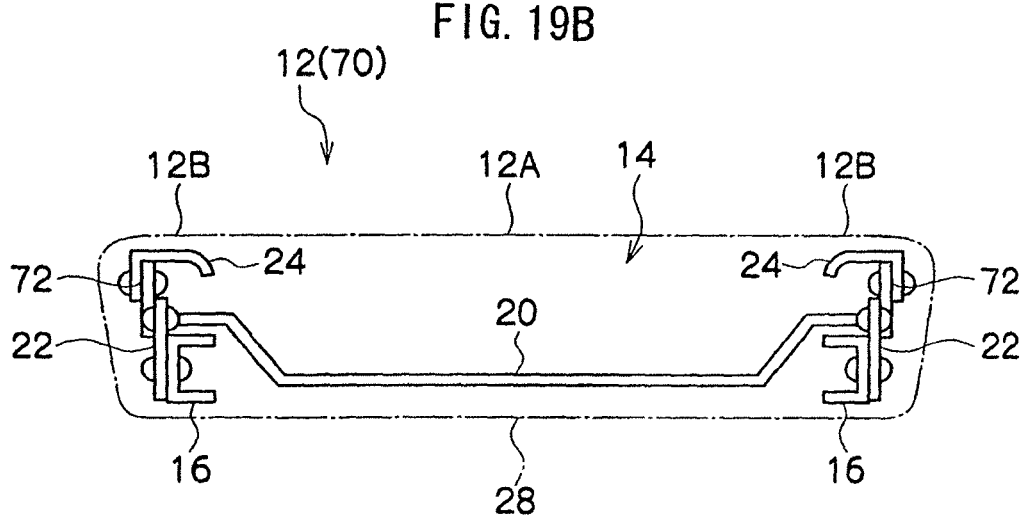
FIG. 19B is a sectional view, viewed from the upper end side, showing a stowed state of the principal elements of the seat relating to the fifth embodiment of the present invention.

When the seat 70 is being stowed, the seat back 12 (the back main frame 16) is tilted forward around the tilting center 16A, and the back joint link 26 is turned forward around the lower end. Thus, by movement of the back backrest 20 which is to say the first links 22 toward the lower end side of the seat back 12, the first links 22 and the second links 72 are turned toward the lower end side of the seat back 12, and a separation in the seat back 12 thickness direction between the back main frame 16 and the back backrest 20 is contracted, along with which a separation in the seat back 12 thickness direction between the back backrest 20 and the back sub frame 24 is contracted (see FIG. 19B). Accordingly, even in a case in which the thickness of the back side portion 12B for times of usual use is made thicker, in accordance with stowing of the seat 70, thicknesses of the back side portion 12B and the back main portion 12A are contracted in the region at the face side relative to the back main frame 16 and can be made equal, and space (space at the upper side of the seat 70) in the cabin at times of stowage of the seat 70 (a luggage compartment) can be made larger.

Therefore, with the present embodiment too, effects the same as in the above-described first embodiment can be produced.

Figure 20A:
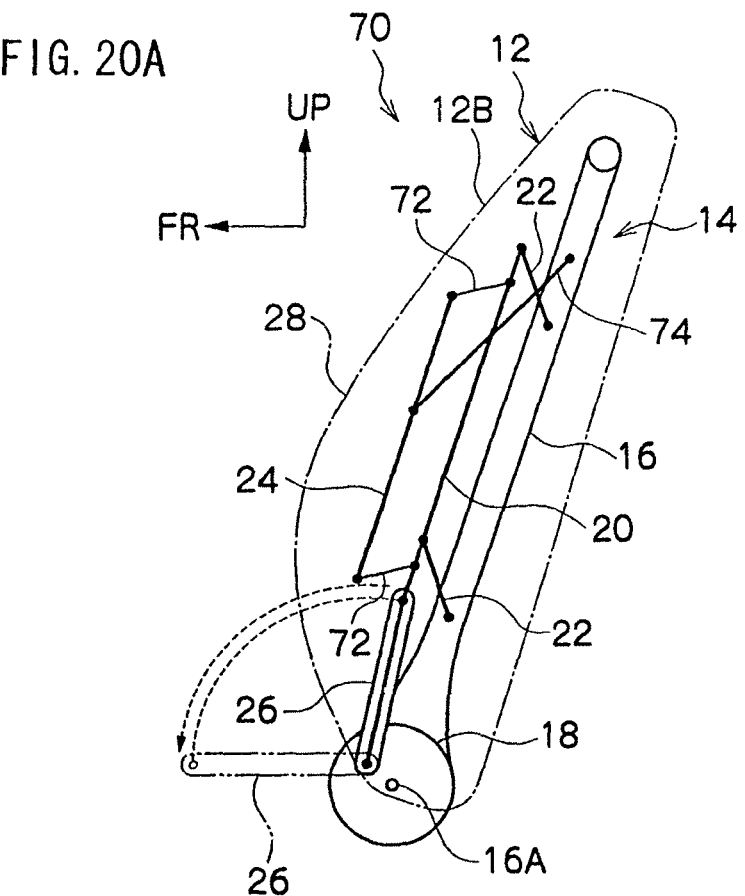
FIG. 20A is a side view, viewed from leftward, showing principal elements of a seat of an alternative example relating to the fifth embodiment of the present invention.
Figure 20B:
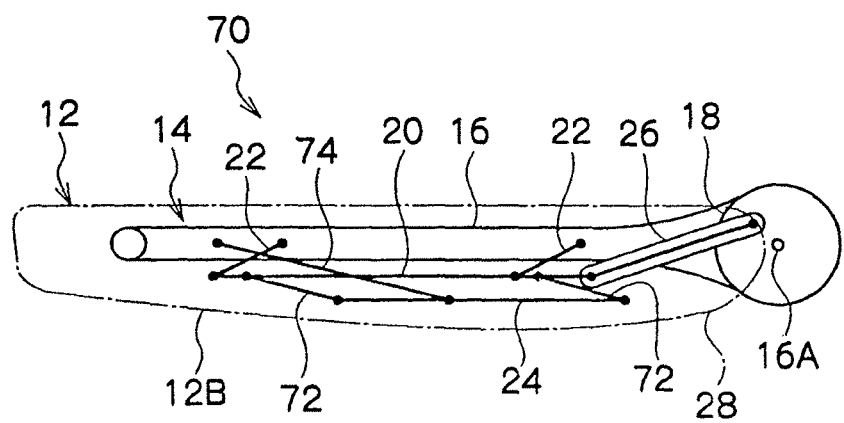
FIG. 20B is a side view, viewed from leftward, showing a stowed state of the principal elements of the seat of the alternative example relating to the fifth embodiment of the present invention.

Here, in the present embodiment, a structure is formed in which the lower end of the back joint link 26 is turnably joined to the vehicle side at the rear side of the tilting center 16A at the lower end of the back main frame 16. However, as shown in FIG. 20A, a structure may be formed in which the lower end of the back joint link 26 is turnably joined to the vehicle side at the front side of the tilting center 16A (a position which is offset from the tilting center 16A) at the lower end of the back main frame 16. In this case, when the seat 70 is being stowed, the seat back 12 (the back main frame 16) is tilted forward around the tilting center 16A, and the back joint link 26 turns forward around the lower end. Thus, by movement of the back backrest 20 which is to say the first links 22 toward the upper end side of the seat back 12, the first links 22 and the second links 72 are turned toward the upper end side of the seat back 12, and the separation in the seat back 12 thickness direction between the back main frame 16 and the back backrest 20 is contracted, along with which the separation in the seat back 12 thickness direction between the back backrest 20 and the back sub frame 24 is contracted (see FIG. 20B).

Further, in the present embodiment, a structure is formed in which the tilting center 16A of the seat back 12 (the back main frame 16) and the lower end (turning center) of the back joint link 26 do not move when the seat 70 is being stowed. However, a structure may be formed in which the tilting center 16A of the seat back 12 (the back main frame 16) and the lower end (turning center) of the back joint link 26 are moved (for example, movement to the rear side) when the seat 70 is being stowed, in a similar manner to FIGS. 7A and 7B.

Further, in the present embodiment, a structure may be formed in which the seat 70 is formed as what is known as a tilt-down stowage type, similarly to the above-described first embodiment (see FIGS. 9A and 9B).

Further, in the present embodiment, a structure is formed in which the seat back 12 is folded onto the upper side of the seat cushion 30 and the seat 70 is stowed. However, similarly to the above-described first embodiment, the seat 70 may be formed with a structure which is known as double-folded stowing (see FIG. 10), or the seat 70 may be formed with a structure which is known as double-flat stowing (see FIG. 11).

Sixth Embodiment

Figure 21:
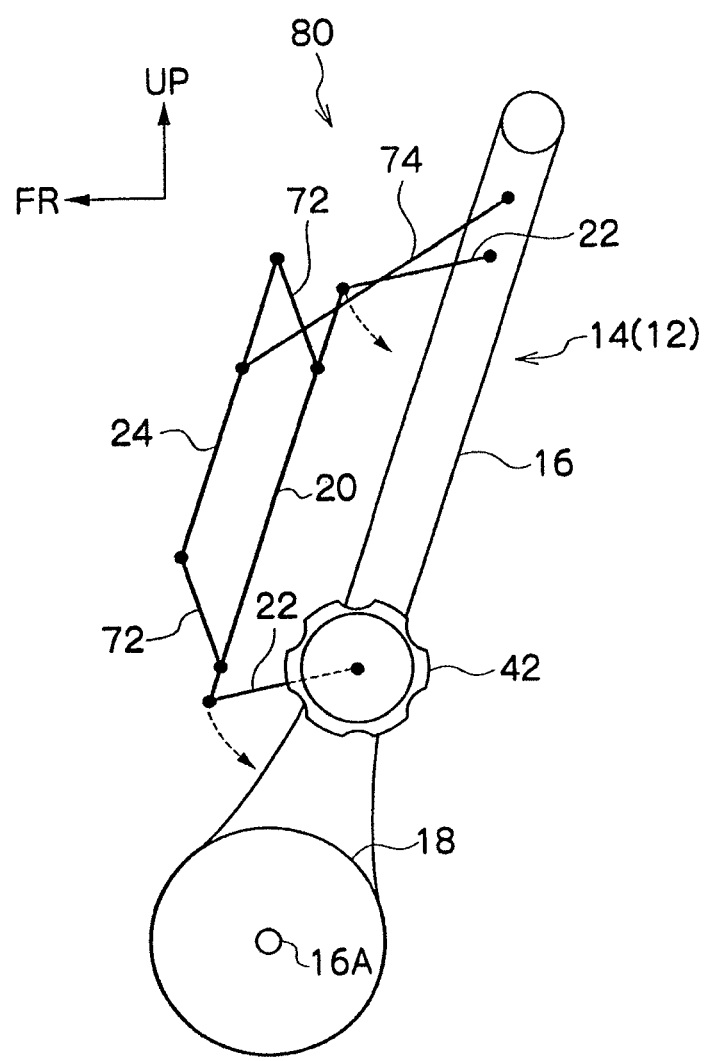
FIG. 21 is a side view, viewed from leftward, showing principal elements of a seat relating to a sixth embodiment of the present invention.

FIG. 21 shows a side view, viewed from leftward, of principal elements of a seat 80 relating to a sixth embodiment that is structured with the seat structure of the present invention.

The seat 80 relating to the present embodiment has a substantially similar structure to the above-described fifth embodiment, but differs in the following respects.

In the seat 80 relating to the present embodiment, the circular rod-shaped control lever 42, which serves as the control mechanism, is joined to the rear end (turning center) of one of the first links 22 at the back main frame 16. The control lever 42 is formed as a dial-type regulator or the like. A turn-locking mechanism (not shown), which serves as a locking mechanism, is provided at the control lever 42. Turning of the control lever 42 is obstructed by the turn-locking mechanism, and thus turning of the first links 22, the back backrest 20, the second links 72, the back sub frame 24 and the third link 74 is locked, and operation of the back link mechanism 14 is locked. The control lever 42 protrudes to sideward of the seat back 12, and by the control lever 42 being turningly controlled, the first links 22 are made turnable.

Further, the back joint link 26 of the above-described fifth embodiment is not provided in the present embodiment.

Next, operation of the present embodiment will be described.

In the seat 80 of the structure described above, in the state in which tilting of the back main frame 16 around the tilting center 16A is locked by the reclining mechanism 18, turning of the control lever 42 is obstructed by the turn-locking mechanism. Thus, turning of the first links 22, the back backrest 20, the second links 72, the back sub frame 24 and the third link 74 is locked, and operation of the back link mechanism 14 is locked. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 80, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

In a state in which turning obstruction by the turn locking-mechanism of the control lever 42 is released, by the control lever 42 being turningly controlled, the first links 22 are turned and the separation in the seat back 12 thickness direction between the back main frame 16 and the back backrest 20 is flexed, along with which the second links 72 are turned and the separation in the seat back 12 thickness direction between the back backrest 20 and the back sub frame 24 is flexed. Accordingly, independently of stowing of the seat 80, thicknesses of the back side portion 12B and the back main portion 12A are flexed in the region at the face side relative to the back main frame 16, and can be adjusted.

Seventh Embodiment

Figure 22:
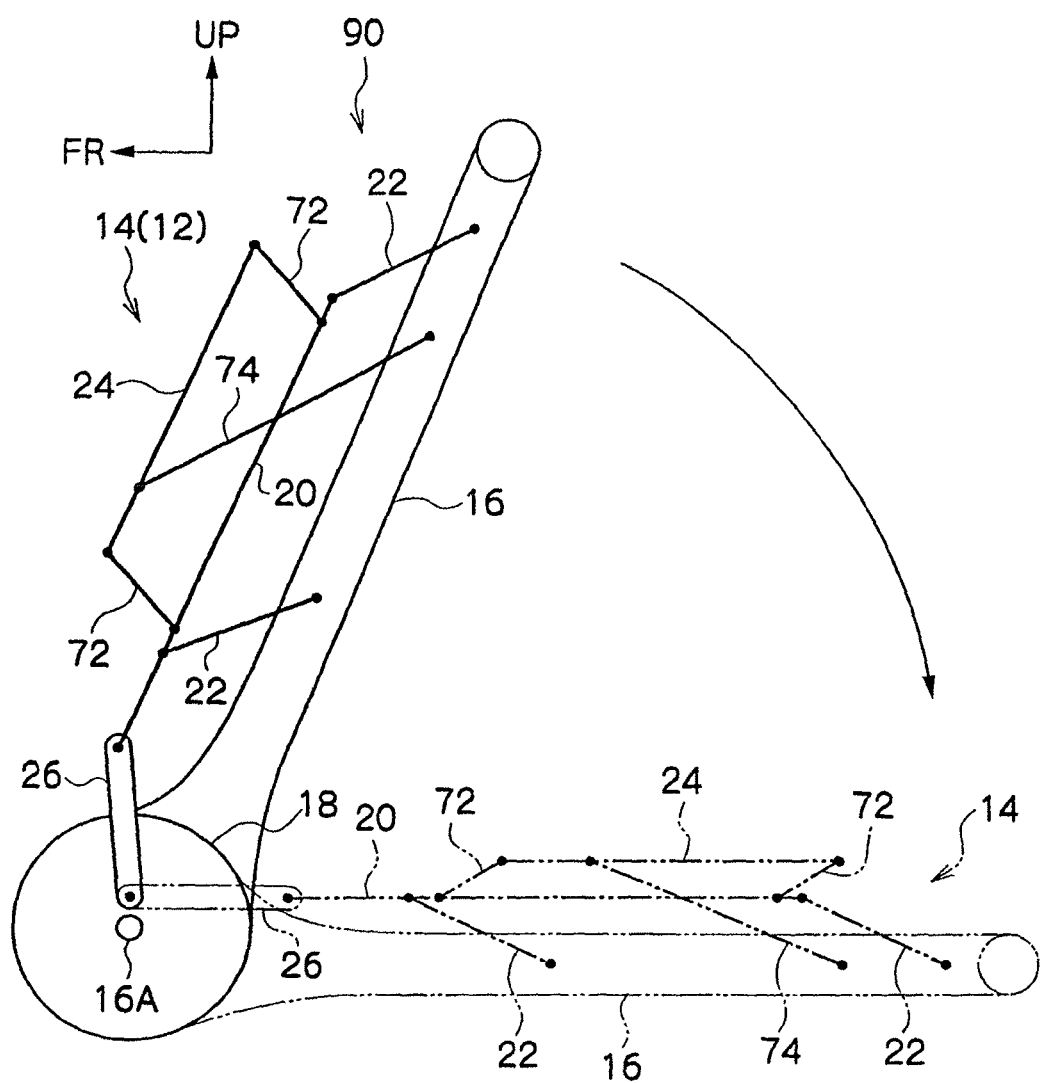
FIG. 22 is a side view, viewed from leftward, showing principal elements of a seat relating to a seventh embodiment of the present invention.

FIG. 22 shows a side view, viewed from leftward, of principal elements of a seat 90 relating to a seventh embodiment that is structured with the seat structure of the present invention.

The seat 90 relating to the present embodiment has a substantially similar structure to the above-described fifth embodiment, but differs in the following respects.

The seat 90 relating to the present embodiment is formed as what is known as a back rearward-folding stowing type.

The lower end of the back joint link 26 is turnably joined to the vehicle side at the upper side of the tilting center 16A (a position which is offset from the tilting center 16A) at the lower end of the back main frame 16.

Here, with the present embodiment too, effects the same as in the above-described fifth embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 90 is stowed (known as rearward-folding stowing).

When the seat 90 is being stowed, the seat back 12 (the back main frame 16) is tilted rearward around the tilting center 16A, and the back joint link 26 is turned rearward around the lower end. Thus, by movement of the back backrest 20 which is to say the first links 22 toward the lower end side of the seat back 12, the first links 22 and the second links 72 are turned toward the lower end side of the seat back 12, and the separation in the seat back 12 thickness direction between the back main frame 16 and the back backrest 20 is contracted, along with which the separation in the seat back 12 thickness direction between the back backrest 20 and the back sub frame 24 is contracted. Accordingly, even in a case in which the thickness of the back side portion 12B for times of usual use is made thicker, in accordance with stowing of the seat 90, the thicknesses of the back side portion 12B and the back main portion 12A are contracted in the region at the face side relative to the back main frame 16 and can be made equal, and space (space at the upper side of the seat back 12) in the cabin at times of stowage of the seat 90 (a luggage compartment) can be made larger.

Further, similarly to the third embodiment, a structure can be formed in which the seat 90 is formed as what is known as a space-increasing storage type (see FIG. 15).

Figure 23:
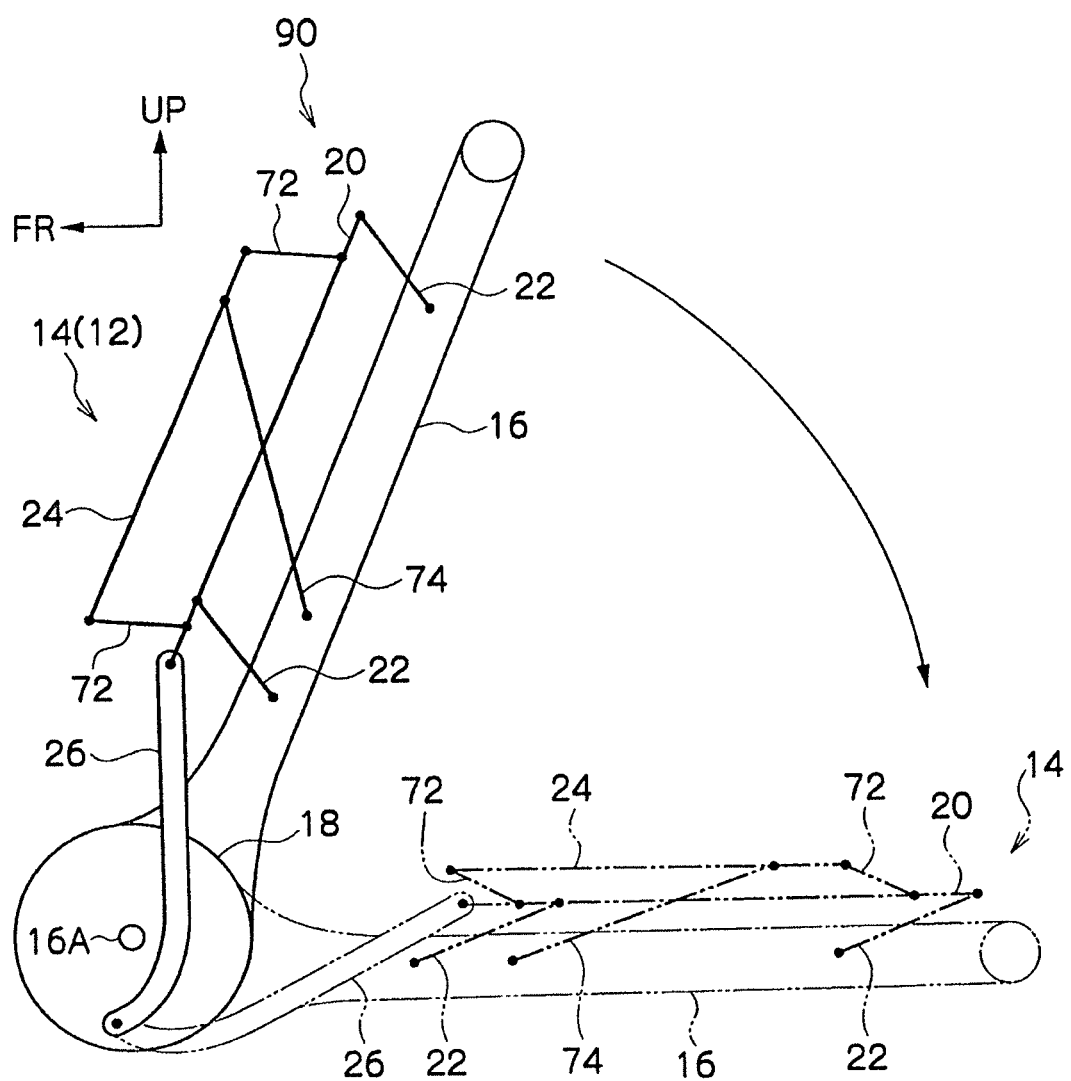
FIG. 23 is a side view, viewed from leftward, showing principal elements of a seat of an alternative example relating to the seventh embodiment of the present invention.

Here, in the present embodiment, a structure is formed in which the lower end of the back joint link 26 is turnably joined to the vehicle side at the upper side of the tilting center 16A at the lower end of the back main frame 16. However, as shown in FIG. 23, a structure may be formed in which the lower end of the back joint link 26 is turnably joined to the vehicle side at the lower side of the tilting center 16A (a position which is offset from the tilting center 16A) at the lower end of the back main frame 16. In this case, when the seat 90 is being stowed, the seat back 12 (the back main frame 16) is tilted rearward around the tilting center 16A, and the back joint link 26 turns rearward around the lower end. Thus, by movement of the back backrest 20 which is to say the first links 22 toward the upper end side of the seat back 12, the first links 22 and the second links 72 are turned toward the upper end side of the seat back 12, and the separation in the seat back 12 thickness direction between the back main frame 16 and the back backrest 20 is contracted, along with which the separation in the seat back 12 thickness direction between the back backrest 20 and the back sub frame 24 is contracted.

Eighth Embodiment

Figure 24:
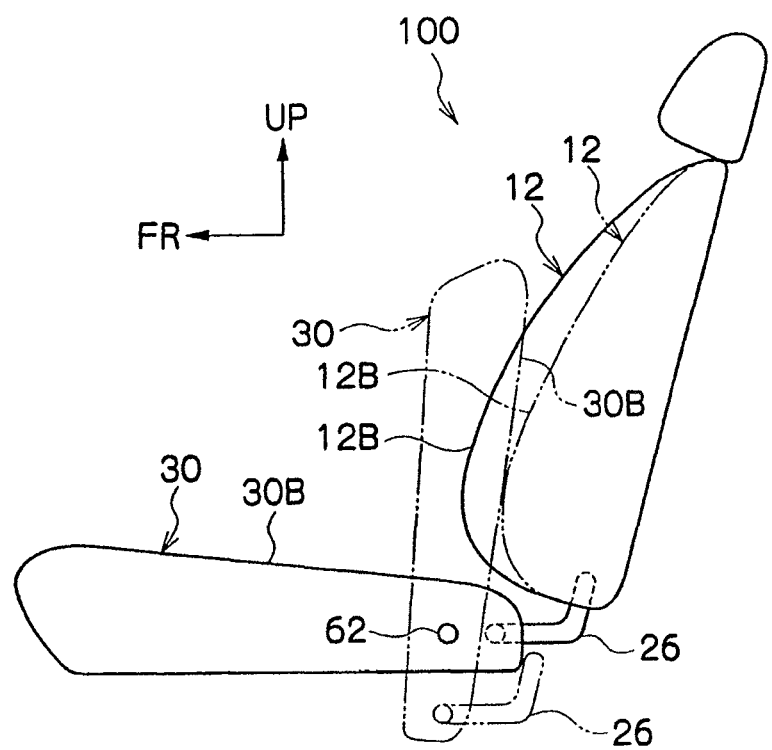
FIG. 24 is a side view, viewed from leftward, showing a seat relating to an eighth embodiment of the present invention.

FIG. 24 shows a side view, viewed from leftward, of a seat 100 relating to an eighth embodiment that is structured with the seat structure of the present invention.

The seat 100 relating to the present embodiment has a substantially similar structure to the above-described fifth embodiment (see FIG. 18A), but differs in the following respects.

The seat 100 relating to the present embodiment is formed as what is known as a tip-up stowing type.

The rear end vicinity of the seat cushion 30 is supported at the vehicle side to be turnable around the support shaft 62, at both the left and the right end portion. Accordingly, the seat cushion 30 is supported at the vehicle side to be turnable around the support shaft 62. The rear end of the seat cushion 30 abuts against the lower end of the seat back 12, and accordingly the seat cushion 30 is disposed substantially horizontally.

The back joint link 26 is formed in the letter-L shape. The upper end of the back joint link 26 is turnably joined to the lower end of the back backrest 20 or the front end (anywhere other than the rear end is acceptable) of the first link 22 at the lower portion of the back main frame 16. The lower end of the back joint link 26 is turnably joined to the rear end of the seat cushion 30 (at a position which is offset to the rear side from the support shaft 62). Accordingly, turning of the first links 22, the back backrest 20, the back joint link 26, the second links 72, the back sub frame 24 and the third link 74 is locked, and operation of the back link mechanism 14 is restricted.

Next, operation of the present embodiment will be described.

In the seat 100 of the structure described above, in the state in which tilting of the back main frame 16 around the tilting center 16A is locked by the reclining mechanism 18 and the rear end of the seat cushion 30 is abutted against the lower end of the seat back 12, the lower end of the back joint link 26 is turnably joined to the rear end of the seat cushion 30. Thus, turning of the first links 22, the back backrest 20, the back joint link 26, the second links 72, the back sub frame 24 and the third link 74 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 100, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Further, by the seat cushion 30 being turned rearward around the support shaft 62 (which is known as tipping up), the seat cushion 30 is folded up onto the front side of the seat back 12, and the seat 100 is stowed.

When the seat 100 is being stowed, the seat cushion 30 is tilted rearward around the support shaft 62, and the back joint link 26 is moved downward. Thus, by movement of the back backrest 20 which is to say the first links 22 downward, the first links 22 and the second links 72 are turned toward the lower end side, and the separation in the seat back 12 thickness direction between the back main frame 16 and the back backrest 20 is contracted, along with which the separation in the seat back 12 thickness direction between the back backrest 20 and the back sub frame 24 is contracted. Accordingly, even in a case in which the thickness of the back side portion 12B for times of usual use is made thicker, in accordance with stowing of the seat 100, the thicknesses of the back side portion 12B and the back main portion 12A are contracted in the region at the face side relative to the back main frame 16 and can be made equal, and space (space at the front side and rear side of the seat 100) in the cabin at times of stowage of the seat 100 (a luggage compartment) can be made larger.

Further, similarly to the above-described fourth embodiment, this can have a structure in which the seat 100 is formed as what is known as a tumble-storing type (see FIG. 5A), a structure in which the seat 100 is formed as what is known as a space-increasing storage type (see FIG. 5B), or a structure in which the seat 100 is formed as what is known as a rearward under-floor storage type (see FIG. 5C).

Ninth Embodiment

Figure 25:
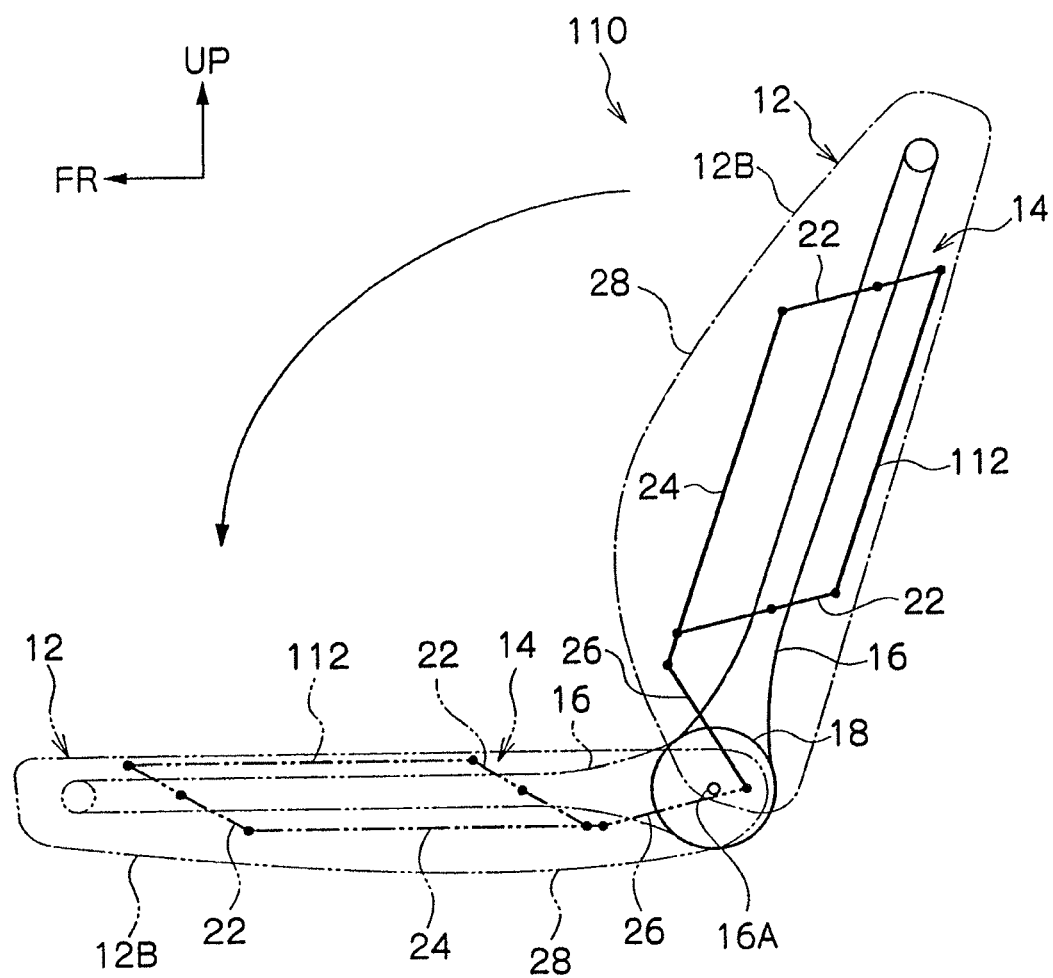
FIG. 25 is a side view, viewed from leftward, showing principal elements of a seat relating to a ninth embodiment of the present invention.

FIG. 25 shows a side view, viewed from leftward, of principal elements of a seat 110 relating to a ninth embodiment that is structured with the seat structure of the present invention.

The seat 110 relating to the present embodiment has a substantially similar structure to the above-described first embodiment, but differs in the following respects.

In the seat 110 relating to the present embodiment, The first links 22 are provided extending rearward, and the first links 22 are turnably joined to the back main frame 16 at intermediate portions.

Inside the seat back 12, at the rear side of the back main frame 16, a board-form back frame 112 is provided, which serves as a back reverse side frame of the back flexing component. The back frame 112 is turnably joined to the rear ends of the first links 22. Furthermore, the back frame 112 is covered with the back face skin 28 and accommodated, and therefore appearance of the seat back 12 is improved.

The upper end of the back joint link 26 is turnably joined to the lower end of the back sub frame 24, the first link 22 at the lower portion of the back main frame 16 (anywhere other than a position of joining to the back main frame 16 is acceptable), or a lower end of the back frame 112. Accordingly, turning of the first links 22, the back sub frame 24, the back frame 112 and the back joint link 26 is locked, and operation of the back link mechanism 14 is restricted.

Next, operation of the present embodiment will be described.

In the seat 110 of the structure described above, in the state in which tilting of the back main frame 16 around the tilting center 16A is locked by the reclining mechanism 18, the lower end of the back joint link 26 is turnably joined to the vehicle side. Thus, turning of the first links 22, the back sub frame 24, the back frame 112 and the back joint link 26 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 110, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

By the reclining mechanism 18 being controlled and the seat back 12 being tilted forward around the tilting center 16A, the seat back 12 is folded onto the upper side of the seat cushion 30, and the seat 110 is stowed (known as fold-forward stowing).

When the seat 110 is being stowed, the seat back 12 (the back main frame 16) is tilted forward around the tilting center 16A, and the back joint link 26 is turned forward around the lower end. Thus, by movement of the back sub frame 24 and the first links 22 or the back frame 112 toward the lower end side of the seat back 12, the first links 22 are turned, and separations in the seat back 12 thickness direction between the back main frame 16 and the back sub frame 24 and the back frame 112 are contracted. Accordingly, even in a case in which the thicknesses of the back side portion 12B and the back main portion 12A for times of usual use are made thicker, in accordance with stowing of the seat 110, the thickness of the back side portion 12B is contracted in the region at the face side relative to the back main frame 16, along with which the thicknesses of the back side portion 12B and the back main portion 12A are contracted in a region at the reverse side relative to the back main frame 16, the thicknesses of the back side portion 12B and the back main portion 12A can be made equal, and space (space at the upper side of the seat 110) in the cabin at times of stowage of the seat 110 (a luggage compartment) can be made larger.

Therefore, with the present embodiment too, effects the same as in the above-described first embodiment can be produced.

Figure 26A:
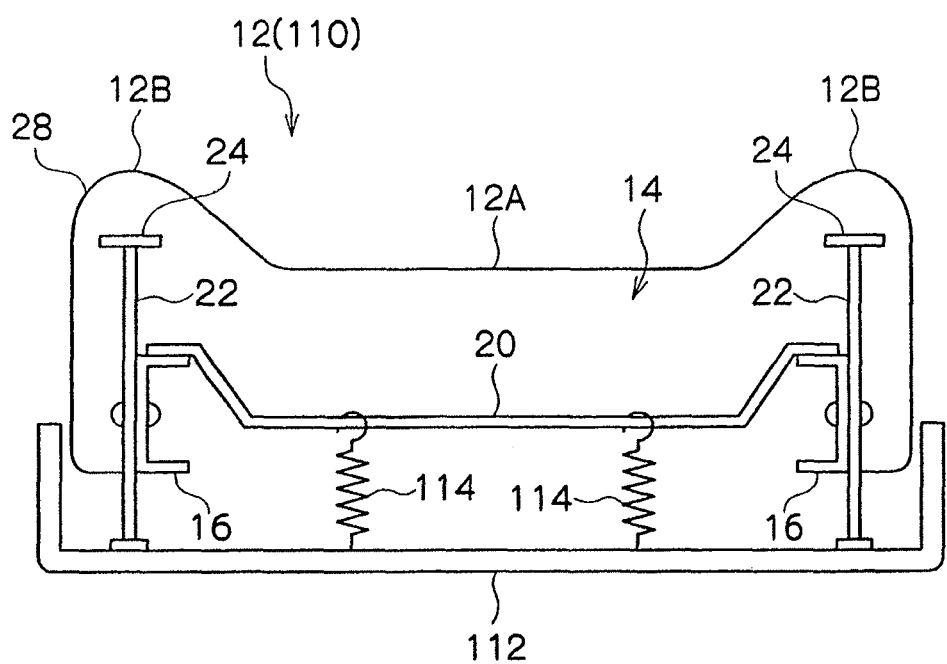
FIG. 26A is a sectional view, viewed from the upper end side, showing principal elements of the seat relating to the ninth embodiment of the present invention.
Figure 26B:
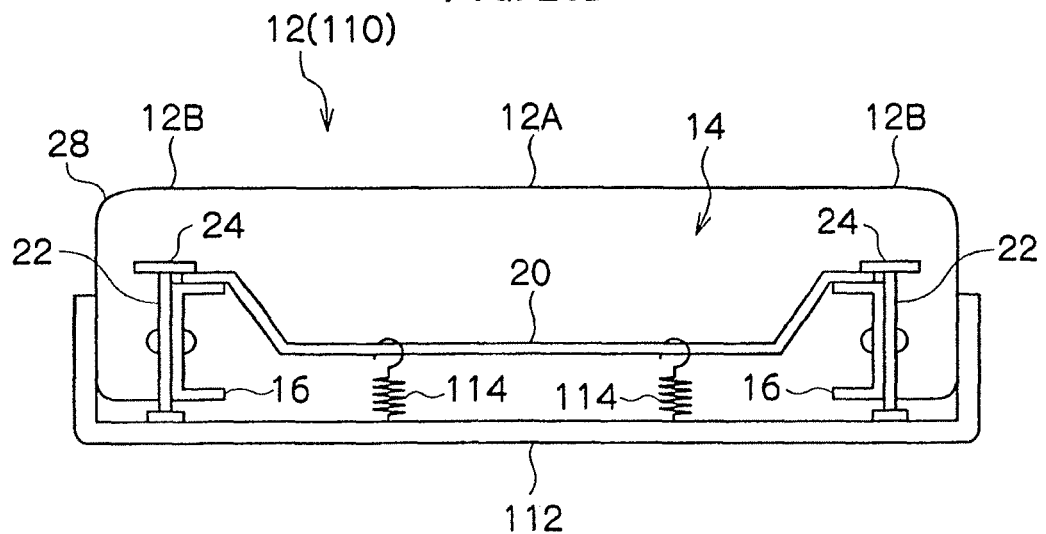
FIG. 26B is a sectional view, viewed from the upper end side, showing a stowed state of the principal elements of the seat relating to the ninth embodiment of the present invention.

Here, in the present embodiment, the back frame 112 is provided inside the seat back 12 and has a structure which is turnably joined to the rear ends of the first links 22. However, as shown in FIG. 26A, the back frame 112 may have a structure that is formed in a character-Π shape in cross-section (a back board) and provided outside a rear side of the seat back 12. In this case, compression coil springs 114 span across between the back backrest 20 and the back frame 112. Thus, the back frame 112 is abutted against the rear ends of the first links 22 by urging force of the compression coil springs 114 and is turnably joined. Therefore, as shown in FIG. 26B, when the seat 110 is being stowed, the first links 22 are turned, and a separation in the seat back 12 thickness direction between the back main frame 16 and the back frame 112 is contracted by the urging force of the compression coil springs 114. Further, in this case, the whole of an outer peripheral surface of the back frame 112 may be covered with an additional back face skin (not shown) which serves as the back cover member similarly to the back face skin 28. Accordingly, appearance of the seat back 12 can be improved.

Figure 27:
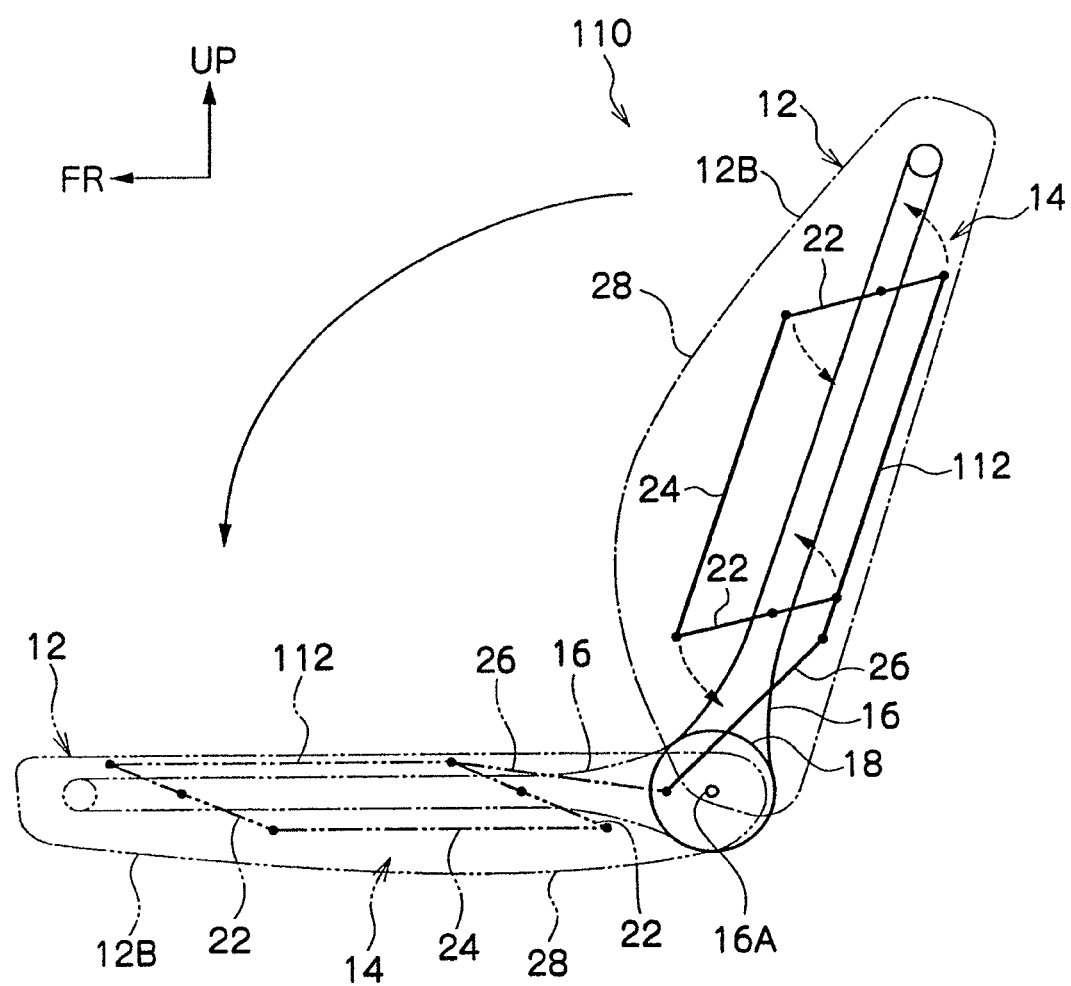
FIG. 27 is a side view, viewed from leftward, showing principal elements of a seat of an alternative example relating to the ninth embodiment of the present invention.

Further, in the present embodiment, a structure is formed in which the lower end of the back joint link 26 is turnably joined to the vehicle side at the front side of the tilting center 16A at the lower end of the back main frame 16. However, as shown in FIG. 27, a structure may be formed in which the lower end of the back joint link 26 is turnably joined to the vehicle side at the front side of the tilting center 16A (a position which is offset from the tilting center 16A) at the lower end of the back main frame 16. In this case, when the seat 110 is being stowed, the seat back 12 (the back main frame 16) is tilted forward around the tilting center 16A, and the back joint link 26 turns forward around the lower end. Thus, by movement of the back frame 112 and the back sub frame 24 or the first links 22 toward the upper end side of the seat back 12, the first links 22 are turned, and the separations in the seat back 12 thickness direction between the back main frame 16 and the back sub frame 24 and the back frame 112 of the seat back 12 are contracted.

Further, in the present embodiment, a structure is formed in which the tilting center 16A of the seat back 12 (the back main frame 16) and the lower end (turning center) of the back joint link 26 do not move when the seat 110 is being stowed. However, a structure may be formed in which the tilting center 16A of the seat back 12 (the back main frame 16) and the lower end (turning center) of the back joint link 26 are moved (for example, movement to rearward) when the seat 110 is being stowed, in a similar manner to FIGS. 7A and 7B.

Further yet, in the present embodiment, a structure may be formed in which the seat 110 is formed as what is known as a tilt-down stowage type, similarly to the above-described first embodiment (see FIGS. 9A and 9B).

Further, in the present embodiment, a structure is formed in which the seat back 12 is folded onto the upper side of the seat cushion 30 and the seat 110 is stowed. However, similarly to the above-described first embodiment, the seat 110 may be formed with a structure which is known as double-folded stowing (see FIG. 10), or the seat 110 may be formed with a structure which is known as double-flat stowing (see FIG. 11).

Tenth Embodiment

Figure 28:
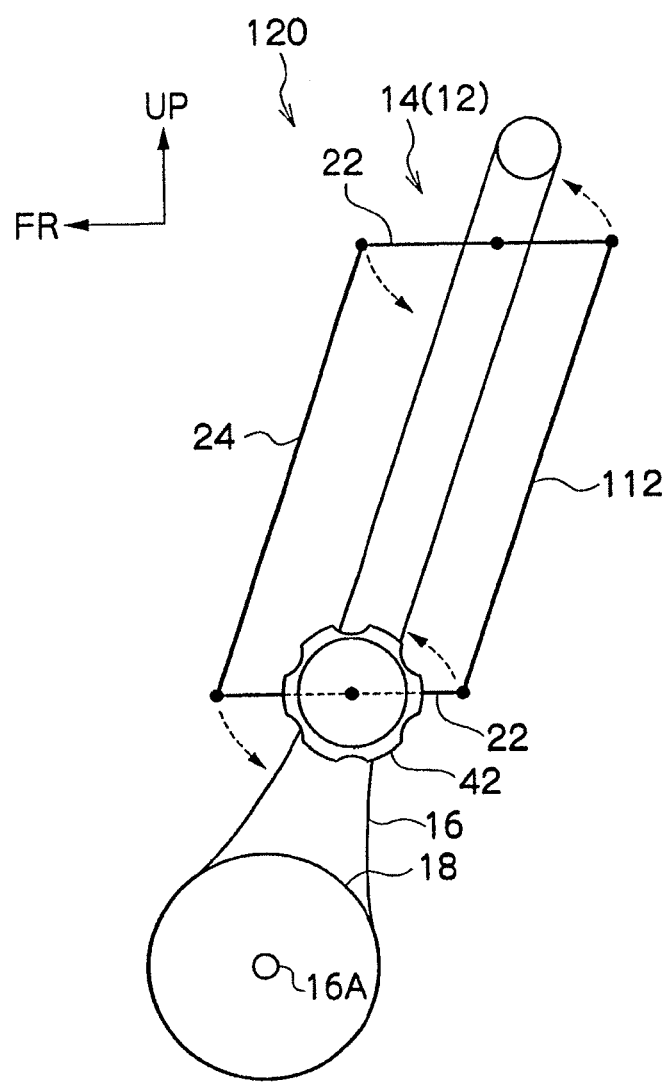
FIG. 28 is a side view, viewed from leftward, showing principal elements of a seat relating to a tenth embodiment of the present invention.

FIG. 28 shows a side view, viewed from leftward, of principal elements of a seat 120 relating to a tenth embodiment that is structured with the seat structure of the present invention.

The seat 120 relating to the present embodiment has a substantially similar structure to the above-described ninth embodiment, but differs in the following respects.

In the seat 120 relating to the present embodiment, the circular rod-shaped control lever 42, which serves as the control mechanism, is engaged with an intermediate portion (turning center) of one of the first links 22 at the back main frame 16. The control lever 42 is formed as a dial-type regulator or the like. A turn-locking mechanism (not shown) which serves as the locking mechanism is provided at the control lever 42. Turning of the control lever 42 is obstructed by the turn-locking mechanism, and thus turning of the first links 22, the back sub frame 24 and the back frame 112 is locked, and operation of the back link mechanism 14 is locked. The control lever 42 protrudes to sideward of the seat back 12, and by the control lever 42 being turningly controlled, the first links 22 are made turnable.

Further, the back joint link 26 of the above-described ninth embodiment is not provided in the present embodiment.

Next, operation of the present embodiment will be described.

In the seat 120 of the structure described above, in the state in which tilting of the back main frame 16 around the tilting center 16A is locked by the reclining mechanism 18, turning of the control lever 42 is obstructed by the turn-locking mechanism. Thus, turning of the first links 22, the back sub frame 24 and the back frame 112 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 120, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

In a state in which turning obstruction by the turn locking-mechanism of the control lever 42 is released, by the control lever 42 being turningly controlled, the first links 22 are turned and the separations in the seat back 12 thickness direction between the back main frame 16 and the back sub frame 24 and the back frame 112 are flexed. Accordingly, independently of stowing of the seat 120, the thickness of the back side portion 12B is flexed in the region at the face side relative to the back main frame 16, along with which the thicknesses of the back side portion 12B and the back main portion 12A are flexed in the region at the reverse side relative to the back main frame 16, and thicknesses of the back side portion 12B and the back main portion 12A can be adjusted.

Eleventh Embodiment

Figure 29:
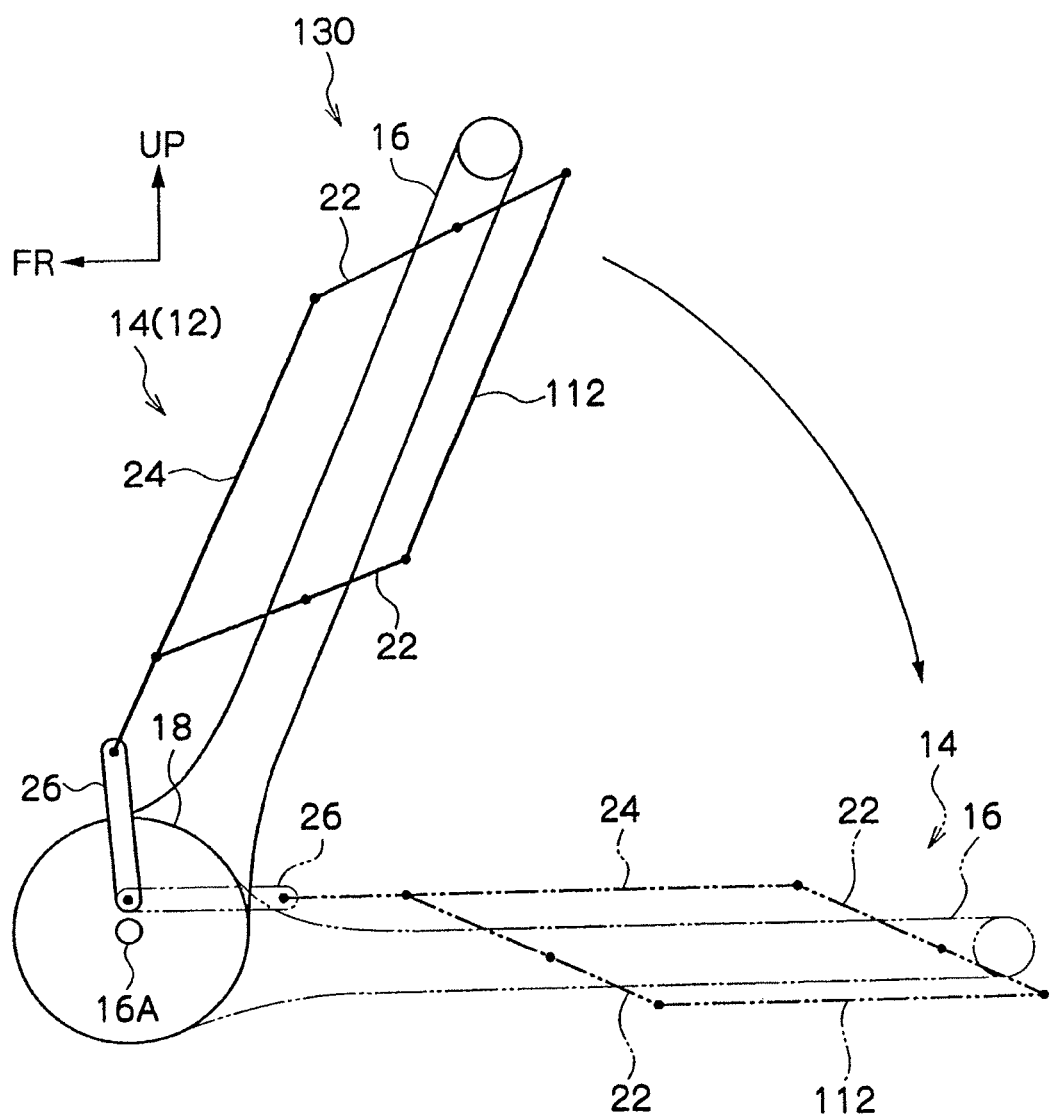
FIG. 29 is a side view, viewed from leftward, showing principal elements of a seat relating to an eleventh embodiment of the present invention.

FIG. 29 shows a side view, viewed from leftward, of principal elements of a seat 130 relating to an eleventh embodiment that is structured with the seat structure of the present invention.

The seat 130 relating to the present embodiment has a substantially similar structure to the above-described ninth embodiment, but differs in the following respects.

The seat 130 relating to the present embodiment is formed as what is known as a back rearward-folding stowing type.

The lower end of the back joint link 26 is turnably joined to the vehicle side at the upper side of the tilting center 16A (a position which is offset from the tilting center 16A) at the lower end of the back main frame 16.

Here, with the present embodiment too, effects the same as in the above-described ninth embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 130 is stowed (known as rearward-folding stowing).

When the seat 130 is being stowed, the seat back 12 (the back main frame 16) is tilted rearward around the tilting center 16A, and the back joint link 26 is turned rearward around the lower end. Thus, by movement of the back sub frame 24 and the first links 22 or the back frame 112 toward the lower end side of the seat back 12, the first links 22 are turned, and the separations in the seat back 12 thickness direction between the back main frame 16 and the back sub frame 24 and the back frame 112 are contracted. Accordingly, even in a case in which the thicknesses of the back side portion 12B and the back main portion 12A for times of usual use are made thicker, in accordance with stowing of the seat 130, the thickness of the back side portion 12B is contracted in the region at the face side relative to the back main frame 16, along with which the thicknesses of the back side portion 12B and the back main portion 12A are contracted in the region at the reverse side relative to the back main frame 16, thicknesses of the back side portion 12B and the back main portion 12A can be made equal, and space (space at the upper side of the seat back 12) in the cabin at times of stowage of the seat 130 (a luggage compartment) can be made larger.

Further, similarly to the third embodiment, a structure can be formed in which the seat 130 is formed as what is known as a space-increasing storage type (see FIG. 15).

Figure 30:
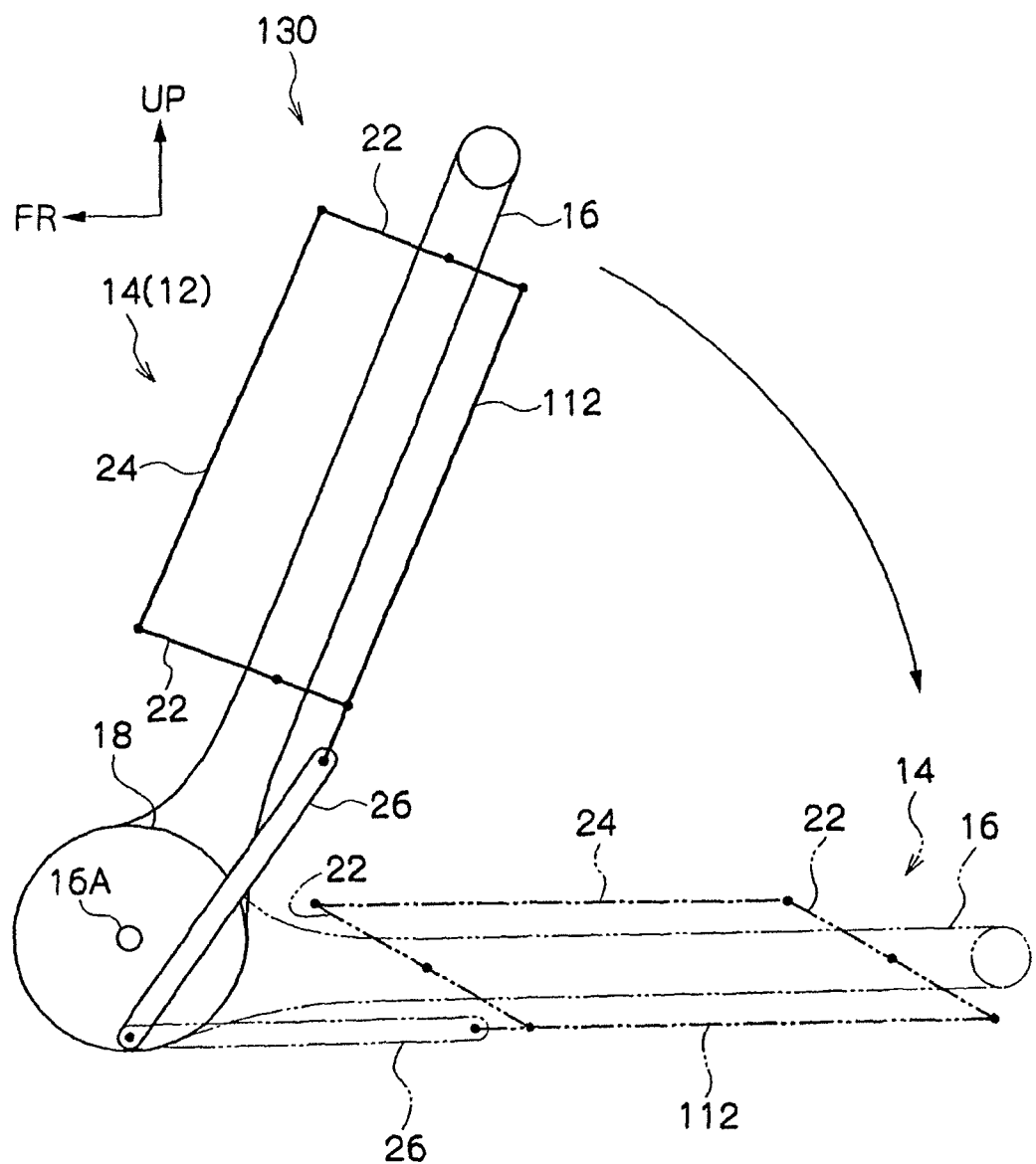
FIG. 30 is a side view, viewed from leftward, showing principal elements of a seat of an alternative example relating to the eleventh embodiment of the present invention.

Here, in the present embodiment, a structure is formed in which the lower end of the back joint link 26 is turnably joined to the vehicle side at the upper side of the tilting center 16A at the lower end of the back main frame 16. However, as shown in FIG. 30, a structure may be formed in which the lower end of the back joint link 26 is turnably joined to the vehicle side at the lower side of the tilting center 16A (a position which is offset from the tilting center 16A) at the lower end of the back main frame 16. In this case, when the seat 130 is being stowed, the seat back 12 (the back main frame 16) is tilted rearward around the tilting center 16A, and the back joint link 26 turns rearward around the lower end. Thus, by movement of the back sub frame 24 and the first links 22 or the back frame 112 toward the upper end side of the seat back 12, the first links 22 are turned, and the separations in the seat back 12 thickness direction between the back main frame 16 and the back sub frame 24 and the back frame 112 are contracted.

Twelfth Embodiment

Figure 31:
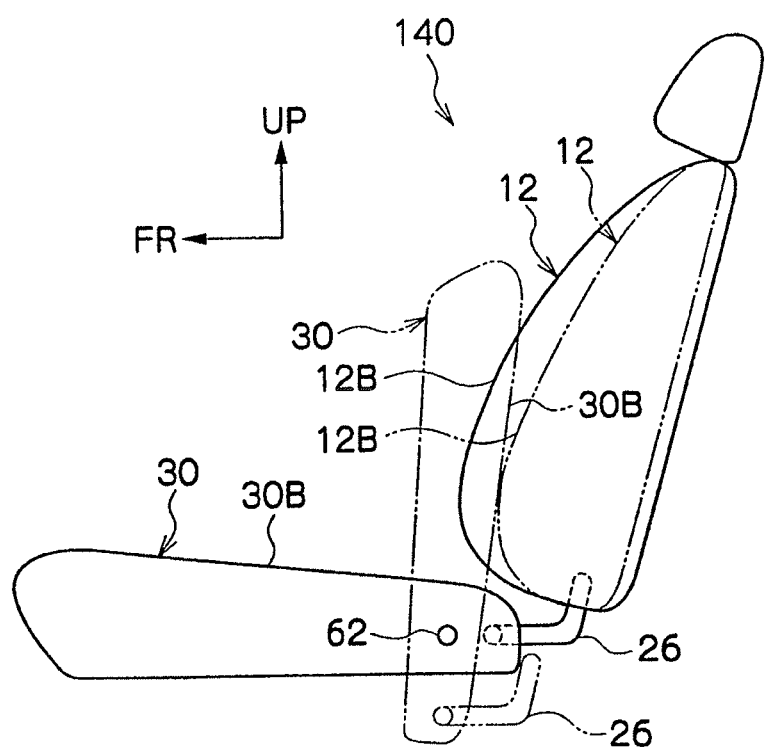
FIG. 31 is a side view, viewed from leftward, showing a seat relating to a twelfth embodiment of the present invention.

FIG. 31 shows a side view, viewed from leftward, of a seat 140 relating to a twelfth embodiment that is structured with the seat structure of the present invention.

The seat 140 relating to the present embodiment has a substantially similar structure to the above-described ninth embodiment (see FIG. 25), but differs in the following respects.

The seat 140 relating to the present embodiment is formed as what is known as a tip-up stowing type.

The rear end vicinity of the seat cushion 30 is supported at the vehicle side to be turnable around the support shaft 62, at both the left and the right end portion. Accordingly, the seat cushion 30 is supported at the vehicle side to be turnable around the support shaft 62. The rear end of the seat cushion 30 abuts against the lower end of the seat back 12, and accordingly the seat cushion 30 is disposed substantially horizontally.

The back joint link 26 is formed in the letter-L shape. The upper end of the back joint link 26 is turnably joined to the lower end of the back sub frame 24, the first link 22 at the lower portion of the back main frame 16 (anywhere other than the position of joining to the back main frame 16 is acceptable), or the lower end of the back frame 112. The lower end of the back joint link 26 is turnably joined to the rear end of the seat cushion 30 (at a position which is offset to the rear side from the support shaft 62). Accordingly, turning of the first links 22, the back sub frame 24, the back frame 112 and the back joint link 26 is locked, and operation of the back link mechanism 14 is restricted.

Next, operation of the present embodiment will be described.

In the seat 140 of the structure described above, in the state in which tilting of the back main frame 16 around the tilting center 16A is locked by the reclining mechanism 18 and the rear end of the seat cushion 30 is abutted against the lower end of the seat back 12, the lower end of the back joint link 26 is turnably joined to the rear end of the seat cushion 30. Thus, turning of the first links 22, the back sub frame 24, the back frame 112 and the back joint link 26 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 140, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Further, by the seat cushion 30 being turned rearward around the support shaft 62 (known as tipping up), the seat cushion 30 is folded up onto the front side of the seat back 12, and the seat 140 is stowed.

When the seat 140 is being stowed, the seat cushion 30 is tilted rearward around the support shaft 62, and the back joint link 26 is moved downward. Thus, by movement of the back sub frame 24 and the first links 22 or the back frame 112 downward, the first links 22 are turned, and the separations in the seat back 12 thickness direction between the back main frame 16 and the back sub frame 24 and the back frame 112 are contracted. Accordingly, even in a case in which the thickness of the back side portion 12B for times of usual use is made thicker, in accordance with stowing of the seat 140, the thickness of the back side portion 12B is contracted in the region at the face side relative to the back main frame 16, along with which the thicknesses of the back side portion 12B and the back main portion 12A are contracted in the region at the rear side relative to the back main frame 16, the thicknesses of the back side portion 12B and the back main portion 12A can be made equal, and space (space at the front side and rear side of the seat 100) in the cabin at times of stowage of the seat 140 (a luggage compartment) can be made larger.

Further, similarly to the above-described fourth embodiment, this can have a structure in which the seat 140 is formed as what is known as a tumble-storing type (see FIG. 5A), a structure in which the seat 140 is formed as what is known as a space-increasing storage type (see FIG. 5B), or a structure in which the seat 140 is formed as what is known as a rearward under-floor storage type (see FIG. 5C).

Thirteenth Embodiment

Figure 32A:
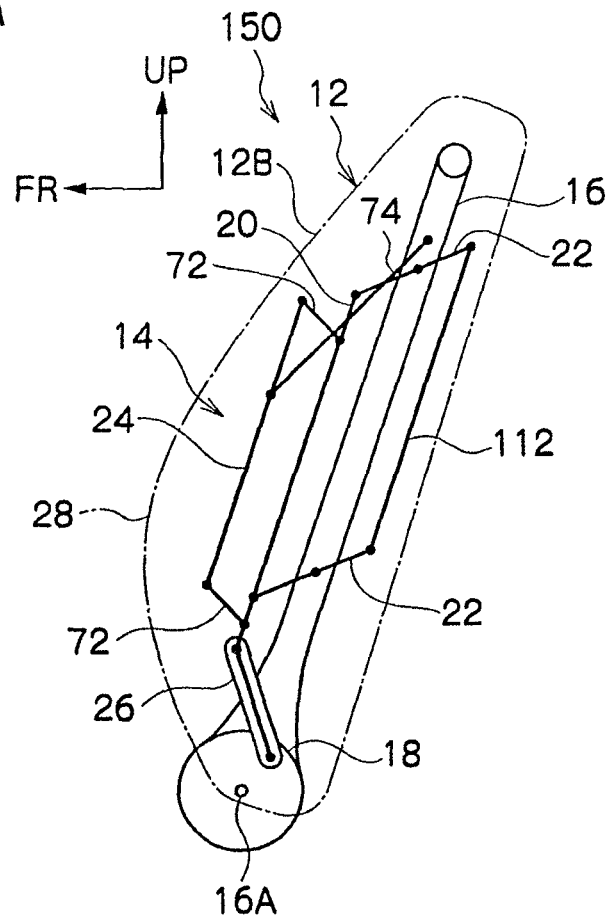
FIG. 32A is a side view, viewed from leftward, showing principal elements of a seat relating to a thirteenth embodiment of the present invention.
Figure 33A:
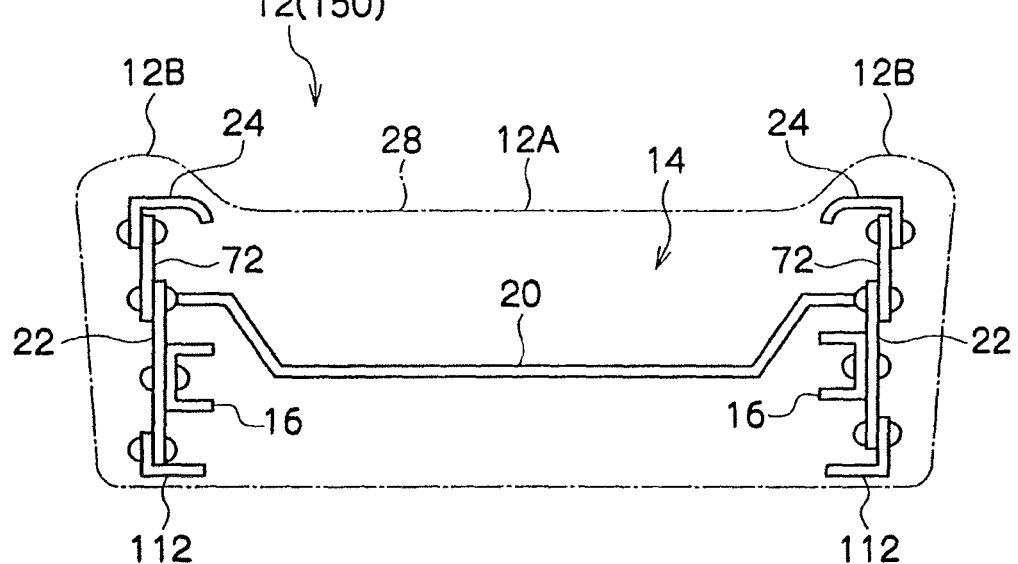
FIG. 33A is a sectional view, viewed from the upper end side, showing the principal elements of the seat relating to the thirteenth embodiment of the present invention.

FIG. 32A shows a side view, viewed from leftward, of principal elements of a seat 150 relating to a thirteenth embodiment that is structured with the seat structure of the present invention. FIG. 33A shows a sectional view, viewed from above, of the principal elements of the seat 150.

The seat 150 relating to the present embodiment has a substantially similar structure to the above-described fifth embodiment, but differs in the following respects.

In the seat 150 relating to the present embodiment, The first links 22 are provided extending rearward, and the first links 22 are turnably joined to the back main frame 16 at intermediate portions.

Inside the seat back 12, at the rear side of the back main frame 16, the board-form back frame 112 which serves as the back reverse side frame of the back flexing component is provided. The back frame 112 is turnably joined to the rear ends of the first links 22. Further, the back frame 112 is covered with the back face skin 28 and accommodated, and therefore appearance of the seat back 12 is improved.

The upper end of the back joint link 26 is turnably joined to the lower end of the back backrest 20, the first link 22 at the lower portion of the back main frame 16 (anywhere other than a position of joining to the back main frame 16 is acceptable), or the lower end of the back frame 112. Accordingly, turning of the first links 22, the back backrest 20, the back frame 112, the back joint link 26, the second links 72, the back sub frame 24 and the third link 74 is locked, and operation of the back link mechanism 14 is restricted.

Next, operation of the present embodiment will be described.

In the seat 150 of the structure described above, in the state in which tilting of the back main frame 16 around the tilting center 16A is locked by the reclining mechanism 18, the lower end of the back joint link 26 is turnably joined to the vehicle side. Thus, turning of the first links 22, the back backrest 20, the back frame 112, the back joint link 26, the second links 72, the back sub frame 24 and the third link 74 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 150, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Figure 32B:
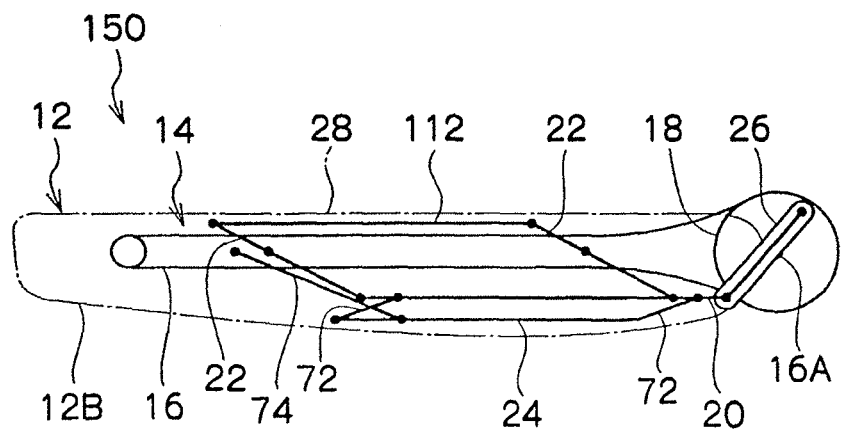
FIG. 32B is a side view, viewed from leftward, showing a stowed state of the principal elements of the seat of the alternative example relating to the thirteenth embodiment of the present invention.

By the reclining mechanism 18 being controlled and the seat back 12 being tilted forward around the tilting center 16A, the seat back 12 is folded onto the upper side of the seat cushion 30, and the seat 150 is stowed (known as fold-forward stowing) (see FIG. 32B).

Figure 33B:
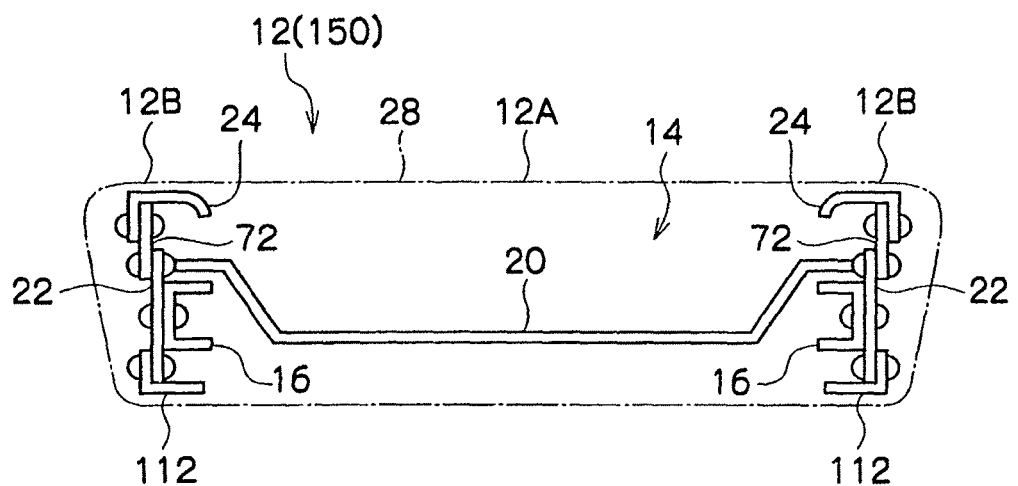
FIG. 33B is a sectional view, viewed from the upper end side, showing the stowed state of the principal elements of the seat relating to the thirteenth embodiment of the present invention.

When the seat 150 is being stowed, the seat back 12 (the back main frame 16) is tilted forward around the tilting center 16A, and the back joint link 26 is turned forward around the lower end. Thus, by movement of the back backrest 20 and the first links 22 or the back frame 112 toward the lower end side of the seat back 12, the first links 22 and the second links 72 are turned, and separations in the seat back 12 thickness direction between the back main frame 16 and the back backrest 20 and the back frame 112 are contracted (see FIG. 33B). Accordingly, even in a case in which the thicknesses of the back side portion 12B and the back main portion 12A for times of usual use are made thicker, in accordance with stowing of the seat 150, the thicknesses of the back side portion 12B and the back main portion 12A are contracted in the region at the face side and the region at the reverse side relative to the back main frame 16 and can be made equal, and space (space at the upper side of the seat 150) in the cabin at times of stowage of the seat 150 (a luggage compartment) can be made larger.

Therefore, with the present embodiment too, effects the same as in the above-described fifth embodiment can be produced.

Figure 34A:
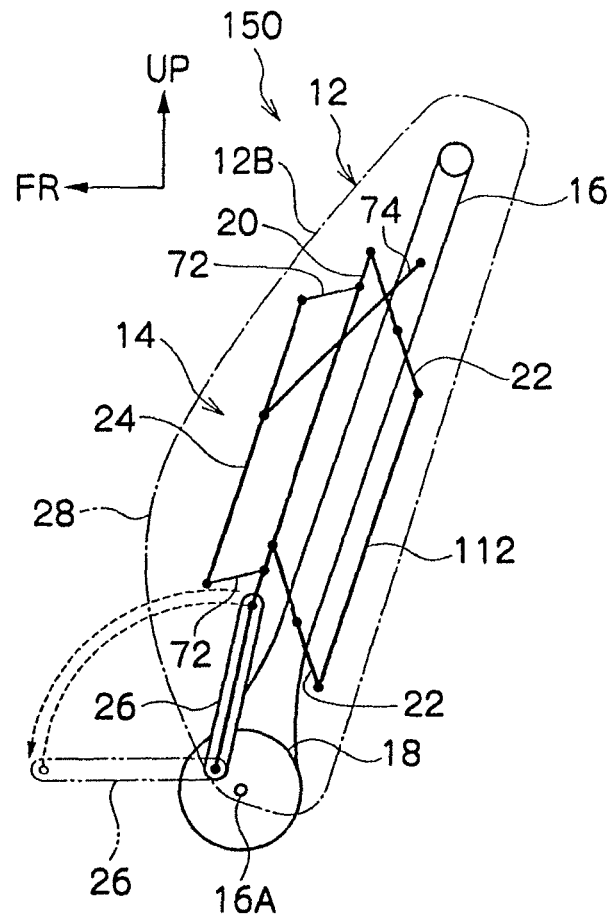
FIG. 34A is a side view, viewed from leftward, showing principal elements of a seat of an alternative example relating to the thirteenth embodiment of the present invention.
Figure 34B:
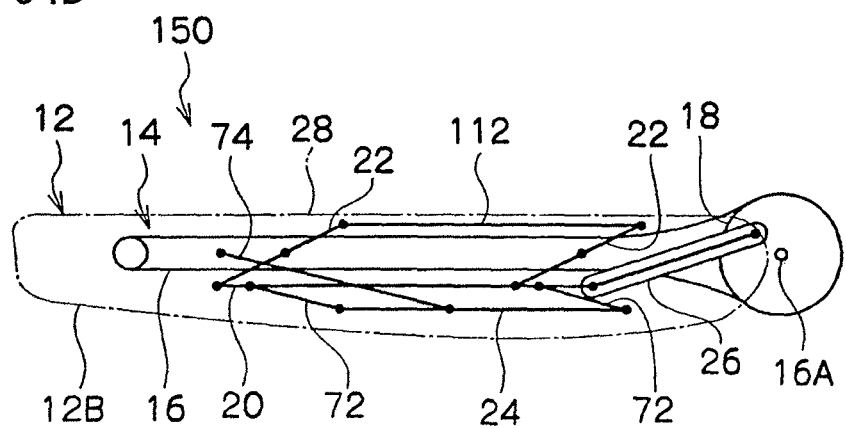
FIG. 34B is a side view, viewed from leftward, showing a stowed state of the principal elements of the seat of the alternative example relating to the thirteenth embodiment of the present invention.

Here, in the present embodiment, a structure is formed in which the lower end of the back joint link 26 is turnably joined to the vehicle side at the rear side of the tilting center 16A at the lower end of the back main frame 16. However, as shown in FIG. 34A, a structure may be formed in which the lower end of the back joint link 26 is turnably joined to the vehicle side at the front side of the tilting center 16A (a position which is offset from the tilting center 16A) at the lower end of the back main frame 16. In this case, when the seat 150 is being stowed, the seat back 12 (the back main frame 16) is tilted forward around the tilting center 16A, and the back joint link 26 turns forward around the lower end. Thus, by movement of the back backrest 20 and the first links 22 or the back frame 112 toward the upper end side of the seat back 12, the first links 22 and the second links 72 are turned, and the separations in the seat back 12 thickness direction between the back main frame 16 and the back backrest 20 and the back frame 112 are contracted, along with which a separation in the seat back 12 thickness direction between the back backrest 20 and the back sub frame 24 is contracted (see FIG. 34B).

Further, in the present embodiment, a structure is formed in which the tilting center 16A of the seat back 12 (the back main frame 16) and the lower end (turning center) of the back joint link 26 do not move when the seat 150 is being stowed. However, a structure may be formed in which the tilting center 16A of the seat back 12 (the back main frame 16) and the lower end (turning center) of the back joint link 26 are moved (for example, movement rearward) when the seat 150 is being stowed, in a similar manner to FIGS. 7A and 7B.

Further yet, in the present embodiment, a structure may be formed in which the seat 150 is formed as what is known as a tilt-down stowage type, similarly to the above-described first embodiment (see FIGS. 9A and 9B).

Further, in the present embodiment, a structure is formed in which the seat back 12 is folded onto the upper side of the seat cushion 30 and the seat 150 is stowed. However, similarly to the above-described first embodiment, the seat 150 may be formed with a structure which is known as double-folded stowing (see FIG. 10), or the seat 110 may be formed with a structure which is known as double-flat stowing (see FIG. 11).

Fourteenth Embodiment

Figure 35:
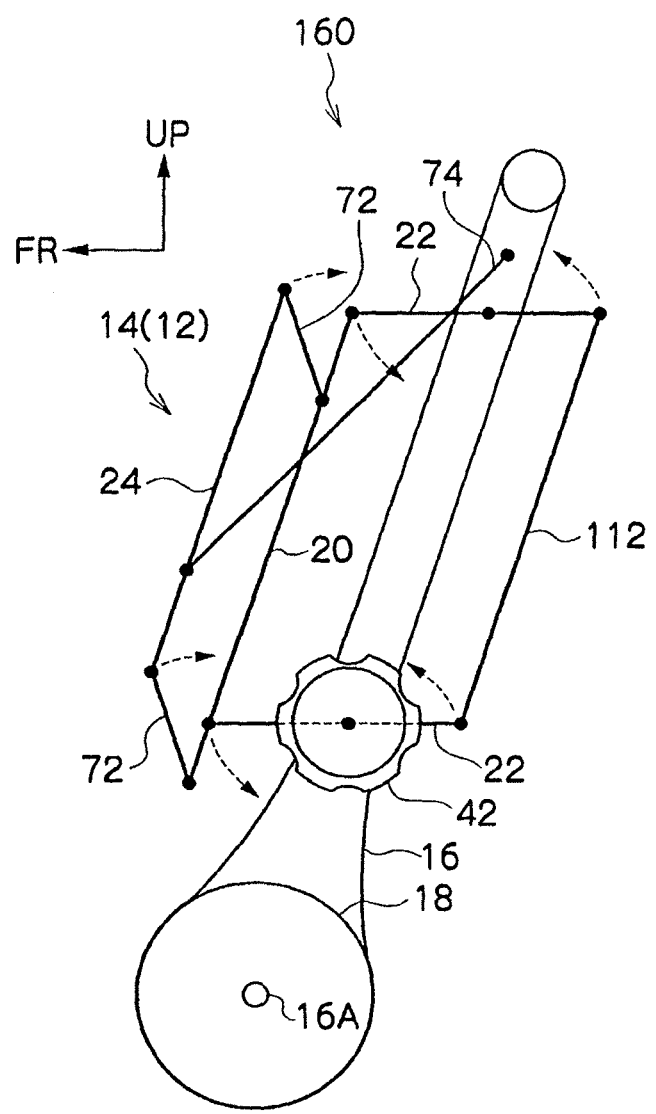
FIG. 35 is a side view, viewed from leftward, showing principal elements of a seat relating to a fourteenth embodiment of the present invention.

FIG. 35 shows a side view, viewed from leftward, of principal elements of a seat 160 relating to a fourteenth embodiment that is structured with the seat structure of the present invention.

The seat 160 relating to the present embodiment has a substantially similar structure to the above-described thirteenth embodiment, but differs in the following respects.

In the seat 160 relating to the present embodiment, the circular rod-shaped control lever 42, which serves as the control mechanism, is engaged with an intermediate portion (turning center) of one of the first links 22 at the back main frame 16. The control lever 42 is formed as a dial-type regulator or the like. A turn-locking mechanism (not shown) which serves as the locking mechanism is provided at the control lever 42. Turning of the control lever 42 is obstructed by the turn-locking mechanism, and thus turning of the first links 22, the back backrest 20, the back frame 112, the second links 72, the back sub frame 24 and the third link 74 is locked, and operation of the back link mechanism 14 is restricted. The control lever 42 protrudes to sideward of the seat back 12, and by the control lever 42 being turningly controlled, the first links 22 are made turnable.

Further, the back joint link 26 of the above-described thirteenth embodiment is not provided in the present embodiment.

Next, operation of the present embodiment will be described.

In the seat 160 of the structure described above, in the state in which tilting of the back main frame 16 around the tilting center 16A is locked by the reclining mechanism 18, turning of the control lever 42 is obstructed by the turn-locking mechanism. Thus, turning of the first links 22, the back backrest 20, the back frame 112, the second links 72, the back sub frame 24 and the third link 74 is locked, and operation of the back link mechanism 14 is locked. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 160, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

In a state in which turning obstruction by the turn locking-mechanism of the control lever 42 is released, by the control lever 42 being turningly controlled, the first links 22 are turned and the separations in the seat back 12 thickness direction between the back main frame 16 and the back backrest 20 and the back frame 112 are flexed, along with which the second links 72 are turned and a separation in the seat back 12 thickness direction between the back backrest 20 and the back sub frame 24 is flexed. Accordingly, independently of stowing of the seat 160, the thicknesses of the back side portion 12B and the back main portion 12A are flexed in the region at the front side and region at the reverse side relative to the back main frame 16, and can be adjusted.

Fifteenth Embodiment

Figure 36:
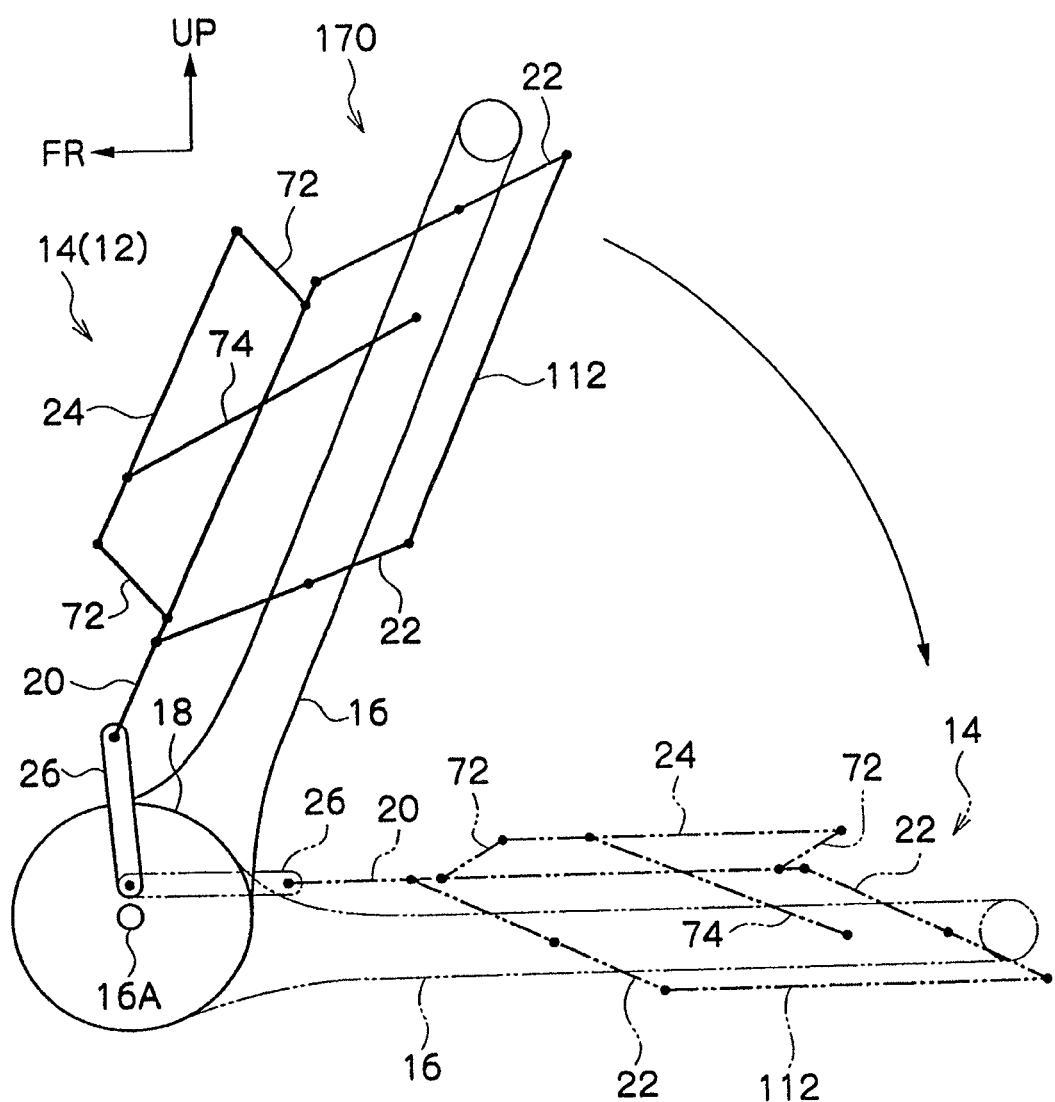
FIG. 36 is a side view, viewed from leftward, showing principal elements of a seat relating to a fifteenth embodiment of the present invention.

FIG. 36 shows a side view, viewed from leftward, of principal elements of a seat 170 relating to a fifteenth embodiment that is structured with the seat structure of the present invention.

The seat 170 relating to the present embodiment has a substantially similar structure to the above-described thirteenth embodiment, but differs in the following respects.

The seat 170 relating to the present embodiment is formed as what is known as a back rearward-folding stowing type.

The lower end of the back joint link 26 is turnably joined to the vehicle side at the upper side of the tilting center 16A (a position which is offset from the tilting center 16A) at the lower end of the back main frame 16.

Here, with the present embodiment too, effects the same as in the above-described thirteenth embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 170 is stowed (known as rearward-folding stowing).

When the seat 170 is being stowed, the seat back 12 (the back main frame 16) is tilted rearward around the tilting center 16A, and the back joint link 26 is turned rearward around the lower end. Thus, by movement of the back backrest 20 and the first links 22 or the back frame 112 toward the lower end side of the seat back 12, the first links 22 and the second links 72 are turned, and the separations in the seat back 12 thickness direction between the back main frame 16 and the back backrest 20 and the back frame 112 are contracted, along with which the separation in the seat back 12 thickness direction between the back backrest 20 and the back sub frame 24 is contracted. Accordingly, even in a case in which the thicknesses of the back side portion 12B and the back main portion 12A for times of usual use are made thicker, in accordance with stowing of the seat 170, the thicknesses of the back side portion 12B and the back main portion 12A are contracted in the region at the face side and region at the reverse side relative to the back main frame 16 and can be made equal, and space (space at the upper side of the seat back 12) in the cabin at times of stowage of the seat 170 (a luggage compartment) can be made larger.

Further, similarly to the third embodiment, a structure can be formed in which the seat 170 is formed as what is known as a space-increasing storage type (see FIG. 15).

Figure 37:
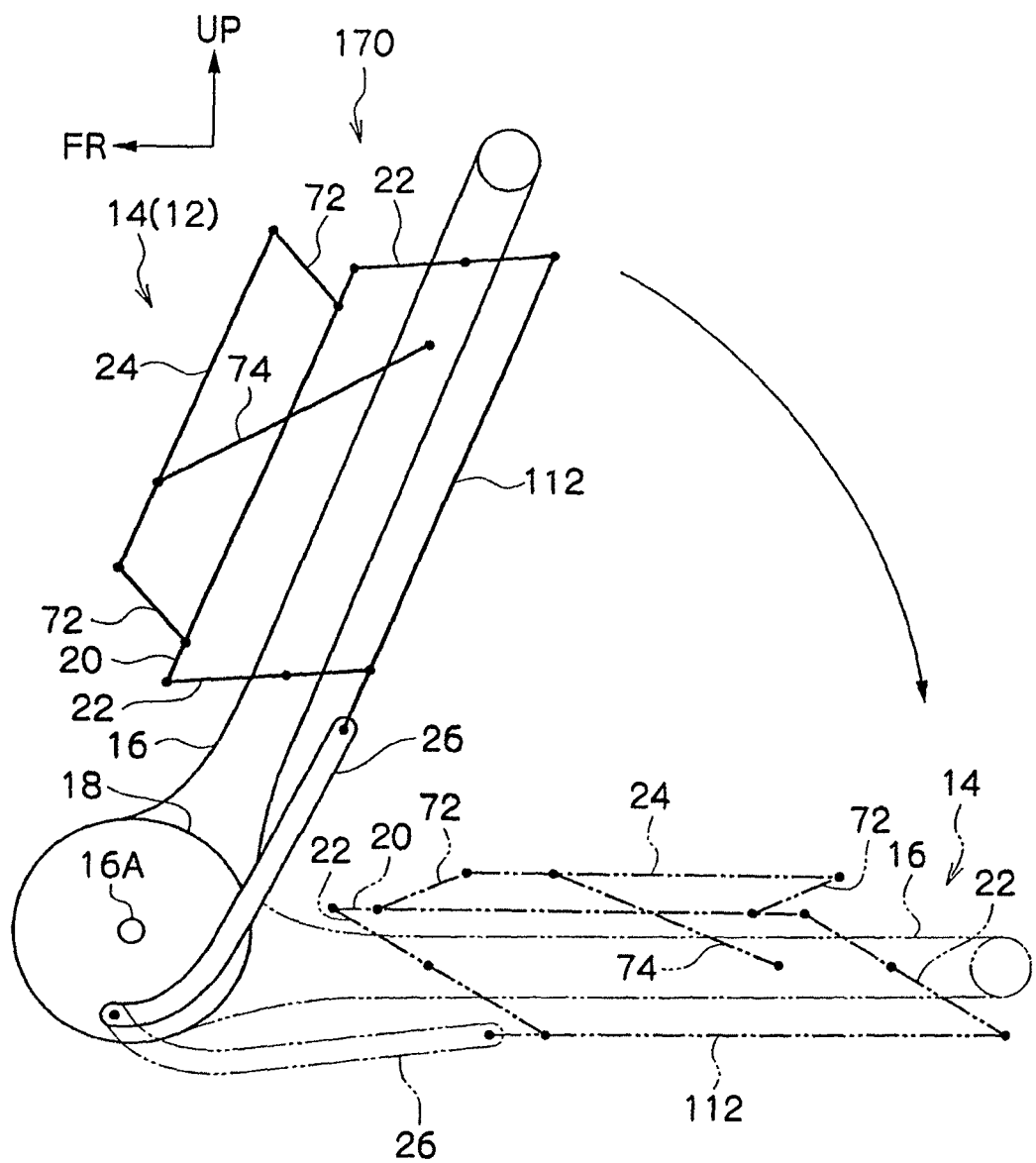
FIG. 37 is a side view, viewed from leftward, showing principal elements of a seat of an alternative example relating to the fifteenth embodiment of the present invention.

Here, in the present embodiment, a structure is formed in which the lower end of the back joint link 26 is turnably joined to the vehicle side at the upper side of the tilting center 16A at the lower end of the back main frame 16. However, as shown in FIG. 37, a structure may be formed in which the lower end of the back joint link 26 is turnably joined to the vehicle side at the lower side of the tilting center 16A (a position which is offset from the tilting center 16A) at the lower end of the back main frame 16. In this case, when the seat 170 is being stowed, the seat back 12 (the back main frame 16) is tilted rearward around the tilting center 16A, and the back joint link 26 turns rearward around the lower end. Thus, by movement of the back backrest 20 and the first links 22 or the back frame 112 toward the upper end side of the seat back 12, the first links 22 and the second links 72 are turned, and the separations in the seat back 12 thickness direction between the back main frame 16 and the back backrest 20 and the back frame 112 are contracted, along with which the separation in the seat back 12 thickness direction between the back backrest 20 and the back sub frame 24 is contracted.

Sixteenth Embodiment

Figure 38:
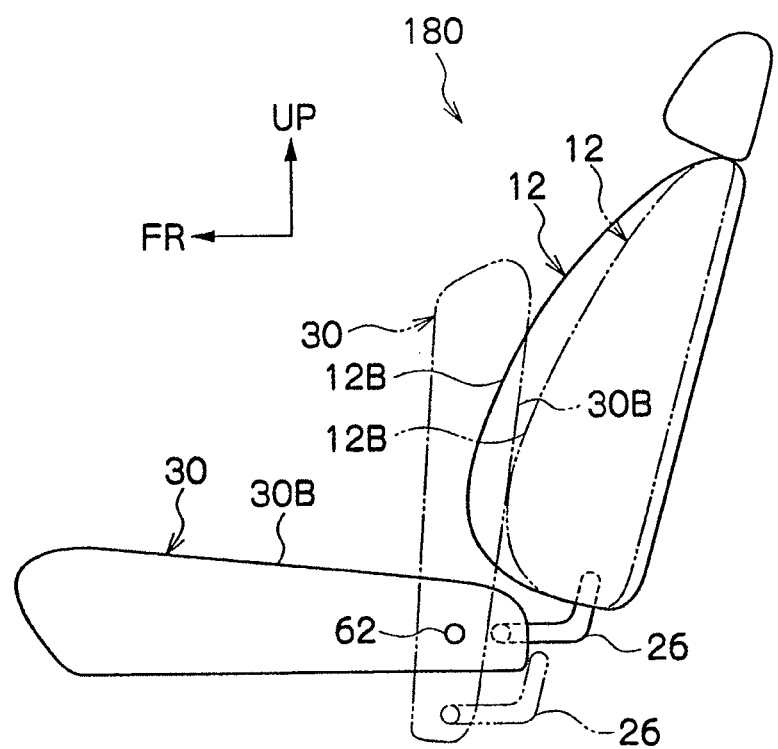
FIG. 38 is a side view, viewed from leftward, showing a seat relating to a sixteenth embodiment of the present invention.

FIG. 38 shows a side view, viewed from leftward, of a seat 180 relating to a sixteenth embodiment that is structured with the seat structure of the present invention.

The seat 180 relating to the present embodiment has a substantially similar structure to the above-described thirteenth embodiment (see FIG. 32A), but differs in the following respects.

The seat 180 relating to the present embodiment is formed as what is known as a tip-up stowing type.

The rear end vicinity of the seat cushion 30 is supported at the vehicle side to be turnable around the support shaft 62, at both the left and the right end portion. Accordingly, the seat cushion 30 is supported at the vehicle side to be turnable around the support shaft 62. The rear end of the seat cushion 30 abuts against the lower end of the seat back 12, and accordingly the seat cushion 30 is disposed substantially horizontally.

The back joint link 26 is formed in the letter-L shape. The upper end of the back joint link 26 is turnably joined to the lower end of the back backrest 20, the first link 22 at the lower portion of the back main frame 16 (anywhere other than the position of joining to the back main frame 16 is acceptable), or the lower end of the back frame 112. The lower end of the back joint link 26 is turnably joined to the rear end of the seat cushion 30 (at a position which is offset to the rear side from the support shaft 62). Accordingly, turning of the first links 22, the back backrest 20, the back frame 112, the back joint link 26, the second links 72, the back sub frame 24 and the third link 74 is locked, and operation of the back link mechanism 14 is restricted.

Next, operation of the present embodiment will be described.

In the seat 180 of the structure described above, in the state in which tilting of the back main frame 16 around the tilting center 16A is locked by the reclining mechanism 18 and the rear end of the seat cushion 30 is abutted against the lower end of the seat back 12, the lower end of the back joint link 26 is turnably joined to the rear end of the seat cushion 30. Thus, turning of the first links 22, the back backrest 20, the back frame 112, the back joint link 26, the second links 72, the back sub frame 24 and the third link 74 is locked, and operation of the back link mechanism 14 is restricted. Therefore, a supporting rigidity from the rear side of the back side portion 12B can be enhanced by the back link mechanism 14 (the back sub frame 24), and even when a load in the left-right direction acts on the back side portion 12B from a crew sitting in the seat 180, the back side portion 12B can thoroughly retain the crew.

Moreover, the operation plane of the back link mechanism 14 (the turning plane of the back sub frame 24) is made perpendicular to the left-right direction of the seat back 12. Therefore, a supporting rigidity of the back side portion 12B with respect to a load in the left-right direction of the seat back 12 can be enhanced by the back link mechanism 14, and even when a load in the left-right direction acts on the back side portion 12B from a crew sitting in the seat 10, the back side portion 12B can even more thoroughly retain the crew.

Further, by the seat cushion 30 being turned rearward around the support shaft 62 (known as tipping up), the seat cushion 30 is folded up onto the front side of the seat back 12, and the seat 180 is stowed.

When the seat 180 is being stowed, the seat cushion 30 is tilted rearward around the support shaft 62, and the back joint link 26 is moved downward. Thus, by movement of the back backrest 20 and the first links 22 or the back frame 112 downward, the first links 22 and the second links 72 are turned, and the separations in the seat back 12 thickness direction between the back main frame 16 and the back backrest 20 and the back frame 112 are contracted, along with which the separation in the seat back 12 thickness direction between the back backrest 20 and the back sub frame 24 is contracted. Accordingly, even in a case in which the thicknesses of the back side portion 12B and the back main portion 12A for times of usual use are made thicker, in accordance with stowing of the seat 180, the thicknesses of the back side portion 12B and the back main portion 12A are contracted in the region at the face side and region at the reverse side relative to the back main frame 16 and can be made equal, and space (space at the front side and rear side of the seat 180) in the cabin at times of stowage of the seat 180 (a luggage compartment) can be made larger.

Further, similarly to the above-described fourth embodiment, this can have a structure in which the seat 180 is formed as what is known as a tumble-storing type (see FIG. 5A), a structure in which the seat 180 is formed as what is known as a space-increasing storage type (see FIG. 5B), or a structure in which the seat 180 is formed as what is known as a rearward under-floor storage type (see FIG. 5C).

Here, in the above-described tenth embodiment to sixteenth embodiment, the back frame 112 is provided inside the seat back 12 and has a structure which is turnably joined to the rear ends of the first links 22. However, similarly to FIGS. 26A and 26B, the back frame 112 may have a structure that is formed in a character-Π shape in cross-section (a back board) and provided outside a rear side of the seat back 12. In this case, the whole of an outer peripheral surface of the back frame 112 may be covered with an additional back face skin (not shown) which serves as the back cover member similarly to the back face skin 28. Accordingly, appearance of the seat back 12 can be improved.

Seventeenth Embodiment

Figure 39A:
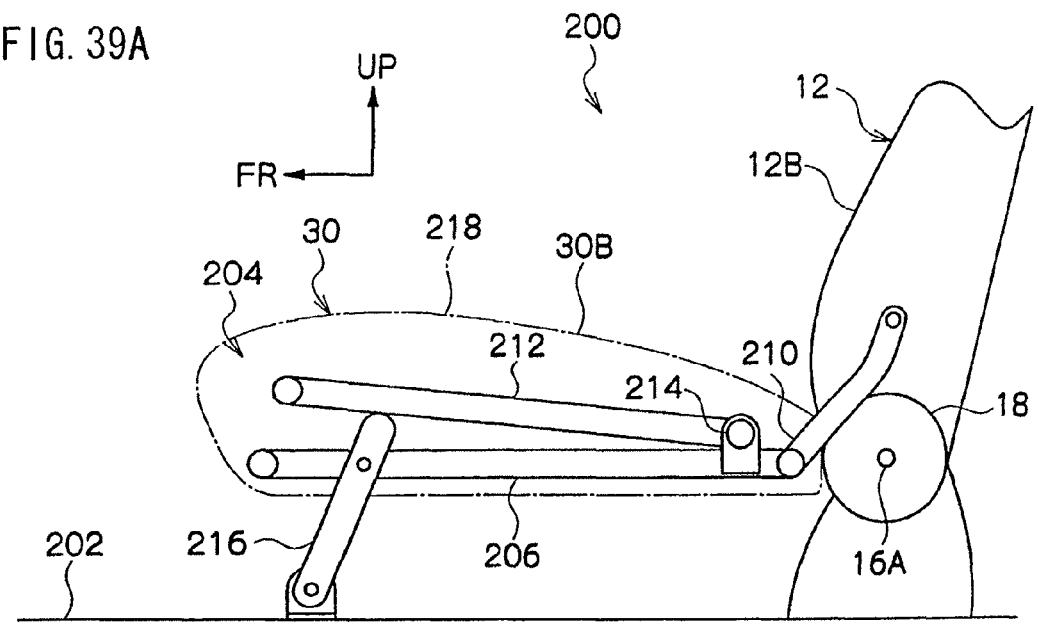
FIG. 39A is a side view, viewed from leftward, showing principal elements of a seat relating to a seventeenth embodiment of the present invention.
Figure 40A:
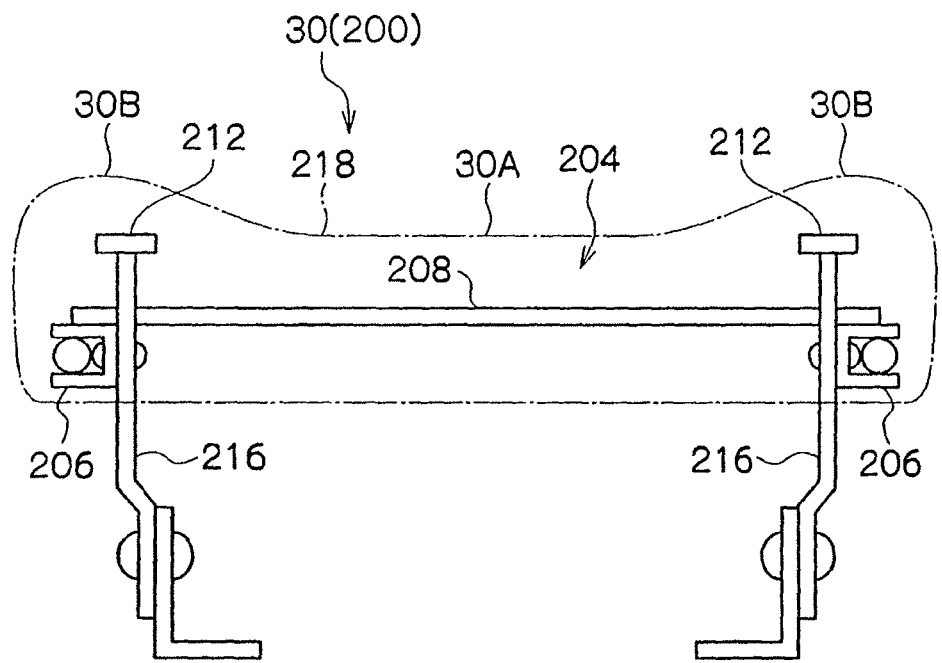
FIG. 40A is a sectional view, viewed from a front end side, showing the principal elements of the seat relating to the seventeenth embodiment of the present invention.

FIG. 39A shows a side view, viewed from leftward, of principal elements of a seat 200 relating to a seventeenth embodiment that is structured with the seat structure of the present invention. FIG. 40A shows a sectional view, viewed from forward, of the principal elements of the seat 200.

The seat 200 relating to the present embodiment is for a vehicle, and is provided on a cabin floor surface 202 of the vehicle. The seat 200 is formed as what is known as a back forward-folding stowing type seat.

The seat back 12 is provided at the seat 200. The board-form back main frame 16 (see FIG. 1) is provided inside each of two left-right direction end portions of the seat back 12, and the lower end of the back main frame 16 is supported at the vehicle side to be tiltable around the tilting center 16A. Thus, the seat back 12 is supported at the vehicle side to be tiltable around the tilting center 16A. The reclining mechanism 18 is provided at the lower end of the back main frame 16. The reclining mechanism 18 locks tilting of the back main frame 16 around the tilting center 16A, and thus the seat back 12 is obstructed from tilting around the tilting center 16A, and is stood up substantially vertically. By the reclining mechanism 18 being controlled, the reclining mechanism 18 enables tilting of the back main frame 16 around the tilting center 16A, and tilting of the seat back 12 around the tilting center 16A is enabled.

The seat cushion 30 is provided at the front side of the seat back 12. The seat cushion 30 is horizontally disposed in a state in which the rear end is disposed in a vicinity of the lower end of the seat back 12. A left-right direction (width direction) central portion of the seat cushion 30 is formed as a cushion main portion 30A, which serves as a seat main portion, and each of two left-right direction side portions of the seat cushion 30 is formed as a cushion side portion 30B, which serves as a seat side portion. The cushion side portion 30B protrudes to the upper side (the face side of the seat cushion 30) in comparison with the cushion main portion 30A (see FIG. 3A).

A cushion link mechanism 204, which serves as the link mechanism, is provided inside the seat cushion 30.

A rectangular frame-form cushion main frame 206 is provided at the cushion link mechanism 204. Two left and right side portions of the cushion main frame 206 are disposed inside the cushion side portions 30B. A cushion support portion 208 supports between two left and right side regions of the cushion main frame 206. The cushion support portion 208 supports an upper side region of the cushion main portion 30A from the lower side. At both a left and a right side region, a lower end of an arm 210 is non-turnably joined to a rear portion of the cushion main frame 206. An upper end of the arm 210 is turnably joined to the lower portion of the back main frame 16 at the upper side of the tilting center 16A (a position which is offset from the tilting center 16A).

At both a left and a right side region of the rear portion of the cushion main frame 206, a rear end of a board-form cushion sub frame 212, which serves as a cushion face side frame of a cushion flexing component, is turnably joined by a cushion joint shaft 214, which serves as a cushion joining component of the cushion flexing component. The cushion sub frame 212 is disposed at the upper side of the cushion main frame 206, and supports an upper side region of the cushion side portion 30B from the lower side.

At both a left and a right side region of a front portion of the cushion main frame 206, a cushion front link 216, which serves as a cushion connection mechanism, is turnably joined, at an intermediate portion. The cushion front link 216 is turnably joined to the vehicle side at a lower end, along with which it supports, at an upper end, the lower side of the cushion sub frame 212. Accordingly, the seat cushion 30 is supported at the vehicle side, turning of the cushion main frame 206, the arm 210, the cushion front link 216 and the cushion sub frame 212 is locked, and operation of the cushion link mechanism 204 is restricted.

The whole of an outer peripheral surface of the seat cushion 30 is covered with a cushion face skin 218, which serves as a cushion cover member.

Next, operation of the present embodiment will be described.

In the seat 200 of the structure described above, in a state in which tilting of the back main frame 16 around the tilting center 16A is locked by the reclining mechanism 18, the lower end of the cushion front link 216 is turnably joined to the vehicle side. Thus, turning of the cushion main frame 206, the arm 210, the cushion front link 216 and the cushion sub frame 212 is locked, and operation of the cushion link mechanism 204 is locked. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 200, the cushion side portion 30B can thoroughly retain the crew.

Moreover, an operation plane of the cushion link mechanism 204 (a turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Figure 39B:
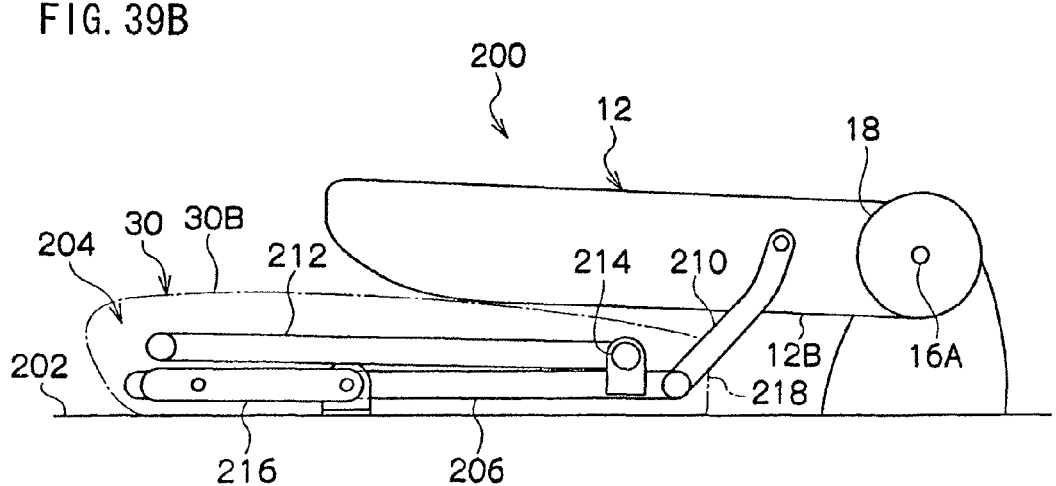
FIG. 39B is a side view, viewed from leftward, showing a stowed state of the principal elements of the seat relating to the seventeenth embodiment of the present invention.

By the reclining mechanism 18 being controlled and the seat back 12 being tilted forward around the tilting center 16A, the seat back 12 is folded onto the upper side of the seat cushion 30, and the seat 200 is stowed (known as fold-forward stowing) (see FIG. 39B).

When the seat 200 is being stowed, the back main frame 16 (the seat back 12) is tilted forward around the tilting center 16A and, via the arm 210, the cushion main frame 206 (the seat cushion 30) is moved forward. Thus, the cushion front link 216 is turned forward and the seat cushion 30 is moved forward and downward.

Figure 40B:
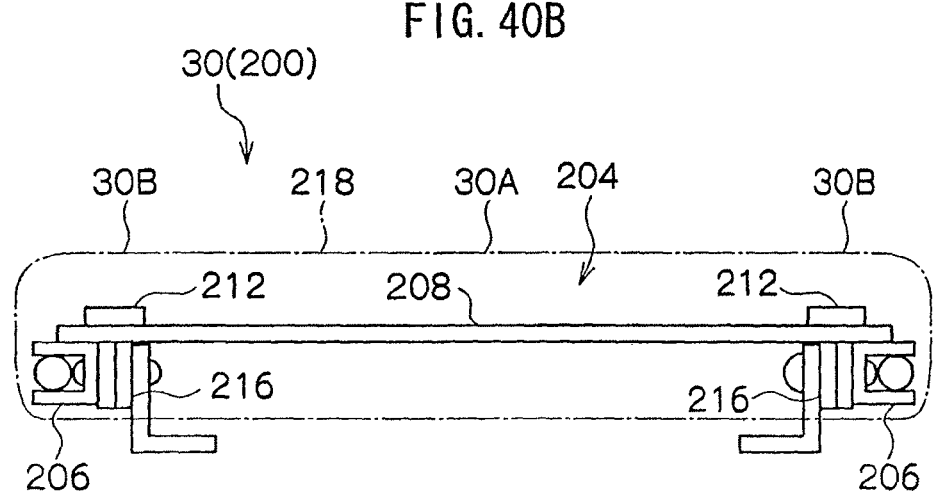
FIG. 40B is a sectional view, viewed from the front end side, showing the stowed state of the principal elements of the seat relating to the seventeenth embodiment of the present invention.

Furthermore, when the seat 200 is being stowed, the cushion front link 216 is turned forward. Thus, a separation in the thickness direction of the seat cushion 30 between the upper end of the cushion front link 216 and the position of joining to the cushion main frame 206 is contracted, the cushion sub frame 212 turns toward the cushion main frame 206 relative to the cushion main frame 206, and a separation in the seat cushion 30 thickness direction between the cushion sub frame 212 and the cushion main frame 206 is contracted (see FIG. 40B). Therefore, even in a case in which a thickness of the cushion side portion 30B for times of usual use is made thicker, in accordance with stowing of the seat 200, the thickness of the cushion side portion 30B is contracted in a region at the face side relative to the cushion main frame 206 and can be made equal to a thickness of the cushion main portion 30A, and space (space at the upper side of the seat 200) in the cabin at times of stowage of the seat 200 (a luggage compartment) can be made larger.

Further, for example, similarly to FIG. 5A, a structure can be formed in which the seat 200 is formed as what is known as a tumble-storing type, and after the seat 200 is stowed, support of the seat back 12 and the seat cushion 30 to the vehicle side is released, the seat 200 is turned substantially 90° forward, and thus the seat 200 (the seat back 12 and the seat cushion 30) is stored to the front side in a state of being stood up substantially vertically. In this case, because the thickness of the cushion side portion 30B has been contracted in accordance with stowing of the seat 200 as described above, space (space at the front side and rear side of the seat 200) in the cabin at times of storage of the seat 200 (a luggage compartment) can be made larger.

Further yet, for example, similarly to FIG. 5B, in a case in which the wheel housing 32 is present to sideward of the seat 200, a structure can be formed in which the seat 200 is formed as what is known as a space-increasing storage type, and after the seat 200 is stowed, support of the seat back 12 and the seat cushion 30 to the vehicle side is released, the seat 200 is turned substantially 90° to sideward, and thus the seat 200 (the seat back 12 and the seat cushion 30) is stored at the upper side of the wheel housing 32 in a state of being stood up substantially vertically. In this case, because the thickness of the cushion side portion 30B has been contracted in accordance with stowing of the seat 200 as described above, space (space to sideward of the seat 200) in the cabin at times of storage of the seat 200 (a luggage compartment) can be made larger.

Moreover, for example, similarly to FIG. 5C, in a case in which the recess portion 34 is present to rearward of the seat 200, a structure can be formed in which the seat 200 is formed as what is known as a rearward under-floor storage type, and after the seat 200 is stowed, support of the seat back 12 and the seat cushion 30 to the vehicle side is released, the seat 200 is turned substantially 180° to rearward or is moved by a turning link or the like, and thus the seat 200 (the seat back 12 and the seat cushion 30) is stored substantially horizontally inside the recess portion 34 in a state in which the seat cushion 30 is disposed at the upper side of the seat back 12. In this case, because the thickness of the cushion side portion 30B has been contracted in accordance with stowing of the seat 200 as described above, space (space at the upper side of the seat 200) in the cabin at times of storage of the seat 200 (a luggage compartment) can be made larger, along with which a depth of the recess portion 34 can be made shallower.

Figure 41A:
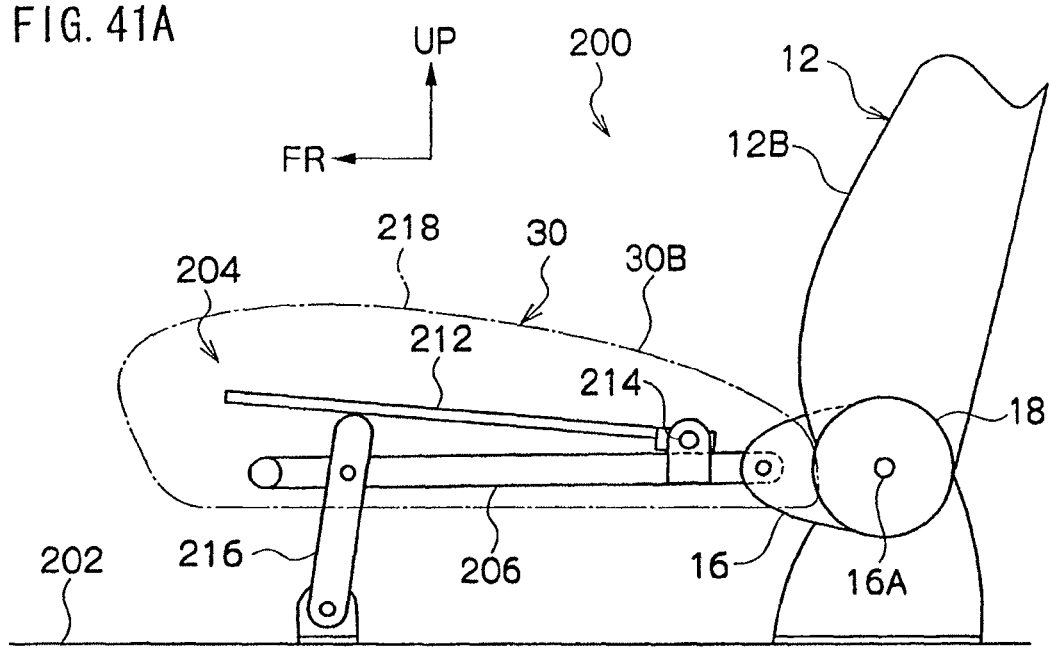
FIG. 41A is a side view, viewed from leftward, showing a seat of an alternative example relating to the seventeenth embodiment of the present invention.
Figure 41B:
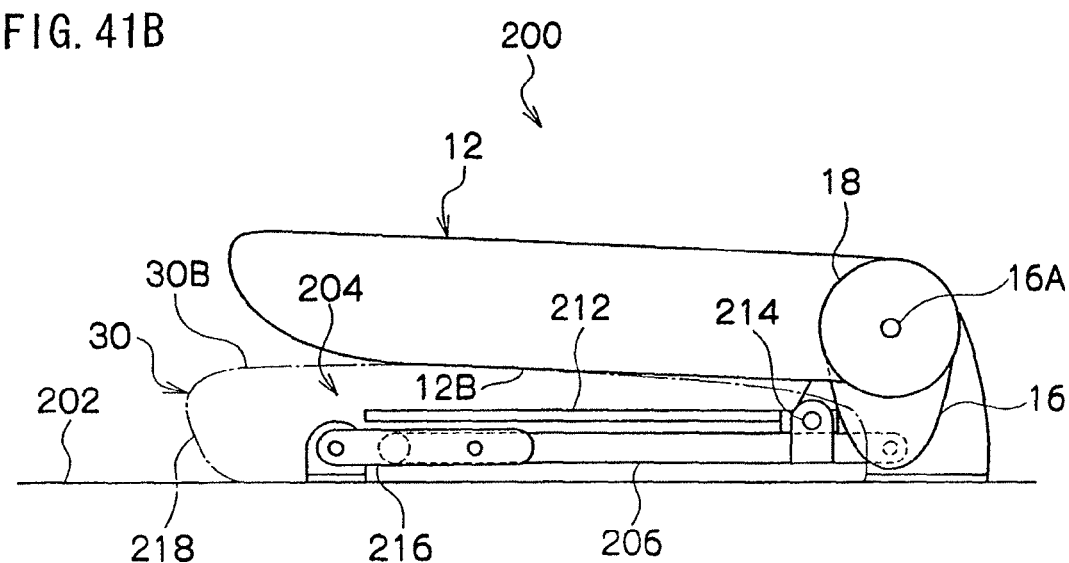
FIG. 41B is a side view, viewed from leftward, showing a stowed state of the seat of the alternative example relating to the seventeenth embodiment of the present invention.

Here, in the present embodiment, a structure is formed in which both the left and the right side region of the rear portion of the cushion main frame 206 is turnably joined, via the arm 210, to the back main frame 16 at the upper side of the tilting center 16A. However, as shown in FIG. 41A, a structure may be formed in which both the left and the right side region of the rear portion of the cushion main frame 206 is turnably joined to the back main frame 16 at the front side of the tilting center 16A (a position which is offset from the tilting center 16A). In this case, as shown in FIG. 41B, when the seat 200 is being stowed, the back main frame 16 (the seat back 12) is tilted forward around the tilting center 16A, and the cushion main frame 206 (the seat cushion 30) moves rearward. Thus, the cushion front link 216 is turned rearward, and the seat cushion 30 is moved rearward and downward.

Eighteenth Embodiment

Figure 42:
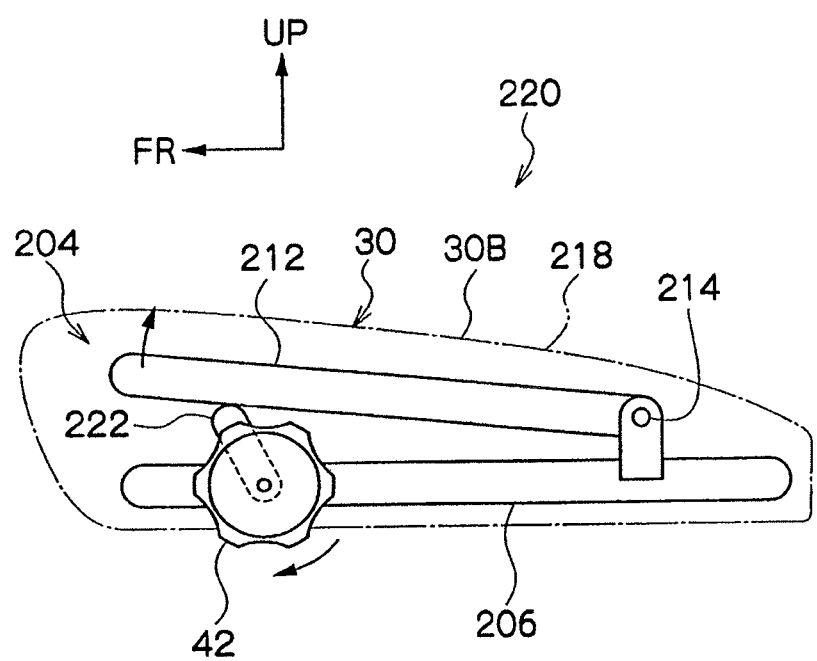
FIG. 42 is a side view, viewed from leftward, showing principal elements of a seat relating to an eighteenth embodiment of the present invention.

FIG. 42 shows a side view, viewed from leftward, of principal elements of a seat 220 relating to an eighteenth embodiment that is structured with the seat structure of the present invention.

The seat 220 relating to the present embodiment has a substantially similar structure to the above-described seventeenth embodiment, but differs in the following respects.

In the seat 220 relating to the present embodiment, the cushion front link 216 is turnably joined, at the upper end, to a front portion of the cushion main frame 206, and the cushion front link 216 does not support the cushion sub frame 212.

At both the left and the right side region of the front portion of the cushion main frame 206, a lower end of a regulation link 222 is turnably joined. The regulation link 222, at an upper end, supports the cushion sub frame 212 from the lower side.

The circular rod-shaped control lever 42, which serves as the control mechanism, is engaged at the lower end (turning center) of the regulation link 222. The control lever 42 is formed as a dial-type regulator or the like. A turn-locking mechanism (not shown) which serves as the locking mechanism is provided at the control lever 42. Turning of the control lever 42 is obstructed by the turn-locking mechanism, and thus turning of the regulation link 222 and the cushion sub frame 212 is locked, and operation of the cushion link mechanism 204 is restricted. The control lever 42 protrudes to sideward of the seat cushion 30, and by the control lever 42 being turningly controlled, the regulation link 222 is made turnable.

Next, operation of the present embodiment will be described.

In the seat 220 of the structure described above, in the state in which tilting of the back main frame 16 around the tilting center 16A is locked by the reclining mechanism 18, the lower end of the cushion front link 216 is turnably joined to the vehicle side, in addition to which turning of the control lever 42 is obstructed by the turn-locking mechanism. Thus, turning of the cushion main frame 206, the aim 210, the cushion front link 216, the regulation link 222 and the cushion sub frame 212 is locked, and operation of the cushion link mechanism 204 is locked. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 220, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

In a state in which turning obstruction by the turn locking-mechanism of the control lever 42 is released, by the control lever 42 being turningly controlled, the regulation link 222 is turned, and a separation in the seat cushion 30 thickness direction between the upper end of the regulation link 222 and the position of joining to the cushion main frame 206 is flexed. Therefore, the cushion sub frame 212 is turned relative to the cushion main frame 206, and a separation in the seat cushion 30 thickness direction between the cushion sub frame 212 and the cushion main frame 206 is flexed. Accordingly, independently of stowing of the seat 220, the thickness of the cushion side portion 30B is flexed in the region at the face side relative to the cushion main frame 206, and can be adjusted.

Nineteenth Embodiment

FIG. 43A shows a side view, viewed from leftward, of principal elements of a seat 230 relating to a nineteenth embodiment that is structured with the seat structure of the present invention.

The seat 230 relating to the present embodiment has a substantially similar structure to the above-described seventeenth embodiment, but differs in the following respects.

In the present embodiment, the cabin floor surface 202 at the front side of the seat 230 is made lower than the cabin floor surface 202 directly below the seat 230.

The seat 230 relating to the present embodiment is formed as what is known as a back rearward-folding stowing type.

The lower end of the cushion front link 216 is turnably joined to a vehicle side front bracket 232. The cushion front link 216 is turnably joined, at the upper end, to a front portion of the cushion main frame 206. The cushion front link 216 does not function as the cushion connection mechanism, and does not support the cushion sub frame 212.

At the lower side of a rear portion of the cushion main frame 206, at both the left and the right side region, a rear locking mechanism 234, which serves as a locking mechanism, is engaged. The rear locking mechanism 234 is locked to the vehicle side. Thus, the cushion main frame 206 is supported at the rear locking mechanism 234 and the cushion front link 216, and the seat cushion 30 is supported at the vehicle side.

The lower end of the back main frame 16 is tiltably supported at the arm 210 to be tiltable around the tilting center 16A. Accordingly, the back main frame 16 is supported at the vehicle side via the arm 210, the cushion main frame 206, the rear locking mechanism 234 and the cushion front link 216, and the seat back 12 is supported at the vehicle side.

A predetermined number (two in the present embodiment) of cushion joint links 236, which serve as the cushion joining component of the cushion flexing component, are turnably joined, at lower ends, to the cushion main frame 206 at both the left and the right side region. Upper ends of the cushion joint links 236 are turnably joined to the cushion sub frame 212.

A front end of a cushion joint link 238, which serves as the cushion connection mechanism, is turnably joined to the rear end of the cushion sub frame 212 or an upper end (anywhere other than a lower end is acceptable) of the cushion joint link 236 at the rear portion of the cushion main frame 206. A rear end of the cushion joint link 238 is turnably joined to the back main frame 16 at the upper side of the tilting center 16A (a position which is offset from the tilting center 16A). Accordingly, turning of the cushion joint links 236, the cushion sub frame 212 and the cushion joint link 238 is locked, and operation of the cushion link mechanism 204 is restricted.

Further, the cushion main frame 206 and the cushion sub frame 212 are not joined by the cushion joint shaft 214 of the above-described seventeenth embodiment.

Operation of the present embodiment will be described.

In the seat 230 of the structure described above, in a state in which the cushion main frame 206 is supported at the rear locking mechanism 234 and the cushion front link 216 and locked, tilting of the back main frame 16 around the tilting center 16A is locked by the reclining mechanism 18. Thus, turning of the cushion main frame 206, the arm 210, the cushion joint links 236, the cushion sub frame 212 and the cushion joint link 238 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 230, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

By the reclining mechanism 18 being controlled and the seat back 12 being tilted forward around the tilting center 16A, the seat back 12 is folded onto the upper side of the seat cushion 30, and the seat 230 is stowed (known as fold-forward stowing) (see FIG. 43B).

When the seat 230 is being stowed, the back main frame 16 (the seat back 12) is tilted forward around the tilting center 16A, and the cushion joint link 238 is moved forward. Thus, by movement of the cushion sub frame 212 which is to say the cushion joint links 236 forward, the cushion joint links 236 are turned forward, and the separation in the seat cushion 30 thickness direction between the cushion sub frame 212 and the cushion main frame 206 is contracted.

Therefore, with the present embodiment too, effects the same as in the above-described seventeenth embodiment can be produced.

Figure 44:
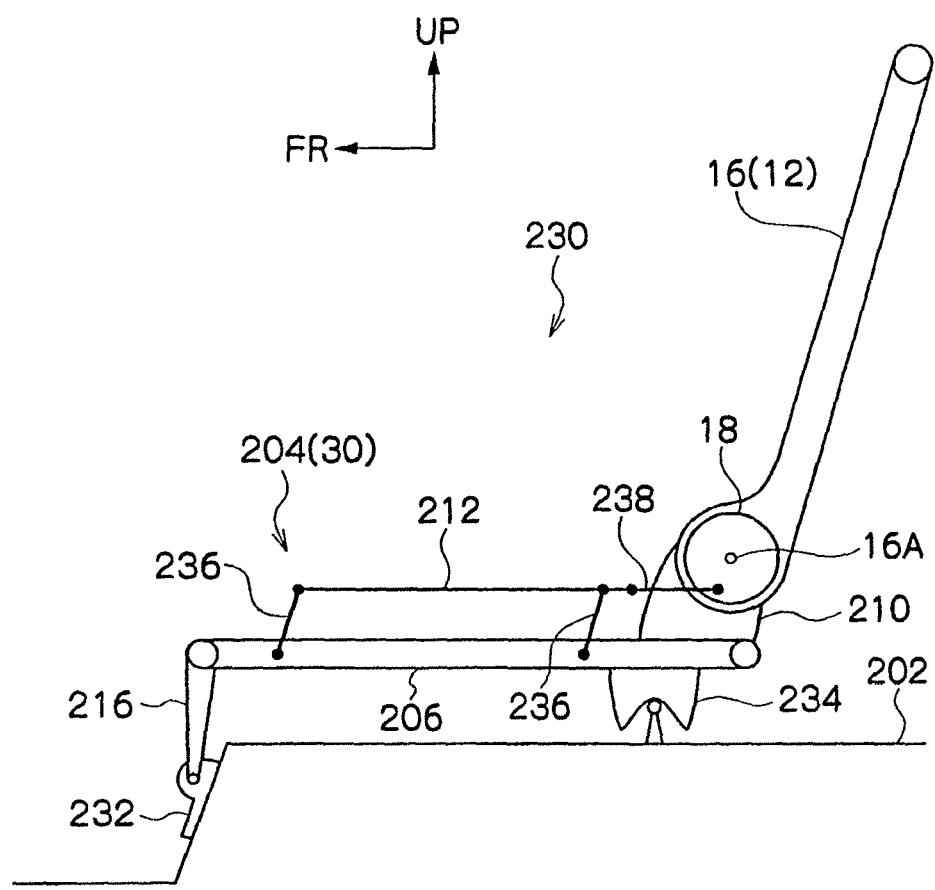
FIG. 44 is a side view, viewed from leftward, showing principal elements of a seat of an alternative example relating to the nineteenth embodiment of the present invention.

Here, in the present embodiment, a structure is formed in which the rear end of the cushion joint link 238 is turnably joined to the back main frame 16 at the upper side of the tilting center 16A. However, as shown in FIG. 44, a structure may be formed in which the rear end of the cushion joint link 238 is turnably joined to the back main frame 16 at the lower side of the tilting center 16A (a position which is offset from the tilting center 16A). In this case, when the seat 230 is being stowed, the back main frame 16 (the seat back 12) is tilted forward around the tilting center 16A, and the cushion joint link 238 is moved rearward. Thus, by movement of the cushion sub frame 212 which is to say the cushion joint links 236 rearward, the cushion joint links 236 are turned rearward, and the separation in the seat cushion 30 thickness direction between the cushion sub frame 212 and the cushion main frame 206 is contracted.

Twentieth Embodiment

Figure 45:
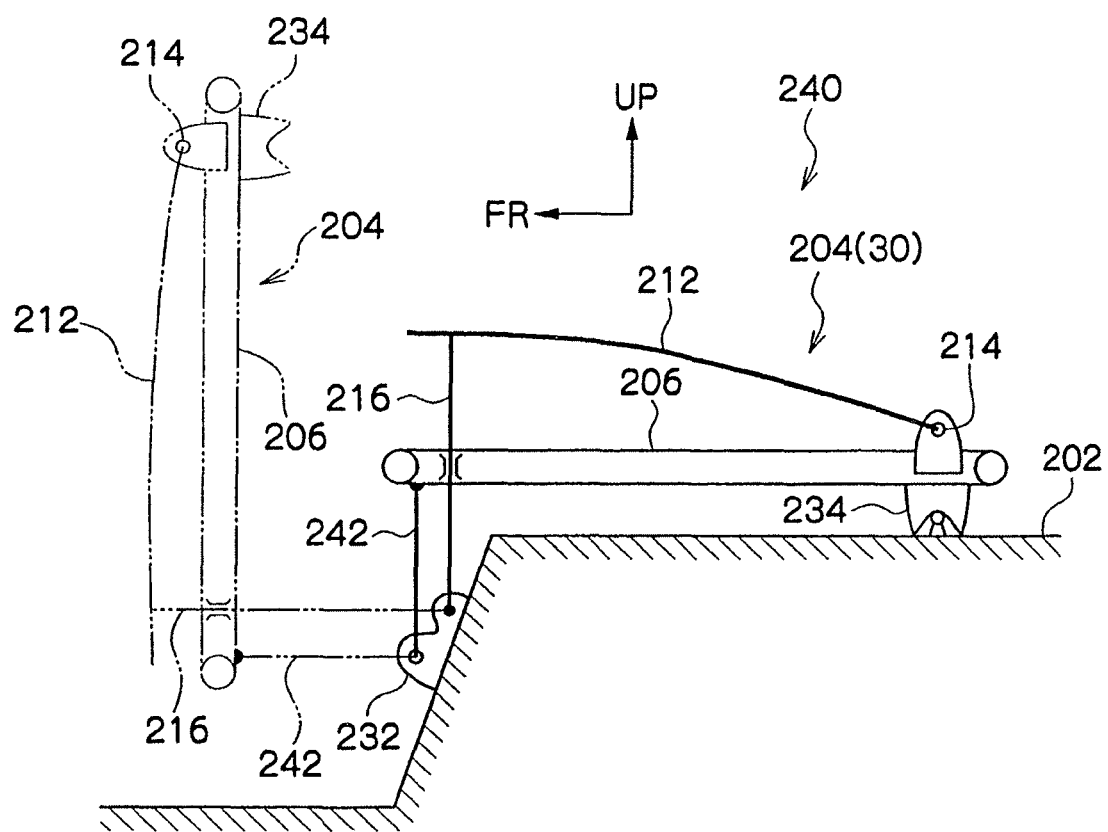
FIG. 45 is a side view, viewed from leftward, showing principal elements of a seat relating to a twentieth embodiment of the present invention.

FIG. 45 shows a side view, viewed from leftward, of principal elements of a seat 240 relating to a twentieth embodiment that is structured with the seat structure of the present invention.

The seat 240 relating to the present embodiment has a substantially similar structure to the above-described seventeenth embodiment, but differs in the following respects.

In the present embodiment, the cabin floor surface 202 at the front side of the seat 240 is made lower than the cabin floor surface 202 directly below the seat 240.

The seat 240 relating to the present embodiment is formed as what is known as a double-folded stowing type.

At both the left and the right side region, an upper end of a fourth link 242 is non-turnably joined to the lower side of a front portion of the cushion main frame 206. A lower end of the fourth link 242 is turnably joined to the front bracket 232 at the vehicle side. In the present embodiment, the arm 210 of the above-described seventeenth embodiment is not provided.

At both the left and the right side region, the rear locking mechanism 234 which serves as the locking mechanism is engaged at the lower side of the rear portion of the cushion main frame 206, and the rear locking mechanism 234 is locked to the vehicle side. Thus, the cushion main frame 206 is supported at the rear locking mechanism 234 and the fourth link 242, and the seat cushion 30 is supported at the vehicle side.

The lower end of the cushion front link 216 is turnably joined to the front bracket 232 at the vehicle side, at the rear side of the position of joining to the front bracket 232 (turning center) of the fourth link 242 (at a position which is offset from this joining position). The cushion front link 216 is joined in a condition of being movable, in a length direction, at the cushion main frame 206. Furthermore, the cushion front link 216, at the upper end, supports the cushion sub frame 212 from the lower side. Thus, turning of the cushion front link 216 and the cushion sub frame 212 is locked, and operation of the cushion link mechanism 204 is restricted.

Next, operation of the present embodiment will be described.

In the seat 240 of the structure described above, in the state in which the cushion main frame 206 is supported at the rear locking mechanism 234 and the fourth link 242 and locked, the lower end of the cushion front link 216 is turnably joined to the vehicle side. Thus, turning of the fourth link 242, the cushion main frame 206, the cushion front link 216 and the cushion sub frame 212 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 240, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 90° forward, the seat cushion 30 is stood up substantially vertically. Then, the reclining mechanism 18 is controlled, the seat back 12 is tilted forward around the tilting center 16A, and thus the seat back 12 is disposed substantially horizontally at the rear side of the seat cushion 30, and the seat 240 is stowed (known as double-folded stowing) (similarly to FIG. 10).

When the seat 240 is being stowed (when the seat cushion 30 is being turned forward), the fourth link 242 and the cushion front link 216 are turned substantially 90° forward. Thus, a separation in the seat cushion 30 thickness direction between the position of joining of the fourth link 242 to the cushion main frame 206 and the position of support of the cushion sub frame 212 by the cushion front link 216 is contracted due to a difference in turning paths of the fourth link 242 and the cushion front link 216, and the cushion sub frame 212 turns toward the cushion main frame 206 relative to the cushion main frame 206 and the separation in the seat cushion 30 thickness direction between the cushion main frame 206 and the cushion sub frame 212 is contracted. Therefore, even in a case in which a thickness of the cushion side portion 30B for times of usual use is made thicker, in accordance with stowing of the seat 240, the thickness of the cushion side portion 30B is contracted in the region at the face side relative to the cushion main frame 206 and can be made equal to the thickness of the cushion main portion 30A, and space (space at the front side and rear side of the seat cushion 30) in the cabin at times of stowage of the seat 240 (a luggage compartment) can be made larger, along with which a possible angle of tilting (reclining), to rearward, of a seat (not shown) at the front side of the seat 240 can be made larger.

Twenty-first Embodiment

Figure 46:
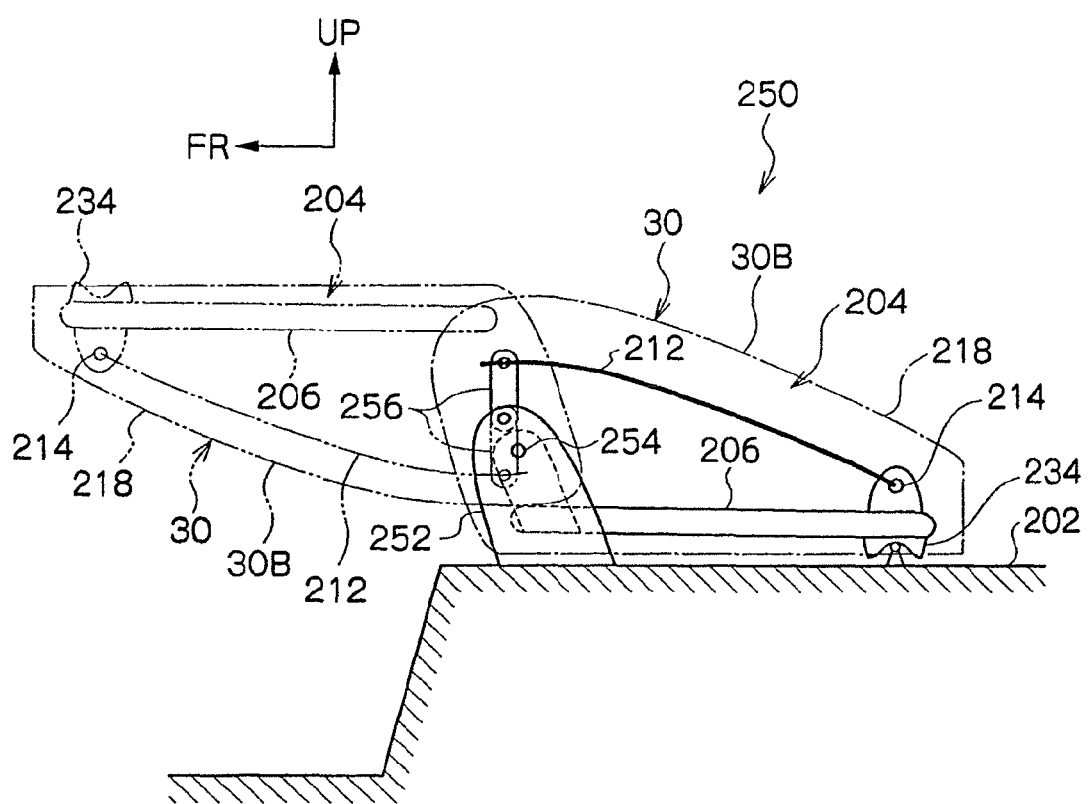
FIG. 46 is a side view, viewed from leftward, showing principal elements of a seat relating to a twenty-first embodiment of the present invention.
Figure 47:
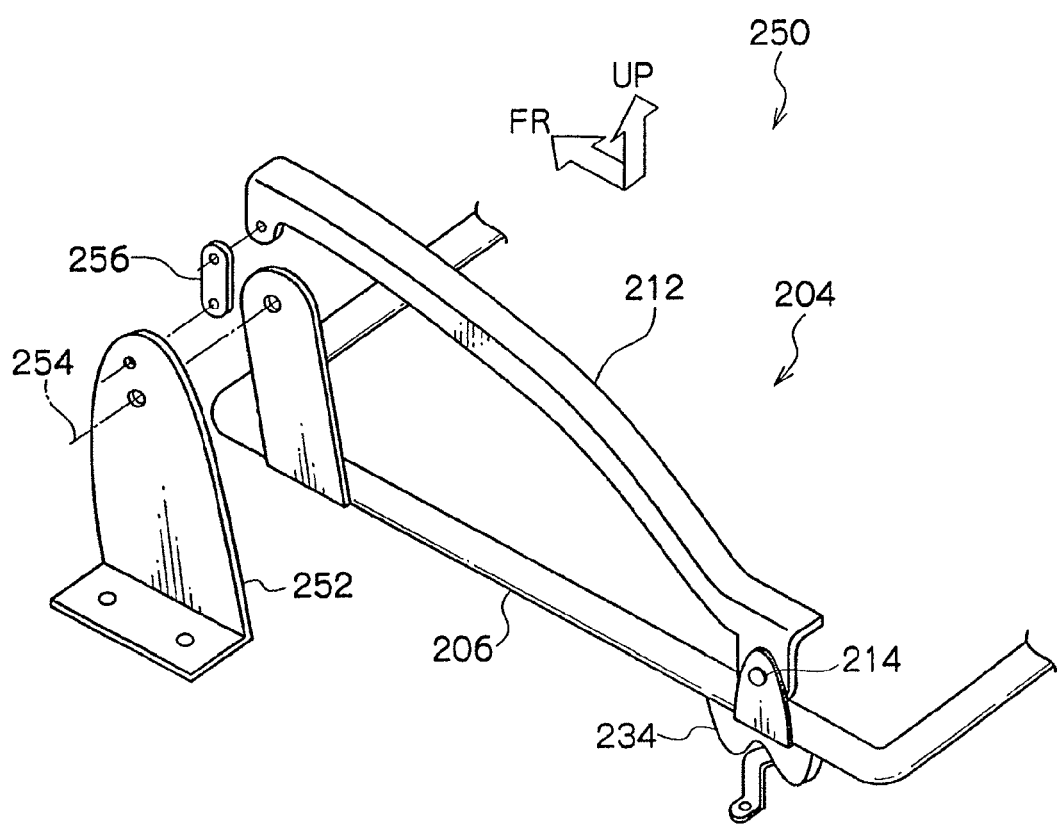
FIG. 47 is an exploded perspective view, viewed from diagonally left rearward, showing the principal elements of the seat relating to the twenty-first embodiment of the present invention.

FIG. 46 shows a side view, viewed from leftward, of principal elements of a seat 250 relating to a twenty-first embodiment that is structured with the seat structure of the present invention. FIG. 47 shows an exploded perspective view, viewed from diagonally left rearward, of the principal elements of the seat 250.

The seat 250 relating to the present embodiment has a substantially similar structure to the above-described seventeenth embodiment, but differs in the following respects.

The seat 250 relating to the present embodiment is formed as what is known as a double-flat stowing type.

At both the left and the right side region, a front portion of the cushion main frame 206 is turnably joined to a fixed bracket 252 at the vehicle side by a first joint shaft 254.

At both the left and the right side region, the rear locking mechanism 234 which serves as the locking mechanism is engaged with the lower side of the rear portion of the cushion main frame 206, and the rear locking mechanism 234 is locked to the vehicle side. Thus, the cushion main frame 206 is supported at the rear locking mechanism 234 and the fixed bracket 252, and the seat cushion 30 is supported at the vehicle side.

In the present embodiment, the arm 210 and the cushion front link 216 of the above-described seventeenth embodiment are not provided.

An upper end of a cushion joint link 256, which serves as the cushion connection mechanism, is non-turnably joined to a front portion of the cushion sub frame 212. A lower end of the cushion joint link 256 is turnably joined to the fixed bracket 252 at the upper side of the first joint shaft 254 (a turning center of the cushion main frame 206) (at a position which is offset from the first joint shaft 254). Accordingly, turning of the cushion joint link 256 and the cushion sub frame 212 is locked, and operation of the cushion link mechanism 204 is restricted.

Next, operation of the present embodiment will be described.

In the seat 250 of the structure described above, in the state in which the cushion main frame 206 is supported at the rear locking mechanism 234 and the fixed bracket 252 and locked, the lower end of the cushion joint link 256 is turnably joined to the fixed bracket 252. Thus, turning of the cushion main frame 206, the cushion joint link 256 and the cushion sub frame 212 is locked, and operation of the cushion link mechanism 204 is locked. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 250, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 180° forward, the seat cushion 30 is inverted to be substantially horizontal. Then, the reclining mechanism 18 is controlled, the seat back 12 is tilted forward around the tilting center 16A, and thus the seat back 12 is disposed substantially horizontally at the rear side of the seat cushion 30, and the seat 250 is stowed (known as double-flat stowing) (similarly to FIG. 11).

When the seat 250 is being stowed (when the seat cushion 30 is being turned forward), the cushion main frame 206 and the cushion sub frame 212 (including the cushion joint link 256) are turned substantially 180° forward. Thus, a separation in the seat cushion 30 thickness direction between the first joint shaft 254 and the position of joining to the cushion sub frame 212 of the cushion joint link 256 is contracted due to a difference in turning paths of the cushion main frame 206 and the cushion sub frame 212, and the cushion sub frame 212 turns toward the cushion main frame 206 relative to the cushion main frame 206 and the separation in the seat cushion 30 thickness direction between the cushion main frame 206 and the cushion sub frame 212 is contracted. Accordingly, even in a case in which a thickness of the seat cushion 30 for times of usual use is made thicker, in accordance with stowing of the seat 250, the thickness of the cushion side portion 30B is contracted in the region at the face side relative to the cushion main frame 206 and can be made equal to the thickness of the cushion main portion 30A, and space (space at the upper side of the seat cushion 30) in the cabin at times of stowage of the seat 250 (a luggage compartment) can be made larger, along with which interference of the seat cushion 30 with the cabin floor surface 202 can be suppressed.

Twenty-second Embodiment

Figure 48:
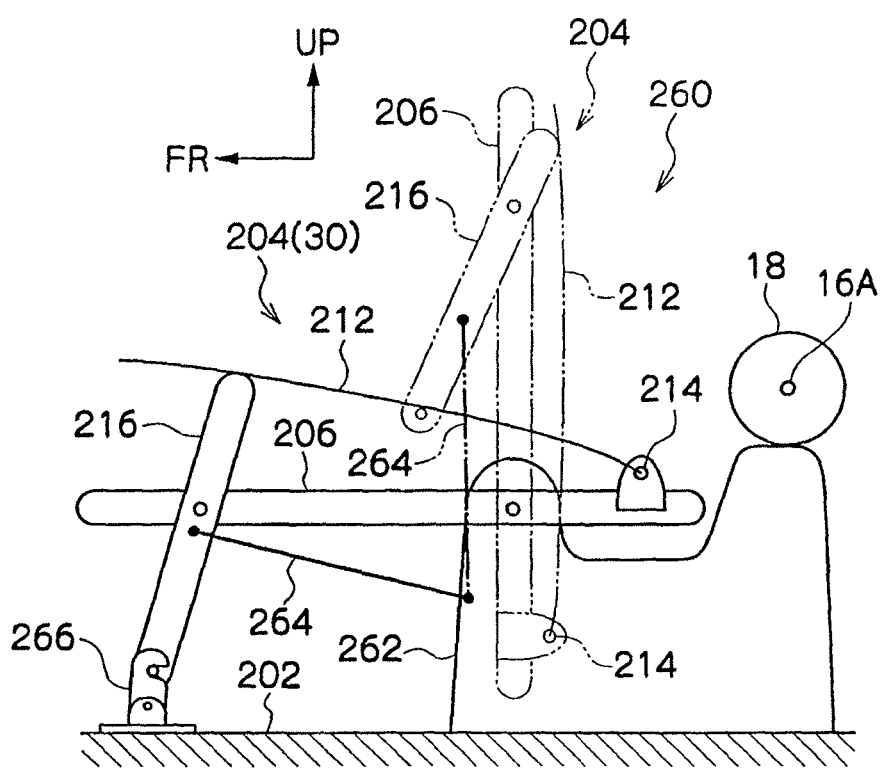
FIG. 48 is a side view, viewed from leftward, showing principal elements of a seat relating to a twenty-second embodiment of the present invention.

FIG. 48 shows a side view, viewed from leftward, of principal elements of a seat 260 relating to a twenty-second embodiment that is structured with the seat structure of the present invention. FIG. 47 shows an exploded perspective view, viewed from diagonally left rearward, of the principal elements of the seat 260.

The seat 260 relating to the present embodiment has a substantially similar structure to the above-described seventeenth embodiment, but differs in the following respects.

The seat 260 relating to the present embodiment is formed as what is known as a tip-up stowing type.

At both the left and the right side region, a front-rear direction intermediate portion of the cushion main frame 206 is turnably joined to a leg 262 at the vehicle side. In the present embodiment, the arm 210 of the above-described seventeenth embodiment is not provided.

The cushion front link 216 structures the cushion flexing component. A front end of a cushion operation link 264, which serves as the cushion connection mechanism, is turnably joined to the cushion front link 216 at the lower side of a position of joining to the cushion main frame 206 (at a position which is offset from this position of joining). A rear end of the cushion operation link 264 is turnably joined to the leg 262 at the lower side of a position of joining of the cushion main frame 206 (at a position which is offset from this position of joining).

The lower end of the cushion front link 216 is locked at a front locking mechanism 266 at the vehicle side, which serves as a locking mechanism. Accordingly, the cushion main frame 206 is supported at the cushion front link 216 and the leg 262, and the seat cushion 30 is supported at the vehicle side, along with which turning of the cushion main frame 206, the cushion front link 216, the cushion sub frame 212 and the cushion operation link 264 is locked, and operation of the cushion link mechanism 204 is restricted.

Next, operation of the present embodiment will be described.

In the seat 260 of the structure described above, in the state in which the cushion main frame 206 is turnably joined to the leg 262, the cushion front link 216 is locked at the front locking mechanism 266 at the vehicle side. Thus, turning of the cushion main frame 206, the cushion front link 216, the cushion sub frame 212 and the cushion operation link 264 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 260, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the cushion front link 216 to the front locking mechanism 266 being released and the seat cushion 30 being turned rearward, the seat cushion 30 is disposed substantially vertically at the front side of the seat back 12, and the seat 260 is stowed (known as tip-up stowing) (similarly to FIG. 17).

When the seat 260 is being stowed (when the seat cushion 30 is being turned rearward), the cushion main frame 206 and the cushion operation link 264 (including the cushion front link 216) are turned substantially 90° rearward. Thus, due to a difference in turning paths of the cushion main frame 206 and the cushion operation link 264, the cushion front link 216 turns relative to the cushion main frame 206 and the cushion operation link 264 and, while the cushion sub frame 212 turns toward the cushion main frame 206 relative to the cushion main frame 206, the separation in the seat cushion 30 thickness direction between the cushion main frame 206 and the cushion sub frame 212 is contracted. Accordingly, even in a case in which a thickness of the seat cushion 30 for times of usual use is made thicker, in accordance with stowing of the seat 260, the thickness of the cushion side portion 30B is contracted in the region at the face side relative to the cushion main frame 206 and can be made equal to the thickness of the cushion main portion 30A, and space (space at the front side and rear side of the seat 260) in the cabin at times of stowage of the seat 260 (a luggage compartment) can be made larger.

Further, for example, similarly to FIG. 5A, a structure can be formed in which the seat 260 is formed as what is known as a tumble-storing type, and after the seat 260 is stowed, support of the seat back 12 and the seat cushion 30 at the vehicle side is released, the seat 260 is turned substantially 180° forward, and thus the seat 260 (the seat back 12 and the seat cushion 30) is stored to the front side in a state of being stood up substantially vertically. In this case, because the thickness of the cushion side portion 30B has been contracted in accordance with stowing of the seat 260 as described above, space (space at the front side and rear side of the seat 260) in the cabin at times of storage of the seat 260 (a luggage compartment) can be made larger.

Further, for example, similarly to FIG. 5B, in a case in which the wheel housing 32 is present to sideward of the seat 260, a structure can be formed in which the seat 260 is formed as what is known as a space-increasing storage type, and after the seat 260 is stowed, support of the seat back 12 and the seat cushion 30 at the vehicle side is released, the seat 260 is turned substantially 90° to sideward, and thus the seat 260 (the seat back 12 and the seat cushion 30) is stored at the upper side of the wheel housing 32 in a state of being stood up substantially vertically. In this case, because the thickness of the cushion side portion 30B has been contracted in accordance with stowing of the seat 260 as described above, space (space to sideward of the seat 260) in the cabin at times of storage of the seat 260 (a luggage compartment) can be made larger.

Moreover, for example, similarly to FIG. 5C, in a case in which the recess portion 34 is present to rearward of the seat 260, a structure can be formed in which the seat 260 is formed as what is known as a rearward under-floor storage type, and after the seat 260 is stowed, support of the seat back 12 and the seat cushion 30 to the vehicle side is released, the seat 260 is turned substantially 90° to rearward or is moved by a turning link or the like, and thus the seat 260 (the seat back 12 and the seat cushion 30) is stored substantially horizontally inside the recess portion 34 in a state in which the seat cushion 30 is disposed at the upper side of the seat back 12. In this case, because the thickness of the cushion side portion 30B has been contracted in accordance with stowing of the seat 260 as described above, space (space at the upper side of the seat 260) in the cabin at times of storage of the seat 260 (a luggage compartment) can be made larger, along with which a depth of the recess portion 34 can be made shallower.

Figure 49:
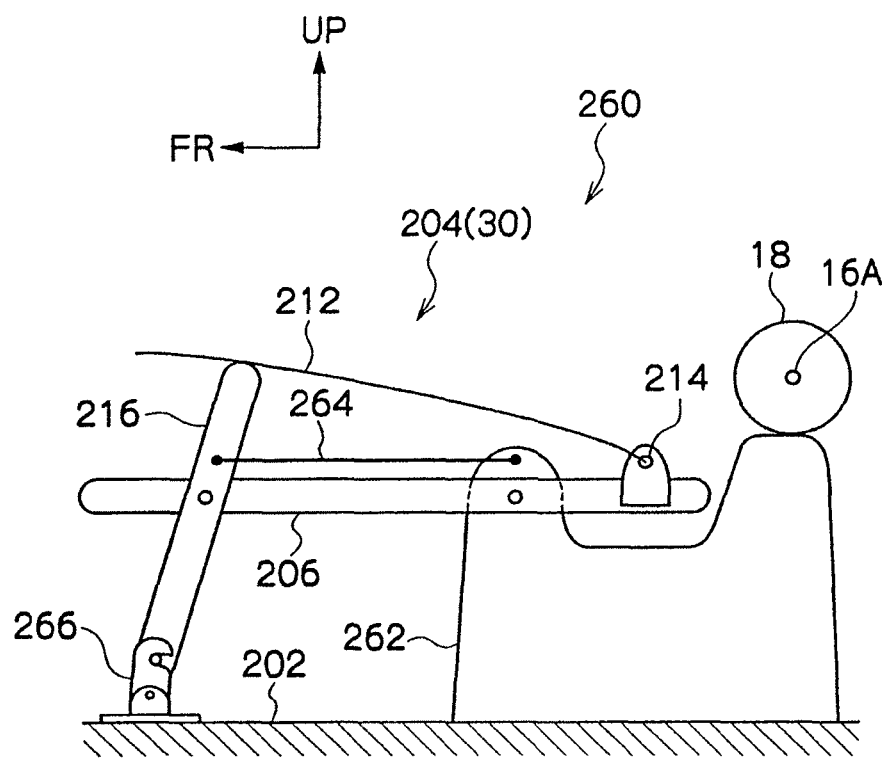
FIG. 49 is a side view, viewed from leftward, showing principal elements of a seat of an alternative example relating to the twenty-second embodiment of the present invention.

Here, in the present embodiment, a structure is formed in which the cushion operation link 264 is turnably joined at the lower side of the position of joining to the cushion main frame 206 of the cushion front link 216 and at the lower side of the position of joining with the cushion main frame 206 of the leg 262. However, as shown in FIG. 49, a structure may be formed in which the cushion operation link 264 is turnably joined at the upper side of the position of joining to the cushion main frame 206 (at a position which is offset from this position of joining) of the cushion front link 216 and at the upper side of the position of joining with the cushion main frame 206 (at a position which is offset from this position of joining) of the leg 262.

Further yet, in the present embodiment, a structure is formed in which the lower end of the cushion front link 216 is locked at the front locking mechanism 266. However, a structure may be formed in which turning of the cushion main frame 206 relative to the leg 262 is made lockable. In this case, a necessity of locking the cushion front link 216 at the front locking mechanism 266 can be eliminated.

Twenty-third Embodiment

Figure 50:
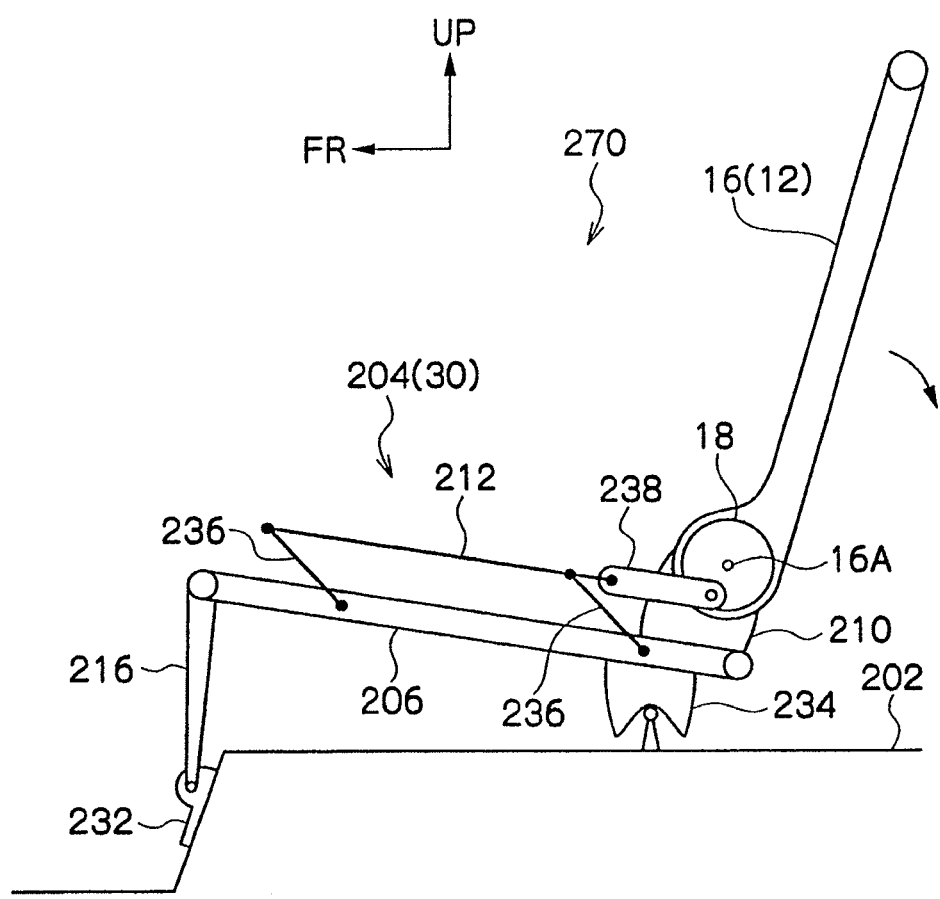
FIG. 50 is a side view, viewed from leftward, showing principal elements of a seat relating to a twenty-third embodiment of the present invention.

FIG. 50 shows a side view, viewed from leftward, of principal elements of a seat 270 relating to a twenty-third embodiment that is structured with the seat structure of the present invention.

The seat 270 relating to the present embodiment has a substantially similar structure to the above-described nineteenth embodiment, but differs in the following respects.

The seat 270 relating to the present embodiment is formed as what is known as a back rearward-folding stowing type.

The rear end of the cushion joint link 238 is turnably joined to the back main frame 16 at the lower side of the tilting center 16A (a position which is offset from the tilting center 16A). Accordingly, turning of the cushion joint links 236, the cushion sub frame 212, and the cushion joint link 238 is locked, and operation of the cushion link mechanism 204 is restricted.

Here, with the present embodiment too, effects the same as in the above-described nineteenth embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 270 is stowed (known as rearward-folding stowing).

When the seat 270 is being stowed, the back main frame 16 (the seat back 12) is tilted rearward around the tilting center 16A, and the cushion joint link 238 is moved forward. Thus, by movement of the cushion sub frame 212 which is to say the cushion joint links 236 to forward, the cushion joint links 236 are turned forward, and the separation in the seat cushion 30 thickness direction between the cushion sub frame 212 and the cushion main frame 206 is contracted. Accordingly, even in a case in which the thickness of the cushion side portion 30B for times of usual use is made thicker, in accordance with stowing of the seat 270, the thickness of the cushion side portion 30B is contracted in the region at the face side relative to the cushion main frame 206 and can be made equal to the thickness of the cushion main portion 30A, and space (space at the upper side of the seat cushion 30) in the cabin at times of stowage of the seat 270 (a luggage compartment) can be made larger.

Further, for example, similarly to FIG. 15, in a case in which the wheel housing 32 is present to sideward of the seat 270, a structure can be formed in which the seat 270 is formed as what is known as a space-increasing storage type, and after the seat 270 is stowed, support of the seat back 12 and the seat cushion 30 to the vehicle side is released, the seat 270 is turned substantially 90° to sideward, and thus the seat 270 (the seat back 12 and the seat cushion 30) is stored at the upper side of the wheel housing 32 in a state of being stood up substantially vertically. In this case, because the thickness of the cushion side portion 30B has been contracted in accordance with stowing of the seat 270 as described above, space (space to sideward of the seat cushion 30) in the cabin at times of storage of the seat 270 (a luggage compartment) can be made larger.

Figure 51:
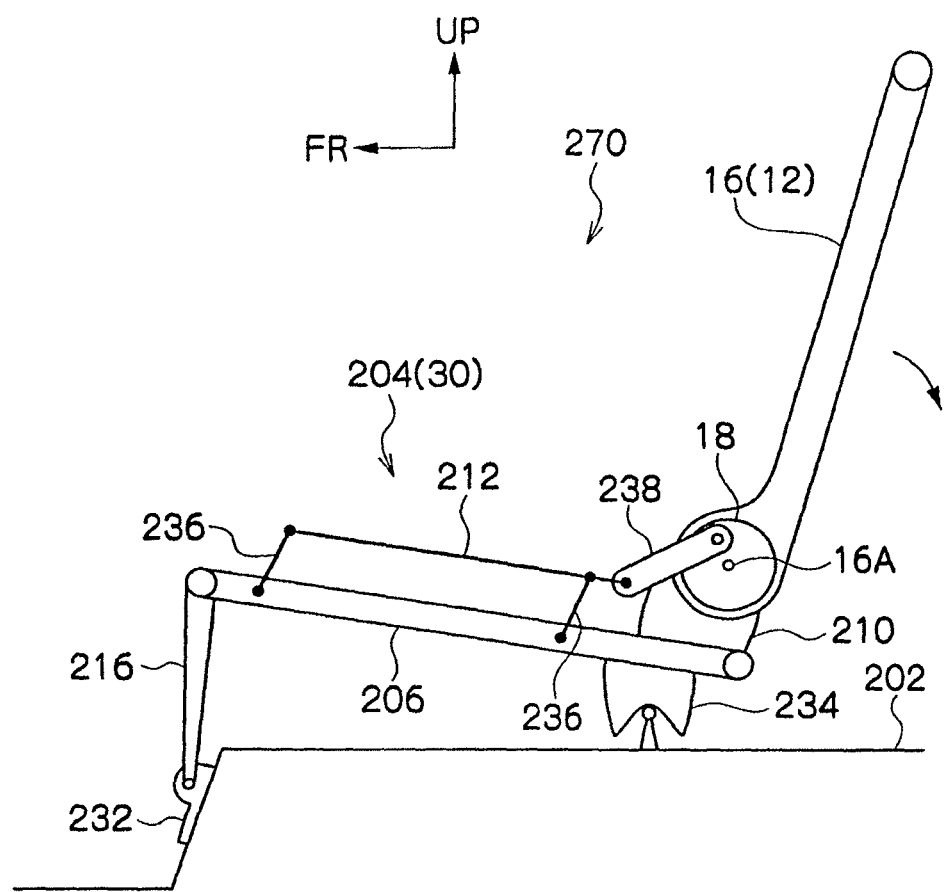
FIG. 51 is a side view, viewed from leftward, showing principal elements of a seat of an alternative example relating to the twenty-third embodiment of the present invention.

Here, in the present embodiment, a structure is formed in which the rear end of the cushion joint link 238 is turnably joined to the back main frame 16 at the lower side of the tilting center 16A. However, as shown in FIG. 51, a structure may be formed in which the rear end of the cushion joint link 238 is turnably joined to the back main frame 16 at the upper side of the tilting center 16A (a position which is offset from the tilting center 16A). In this case, when the seat 270 is being stowed, the back main frame 16 (the seat back 12) is tilted rearward around the tilting center 16A, and the cushion joint link 238 is moved rearward. Thus, by movement to rearward of the cushion sub frame 212 which is to say the cushion joint links 236, the cushion joint links 236 are turned rearward, and the separation in the seat cushion 30 thickness direction between the cushion sub frame 212 and the cushion main frame 206 is contracted.

Twenty-fourth Embodiment

Figure 52:
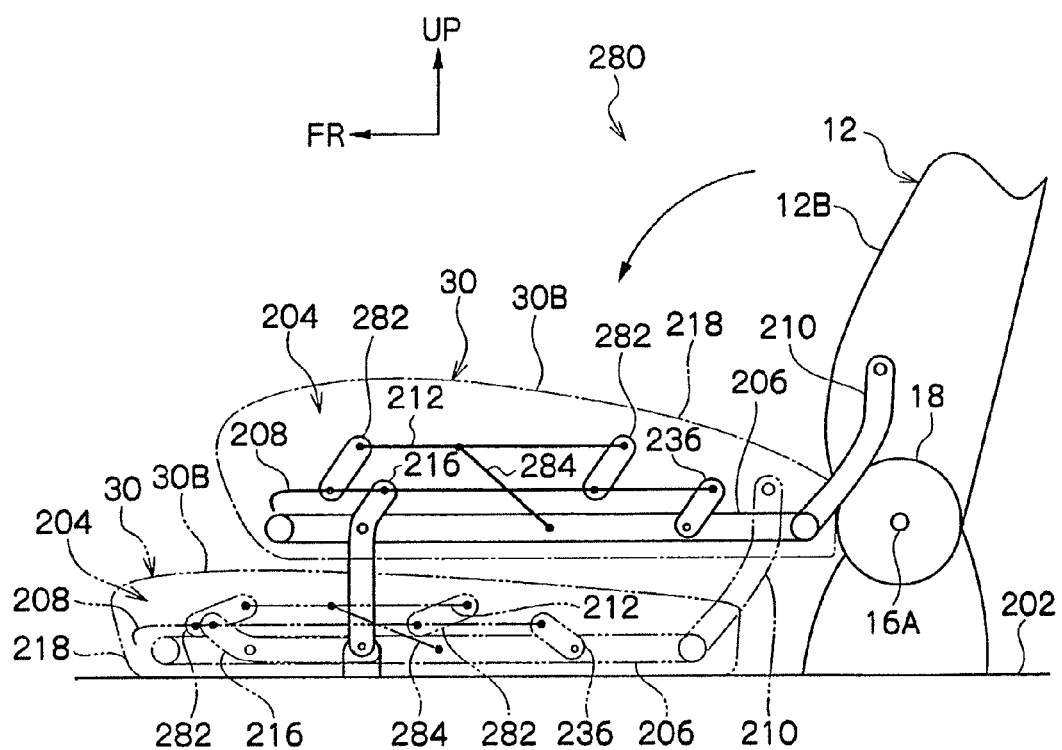
FIG. 52 is a side view, viewed from leftward, showing principal elements of a seat relating to a twenty-fourth embodiment of the present invention.
Figure 53:
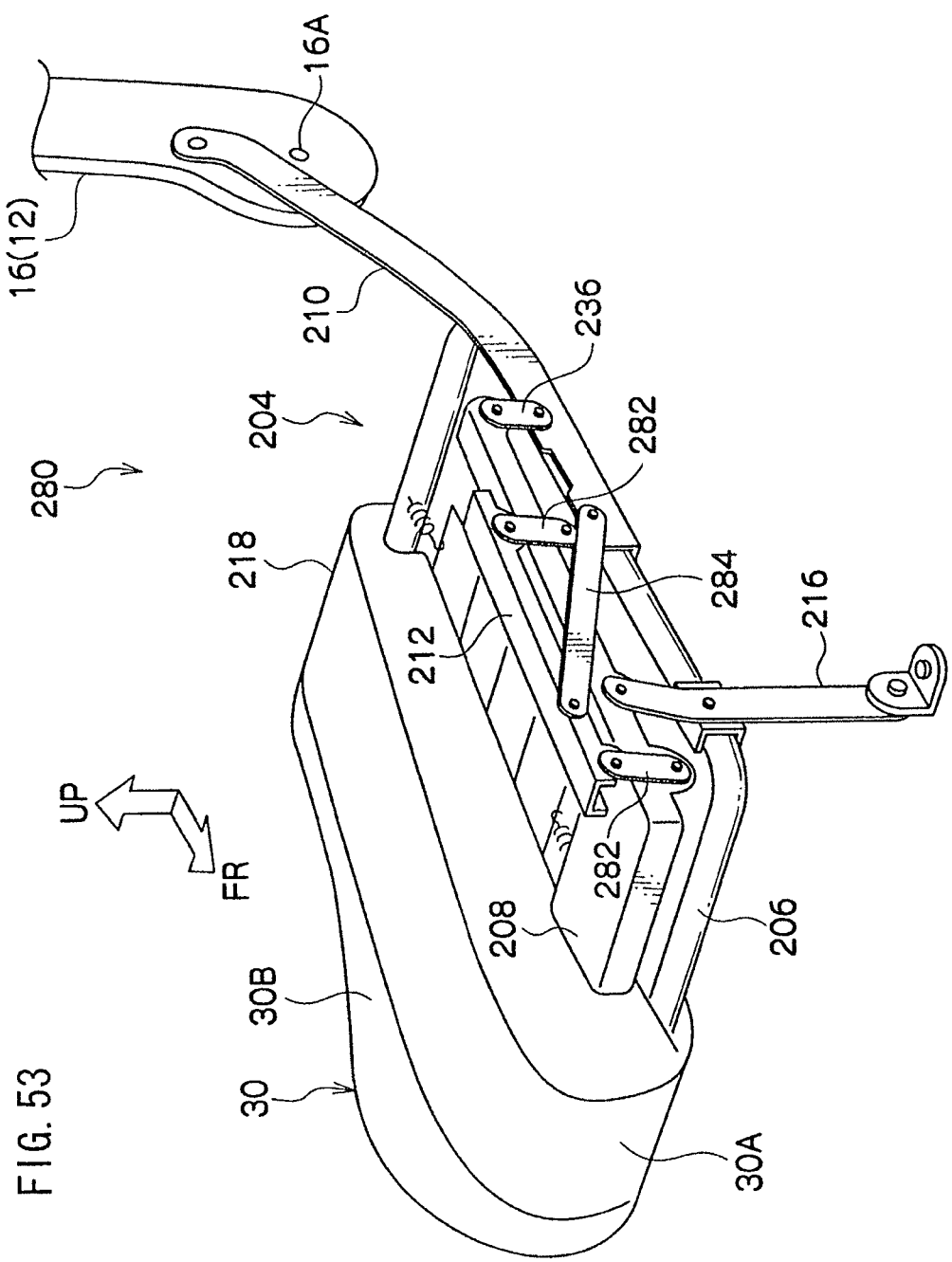
FIG. 53 is a perspective view, viewed from diagonally left forward, showing the principal elements of the seat relating to the twenty-fourth embodiment of the present invention.
Figure 55A:
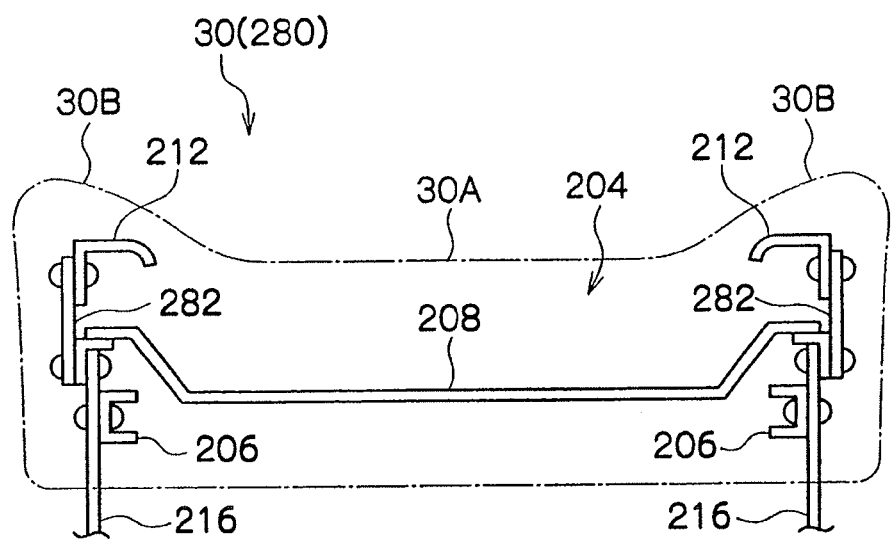
FIG. 55A is a sectional view, viewed from the front end side, showing the principal elements of the seat relating to the twenty-fourth embodiment of the present invention.

FIG. 52 shows a side view, viewed from leftward, of principal elements of a seat 280 relating to a twenty-fourth embodiment that is structured with the seat structure of the present invention. FIG. 53 shows a perspective view, viewed from diagonally left forward, of the principal elements of the seat 280. FIG. 55A shows a sectional view, viewed from the front end side, of the principal elements of the seat 280.

The seat 280 relating to the present embodiment has a substantially similar structure to the above-described seventeenth embodiment, but differs in the following respects.

In the seat 280 relating to the present embodiment, lower ends of the cushion joint links 236, which serve as the cushion joining component of the cushion flexing component, are turnably joined to both a left and a right side region of the rear portion of the cushion main frame 206. Here, in the present embodiment, the cushion joint shaft 214 of the seventeenth embodiment is not provided.

The cushion support portion 208 functions as the cushion face side frame of the cushion flexing component, and is disposed at the upper side of the cushion main frame 206. Both a left and a right side region of the cushion support portion 208 is turnably joined, at a front portion, to the upper side of the cushion front link 216, along with which it is turnably joined, at a rear portion, to the upper end of the cushion joint link 236. A predetermined number (two in the present embodiment) of fifth links 282, which structure the cushion flexing component, are turnably joined, at lower ends, to both the left and the right side region of the cushion support portion 208.

The cushion sub frame 212 functions as a cushion face frame of the cushion flexing component, and is disposed at the upper side of the cushion support portion 208. The predetermined number of the fifth links 282 are turnably joined, at upper ends, to the cushion sub frame 212. Otherwise, a front end of a sixth link 284, which structures the back flexing component, is turnably joined to the cushion sub frame 212 or a position other than a lower end (turning center) of the fifth links 282. A rear end of the sixth link 284 is turnably joined to the back main frame 16. Accordingly, turning of the cushion joint link 236, the cushion support portion 208, the fifth links 282, the cushion sub frame 212 and the sixth link 284 is locked, and operation of the cushion link mechanism 204 is restricted.

Next, operation of the present embodiment will be described.

In the seat 280 of the structure described above, in a state in which tilting of the back main frame 16 around the tilting center 16A is locked by the reclining mechanism 18, the lower end of the cushion front link 216 is turnably joined to the vehicle side. Thus, turning of the cushion main frame 206, the arm 210, the cushion front link 216, the cushion joint links 236, the cushion support portion 208, the fifth links 282, the cushion sub frame 212 and the sixth link 284 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 280, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Figure 54:
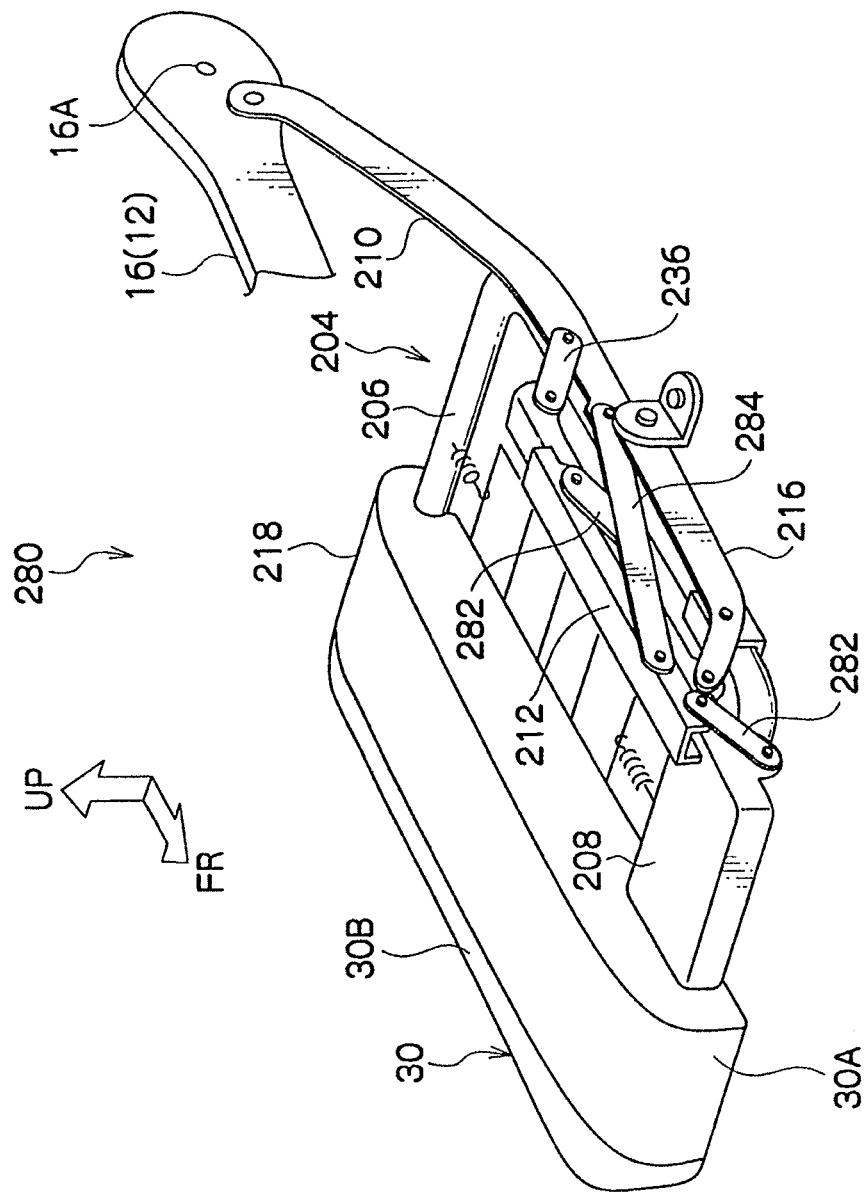
FIG. 54 is a perspective view, viewed from diagonally left forward, showing a stowed state of the principal elements of the seat relating to the twenty-fourth embodiment of the present invention.

By the reclining mechanism 18 being controlled and the seat back 12 being tilted forward around the tilting center 16A, the seat back 12 is folded onto the upper side of the seat cushion 30, and the seat 280 is stowed (known as fold-forward stowing) (see FIG. 54).

Figure 55B:
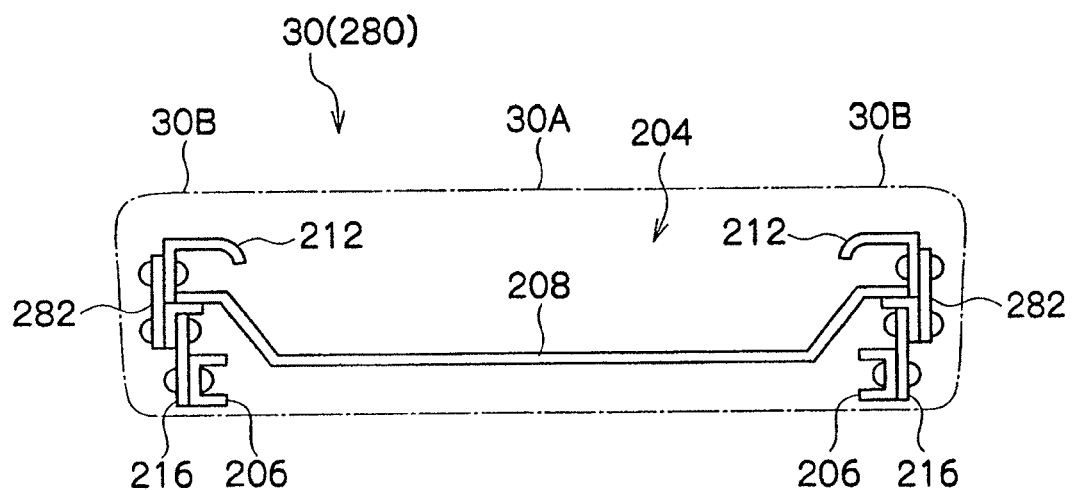
FIG. 55B is a sectional view, viewed from the front end side, showing the stowed state of the principal elements of the seat relating to the twenty-fourth embodiment of the present invention.

When the seat 280 is being stowed, the back main frame 16 (the seat back 12) is tilted forward around the tilting center 16A, and the cushion main frame 206 (the seat cushion 30) is moved forward, via the arm 210. Thus, the cushion front link 216 is turned forward, and the seat cushion 30 is moved forward and downward Furthermore, when the seat 280 is being stowed, the cushion front link 216 is turned forward, and the cushion joint link 236 is turned forward. Thus, a separation in the seat cushion 30 thickness direction between the cushion main frame 206 and the cushion support portion 208 is contracted. Along with this, by movement to forward of the cushion support portion 208, the fifth links 282 are turned forward, and a separation in the seat cushion 30 thickness direction between the cushion support portion 208 and the cushion sub frame 212 is contracted (see FIG. 55B). Therefore, even in a case in which thicknesses of the cushion side portion 30B and the cushion main portion 30A for times of usual use are made thicker, in accordance with stowing of the seat 280, the thicknesses of the cushion side portion 30B and the cushion main portion 30A are contracted in the region at the face side relative to the cushion main frame 206 and can be made equal, and space (space at the upper side of the seat 280) in the cabin at times of stowage of the seat 280 (a luggage compartment) can be made larger.

Therefore, with the present embodiment too, effects the same as in the above-described seventeenth embodiment can be produced.

Figure 56:
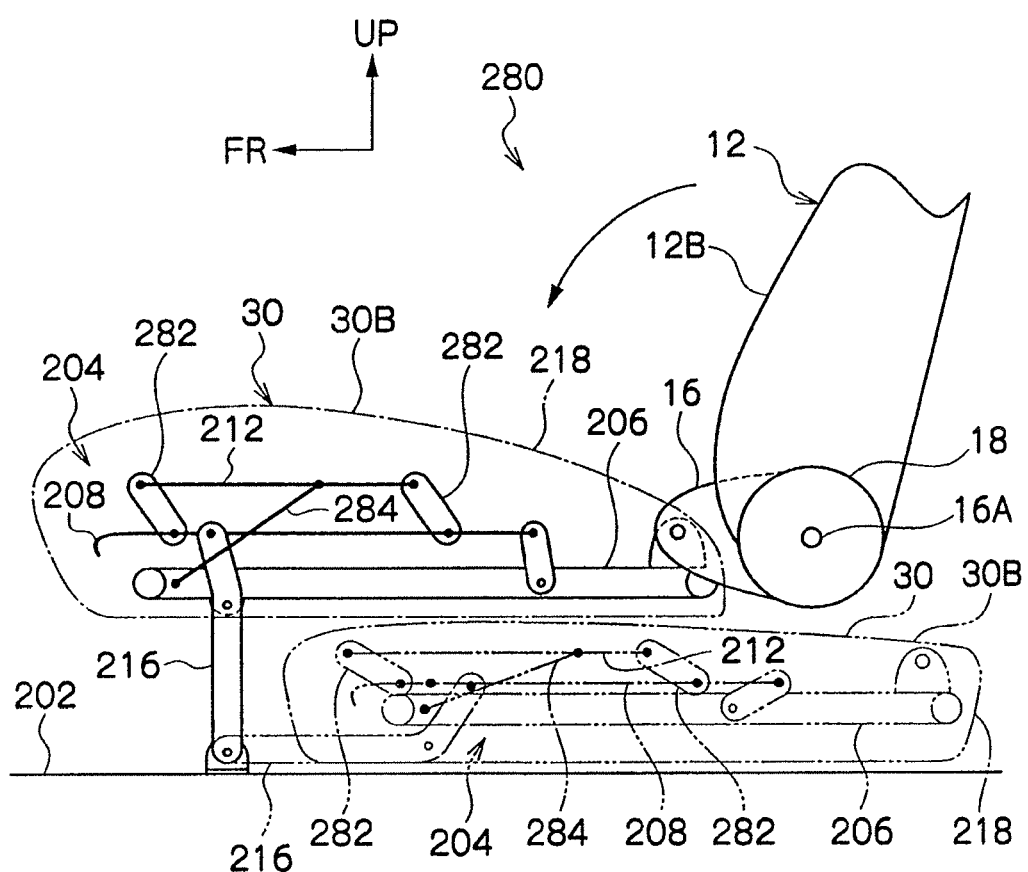
FIG. 56 is a side view, viewed from leftward, showing principal elements of a seat of an alternative example relating to the twenty-fourth embodiment of the present invention.
Figure 57:
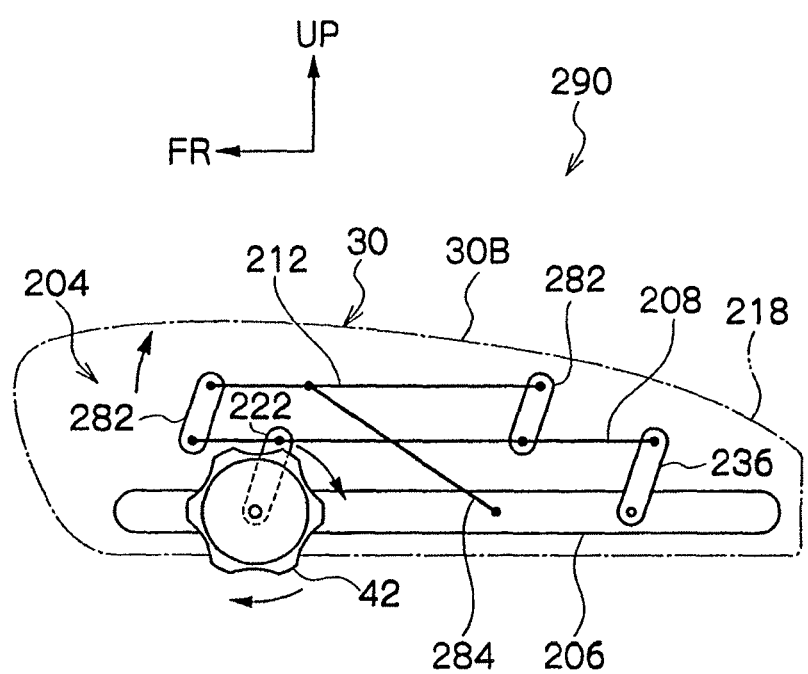
FIG. 57 is a side view, viewed from leftward, showing principal elements of a seat relating to a twenty-fifth embodiment of the present invention.

Here, in the present embodiment, a structure is formed in which both the left and the right side region of the rear portion of the cushion main frame 206 is turnably joined, via the arm 210, to the back main frame 16 at the upper side of the tilting center 16A. However, as shown in FIG. 56, a structure may be formed in which both the left and the right side region of the rear portion of the cushion main frame 206 is turnably joined to the back main frame 16 at the upper side of the tilting center 16A (a position which is offset from the tilting center 16A). In this case, the front end of the sixth link 284 is turnably joined to the cushion main frame 206, along with which the rear end of the sixth link 284 is turnably joined to the cushion sub frame 212 or a position other than the lower ends (turning centers) of the fifth links 282. Further, when the seat 280 is being stowed, the back main frame 16 (the seat back 12) is tilted forward around the tilting center 16A, and the cushion main frame 206 (the seat cushion 30) is moved rearward. Thus, the cushion front link 216 is turned rearward, and the seat cushion 30 is moved rearward and downward. Furthermore, when the seat 280 is being stowed, the cushion front link 216 is turned rearward and the cushion joint links 236 are turned rearward. Thus, a separation in the seat cushion 30 thickness direction between the cushion main frame 206 and the cushion support portion 208 is contracted, along with which, by movement to rearward of the cushion support portion 208, the fifth links 282 are turned rearward and a separation in the seat cushion 30 thickness direction between the cushion support portion 208 and the cushion sub frame 212 is contracted Twenty-fifth Embodiment FIG. 57 shows a side view, viewed from leftward, of principal elements of a seat 290 relating to a twenty-fifth embodiment that is structured with the seat structure of the present invention.

The seat 290 relating to the present embodiment has a substantially similar structure to the above-described twenty-fourth embodiment, but differs in the following respects.

In the seat 290 relating to the present embodiment, the cushion front link 216 is turnably joined, at an upper portion, to a front portion of the cushion main frame 206, and the cushion front link 216 is joined to the cushion support portion 208.

At both the left and the right side region of the front portion of the cushion main frame 206, the lower end of the regulation link 222 is turnably joined. The regulation link 222 is turnably joined, at an upper portion, to a front portion of the cushion support portion 208.

The circular rod-shaped control lever 42, which serves as the control mechanism, is engaged at the lower end (turning center) of the regulation link 222. The control lever 42 is formed as a dial-type regulator or the like. A turn-locking mechanism (not shown) which serves as the locking mechanism is provided at the control lever 42. Turning of the control lever 42 is obstructed by the turn-locking mechanism, and thus turning of the regulation link 222, the cushion joint links 236, the cushion support portion 208, the fifth links 282, the cushion sub frame 212 and the sixth link 284 is locked, and operation of the cushion link mechanism 204 is restricted. The control lever 42 protrudes to sideward of the seat cushion 30, and by the control lever 42 being turningly controlled, the regulation link 222 is made turnable.

Next, operation of the present embodiment will be described.

In the seat 290 of the structure described above, in the state in which tilting of the back main frame 16 around the tilting center 16A is locked by the reclining mechanism 18, the lower end of the cushion front link 216 is turnably joined to the vehicle side, in addition to which turning of the control lever 42 is obstructed by the turn-locking mechanism. Thus, turning of the cushion main frame 206, the arm 210, the cushion front link 216, the regulation link 222, the cushion joint links 236, the cushion support portion 208, the fifth links 282, the cushion sub frame 212 and the sixth link 284 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 290, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

In a state in which turning obstruction by the turn locking-mechanism of the control lever 42 is released, by the control lever 42 being turningly controlled, the regulation link 222 and the cushion joint links 236 are turned. Thus, a separation in the seat cushion 30 thickness direction between the cushion main frame 206 and the cushion support portion 208 is flexed. Along with this, by movement to forward or rearward of the cushion support portion 208, the fifth links 282 are turned, and a separation in the seat cushion 30 thickness direction between the cushion support portion 208 and the cushion sub frame 212 is flexed. Accordingly, independently of stowing of the seat 290, the thicknesses of the cushion side portion 30B and the cushion main portion 30A are flexed in the region at the face side relative to the cushion main frame 206, and can be adjusted.

Twenty-sixth Embodiment

Figure 58A:
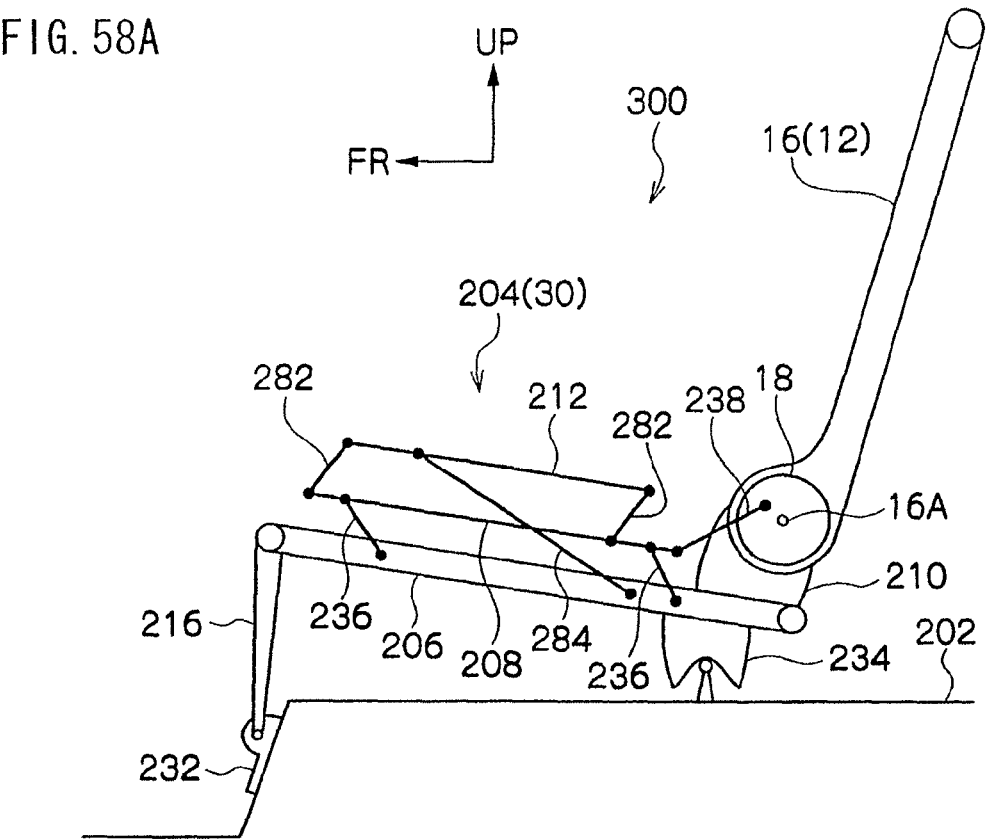
FIG. 58A is a side view, viewed from leftward, showing principal elements of a seat relating to a twenty-sixth embodiment of the present invention.

FIG. 58A shows a side view, viewed from leftward, of principal elements of a seat 300 relating to a twenty-sixth embodiment that is structured with the seat structure of the present invention.

The seat 300 relating to the present embodiment has a substantially similar structure to the above-described twenty-fourth embodiment, but differs in the following respects.

In the present embodiment, the cabin floor surface 202 at the front side of the seat 300 is made lower than the cabin floor surface 202 directly below the seat 300.

The seat 300 relating to the present embodiment is formed as what is known as a back forward-folding stowing type.

The lower end of the cushion front link 216 is turnably joined to the front bracket 232. The cushion front link 216 is turnably joined, at the upper end, to the front portion of the cushion main frame 206. The cushion front link 216 does not function as the cushion connection mechanism, and is not joined to the cushion support portion 208.

At the lower side of the rear portion of the cushion main frame 206, at both the left and the right side region, the rear locking mechanism 234 which serves as the locking mechanism is engaged. The rear locking mechanism 234 is locked to the vehicle side. Thus, the cushion main frame 206 is supported at the rear locking mechanism 234 and the cushion front link 216, and the seat cushion 30 is supported at the vehicle side.

The lower end of the back main frame 16 is turnably supported at the arm 210 to be tiltable around the tilting center 16A. Accordingly, the back main frame 16 is supported at the vehicle side via the arm 210, the cushion main frame 206, the rear locking mechanism 234 and the cushion front link 216, and the seat back 12 is joined to the vehicle side.

The predetermined number (two in the present embodiment) of the cushion joint links 236 are turnably joined, at the lower ends, to both the left and the right side region of the cushion main frame 206. The predetermined number of the cushion joint links 236 are turnably joined, at the upper ends, to both the left and the right side region of the cushion support portion 208.

The front end of the cushion joint link 238, which serves as the cushion connection mechanism, is turnably joined to the rear end of the cushion support portion 208 or the cushion joint link 236 at the rear portion of the cushion main frame 206 (anywhere other than the lower end is acceptable). The rear end of the cushion joint link 238 is turnably joined to the back main frame 16 at the upper side of the tilting center 16A (a position which is offset from the tilting center 16A). Accordingly, turning of the cushion joint links 236, the cushion support portion 208, the fifth links 282, the cushion sub frame 212, the sixth link 284 and the cushion joint link 238 is locked, and operation of the cushion link mechanism 204 is restricted.

Operation of the present embodiment will be described.

In the seat 300 of the structure described above, in a state in which the cushion main frame 206 is supported at the rear locking mechanism 234 and the cushion front link 216 and locked, tilting of the back main frame 16 around the tilting center 16A is locked by the reclining mechanism 18. Thus, turning of the cushion main frame 206, the arm 210, the cushion joint links 236, the cushion support portion 208, the fifth links 282, the cushion sub frame 212, the sixth link 284 and the cushion joint link 238 is locked, and operation of the cushion link mechanism 204 is locked. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 300, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Figure 58B:
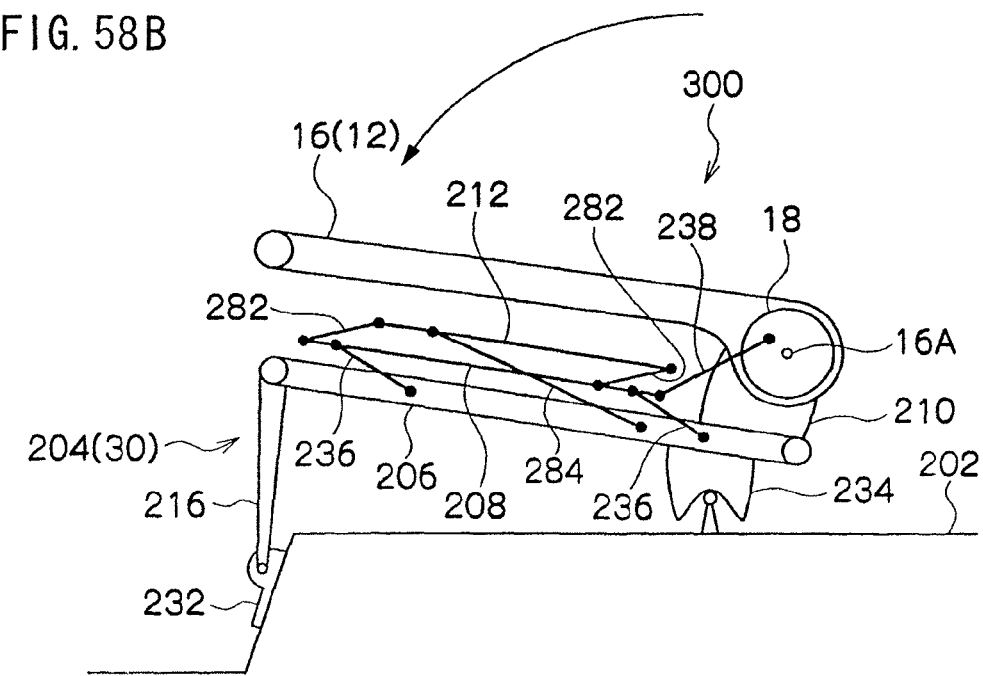
FIG. 58B is a side view, viewed from leftward, showing a stowed state of the principal elements of the seat relating to the twenty-sixth embodiment of the present invention.

By the reclining mechanism 18 being controlled and the seat back 12 being tilted forward around the tilting center 16A, the seat back 12 is folded onto the upper side of the seat cushion 30, and the seat 300 is stowed (known as fold-forward stowing) (see FIG. 58B).

When the seat 300 is being stowed, the back main frame 16 (the seat back 12) is tilted forward around the tilting center 16A, and the cushion joint link 238 is moved forward. Thus, by movement of the cushion support portion 208 which is to say the cushion joint links 236 forward, the cushion joint links 236 are turned forward and the separation in the seat cushion 30 thickness direction between the cushion main frame 206 and the cushion support portion 208 is contracted, along with which, by movement of the cushion support portion 208 forward, the fifth links 282 are turned forward and the separation in the seat cushion 30 thickness direction between the cushion support portion 208 and the cushion sub frame 212 is contracted. Therefore, even in a case in which thicknesses of the cushion side portion 30B and the cushion main portion 30A for times of usual use are made thicker, in accordance with stowing of the seat 300, the thicknesses of the cushion side portion 30B and the cushion main portion 30A are contracted in the region at the face side relative to the cushion main frame 206 and can be made equal, and space (space at the upper side of the seat 300) in the cabin at times of stowage of the seat 300 (a luggage compartment) can be made larger.

Therefore, with the present embodiment too, effects the same as in the above-described twenty-fourth embodiment can be produced.

Figure 59:
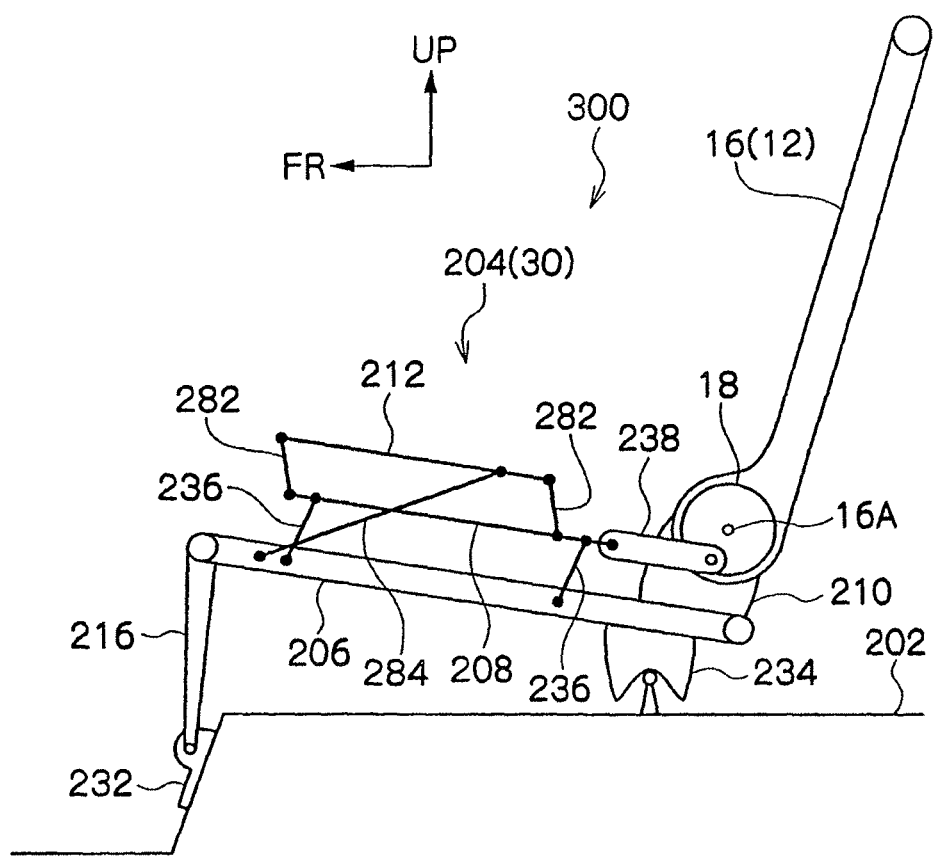
FIG. 59 is a side view, viewed from leftward, showing principal elements of a seat of an alternative example relating to the twenty-sixth embodiment of the present invention.

Here, in the present embodiment, a structure is formed in which the rear end of the cushion joint link 238 is turnably joined to the back main frame 16 at the upper side of the tilting center 16A. However, as shown in FIG. 59, a structure may be formed in which the rear end of the cushion joint link 238 is turnably joined to the back main frame 16 at the lower side of the tilting center 16A (a position which is offset from the tilting center 16A). In this case, the front end of the sixth link 284 is turnably joined to the cushion main frame 206, along with which the rear end of the sixth link 284 is turnably joined to the cushion sub frame 212 or a position other than a lower end (turning center) of the fifth links 282. When the seat 300 is being stowed, the back main frame 16 (the seat back 12) is tilted forward around the tilting center 16A, and the cushion joint link 238 is moved rearward. Thus, by movement of the cushion support portion 208 which is to say the cushion joint links 236 rearward, the cushion joint links 236 are turned toward the rear side, and the separation in the seat cushion 30 thickness direction between the cushion main frame 206 and the cushion support portion 208 is contracted. Along with this, by movement of the cushion support portion 208 rearward, the fifth links 282 are turned rearward, and the separation in the seat cushion 30 thickness direction between the cushion support portion 208 and the cushion sub frame 212 is contracted.

Twenty-seventh Embodiment

Figure 60:
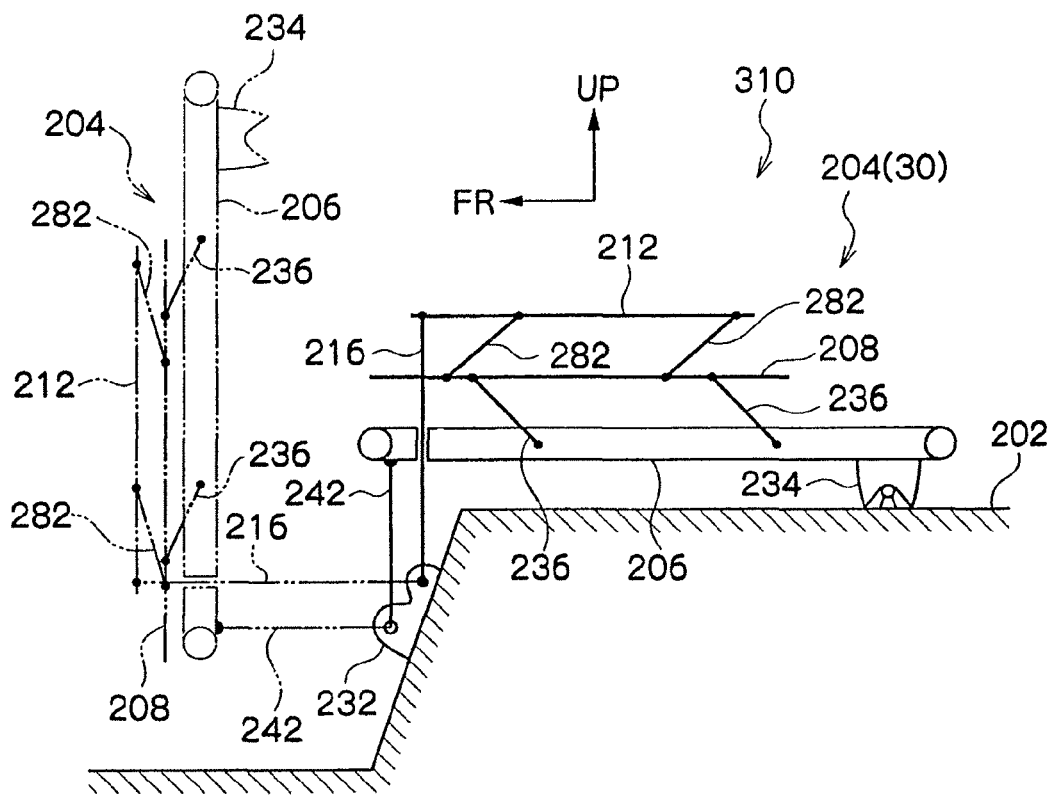
FIG. 60 is a side view, viewed from leftward, showing principal elements of a seat relating to a twenty-seventh embodiment of the present invention.

FIG. 60 shows a side view, viewed from leftward, of principal elements of a seat 310 relating to a twenty-seventh embodiment that is structured with the seat structure of the present invention.

The seat 310 relating to the present embodiment has a substantially similar structure to the above-described twenty-fourth embodiment, but differs in the following respects.

In the present embodiment, the cabin floor surface 202 at the front side of the seat 310 is made lower than the cabin floor surface 202 directly below the seat 310.

The seat 310 relating to the present embodiment is formed as what is known as a double-folded stowing type.

At both the left and the right side region, the upper end of the fourth link 242 is non-turnably joined to the lower side of the front portion of the cushion main frame 206. The lower end of the fourth link 242 is turnably joined to the front bracket 232 at the vehicle side. In the present embodiment, the arm 210 of the above-described twenty-fourth embodiment is not provided.

At both the left and the right side region, the rear locking mechanism 234 which serves as a locking mechanism is engaged with the lower side of the rear portion of the cushion main frame 206, and the rear locking mechanism 234 is locked to the vehicle side. Thus, the cushion main frame 206 is supported at the rear locking mechanism 234 and the cushion front link 216, and the seat cushion 30 is supported at the vehicle side.

The predetermined number (two in the present embodiment) of the cushion joint links 236 are turnably joined, at the lower ends, to the cushion main frame 206 at both the left and the right side region. The predetermined number of the cushion joint links 236 are turnably joined, at the upper ends, to the cushion support portion 208 at both the left and the right side region.

The lower end of the cushion front link 216 is turnably joined to the front bracket 232 at the vehicle side, at the rear side of a position of joining to the front bracket 232 (a turning center) of the fourth link 242 (at a position which is offset from this joining position). The cushion front link 216 is joined in a condition of being movable, in the length direction, at the cushion main frame 206. The cushion front link 216, at the upper end, is non-turnably joined to the cushion sub frame 212. Accordingly, turning of the cushion front link 216, the cushion joint links 236, the cushion support portion 208, the fifth links 282 and the cushion sub frame 212 is locked, and operation of the cushion link mechanism 204 is restricted. In the present embodiment, the sixth link 284 of the twenty-fourth embodiment is not provided.

Next, operation of the present embodiment will be described.

In the seat 310 of the structure described above, in the state in which the cushion main frame 206 is supported at the rear locking mechanism 234 and the fourth link 242 and locked, the lower end of the cushion front link 216 is turnably joined to the vehicle side. Thus, turning of the fourth link 242, the cushion main frame 206, the cushion front link 216, the cushion joint links 236, the cushion support portion 208, the fifth links 282 and the cushion sub frame 212 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 310, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 90° forward, the seat cushion 30 is stood up substantially vertically. Then, the reclining mechanism 18 is controlled, the seat back 12 is tilted forward around the tilting center 16A, and thus the seat back 12 is disposed substantially horizontally at the rear side of the seat cushion 30, and the seat 310 is stowed (known as double-folded stowing) (similarly to FIG. 10).

When the seat 310 is being stowed (when the seat cushion 30 is being turned forward), the fourth link 242 and the cushion front link 216 are turned substantially 90° forward. Thus, a separation in the seat cushion 30 thickness direction between the position of joining to the cushion main frame 206 of the fourth link 242 and the position of joining to the cushion sub frame 212 of the cushion front link 216 is contracted due to a difference in turning paths of the fourth link 242 and the cushion front link 216 and, while the cushion joint links 236 and the cushion joint link 238 are turned, the separation in the seat cushion 30 thickness direction between the cushion main frame 206 and the cushion support portion 208 is contracted. Therefore, even in a case in which thicknesses of the cushion side portion 30B and the cushion main portion 30A for times of usual use are made thicker, in accordance with stowing of the seat 310, the thicknesses of the cushion side portion 30B and the cushion main portion 30A are contracted in the region at the face side relative to the cushion main frame 206 and can be made equal, and space (space at the front side and rear side of the seat cushion 30) in the cabin at times of stowage of the seat 310 (a luggage compartment) can be made larger, along with which a possible angle of tilting (reclining), to rearward, of a seat (not shown) at the front side of the seat 310 can be made larger.

Twenty-eighth Embodiment

Figure 61:
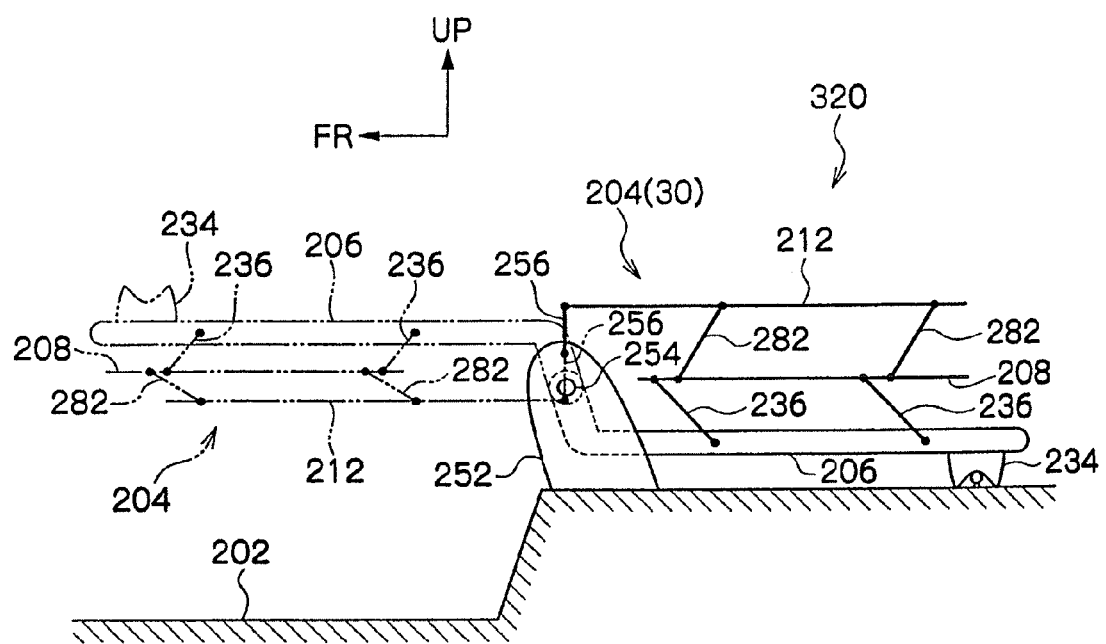
FIG. 61 is a side view, viewed from leftward, showing principal elements of a seat relating to a twenty-eighth embodiment of the present invention.
Figure 62:
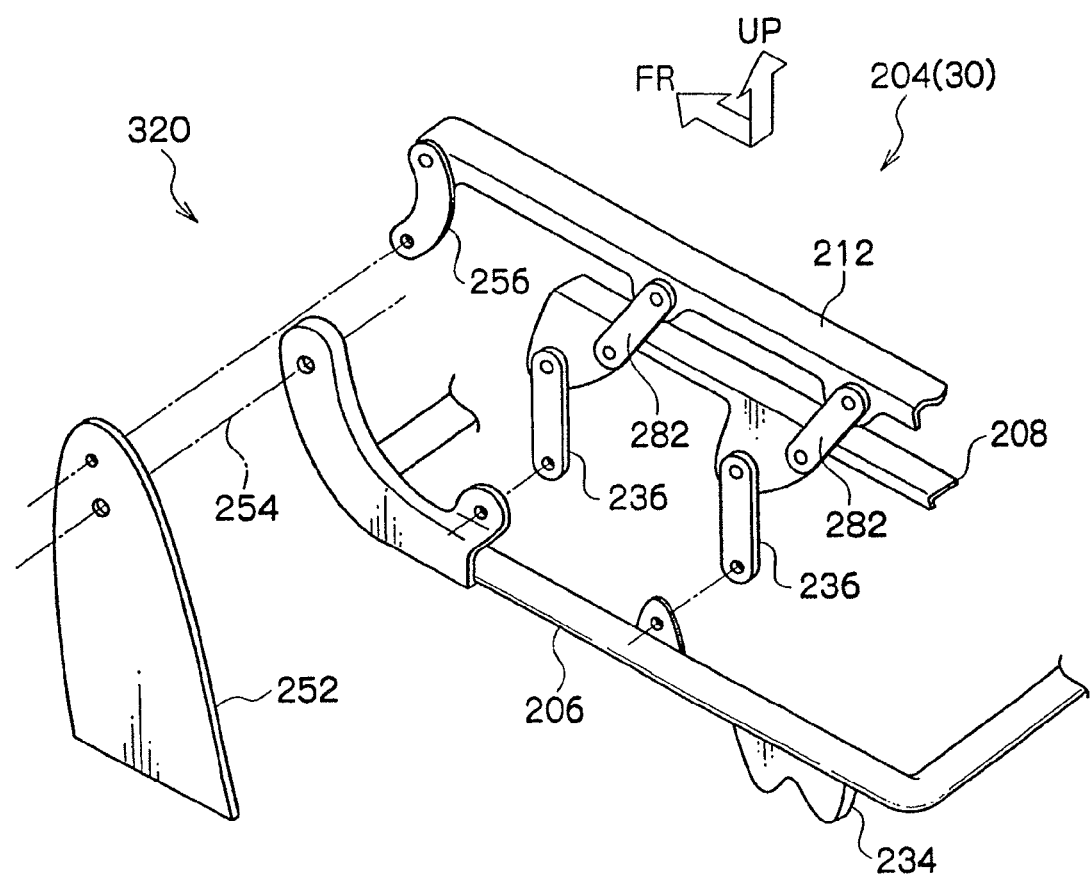
FIG. 62 is an exploded perspective view, viewed from diagonally left rearward, showing the principal elements of the seat relating to the twenty-eighth embodiment of the present invention.

FIG. 61 shows a side view, viewed from leftward, of principal elements of a seat 320 relating to a twenty-eighth embodiment that is structured with the seat structure of the present invention. FIG. 62 shows an exploded perspective view, viewed from diagonally left rearward, of the principal elements of the seat 320.

The seat 320 relating to the present embodiment has a substantially similar structure to the above-described twenty-fourth embodiment, but differs in the following respects.

The seat 320 relating to the present embodiment is formed as what is known as a double-flat stowing type.

At both the left and the right side region, the front portion of the cushion main frame 206 is turnably joined to the fixed bracket 252 at the vehicle side by the first joint shaft 254.

At both the left and the right side region, the rear locking mechanism 234 which serves as the locking mechanism is engaged with the lower side of the rear portion of the cushion main frame 206, and the rear locking mechanism 234 is locked to the vehicle side. Thus, the cushion main frame 206 is supported at the rear locking mechanism 234 and the fixed bracket 252, and the seat cushion 30 is supported at the vehicle side.

In the present embodiment, the arm 210 and the cushion front link 216 of the above-described twenty-fourth embodiment are not provided.

The predetermined number (two in the present embodiment) of the cushion joint links 236 are turnably joined, at the lower ends, to the cushion main frame 206 at both the left and the right side region. The predetermined number of the cushion joint links 236 are turnably joined, at the upper ends, to the cushion support portion 208 at both the left and the right side region.

The upper end of the cushion joint link 256 which serves as the cushion connection mechanism is non-turnably joined to the front portion of the cushion sub frame 212. The lower end of the cushion joint link 256 is turnably joined to the fixed bracket 252 at the upper side of the first joint shaft 254 (a turning center) (at a position which is offset from the first joint shaft 254). Accordingly, turning of the cushion joint link 256, the cushion joint links 236, the cushion support portion 208, the fifth links 282 and the cushion sub frame 212 is locked, and operation of the cushion link mechanism 204 is restricted. In the present embodiment, the sixth link 284 of the above-described twenty-fourth embodiment is not provided.

Next, operation of the present embodiment will be described.

In the seat 320 of the structure described above, in the state in which the cushion main frame 206 is supported at the rear locking mechanism 234 and the fixed bracket 252 and locked, the lower end of the cushion joint link 256 is turnably joined to the fixed bracket 252. Thus, turning of the cushion main frame 206, the cushion joint link 256, the cushion joint links 236, the cushion support portion 208, the fifth links 282 and the cushion sub frame 212 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 320, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 180° forward, the seat cushion 30 is inverted to be substantially horizontal. Then, the reclining mechanism 18 is controlled, the seat back 12 is tilted forward around the tilting center 16A, and thus the seat back 12 is disposed substantially horizontally at the rear side of the seat cushion 30, and the seat 320 is stowed (known as double-flat stowing) (similarly to FIG. 11).

When the seat 320 is being stowed (when the seat cushion 30 is being turned forward), the cushion main frame 206 and the cushion sub frame 212 (including the cushion joint link 256) are turned substantially 180° forward. Thus, a separation in the seat cushion 30 thickness direction between the first joint shaft 254 and the position of joining to the cushion sub frame 212 of the cushion joint link 256 is contracted due to a difference in turning paths of the cushion main frame 206 and the cushion sub frame 212 and, while the cushion joint links 236 and the fifth links 282 are turned, the separation in the seat cushion 30 thickness direction between the cushion main frame 206 and the cushion support portion 208 and the separation in the seat cushion 30 thickness direction between the cushion support portion 208 and the cushion sub frame 212 are contracted. Accordingly, even in a case in which thicknesses of the cushion side portion 30B and the cushion main portion 30A for times of usual use are made thicker, in accordance with stowing of the seat 320, the thicknesses of the cushion side portion 30B and the cushion main portion 30A are contracted in the region at the face side relative to the cushion main frame 206 and can be made equal, and space (space at the upper side of the seat cushion 30) in the cabin at times of stowage of the seat 320 (a luggage compartment) can be made larger, along with which interference of the seat cushion 30 with the cabin floor surface 202 can be suppressed.

Twenty-ninth Embodiment

Figure 63A:
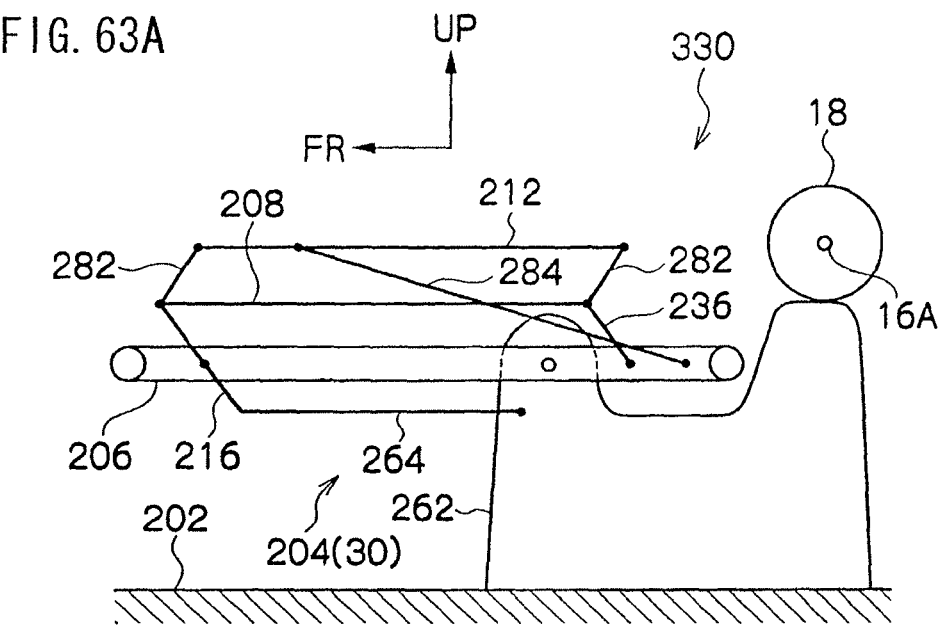
FIG. 63A is a side view, viewed from leftward, showing principal elements of a seat relating to a twenty-ninth embodiment of the present invention.

FIG. 63A shows a side view, viewed from leftward, of principal elements of a seat 330 relating to a twenty-ninth embodiment that is structured with the seat structure of the present invention. FIG. 64 shows an exploded perspective view, viewed from diagonally left forward, of the principal elements of the seat 330.

The seat 330 relating to the present embodiment has a substantially similar structure to the above-described twenty-fourth embodiment, but differs in the following respects.

The seat 330 relating to the present embodiment is formed as what is known as a tip-up stowing type.

At both the left and the right side region, a front-rear direction intermediate portion of the cushion main frame 206 is turnably joined to the leg 262 at the vehicle side, and turning of the cushion main frame 206 relative to the leg 262 is locked. Accordingly, the cushion main frame 206 is supported at the leg 262, and the seat cushion 30 is supported at the vehicle side. In the present embodiment, the arm 210 of the above-described twenty-fourth embodiment is not provided.

The cushion front link 216 structures the cushion flexing component, and the lower end of the cushion front link 216 is joined to the vehicle side.

The front end of the cushion operation link 264, which serves as the cushion connection mechanism, is turnably joined to the cushion front link 216 at the lower side of the position of joining to the cushion main frame 206 (at a position which is offset from this position of joining). The rear end of the cushion operation link 264 is turnably joined to the leg 262 at the lower side of the position of joining of the cushion main frame 206 (at a position which is offset from this position of joining). Accordingly, turning of the cushion operation link 264, the cushion front link 216, the cushion joint links 236, the cushion support portion 208, the fifth links 282, the cushion sub frame 212 and the sixth link 284 is locked, and operation of the cushion link mechanism 204 is restricted.

Next, operation of the present embodiment will be described.

In the seat 330 of the structure described above, in the state in which the cushion main frame 206 is joined to the leg 262 while turning is locked, the cushion operation link 264 is turnably joined to the leg 262. Thus, turning of the cushion main frame 206, the cushion operation link 264, the cushion front link 216, the cushion joint links 236, the cushion support portion 208, the fifth links 282, the cushion sub frame 212 and the sixth link 284 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 330, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the cushion main frame 206 to the leg 262 being released and the seat cushion 30 being turned rearward, the seat cushion 30 is disposed substantially vertically at the front side of the seat back 12, and the seat 330 is stowed (known as tip-up stowing) (similarly to FIG. 17).

Figure 63B:
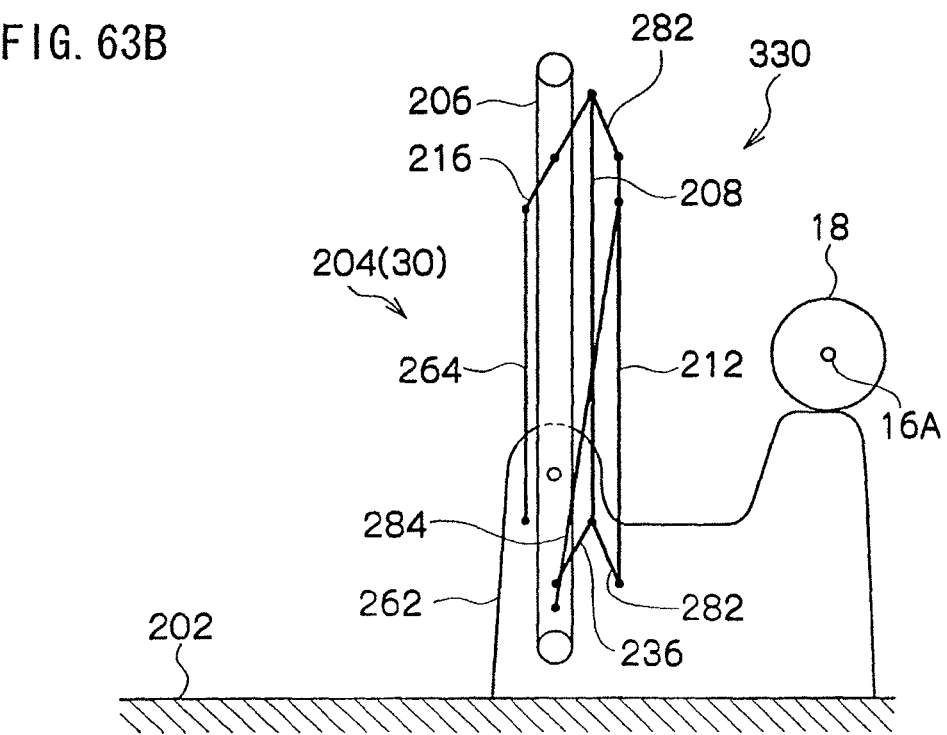
FIG. 63B is a side view, viewed from leftward, showing a stowed state of the principal elements of the seat relating to the twenty-ninth embodiment of the present invention.

When the seat 330 is being stowed (when the seat cushion 30 is being turned rearward), the cushion main frame 206 and the cushion operation link 264 (including the cushion front link 216) are turned substantially 90° rearward. Thus, due to a difference in turning paths of the cushion main frame 206 and the cushion operation link 264, the cushion front link 216 turns relative to the cushion main frame 206 and the cushion operation link 264 and, while the cushion joint links 236 and the fifth links 282 are turned, the separation in the seat cushion 30 thickness direction between the cushion main frame 206 and the cushion support portion 208 and the separation in the seat cushion 30 thickness direction between the cushion support portion 208 and the cushion sub frame 212 are contracted (see FIG. 63B). Accordingly, even in a case in which thicknesses of the cushion side portion 30B and the cushion main portion 30A for times of usual use are made thicker, in accordance with stowing of the seat 330, the thicknesses of the cushion side portion 30B and the cushion main portion 30A are contracted in the region at the face side relative to the cushion main frame 206 and can be made equal, and space (space at the front side and rear side of the seat 330) in the cabin at times of stowage of the seat 330 (a luggage compartment) can be made larger.

Further, similarly to the above-described twenty-second embodiment, this can have a structure in which the seat 330 is formed as what is known as a tumble-storing type (see FIG. 5A), a structure in which the seat 330 is formed as what is known as a space-increasing storage type (see FIG. 5B), or a structure in which the seat 330 is formed as what is known as a rearward under-floor storage type (see FIG. 5C).

Here, in the present embodiment, a structure is formed in which the cushion operation link 264 is turnably joined to the cushion front link 216 at the lower side of the position of joining to the cushion main frame 206 and to the leg 262 at the lower side of the position of joining with the cushion main frame 206. However, a structure may be formed in which the cushion operation link 264 is turnably joined to the cushion front link 216 at the upper side of the position of joining to the cushion main frame 206 (at a position which is offset from this position of joining) and to the leg 262 at the upper side of the position of joining with the cushion main frame 206 (at a position which is offset from this position of joining).

Furthermore, in the present embodiment, a structure is formed in which turning of the cushion main frame 206 relative to the leg 262 is locked. However, a structure may be formed in which the lower end of the cushion front link 216 is made lockable to the vehicle side. In this case, a necessity of locking turning of the cushion main frame 206 relative to the leg 262 can be eliminated.

Thirtieth Embodiment

Figure 65:
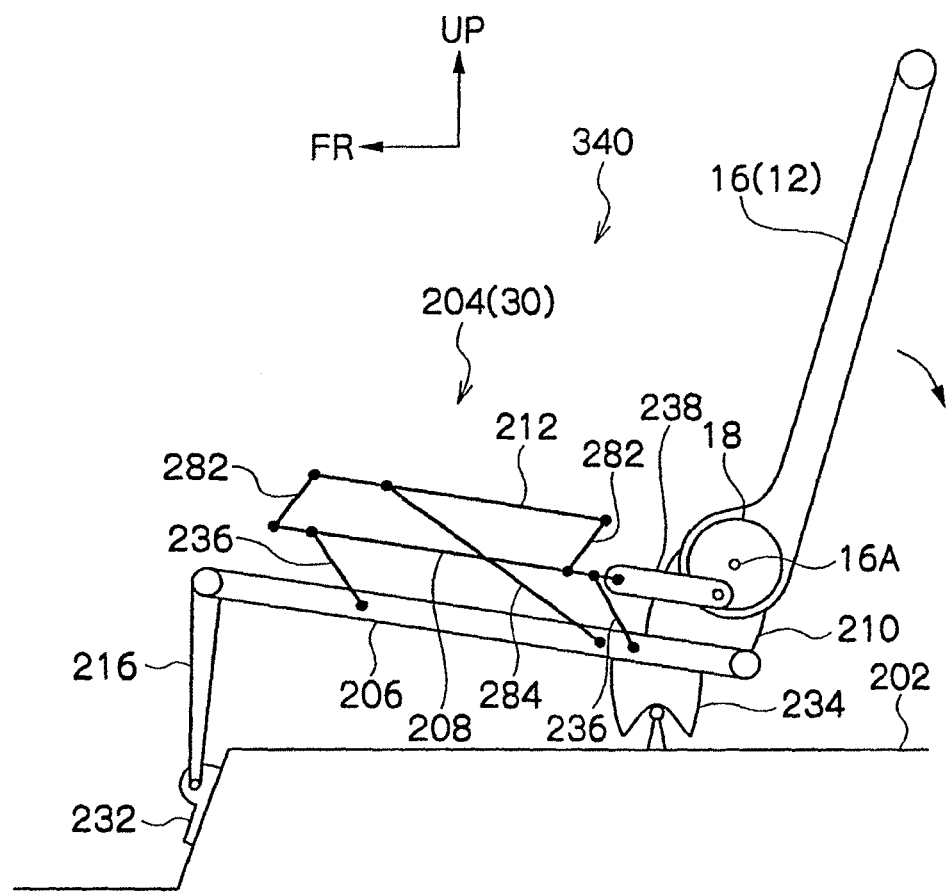
FIG. 65 is a side view, viewed from leftward, showing principal elements of a seat relating to a thirtieth embodiment of the present invention.

FIG. 65 shows a side view, viewed from leftward, of principal elements of a seat 340 relating to a thirtieth embodiment that is structured with the seat structure of the present invention.

The seat 340 relating to the present embodiment has a substantially similar structure to the above-described twenty-sixth embodiment, but differs in the following respects.

The seat 340 relating to the present embodiment is formed as what is known as a back rearward-folding stowing type.

The rear end of the cushion joint link 238 is turnably joined to the back main frame 16 at the lower side of the tilting center 16A (a position which is offset from the tilting center 16A). Accordingly, turning of the cushion joint link 236, the cushion support portion 208, the fifth links 282, the cushion sub frame 212, the sixth link 284 and the cushion joint link 238 is locked, and operation of the cushion link mechanism 204 is restricted.

Here, with the present embodiment too, effects the same as in the above-described twenty-sixth embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 340 is stowed (known as rearward-folding stowing).

When the seat 340 is being stowed, the back main frame 16 (the seat back 12) is tilted rearward around the tilting center 16A, and the cushion joint link 238 is moved forward. Thus, by movement of the cushion support portion 208 which is to say the cushion joint links 236 to forward, the cushion joint links 236 are turned forward, and the separation in the seat cushion 30 thickness direction between the cushion main frame 206 and the cushion support portion 208 is contracted. Along with this, by movement of the cushion support portion 208 to forward, the fifth links 282 are turned forward, and the separation in the seat cushion 30 thickness direction between the cushion support portion 208 and the cushion sub frame 212 is contracted. Therefore, even in a case in which the thicknesses of the cushion side portion 30B and the cushion main portion 30A for times of usual use are made thicker, in accordance with stowing of the seat 340, the thicknesses of the cushion side portion 30B and the cushion main portion 30A are contracted in the region at the face side relative to the cushion main frame 206 and can be made equal, and space (space at the upper side of the seat cushion 30) in the cabin at times of stowage of the seat 340 (a luggage compartment) can be made larger.

Further, similarly to the twenty-third embodiment, a structure can be formed in which the seat 340 is formed as what is known as a space-increasing storage type (see FIG. 15).

Figure 66:
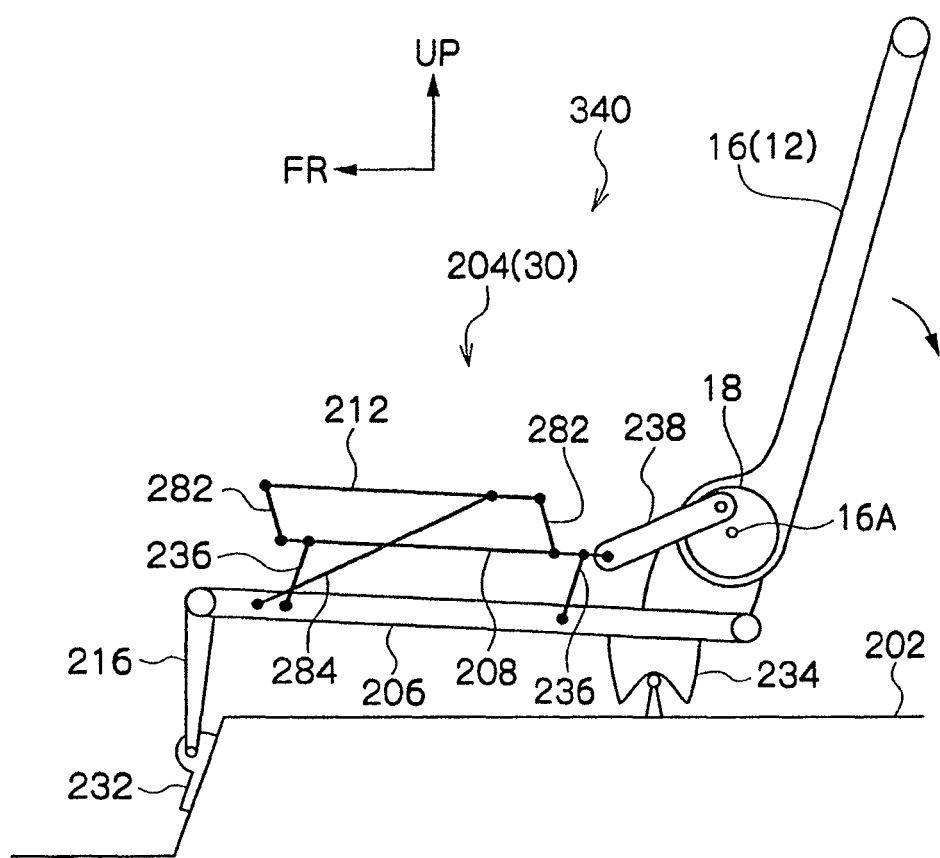
FIG. 66 is a side view, viewed from leftward, showing principal elements of a seat of an alternative example relating to the thirtieth embodiment of the present invention.

Here, in the present embodiment, a structure is formed in which the rear end of the cushion joint link 238 is turnably joined to the back main frame 16 at the lower side of the tilting center 16A. However, as shown in FIG. 66, a structure may be formed in which the rear end of the cushion joint link 238 is turnably joined to the back main frame 16 at the upper side of the tilting center 16A (a position which is offset from the tilting center 16A). In this case, the front end of the sixth link 284 is turnably joined to the cushion main frame 206, along with which the rear end of the sixth link 284 is turnably joined to the cushion sub frame 212 or a position other than a lower end (turning center) of the fifth links 282. Furthermore, when the seat 340 is being stowed, the back main frame 16 (the seat back 12) is tilted rearward around the tilting center 16A, and the cushion joint link 238 is moved rearward. Thus, by movement to rearward of the cushion support portion 208 which is to say the cushion joint links 236, the cushion joint links 236 are turned rearward, and the separation in the seat cushion 30 thickness direction between the cushion main frame 206 and the cushion support portion 208 is contracted. Along with this, by movement to rearward of the cushion support portion 208, the fifth links 282 are turned rearward, and the separation in the seat cushion 30 thickness direction between the cushion support portion 208 and the cushion sub frame 212 is contracted.

Thirty-first Embodiment

Figure 67:
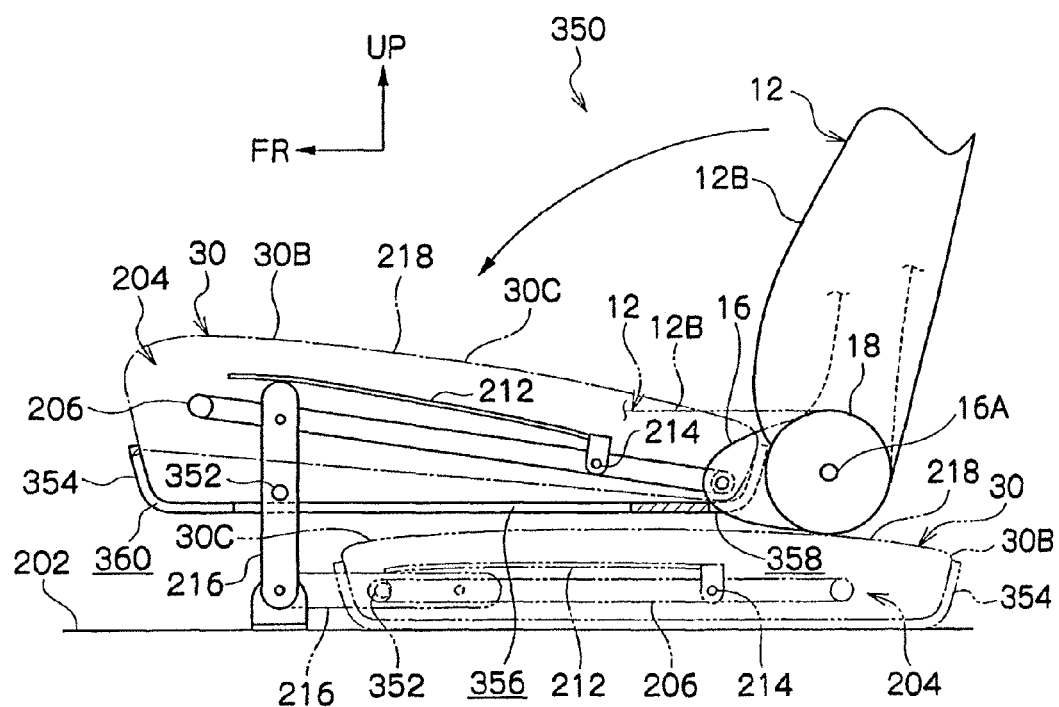
FIG. 67 is a side view, viewed from leftward, showing principal elements of a seat relating to a thirty-first embodiment of the present invention.
Figure 68:
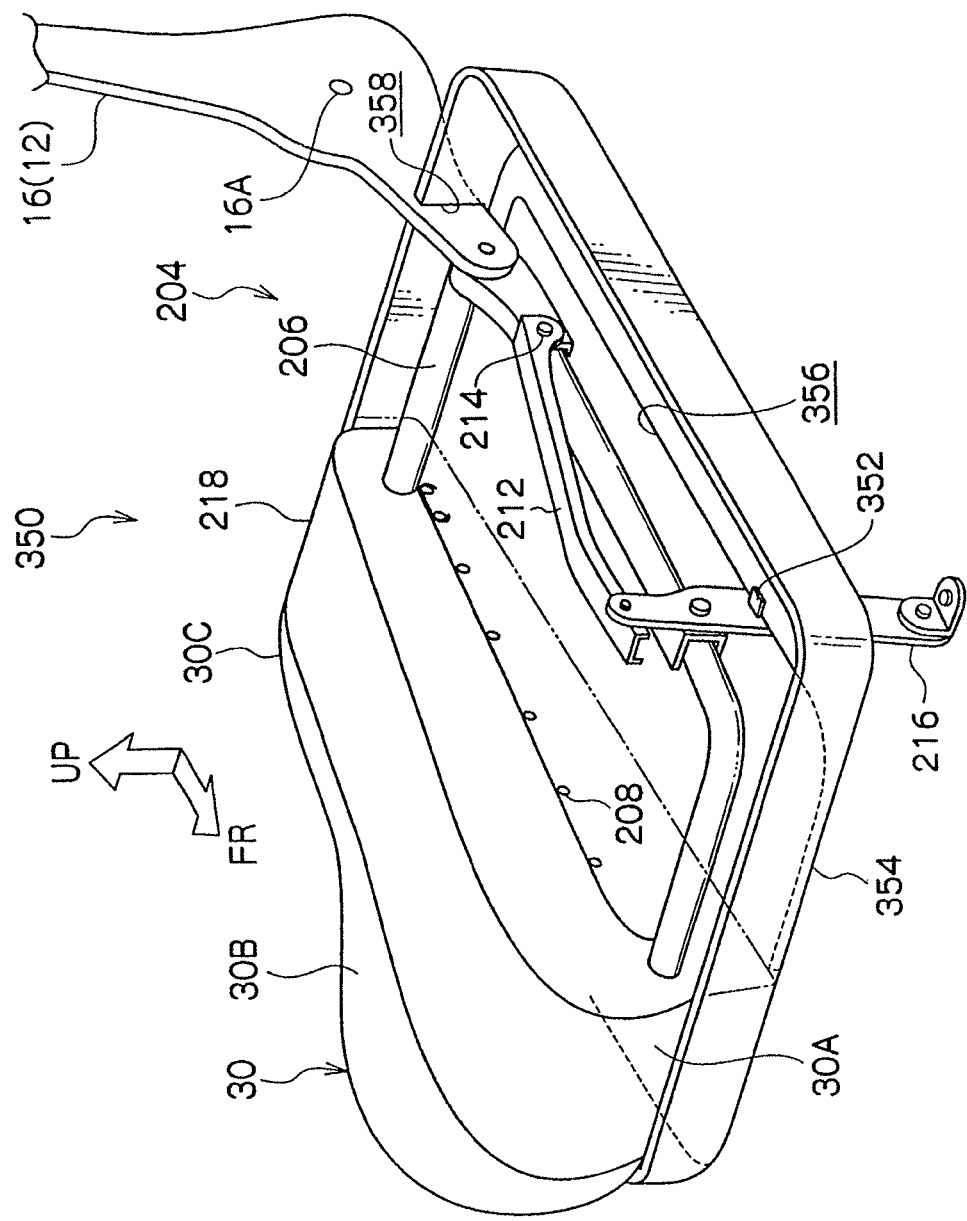
FIG. 68 is a perspective view, viewed from diagonally left forward, showing the principal elements of the seat relating to the thirty-first embodiment of the present invention.

FIG. 67 shows a side view, viewed from leftward, of principal elements of a seat 350 relating to a thirty-first embodiment that is structured with the seat structure of the present invention. FIG. 68 shows a sectional view, viewed from forward, of the principal elements of the seat 350.

The seat 350 relating to the present embodiment has a substantially similar structure to the above-described seventeenth embodiment, but differs in the following respects.

In the seat 350 relating to the present embodiment, both the left and the right side region of the rear portion of the cushion main frame 206 is turnably joined to the lower end of the back main frame 16 at the front side of the tilting center 16A (a position which is offset from the tilting center 16A). In the present embodiment, the arm 210 of the above-described seventeenth embodiment is not provided.

At an up-down direction intermediate portion of the cushion front link 216, a shaft-form or board-form restricting portion 352 is provided. The restricting portion 352 protrudes outward in the left-right direction from the cushion front link 216.

At a lower side of the cushion main frame 206 (a reverse side region of the seat cushion 30), an under cover 354 is provided, which serves as a cushion reverse side member of the cushion flexing component. The under cover 354 is formed as a substantially square container, with an upper face open. Both a left and a right side region of a rear portion of the under cover 354 is turnably joined to the respective one of the two left and right side regions of the rear portion of the cushion main frame 206. At the middle of a lower wall of the under cover 354, a rectangular aperture 356 is penetratingly formed. The cushion front link 216 passes through the aperture 356. Thus, joining of the cushion main frame 206 with the vehicle side by the cushion front link 216 is enabled. The under cover 354 is engaged with a seat cushion main body 30C (a region of the seat cushion 30 other than the under cover 354), and turning to the lower side is restricted. Accordingly, the under cover 354 covers a lower side of the seat cushion main body 30C, along with which the lower wall of the under cover 354 and the cushion main frame 206 are separated, and a gap is formed between the lower wall of the under cover 354 and the lower face of the seat cushion main body 30C. The restricting portion 352 of the cushion front link 216 abuts against the lower wall of the under cover 354 from the upper side. Accordingly, turning of the under cover 354 to upward is restricted.

At both a left and a right side region, a rear passage hole 358, which is formed to be long, is penetratingly formed in a rear wall of the under cover 354. The rear passage hole 358 is arranged along the up-down direction and opens to the upper side. The lower end of the back main frame 16 passes through at the rear passage hole 358. Accordingly, joining of the lower end of the back main frame 16 to the cushion main frame 206 is enabled. At both a left and a right side region, a front passage hole 360, which is formed to be long, is penetratingly formed from a front wall to a front portion of the lower wall of the under cover 354. The front passage hole 360 is arranged along the up-down direction and the front-rear direction at the front side of the cushion front link 216, along with which it is communicated with the aperture 356.

The whole of an outer peripheral surface of the under cover 354 is covered with an additional cushion face skin (not shown), which serves as a cushion cover member, and the under cover 354 is accommodated in the additional cushion face skin. Accordingly, appearance of the under cover 354, and hence the seat cushion 30, can be improved.

Next, operation of the present embodiment will be described.

In the seat 350 of the structure described above, in the state in which tilting of the back main frame 16 around the tilting center 16A is locked by the reclining mechanism 18, the lower end of the cushion front link 216 is turnably joined to the vehicle side. Thus, turning of the cushion main frame 206, the cushion front link 216, the cushion sub frame 212 and the under cover 354 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 350, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Figure 69:
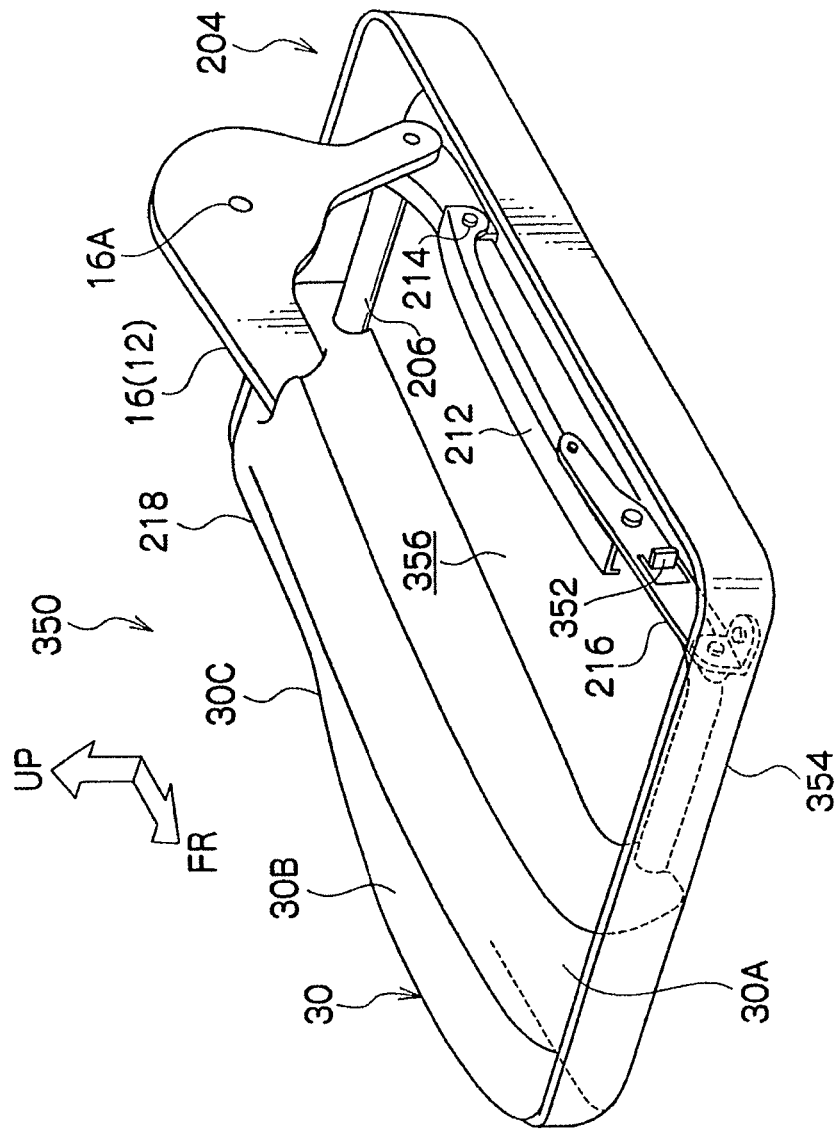
FIG. 69 is a perspective view, viewed from diagonally left forward, showing a stowed state of the principal elements of the seat relating to the thirty-first embodiment of the present invention.

By the reclining mechanism 18 being controlled and the seat back 12 being tilted forward around the tilting center 16A, the seat back 12 is folded onto the upper side of the seat cushion 30, and the seat 350 is stowed (known as fold-forward stowing) (see FIG. 69).

When the seat 350 is being stowed, the back main frame 16 (the seat back 12) is tilted forward around the tilting center 16A, and the cushion main frame 206 (the seat cushion 30) is moved rearward. Thus, the cushion front link 216 is turned rearward while being passed into the front passage hole 360, and the seat cushion 30 is moved rearward and downward.

Furthermore, when the seat 350 is being stowed, the cushion front link 216 is turned rearward. Thus, a separation in the seat cushion 30 thickness direction between the upper end of the cushion front link 216 and the position of joining to the cushion main frame 206 is contracted, and the separation in the seat cushion 30 thickness direction between the cushion sub frame 212 and the cushion main frame 206 is contracted by turning of the cushion sub frame 212 toward the cushion main frame 206 relative to the cushion main frame 206. Moreover, a separation in the seat cushion 30 thickness direction between the cushion front link 216 at a position of joining to the cushion main frame 206 and the restricting portion 352 is contracted. By turning of the cushion main frame 206 toward the lower wall side of the under cover 354 relative to the under cover 354, the seat cushion main body 30C passes into the interior of the under cover 354 until the lower face of the seat cushion main body 30C abuts against the lower wall of the under cover 354. Therefore, even in a case in which thicknesses of the cushion side portion 30B and the cushion main portion 30A for times of usual use are made thicker, in accordance with stowing of the seat 350, the thickness of the cushion side portion 30B is contracted in the region at the face side relative to the cushion main frame 206, along with which the thicknesses of the cushion side portion 30B and the cushion main portion 30A are contracted in the region at the reverse side relative to the cushion main frame 206, the thicknesses of the cushion side portion 30B and the cushion main portion 30A can be made equal, and space (space at the upper side of the seat 350) in the cabin at times of stowage of the seat 350 (a luggage compartment) can be made larger.

Therefore, with the present embodiment too, effects the same as in the above-described seventeenth embodiment can be produced.

Figure 70:
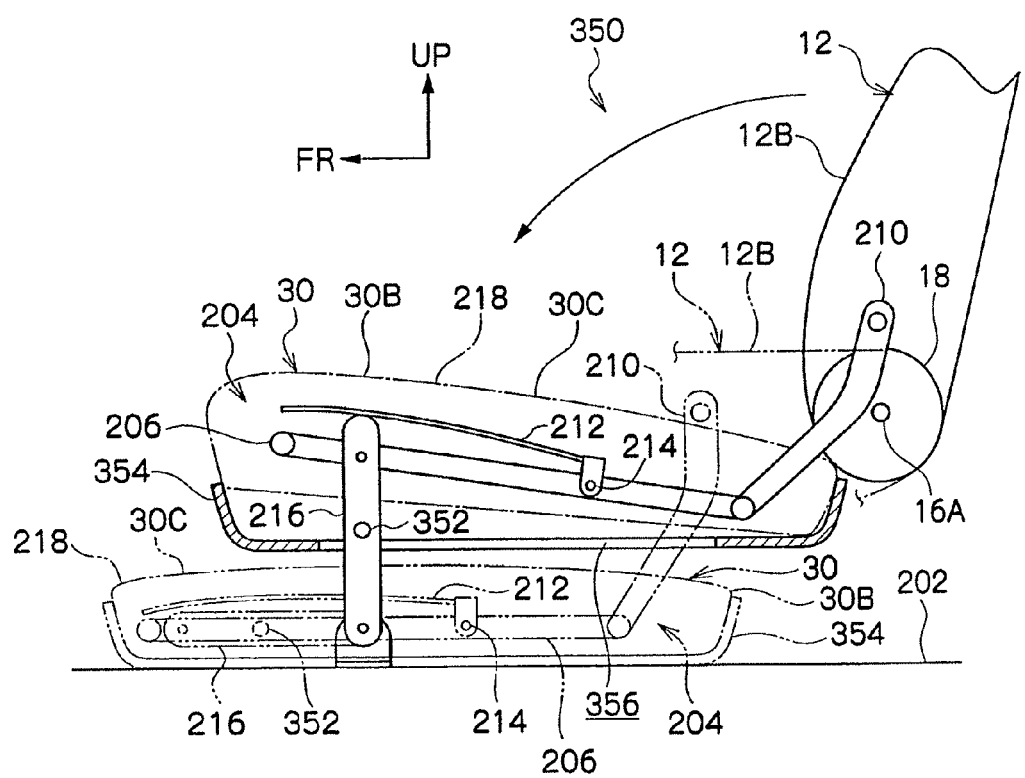
FIG. 70 is a side view, viewed from leftward, showing principal elements of a seat of an alternative example relating to the thirty-first embodiment of the present invention.

Here, in the present embodiment, a structure is formed in which both the left and the right side region of the rear portion of the cushion main frame 206 is turnably joined to the back main frame 16 at the front side of the tilting center 16A. However, as shown in FIG. 70, a structure may be formed in which both the left and the right side region of the rear portion of the cushion main frame 206 is turnably joined to the back main frame 16 at the upper side of the tilting center 16A (a position which is offset from the tilting center 16A). In this case, when the seat 350 is being stowed, the back main frame 16 (the seat back 12) is tilted forward around the tilting center 16A, and the cushion main frame 206 (the seat cushion 30) is moved forward. Thus, the cushion front link 216 is turned forward, and the seat cushion 30 is moved forward and downward.

Further, in the present embodiment, a structure is formed in which the restricting portion 352 is provided at the cushion front link 216. However, a structure may be formed in which the restricting portion 352 is not provided at the cushion front link 216.

Thirty-Second Embodiment

Figure 71:
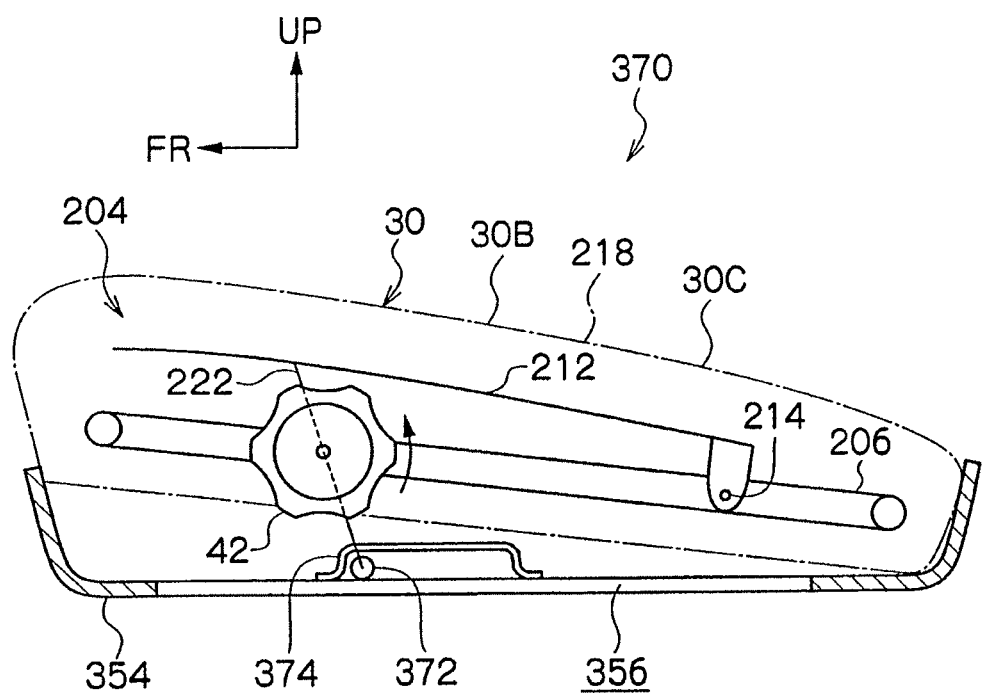
FIG. 71 is a side view, viewed from leftward, showing principal elements of a seat relating to a thirty-second embodiment of the present invention.

FIG. 71 shows a side view, viewed from leftward, of principal elements of a seat 370 relating to a thirty-second embodiment that is structured with the seat structure of the present invention.

The seat 370 relating to the present embodiment has a substantially similar structure to the above-described thirty-first embodiment, but differs in the following respects.

In the seat 370 relating to the present embodiment, the cushion front link 216 is turnably joined, at the upper end, to the front portion of the cushion main frame 206. The cushion front link 216 does not support the cushion sub frame 212, along with which the restricting portion 352 of the above-described thirty-first embodiment is not provided.

At both the left and the right side region of the front portion of the cushion main frame 206, an intermediate portion of the regulation link 222 is turnably joined. The regulation link 222, at the upper end, supports the cushion sub frame 212 from the lower side. A circular shaft-form slide shaft 372 is fixed to the lower end of the regulation link 222. The slide shaft 372 protrudes outward in the left-right direction from the regulation link 222.

The circular rod-shaped control lever 42 which serves as the control mechanism is engaged at the intermediate portion (turning center) of the regulation link 222. The control lever 42 is formed as a dial-type regulator or the like. A turn-locking mechanism (not shown) which serves as the locking mechanism is provided at the control lever 42. Turning of the control lever 42 is obstructed by the turn-locking mechanism, and thus turning of the regulation link 222 and the cushion sub frame 212 is locked. The control lever 42 protrudes to sideward of the seat cushion 30, and by the control lever 42 being turningly controlled, the regulation link 222 is made turnable.

At both a left and a right side region, a guide plate 374 with an inverted letter-U form plate shape in cross-section, which serves as a guide member, is fixed to a vicinity of a front portion of an upper face of the lower wall of the under cover 354. An upper wall of the guide plate 374 is formed in a flat plate shape. The slide shaft 372 of the regulation link 222 passes into the guide plate 374. Accordingly, the upper wall of the guide plate 374 engages with the slide shaft 372, and turning of the under cover 354 to downward is restricted. Thus, movement of the cushion link mechanism 204 is locked, in addition to which the under cover 354 covers the lower side of the seat cushion main body 30C.

Next, operation of the present embodiment will be described.

In the seat 370 of the structure described above, in the state in which tilting of the back main frame 16 around the tilting center 16A is locked by the reclining mechanism 18, the lower end of the cushion front link 216 is turnably joined to the vehicle side, in addition to which turning of the control lever 42 is obstructed by the turn-locking mechanism. Thus, turning of the cushion main frame 206, the cushion front link 216, the regulation link 222, the cushion sub frame 212 and the under cover 354 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 370, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

In a state in which turning obstruction by the turn locking-mechanism of the control lever 42 is released, by the control lever 42 being turningly controlled and the regulation link 222 being turned, a separation in the seat cushion 30 thickness direction between the upper end of the regulation link 222 and a position of joining to the cushion main frame 206 is flexed, and the separation in the seat cushion 30 thickness direction between the cushion sub frame 212 and the cushion main frame 206 is flexed by turning of the cushion sub frame 212 relative to the cushion main frame 206. Moreover, a separation in the seat cushion 30 thickness direction between the position of joining to the cushion main frame 206 of the regulation link 222 and the slide shaft 372 is flexed by sliding of the slide shaft 372 of the regulation link 222 in the guide plate 374, and a separation in the seat cushion 30 thickness direction between the cushion main frame 206 and the lower wall of the under cover 354 is flexed while the under cover 354 is turned relative to the cushion main frame 206. Accordingly, independently of stowing of the seat 370, the thickness of the cushion side portion 30B is flexed in the region at the face side relative to the cushion main frame 206, along with which the thicknesses of the cushion side portion 30B and the cushion main portion 30A are flexed in the region at the reverse side relative to the cushion main frame 206, and the thicknesses of the cushion side portion 30B and the cushion main portion 30A can be adjusted.

Thirty-Third Embodiment

FIG. 72A shows a side view, viewed from leftward, of principal elements of a seat 380 relating to a thirty-third embodiment that is structured with the seat structure of the present invention.

The seat 380 relating to the present embodiment has a substantially similar structure to the above-described thirty-first embodiment, but differs in the following respects.

In the present embodiment, the cabin floor surface 202 at the front side of the seat 380 is made lower than the cabin floor surface 202 directly below the seat 380.

The seat 380 relating to the present embodiment is formed as what is known as a back forward-folding stowing type.

The lower end of the cushion front link 216 is turnably joined to the vehicle side front bracket 232. The cushion front link 216 is turnably joined, at the upper end, to the front portion of the cushion main frame 206. The cushion front link 216 does not function as the cushion connection mechanism, and does not directly support the cushion sub frame 212. The restricting portion 352 of the above-described thirty-first embodiment is not provided at the cushion front link 216.

At the lower side of the rear portion of the cushion main frame 206, at both the left and the right side region, the rear locking mechanism 234 which serves as the locking mechanism is engaged. The rear locking mechanism 234 is locked to the vehicle side. Thus, the cushion main frame 206 is supported at the rear locking mechanism 234 and the cushion front link 216, and the seat cushion 30 is supported at the vehicle side. Further, the rear locking mechanism 234 passes through the aperture 356 of the under cover 354. Accordingly, joining of the cushion main frame 206 with the vehicle side by the rear locking mechanism 234 is enabled.

At the rear portion of the cushion main frame 206, at both the left and the right side region, the arm 210 is fixed, and the lower end of the back main frame 16 is joined to the arm 210 to be tiltable around the tilting center 16A. Accordingly, the back main frame 16 is supported at the vehicle side via the arm 210, the cushion main frame 206, the rear locking mechanism 234 and the cushion front link 216, and the seat back 12 is supported at the vehicle side.

A predetermined number (two in the present embodiment) of the cushion joint links 236, which serve as the cushion joining component of the cushion flexing component, are turnably joined, at upper ends, to the cushion sub frame 212. The cushion joint link 236 at the front portion of the cushion sub frame 212 is turnably joined, at an intermediate portion, to the cushion main frame 206, along with which the cushion joint link 236 other than that cushion joint link 236 is turnably joined, at the lower end, to the cushion main frame 206. Further, the cushion main frame 206 and the cushion sub frame 212 are not joined by the cushion joint shaft 214 of the thirty-first embodiment.

The circular shaft-form slide shaft 372 is fixed, at the lower end, to the cushion joint link 236 at the front portion of the cushion sub frame 212. The slide shaft 372 protrudes outward in the left-right direction from this cushion joint link 236.

At both the left and the right side region, the guide plate 374 with the inverted letter-U form plate shape in cross-section, which serves as the guide member, is fixed to the vicinity of the front portion of the upper face of the lower wall of the under cover 354. The upper wall of the guide plate 374 is formed in the flat plate form. The slide shaft 372 passes into the guide plate 374. Accordingly, the upper wall of the guide plate 374 engages with the slide shaft 372, and turning of the under cover 354 to downward is restricted. Thus, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

The front end of the cushion joint link 238 which serves as the cushion connection mechanism is turnably joined to the rear end of the cushion sub frame 212 or the upper end (anywhere other than the lower end is acceptable) of the cushion joint link 236 at the rear portion of the cushion sub frame 212. The rear end of the cushion joint link 238 is turnably joined to the back main frame 16 at the upper side of the tilting center 16A (a position which is offset from the tilting center 16A). Accordingly, turning of the cushion joint links 236, the cushion sub frame 212, the cushion joint link 238 and the under cover 354 is locked, and operation of the cushion link mechanism 204 is restricted.

Operation of the present embodiment will be described.

In the seat 380 of the structure described above, in a state in which the cushion main frame 206 is supported at the rear locking mechanism 234 and the cushion front link 216, tilting of the back main frame 16 around the tilting center 16A is locked by the reclining mechanism 18. Thus, turning of the cushion main frame 206, the arm 210, the cushion joint links 236, the cushion sub frame 212, the cushion joint link 238 and the under cover 354 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 380, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

By the reclining mechanism 18 being controlled and the seat back 12 being tilted forward around the tilting center 16A, the seat back 12 is folded onto the upper side of the seat cushion 30, and the seat 380 is stowed (known as fold-forward stowing) (see FIG. 72B).

When the seat 380 is being stowed, the back main frame 16 (the seat back 12) is tilted forward around the tilting center 16A, and the cushion joint link 238 is moved forward. Thus, by movement of the cushion sub frame 212 which is to say the cushion joint links 236 forward, the cushion joint links 236 are turned, and the separation in the seat cushion 30 thickness direction between the cushion sub frame 212 and the cushion main frame 206 is contracted. Moreover, by sliding of the slide shaft 372 of the cushion joint link 236 in the guide plate 374, a separation in the seat cushion 30 thickness direction between the cushion joint link 236 at the position of joining to the cushion main frame 206 and the slide shaft 372 is contracted and, while the under cover 354 is turned toward the cushion main frame 206 relative to the cushion main frame 206, a separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 380, the thickness of the cushion side portion 30B is contracted in the region at the face side relative to the cushion main frame 206, along with which the thicknesses of the cushion side portion 30B and the cushion main portion 30A are contracted in the region at the reverse side relative to the cushion main frame 206, the thicknesses of the cushion side portion 30B and the cushion main portion 30A can be made equal, and space (space at the upper side of the seat 380) in the cabin at times of stowage of the seat 380 (a luggage compartment) can be made larger.

Therefore, with the present embodiment too, effects the same as in the above-described thirty-first embodiment can be produced.

Figure 73:
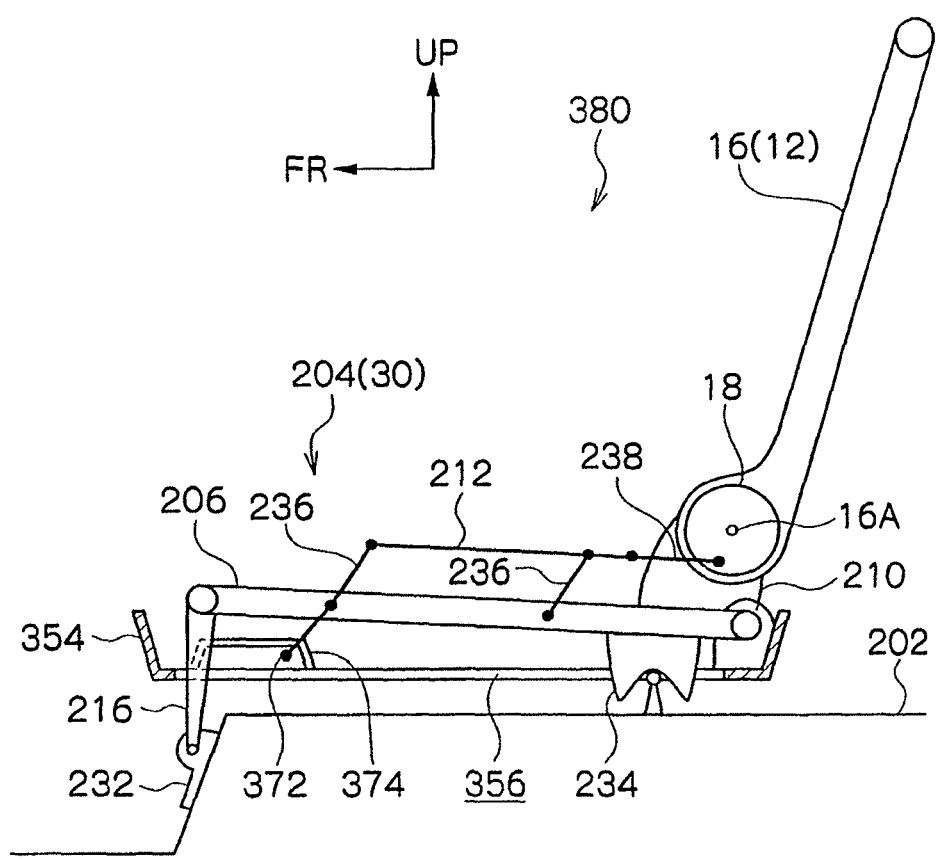
FIG. 73 is a side view, viewed from leftward, showing principal elements of a seat of an alternative example relating to the thirty-third embodiment of the present invention.

Here, in the present embodiment, a structure is formed in which the rear end of the cushion joint link 238 is turnably joined to the back main frame 16 at the upper side of the tilting center 16A. However, as shown in FIG. 73, a structure may be formed in which the rear end of the cushion joint link 238 is turnably joined to the back main frame 16 at the lower side of the tilting center 16A (a position which is offset from the tilting center 16A). In this case, when the seat 380 is being stowed, the back main frame 16 (the seat back 12) is tilted forward around the tilting center 16A, and the cushion joint link 238 is moved rearward. Thus, by movement of the cushion sub frame 212 which is to say the cushion joint links 236 rearward, the cushion joint links 236 are turned, and the separation in the seat cushion 30 thickness direction between the cushion sub frame 212 and the cushion main frame 206 is contracted. Moreover, by sliding of the slide shaft 372 of the cushion joint link 236 in the guide plate 374, the separation in the seat cushion 30 thickness direction between the cushion joint link 236 at the position of joining to the cushion main frame 206 and the slide shaft 372 is contracted and, while the under cover 354 is turned toward the cushion main frame 206 relative to the cushion main frame 206, the separation in the seat cushion 30 thickness direction between the cushion main frame 206 and the lower wall of the under cover 354 is contracted.

Thirty-Fourth Embodiment

Figure 74:
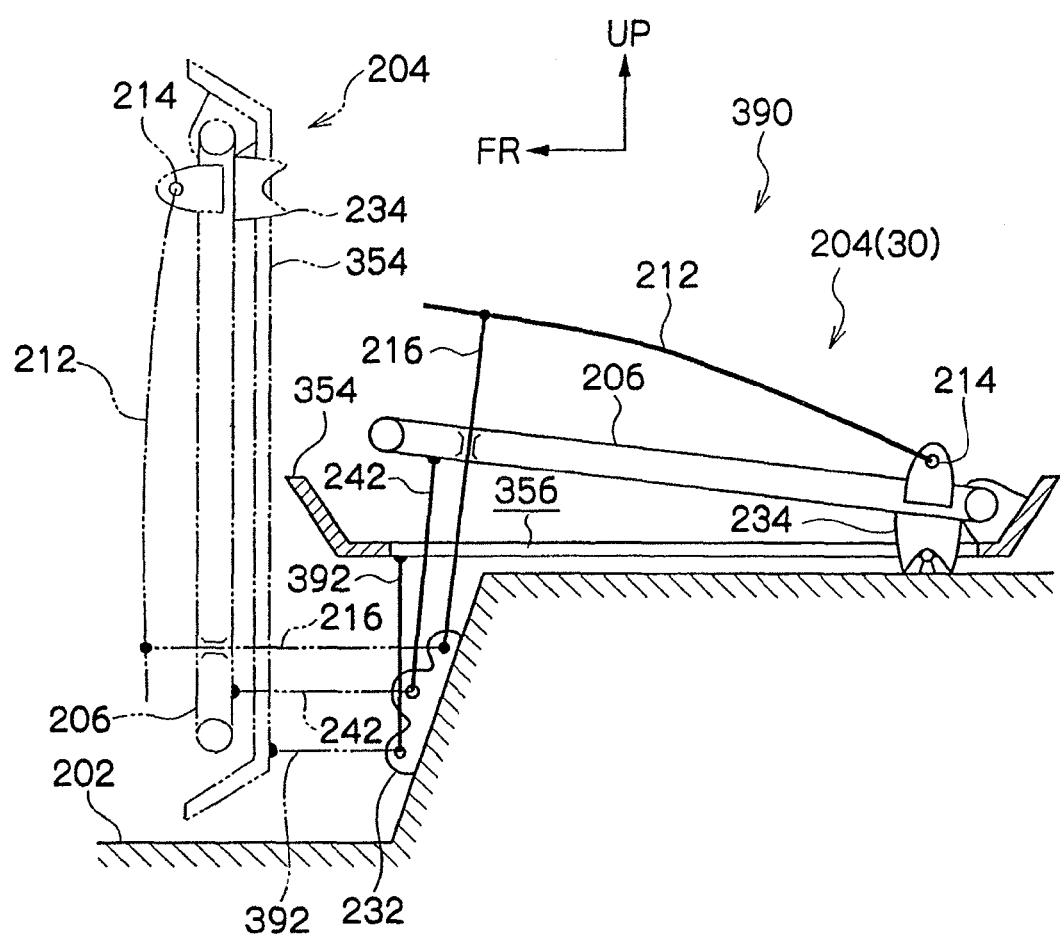
FIG. 74 is a side view, viewed from leftward, showing principal elements of a seat relating to a thirty-fourth embodiment of the present invention.

FIG. 74 shows a side view, viewed from leftward, of principal elements of a seat 390 relating to a thirty-fourth embodiment that is structured with the seat structure of the present invention.

The seat 390 relating to the present embodiment has a substantially similar structure to the above-described thirty-first embodiment, but differs in the following respects.

In the present embodiment, the cabin floor surface 202 at the front side of the seat 390 is made lower than the cabin floor surface 202 directly below the seat 390.

The seat 390 relating to the present embodiment is formed as what is known as a double-folded stowing type.

At both the left and the right side region, the upper end of the fourth link 242 is non-turnably joined to the lower side of the front portion of the cushion main frame 206. The lower end of the fourth link 242 is turnably joined to the front bracket 232 at the vehicle side. In the present embodiment, the rear portion of the cushion main frame 206 is not directly joined to the lower portion of the back main frame 16.

At both the left and the right side region, the rear locking mechanism 234 which serves as the locking mechanism is engaged at the lower side of the rear portion of the cushion main frame 206, and the rear locking mechanism 234 is locked to the vehicle side. Thus, the cushion main frame 206 is supported at the rear locking mechanism 234 and the fourth link 242, and the seat cushion 30 is supported at the vehicle side.

Further, the rear locking mechanism 234 and the fourth link 242 pass through the aperture 356 of the under cover 354. Accordingly, joining of the cushion main frame 206 with the vehicle side by the rear locking mechanism 234 and the fourth link 242 is enabled.

The lower end of the cushion front link 216 is turnably joined to the front bracket 232 at the vehicle side, at the rear side of the position of joining to the front bracket 232 (turning center) of the fourth link 242 (at a position which is offset from this joining position). The cushion front link 216 is joined in a condition of being movable, in the length direction, at the cushion main frame 206. The cushion front link 216, at the upper end, is non-turnably joined to the cushion sub frame 212. Accordingly, turning of the cushion front link 216 and the cushion sub frame 212 is locked. Further, the restricting portion 352 of the thirty-first embodiment is not provided at the cushion front link 216.

At the lower side of both the left and the right side region, an upper end of a seventh link 392, which structures the cushion connection mechanism, is non-turnably joined to the front portion of the lower wall of the under cover 354. A lower end of the seventh link 392 is turnably joined to the front bracket 232 at the vehicle side, at the front side of the position of joining to the front bracket 232 (turning center) of the fourth link 242 (at a position which is offset from this joining position). Accordingly, turning of the seventh link 392 and the under cover 354 is locked, and operation of the cushion link mechanism 204 is restricted. In addition to this, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

Next, operation of the present embodiment will be described.

In the seat 390 of the structure described above, in the state in which the cushion main frame 206 is supported at the rear locking mechanism 234 and the fourth link 242 and locked, the lower ends of the cushion front link 216 and the seventh link 392 are turnably joined to the vehicle side. Thus, turning of the fourth link 242, the cushion main frame 206, the cushion front link 216, the cushion sub frame 212, the seventh link 392 and the under cover 354 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 390, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat seat 10, the cushion side portion 30B can even more thoroughly retain the crew.

Further, by the locking of the rear locking mechanism 234 to the vehicle side being released and the seat cushion 30 being turned substantially 90° forward, the seat cushion 30 is stood up substantially vertically. Then, the reclining mechanism 18 is controlled, the seat back 12 is tilted forward around the tilting center 16A, and thus the seat back 12 is disposed substantially horizontally at the rear side of the seat cushion 30, and the seat 390 is stowed (known as double-folded stowing) (similarly to FIG. 10).

When the seat 390 is being stowed (when the seat cushion 30 is being turned forward), the fourth link 242, the cushion front link 216 and the seventh link 392 are turned substantially 90° forward. Thus, a separation in the seat cushion 30 thickness direction between the fourth link 242 at the position of joining to the cushion main frame 206 and the cushion front link 216 at the position of joining to the cushion sub frame 212 is contracted due to a difference in turning paths of the fourth link 242 and the cushion front link 216, the cushion sub frame 212 is turned toward the cushion main frame 206 relative to the cushion main frame 206, and the separation in the seat cushion 30 thickness direction between the cushion main frame 206 and the cushion sub frame 212 is contracted. Moreover, a separation in the seat cushion 30 thickness direction between the fourth link 242 at the position of joining to the cushion main frame 206 and the seventh link 392 at the position of joining to the under cover 354 is contracted due to a difference in turning paths of the fourth link 242 and the seventh link 392, the cushion main frame 206 is turned toward the under cover 354 relative to the under cover 354, and the separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 390, the thickness of the cushion side portion 30B is contracted in the region at the face side relative to the cushion main frame 206, along with which the thicknesses of the cushion side portion 30B and the cushion main portion 30A are contracted in the region at the reverse side relative to the cushion main frame 206, the thicknesses of the cushion side portion 30B and the cushion main portion 30A can be made equal, and space (space at the front side and rear side of the seat cushion 30) in the cabin at times of stowage of the seat 390 (a luggage compartment) can be made larger, along with which a possible angle of tilting (reclining), to rearward, of a seat (not shown) at the front side of the seat 390 can be made larger.

Thirty-Fifth Embodiment

Figure 75:
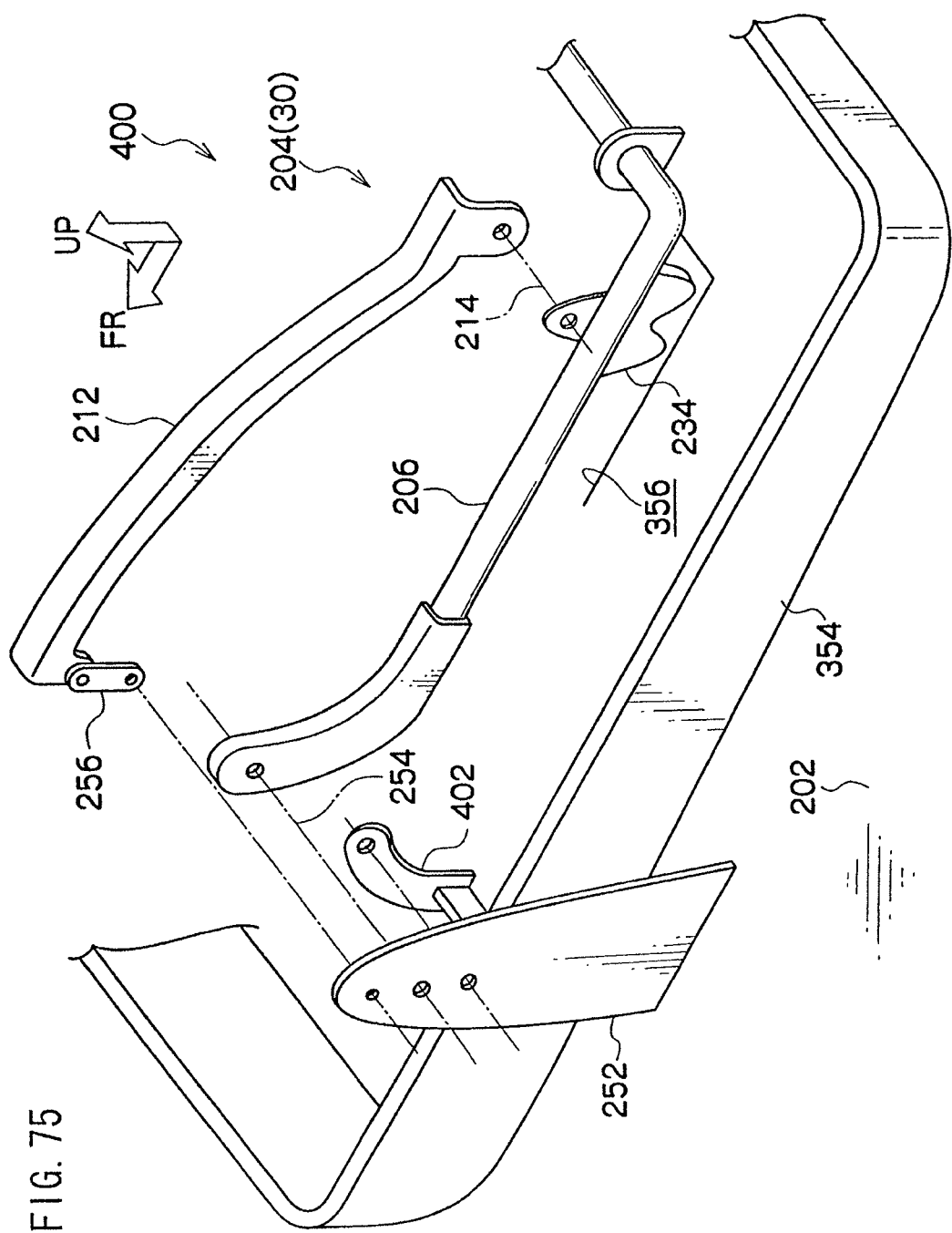
FIG. 75 is an exploded perspective view, viewed from diagonally left rearward, showing principal elements of a seat relating to a thirty-fifth embodiment of the present invention.

FIG. 75 shows an exploded perspective view, viewed from diagonally left rearward, of principal elements of a seat 400 relating to a thirty-fifth embodiment that is structured with the seat structure of the present invention.

The seat 400 relating to the present embodiment has a substantially similar structure to the above-described thirty-first embodiment, but differs in the following respects.

The seat 400 relating to the present embodiment is formed as what is known as a double-flat stowing type.

At both the left and the right side region, a front portion of the cushion main frame 206 is turnably joined to the fixed bracket 252 at the vehicle side by the first joint shaft 254. Further, the rear portion of the cushion main frame 206 is not directly joined to the lower portion of the back main frame 16.

At both the left and the right side region, the rear locking mechanism 234 which serves as the locking mechanism is engaged with the lower side of the rear portion of the cushion main frame 206, and the rear locking mechanism 234 is locked to the vehicle side. Thus, the cushion main frame 206 is supported at the rear locking mechanism 234 and the fixed bracket 252, and the seat cushion 30 is supported at the vehicle side. Further, the rear locking mechanism 234 passes through the aperture 356 of the under cover 354. Accordingly, joining of the cushion main frame 206 with the vehicle side by the rear locking mechanism 234 is enabled.

Here, in the present embodiment, the cushion front link 216 (including the restricting portion 352) of the above-described thirty-first embodiment is not provided.

The upper end of the cushion joint link 256, which structures the cushion connection mechanism, is non-turnably joined to the front portion of the cushion sub frame 212, and the lower end of the cushion joint link 256 is turnably joined to the fixed bracket 252 at an upper side (a position which is offset from the first joint shaft 254) of the first joint shaft 254 (a turning center of the cushion main frame 206). Accordingly, turning of the cushion joint link 256 and the cushion sub frame 212 is locked.

At both the left and the right side region, a lower end of a cover interlocking link 402, which structures the cushion connection mechanism, is non-turnably joined to the front portion of the under cover 354. An upper end of the cover interlocking link 402 is turnably joined to the fixed bracket 252, at the lower side (a position which is offset from the first joint shaft 254) of the first joint shaft 254 (the turning center of the cushion main frame 206). Accordingly, turning of the cover interlocking link 402 and the under cover 354 is locked, and operation of the cushion link mechanism 204 is restricted. In addition to this, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

Next, operation of the present embodiment will be described.

In the seat 400 of the structure described above, in the state in which the cushion main frame 206 is supported at the rear locking mechanism 234 and the fixed bracket 252 and locked, the lower end of the cushion joint link 256 and the upper end of the cover interlocking link 402 are turnably joined to the fixed bracket 252. Thus, turning of the cushion main frame 206, the cushion joint link 256, the cushion sub frame 212, the cover interlocking link 402 and the under cover 354 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 400, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 180° forward, the seat cushion 30 is inverted to be substantially horizontal. Then, the reclining mechanism 18 is controlled, the seat back 12 is tilted forward around the tilting center 16A, and thus the seat back 12 is disposed substantially horizontally at the rear side of the seat cushion 30, and the seat 400 is stowed (known as double-flat stowing) (similarly to FIG. 11).

When the seat 400 is being stowed (when the seat cushion 30 is being turned forward), the cushion main frame 206, the cushion sub frame 212 (including the cushion joint link 256) and the under cover 354 (including the cover interlocking link 402) are turned substantially 180° forward. Thus, a separation in the seat cushion 30 thickness direction between the first joint shaft 254 and the cushion joint link 256 at the position of joining to the cushion sub frame 212 is contracted due to a difference in turning paths of the cushion main frame 206 and the cushion sub frame 212, the cushion sub frame 212 is turned toward the cushion main frame 206 relative to the cushion main frame 206, and the separation in the seat cushion 30 thickness direction between the cushion main frame 206 and the cushion sub frame 212 is contracted. Moreover, a separation in the seat cushion 30 thickness direction between the first joint shaft 254 and the cover interlocking link 402 at the position of joining to the under cover 354 is contracted due to a difference in turning paths of the cushion main frame 206 and the under cover 354, the under cover 354 is turned toward the cushion main frame 206 relative to the cushion main frame 206, and the separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 400, the thickness of the cushion side portion 30B is contracted in the region at the face side relative to the cushion main frame 206, along with which the thicknesses of the cushion side portion 30B and the cushion main portion 30A are contracted in the region at the reverse side relative to the cushion main frame 206, the thicknesses of the cushion side portion 30B and the cushion main portion 30A can be made equal, and space (space at the upper side of the seat cushion 30) in the cabin at times of stowage of the seat 400 (a luggage compartment) can be made larger, along with which interference of the seat cushion 30 with the cabin floor surface 202 can be suppressed.

Thirty-Sixth Embodiment

Figure 76:
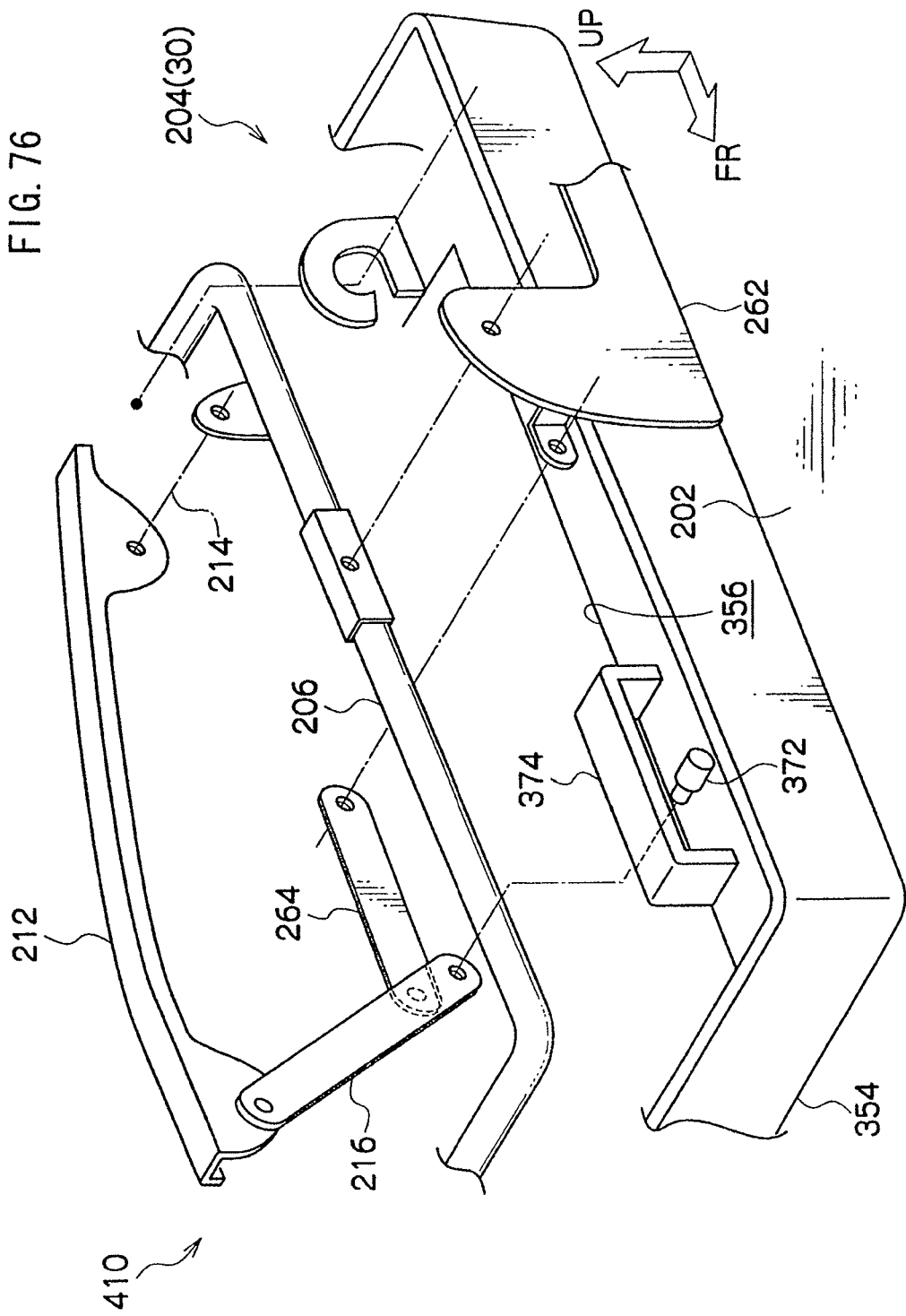
FIG. 76 is an exploded perspective view, viewed from diagonally left forward, showing principal elements of a seat relating to a thirty-sixth embodiment of the present invention.

FIG. 76 shows an exploded perspective view, viewed from diagonally left forward, of principal elements of a seat 410 relating to a thirty-sixth embodiment that is structured with the seat structure of the present invention.

The seat 410 relating to the present embodiment has a substantially similar structure to the above-described thirty-first embodiment, but differs in the following respects.

The seat 410 relating to the present embodiment is formed as what is known as a tip-up stowing type.

At both the left and the right side region, a front-rear direction intermediate portion of the cushion main frame 206 is turnably joined to the leg 262 at the vehicle side, and turning of the cushion main frame 206 relative to the leg 262 is locked. Accordingly, the cushion main frame 206 is supported at the leg 262, and the seat cushion 30 is supported at the vehicle side. Further, the rear portion of the cushion main frame 206 is not directly joined to the lower portion of the back main frame 16.

The cushion front link 216 structures the cushion flexing component. The upper end of the cushion front link 216 is turnably joined to the cushion sub frame 212, along with which the cushion front link 216 is joined to the cushion main frame 206 and the vehicle side. Further, the restricting portion 352 of the above-described thirty-first embodiment is not provided at the cushion front link 216.

The front end of the cushion operation link 264, which serves as the cushion connection mechanism, is turnably joined, at a position other than the upper end (tuning center), to the cushion front link 216. The rear end of the cushion operation link 264 is turnably joined to the leg 262 at the lower side of a position of joining of the cushion main frame 206 (at a position which is offset from this position of joining). Accordingly, turning of the cushion operation link 264, the cushion front link 216 and the cushion sub frame 212 is locked.

The circular shaft-form slide shaft 372 is fixed to the lower end of the cushion front link 216. The slide shaft 372 protrudes outward in the left-right direction from the cushion front link 216.

At both the left and the right side region, the guide plate 374 with the inverted letter-U form plate shape in cross-section, which serves as the guide member, is fixed to the vicinity of the front portion of the upper face of the lower wall of the under cover 354. The upper wall of the guide plate 374 is formed in the flat plate form. The slide shaft 372 passes into the guide plate 374. Accordingly, the upper wall of the guide plate 374 engages with the slide shaft 372, and turning of the under cover 354 to downward is restricted. Thus, operation of the cushion link mechanism 204 is locked, in addition to which the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

Next, operation of the present embodiment will be described.

In the seat 410 of the structure described above, in a state in which turning by the cushion main frame 206 relative to the leg 262 at the vehicle side is locked, the rear end of the cushion operation link 264 is turnably joined to the leg 262.

Thus, turning of the cushion main frame 206, the cushion sub frame 212, the cushion front link 216, the cushion operation link 264 and the under cover 354 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 410, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of turning of the cushion main frame 206 relative to the leg 262 being released and the seat cushion 30 being turned rearward, the seat cushion 30 is disposed substantially vertically at the front side of the seat back 12, and the seat 410 is stowed (known as tip-up stowing) (similarly to FIG. 17).

When the seat 410 is being stowed (when the seat cushion 30 is being turned rearward), the cushion main frame 206 and the cushion operation link 264 (including the cushion front link 216) are turned substantially 90° rearward. Thus, due to a difference in turning paths of the cushion main frame 206 and the cushion operation link 264, the cushion front link 216 turns relative to the cushion main frame 206 and the cushion operation link 264 and, while the cushion sub frame 212 turns toward the cushion main frame 206 relative to the cushion main frame 206, the separation in the seat cushion 30 thickness direction between the cushion main frame 206 and the cushion sub frame 212 is contracted. Moreover, by sliding of the slide shaft 372 of the cushion front link 216 in the guide plate 374, while the under cover 354 is turned toward the cushion main frame 206 relative to the cushion main frame 206, the separation in the seat cushion 30 thickness direction between the cushion main frame 206 and the lower wall of the under cover 354 is contracted. Accordingly, even in a case in which thicknesses of the cushion side portion 30B and the cushion main portion 30A for times of usual use are made thicker, in accordance with stowing of the seat 410, the thickness of the cushion side portion 30B is contracted in the region at the face side relative to the cushion main portion 206, along with which the thicknesses of the cushion side portion 30B and the cushion main portion 30A are contracted in the region at the reverse side relative to the cushion main frame 206, the thicknesses of the cushion side portion 30B and the cushion main portion 30A can be made equal, and space (space at the front side and rear side of the seat 410) in the cabin at times of stowage of the seat 410 (a luggage compartment) can be made larger.

Further, similarly to the above-described twenty-second embodiment, this can have a structure in which the seat 410 is formed as what is known as a tumble-storing type (see FIG. 5A), a structure in which the seat 410 is formed as what is known as a space-increasing storage type (see FIG. 5B), or a structure in which the seat 410 is formed as what is known as a rearward under-floor storage type (see FIG. 5C).

Here, in the present embodiment, a structure is formed in which the rear end of the cushion operation link 264 is turnably joined at the lower side of the position of joining with the cushion main frame 206 of the leg 262. However, a structure may be formed in which the rear end of the cushion operation link 264 is turnably joined at the upper side of the position of joining with the cushion main frame 206 of the leg 262 (at a position which is offset from this position of joining).

Furthermore, in the present embodiment, a structure is formed in which turning of the cushion main frame 206 relative to the leg 262 is locked. However, a structure may be formed in which the lower end of the cushion front link 216 is made lockable at the vehicle side. In this case, a necessity of locking turning of the cushion main frame 206 relative to the leg 262 can be eliminated.

Further, in the present embodiment, a structure is formed in which the cushion front link 216 is slidably joined to the under cover 354, along with which it is turnably joined to the cushion sub frame 212. However, a structure may be formed in which the cushion front link 216 is turnably joined to the under cover 354 along with which it is slidably joined to the cushion sub frame 212. In this case, the structure is acceptable as long as the cushion operation link 264 is turnably joined to a position of the cushion front link 216 other than the position of joining to the under cover 354.

Thirty-Seventh Embodiment

Figure 77:
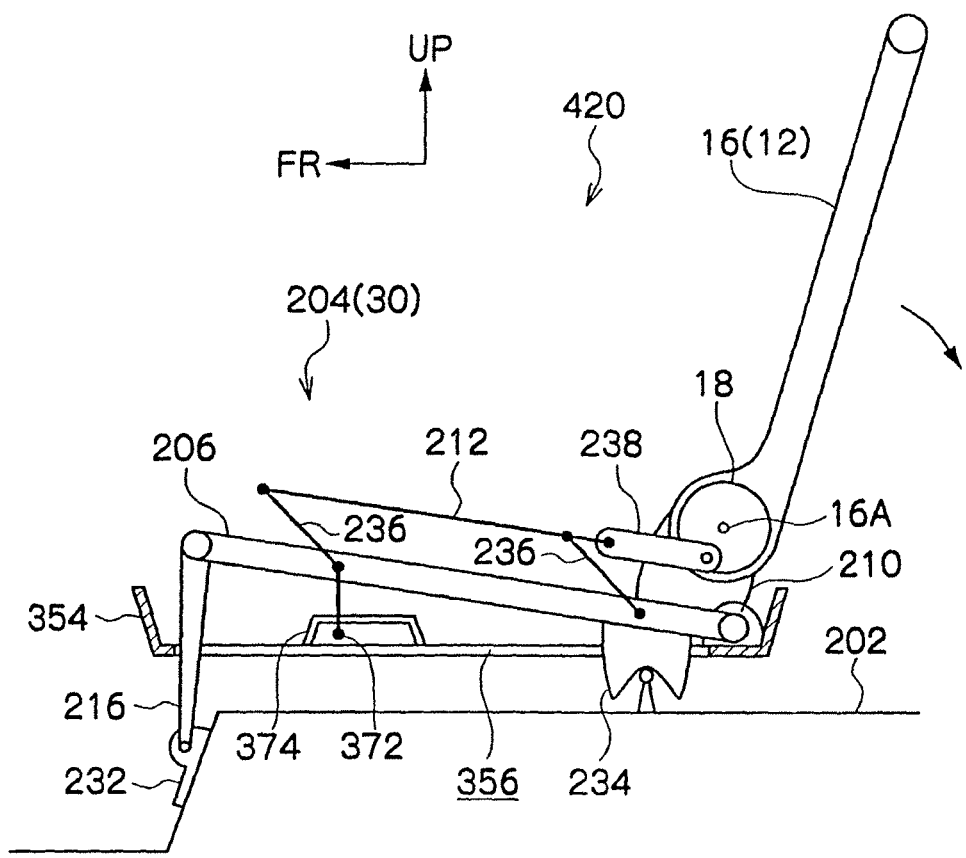
FIG. 77 is a side view, viewed from leftward, showing principal elements of a seat relating to a thirty-seventh embodiment of the present invention.

FIG. 77 shows a side view, viewed from leftward, of principal elements of a seat 420 relating to a thirty-seventh embodiment that is structured with the seat structure of the present invention.

The seat 420 relating to the present embodiment has a substantially similar structure to the above-described thirty-third embodiment, but differs in the following respects.

The seat 420 relating to the present embodiment is formed as what is known as a back rearward-folding stowing type.

The rear end of the cushion joint link 238 is turnably joined to the back main frame 16 at the lower side of the tilting center 16A (a position which is offset from the tilting center 16A). Accordingly, turning of the cushion joint links 236, the cushion sub frame 212, the cushion joint link 238 and the under cover 354 is locked, and operation of the cushion link mechanism 204 is restricted.

Here, with the present embodiment too, effects the same as in the above-described thirty-third embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 420 is stowed (known as rearward-folding stowing).

When the seat 420 is being stowed, the back main frame 16 (the seat back 12) is tilted rearward around the tilting center 16A, and the cushion joint link 238 is moved forward. Thus, by movement of the cushion sub frame 212 which is to say the cushion joint links 236 forward, the cushion joint links 236 are turned, and the separation in the seat cushion 30 thickness direction between the cushion sub frame 212 and the cushion main frame 206 is contracted. Moreover, a separation in the seat cushion 30 thickness direction between the cushion joint link 236 at a position of joining to the cushion main frame 206 and the slide shaft 372 is contracted by sliding of the slide shaft 372 of the cushion joint link 236 in the guide plate 374 and, while the under cover 354 is turned toward the cushion main frame 206 relative to the cushion main frame 206, the separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 420, the thickness of the cushion side portion 30B is contracted in the region at the face side relative to the cushion main frame 206, along with which the thicknesses of the cushion side portion 30B and the cushion main portion 30A are contracted in the region at the reverse side relative to the cushion main frame 206, the thicknesses of the cushion side portion 30B and the cushion main portion 30A can be made equal, and space (space at the upper side of the seat cushion 30) in the cabin at times of stowage of the seat 420 (a luggage compartment) can be made larger.

Further, similarly to the above-described twenty-third embodiment, a structure can be formed in which the seat 420 is formed as what is known as a space-increasing storage type (see FIG. 15).

Figure 78:
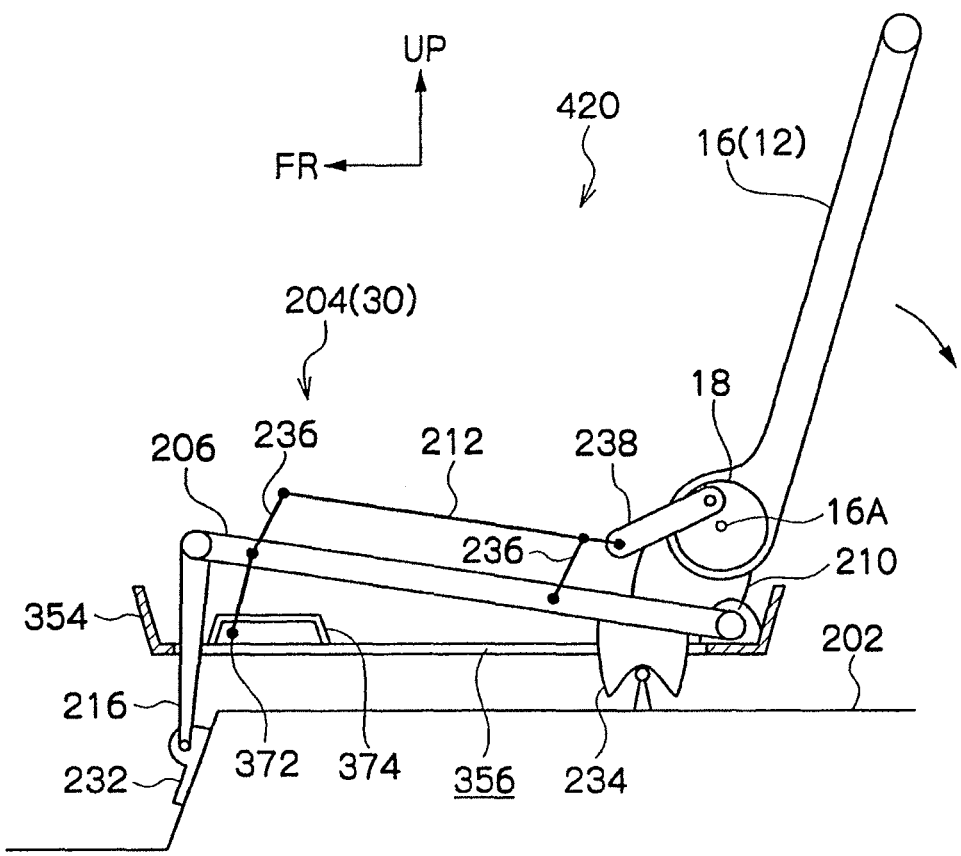
FIG. 78 is a side view, viewed from leftward, showing principal elements of a seat of an alternative example relating to the thirty-seventh embodiment of the present invention.

Here, in the present embodiment, a structure is formed in which the rear end of the cushion joint link 238 is turnably joined to the back main frame 16 at the lower side of the tilting center 16A. However, as shown in FIG. 78, a structure may be formed in which the rear end of the cushion joint link 238 is turnably joined to the back main frame 16 at the upper side of the tilting center 16A (a position which is offset from the tilting center 16A). In this case, when the seat 420 is being stowed, the back main frame 16 (the seat back 12) is tilted rearward around the tilting center 16A, and the cushion joint link 238 is moved rearward. Thus, by movement to rearward of the cushion support portion 208 which is to say the cushion joint links 236, the cushion joint links 236 are turned, and the separation in the seat cushion 30 thickness direction between the cushion sub frame 212 and the cushion main frame 206 is contracted. Moreover, the separation in the seat cushion 30 thickness direction between the cushion joint link 236 at the position of joining to the cushion main frame 206 and the slide shaft 372 is contracted by sliding of the slide shaft 372 of the cushion joint link 236 in the guide plate 374 and, while the under cover 354 is turned toward the cushion main frame 206 relative to the cushion main frame 206, the separation in the seat cushion 30 thickness direction between the cushion main frame 206 and the lower wall of the under cover 354 is contracted.

Thirty-Eighth Embodiment

Figure 79:
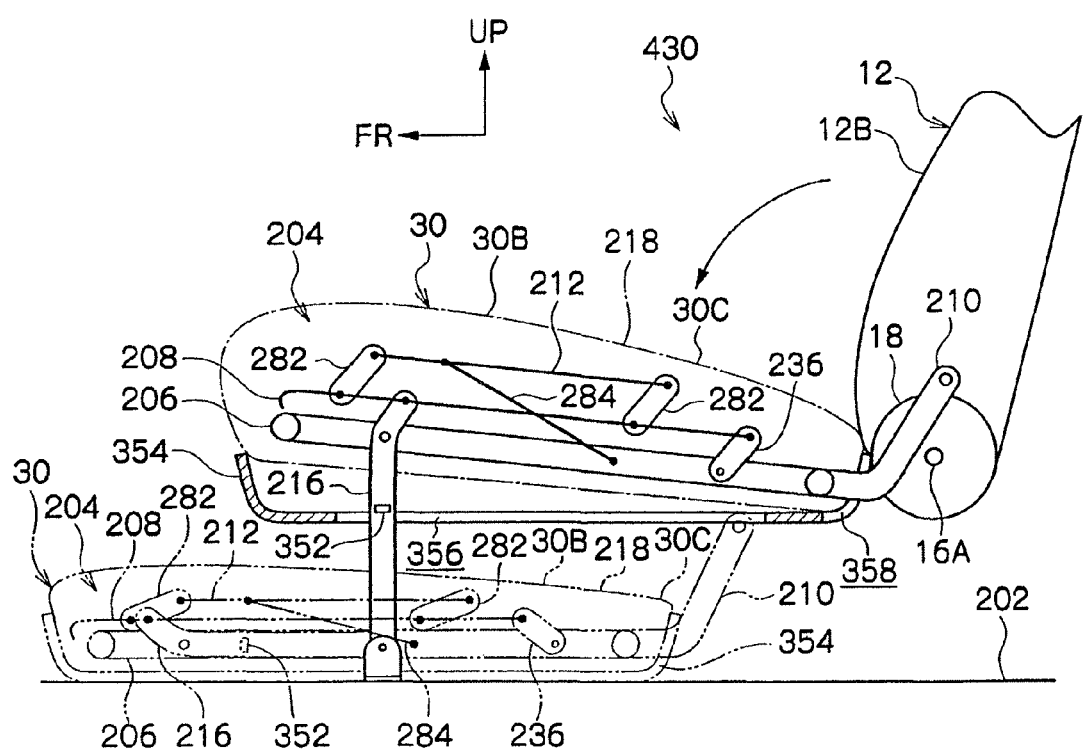
FIG. 79 is a side view, viewed from leftward, showing principal elements of a seat relating to a thirty-eighth embodiment of the present invention.
Figure 80:
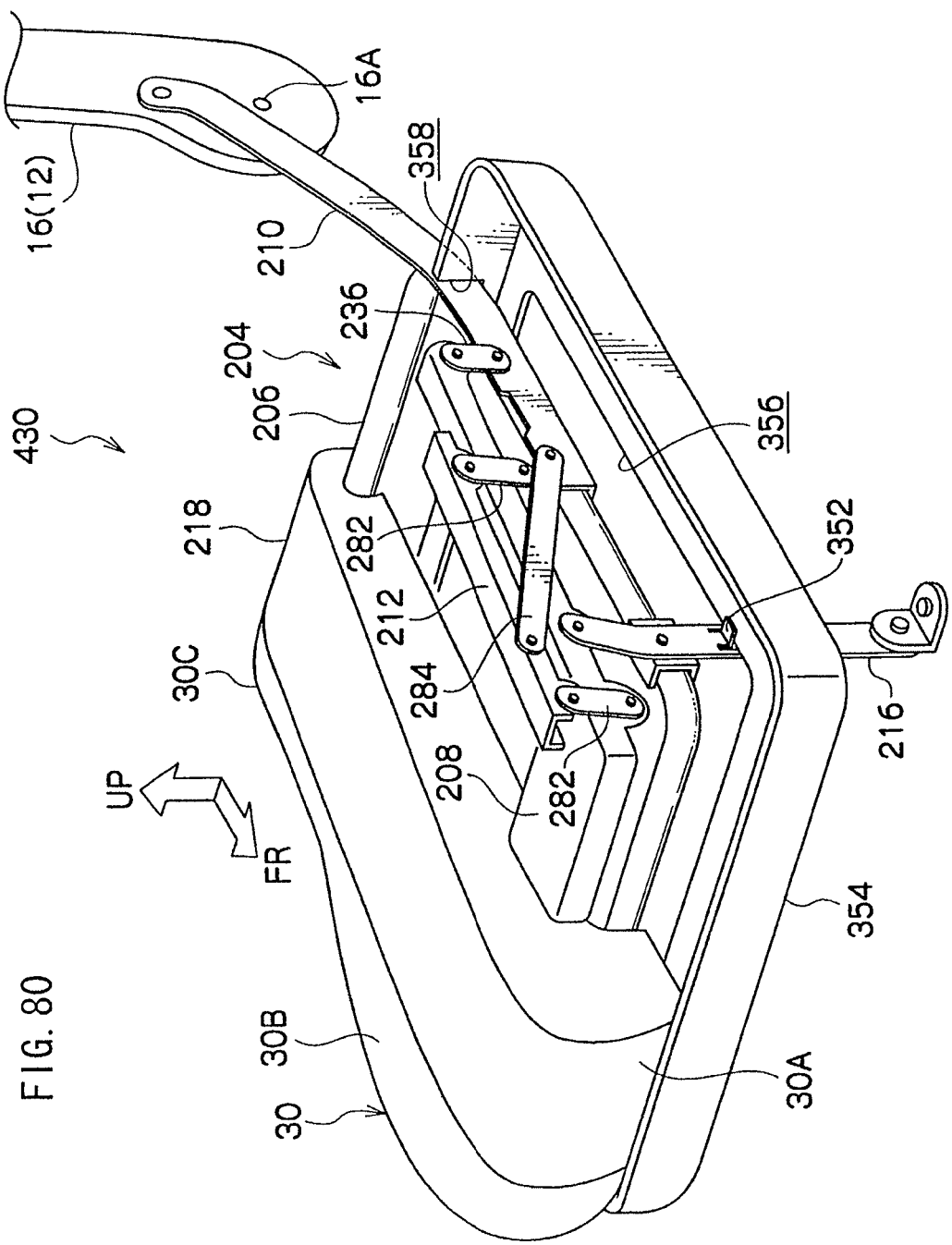
FIG. 80 is a perspective view, viewed from diagonally left forward, showing the principal elements of the seat relating to the thirty-eighth embodiment of the present invention.
Figure 82A:
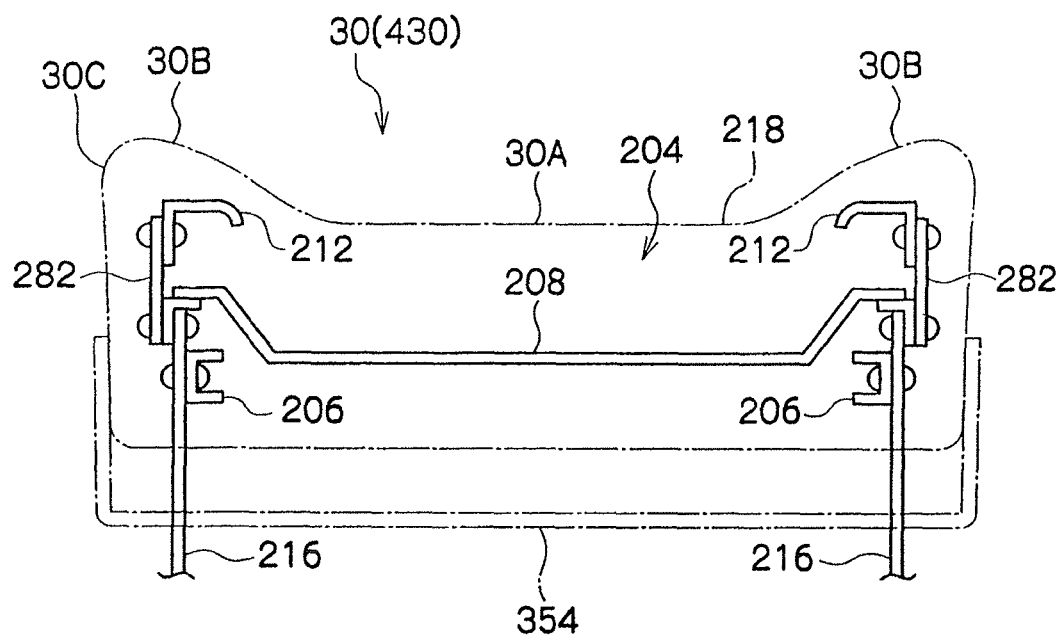
FIG. 82A is a sectional view, viewed from the front end side, showing the principal elements of the seat relating to the thirty-eighth embodiment of the present invention.

FIG. 79 shows a side view, viewed from leftward, of principal elements of a seat 430 relating to a thirty-eighth embodiment that is structured with the seat structure of the present invention. FIG. 80 shows a perspective view, viewed from diagonally left forward, of the principal elements of the seat 430. FIG. 82A shows a sectional view, viewed from forward, of the principal elements of the seat 430.

The seat 430 relating to the present embodiment has a substantially similar structure to the above-described twenty-fourth embodiment, but differs in the following respects.

In the seat 430 relating to the present embodiment, the shaft-form or board-form restricting portion 352 is provided at the cushion front link 216, at the lower side of a position of joining to the cushion main frame 206. The restricting portion 352 protrudes outward in the left-right direction from the cushion front link 216.

At the lower side of the cushion main frame 206 (the reverse side region of the seat cushion 30), the under cover 354 is provided, which serves as the cushion reverse side member of the cushion flexing component. The under cover 354 is formed as a substantially square container, with the upper face open. Both the left and the right side region of the rear portion of the under cover 354 is turnably joined to the respective one of the two left and right side regions of the rear portion of the cushion main frame 206. At the center of the lower wall of the under cover 354, the rectangular aperture aperture 356 is penetratingly formed. The cushion front link 216 passes through the aperture 356. Thus, joining of the cushion main frame 206 with the vehicle side by the cushion front link 216 is enabled. The under cover 354 is engaged with the seat cushion main body 30C (a region of the seat cushion 30 other than the under cover 354), and turning to the lower side is restricted. Accordingly, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C. The restricting portion 352 of the cushion front link 216 abuts against the lower wall of the under cover 354 from the upper side. Accordingly, turning of the under cover 354 to upward is restricted.

At both the left and the right side region, the rear passage hole 358, which is formed to be long, is penetratingly formed in the rear wall of the under cover 354. The rear passage hole 358 is arranged along the up-down direction and opens to the upper side. The arm 210 passes through at the rear passage hole 358. Accordingly, joining of the lower end of the back main frame 16 with the cushion main frame 206 by the aim 210 is enabled.

The whole of the outer peripheral surface of the under cover 354 is covered with the additional cushion face skin (not shown) which serves as the cushion cover member, and the under cover 354 is accommodated in the additional cushion face skin. Accordingly, appearance of the under cover 354, and hence the seat cushion 30, can be improved.

Next, operation of the present embodiment will be described.

In the seat 430 of the structure described above, in the state in which tilting of the back main frame 16 around the tilting center 16A is locked by the reclining mechanism 18, the lower end of the cushion front link 216 is turnably joined to the vehicle side. Thus, turning of the cushion main frame 206, the arm 210, the cushion front link 216, the cushion joint links 236, the cushion support portion 208, the fifth links 282 and the under cover 354 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 430, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Figure 81:
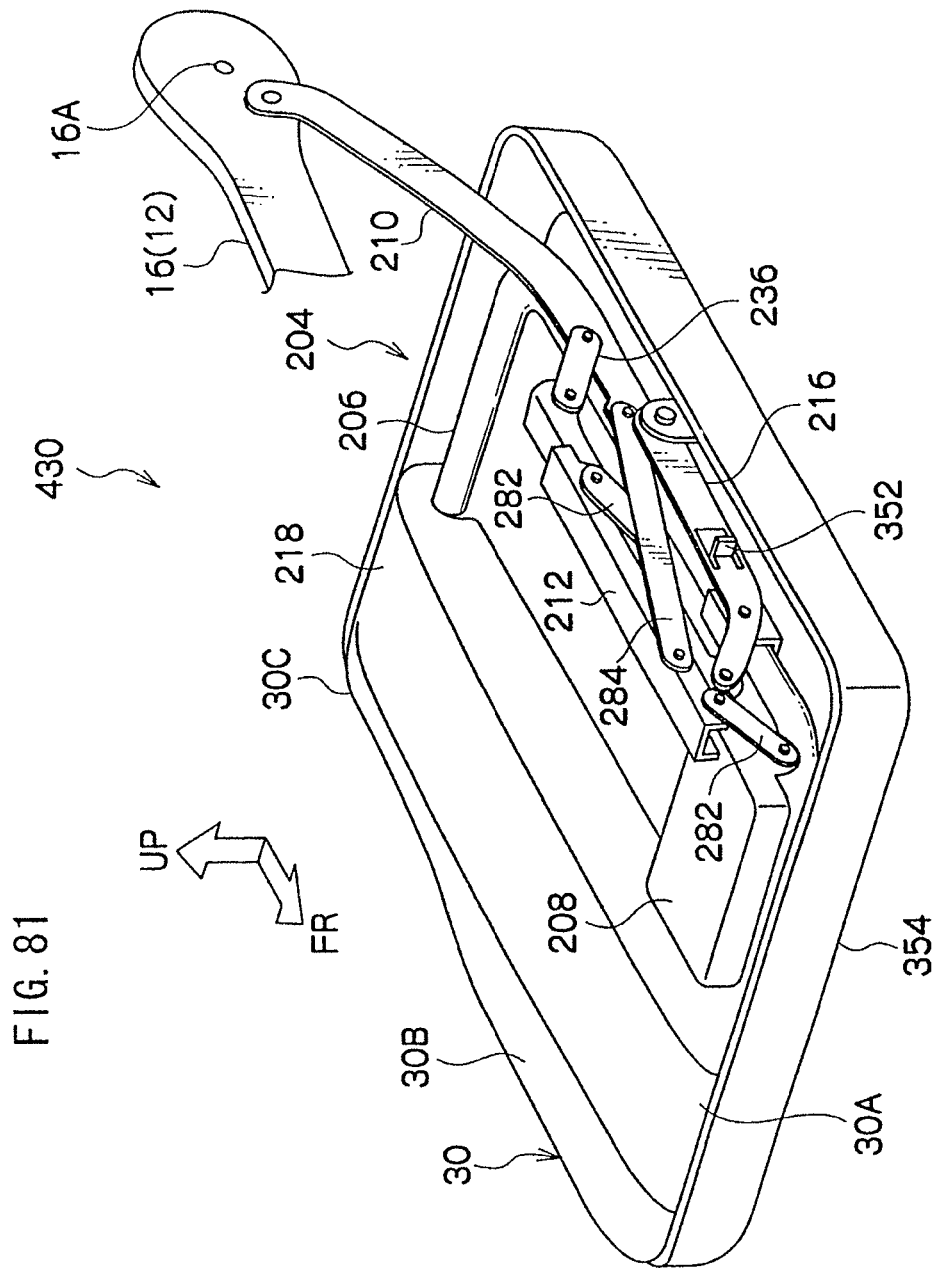
FIG. 81 is a perspective view, viewed from diagonally left forward, showing a stowed state of the principal elements of the seat relating to the thirty-eighth embodiment of the present invention.

By the reclining mechanism 18 being controlled and the seat back 12 being tilted forward around the tilting center 16A, the seat back 12 is folded onto the upper side of the seat cushion 30, and the seat 430 is stowed (known as fold-forward stowing) (see FIG. 81).

When the seat 430 is being stowed, the back main frame 16 (the seat back 12) is tilted forward around the tilting center 16A, and the cushion main frame 206 (the seat cushion 30) is moved forward via the arm 210. Thus, the cushion front link 216 is turned forward, and the seat cushion 30 is moved forward and downward.

Figure 82B:
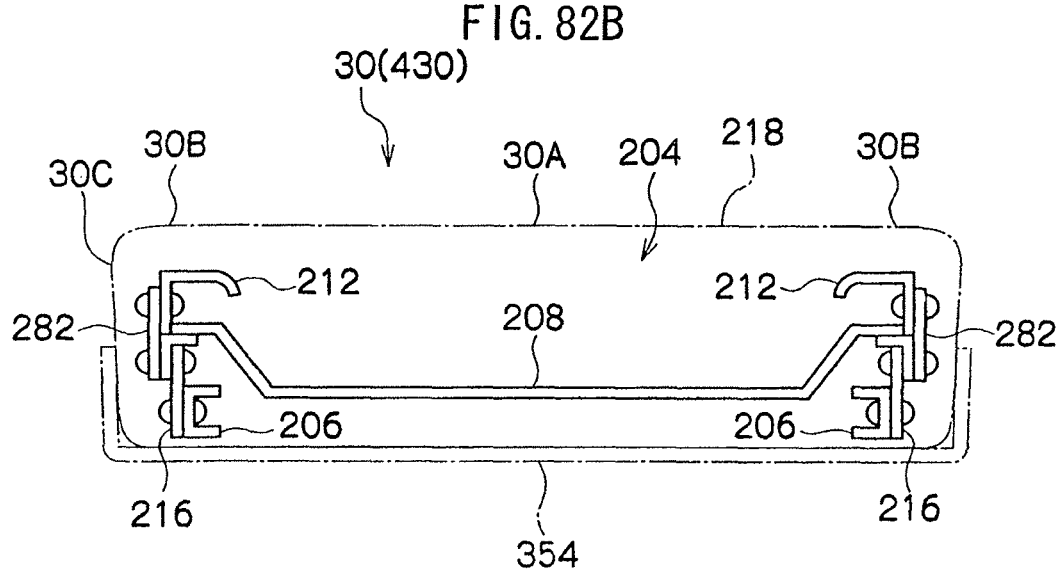
FIG. 82B is a sectional view, viewed from the front end side, showing the stowed state of the principal elements of the seat relating to the thirty-eighth embodiment of the present invention.

Furthermore, when the seat 430 is being stowed, the cushion front link 216 is turned forward and the cushion joint links 236 are turned forward. Thus, the separation in the seat cushion 30 thickness direction between the cushion main frame 206 and the cushion support portion 208 is contracted, along with which the fifth links 282 are turned forward by movement forward of the cushion support portion 208, and the separation in the seat cushion 30 thickness direction between the cushion support portion 208 and the cushion sub frame 212 is contracted (see FIG. 82B). Moreover, a separation in the seat cushion 30 thickness direction between the cushion front link 216 at a position of joining to the cushion main frame 206 and the restricting portion 352 is contracted. By turning of the cushion main frame 206 toward the lower wall side of the under cover 354 relative to the under cover 354, due to abutting of the lower wall of the under cover 354 against the cabin floor surface 202, the seat cushion main body 30C passes into the interior of the under cover 354 until the lower face of the seat cushion main body 30C abuts against the lower wall of the under cover 354. Therefore, even in a case in which thicknesses of the cushion side portion 30B and the cushion main portion 30A for times of usual use are made thicker, in accordance with stowing of the seat 430, the thicknesses of the cushion side portion 30B and the cushion main portion 30A are contracted in the region at the face side and the region at the reverse side relative to the cushion main frame 206 and can be made equal, and space (space at the upper side of the seat 430) in the cabin at times of stowage of the seat 430 (a luggage compartment) can be made larger.

Therefore, with the present embodiment too, effects the same as in the above-described twenty-fourth embodiment can be produced.

Figure 83:
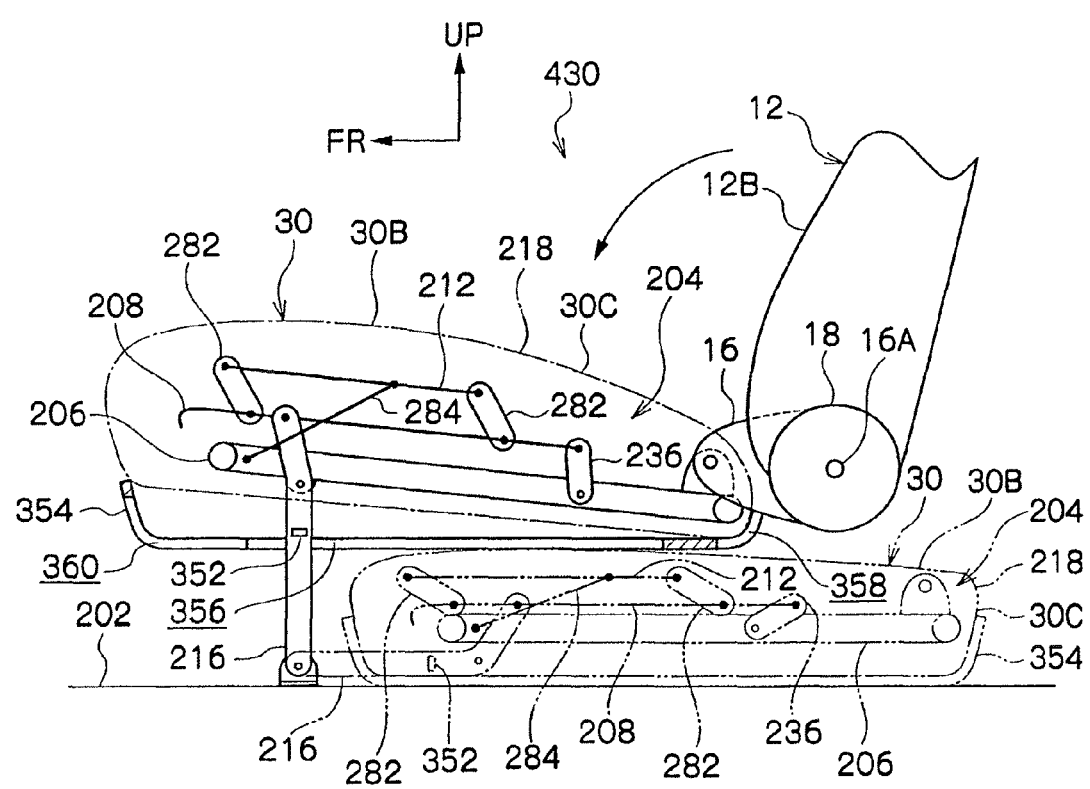
FIG. 83 is a side view, viewed from leftward, showing principal elements of a seat of an alternative example relating to the thirty-eighth embodiment of the present invention.

Here, in the present embodiment, a structure is to led in which both the left and the right side region of the rear portion of the cushion main frame 206 is turnably joined to the back main frame 16 at the upper side of the tilting center 16A via the arm 210. However, as shown in FIG. 83, a structure may be formed in which both the left and the right side region of the rear portion of the cushion main frame 206 is turnably joined to the back main frame 16 at the front side of the tilting center 16A (a position which is offset from the tilting center 16A). In this case, the front end of the sixth link 284 is turnably joined to the cushion main frame 206, along with which the rear end of the sixth link 284 is turnably joined to the cushion sub frame 212 or a position other than the lower end (turning center) of the fifth link 282. At both the left and the right side region, the front passage hole 360, which is formed to be long, is penetratingly formed from the front wall to the front portion of the lower wall of the under cover 354. The front passage hole 360 is arranged along the up-down direction and the front-rear direction at the front side of the cushion front link 216, along with which it is communicated with the aperture 356. Further, when the seat 430 is being stowed, the back main frame 16 (the seat back 12) is tilted forward around the tilting center 16A, and the cushion main frame 206 (the seat cushion 30) is moved forward. Thus, the cushion front link 216 is turned forward while passing into the front passage hole 360, and the seat cushion 30 is moved rearward and downward. Furthermore, when the seat 430 is being stowed, the cushion front link 216 is turned rearward and the cushion joint links 236 are turned rearward. Thus, the separation in the seat cushion 30 thickness direction between the cushion main frame 206 and the cushion support portion 208 is contracted, along with which the fifth links 282 are turned rearward by movement rearward of the cushion support portion 208, and the separation in the seat cushion 30 thickness direction between the cushion support portion 208 and the cushion sub frame 212 is contracted. Moreover, the separation in the seat cushion 30 thickness direction between the cushion front link 216 at a position of joining to the cushion main frame 206 and the restricting portion 352 is contracted. By turning of the cushion main frame 206 toward the lower wall side of the under cover 354 relative to the under cover 354, due to abutting of the lower wall of the under cover 354 against the cabin floor surface 202, the seat cushion main body 30C passes into the interior of the under cover 354 until the lower face of the seat cushion main body 30C abuts against the lower wall of the under cover 354.

Further, in the present embodiment, a structure is formed in which the restricting portion 352 is provided at the cushion front link 216. However, a structure may be formed in which the restricting portion 352 is not provided at the cushion front link 216.

Thirty-Ninth Embodiment

Figure 84:
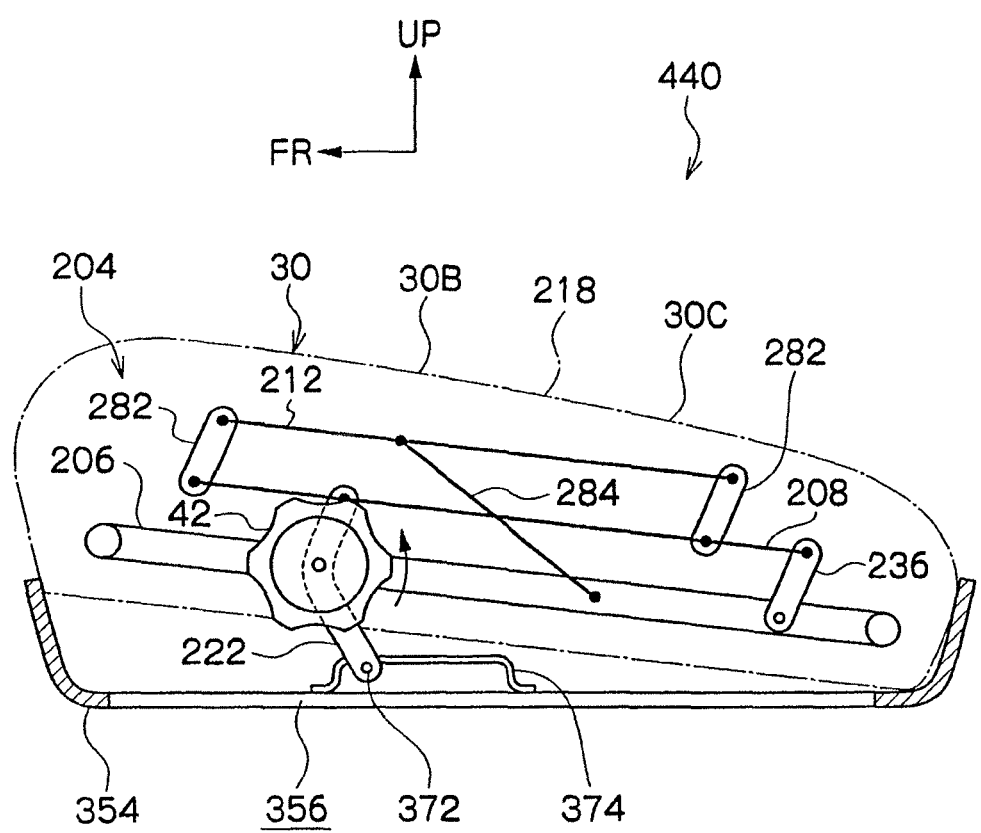
FIG. 84 is a side view, viewed from leftward, showing principal elements of a seat relating to a thirty-ninth embodiment of the present invention.

FIG. 84 shows a side view, viewed from leftward, of principal elements of a seat 440 relating to a thirty-ninth embodiment that is structured with the seat structure of the present invention.

The seat 440 relating to the present embodiment has a substantially similar structure to the above-described thirty-eighth embodiment, but differs in the following respects.

In the seat 440 relating to the present embodiment, the cushion front link 216 is turnably joined, at the upper end, to the front portion of the cushion main frame 206. The cushion front link 216 is not joined to the cushion support portion 208, along with which the restricting portion 352 of the above-described thirty-eighth embodiment is not provided.

At both the left and the right side region of the front portion of the cushion main frame 206, an intermediate portion of the regulation link 222 is turnably joined. The regulation link 222, at the upper end, is turnably joined to the cushion support portion 208. The circular shaft-form slide shaft 372 is fixed to the lower end of the regulation link 222. The slide shaft 372 protrudes outward in the left-right direction from the regulation link 222.

The circular rod-shaped control lever 42 which serves as the control mechanism is engaged at the intermediate portion (turning center) of the regulation link 222. The control lever 42 is formed as a dial-type regulator or the like. A turn-locking mechanism (not shown) which serves as the locking mechanism is provided at the control lever 42. Turning of the control lever 42 is obstructed by the turn-locking mechanism, and thus turning of the regulation link 222, the cushion joint links 236, the cushion support portion 208, the fifth links 282, the cushion sub frame 212 and the sixth link 284 is locked. The control lever 42 protrudes to sideward of the seat cushion 30, and by the control lever 42 being turningly controlled, the regulation link 222 is made turnable.

At both a left and a right side region, the guide plate 374 with the inverted letter-U form plate shape in cross-section which serves as the guide member is fixed to the vicinity of the front portion of the upper face of the lower wall of the under cover 354. The upper wall of the guide plate 374 is formed in a flat plate form. The slide shaft 372 of the regulation link 222 passes into the guide plate 374. Accordingly, the upper wall of the guide plate 374 engages with the slide shaft 372, and turning of the under cover 354 to downward is restricted. Thus, movement of the cushion link mechanism 204 is restricted, in addition to which the under cover 354 covers the lower side of the seat cushion main body 30C.

Next, operation of the present embodiment will be described.

In the seat 440 of the structure described above, in the state in which tilting of the back main frame 16 around the tilting center 16A is locked by the reclining mechanism 18, the lower end of the cushion front link 216 is turnably joined to the vehicle side, in addition to which turning of the control lever 42 is obstructed by the turn-locking mechanism. Thus, turning of the cushion main frame 206, the arm 210, the cushion front link 216, the regulation link 222, the cushion joint links 236, the cushion support portion 208, the fifth links 282, the cushion sub frame 212 and the sixth link 284 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 440, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

In a state in which turning obstruction by the turn locking-mechanism of the control lever 42 is released, by the control lever 42 being turningly controlled and the regulation link 222 and the cushion joint link 236 being turned, the separation in the seat cushion 30 thickness direction between the cushion main frame 206 and the cushion support portion 208 is flexed, along with which, by movement of the cushion support portion 208 to forward or rearward, the fifth links 282 are turned forward or rearward and the separation in the seat cushion 30 thickness direction between the cushion support portion 208 and the cushion sub frame 212 is flexed. Moreover, the separation in the seat cushion 30 thickness direction between the regulation link 222 at the position of joining to the cushion main frame 206 and the slide shaft 372 is flexed by sliding of the slide shaft 372 of the regulation link 222 in the guide plate 374, and the separation in the seat cushion 30 thickness direction between the cushion main frame 206 and the lower wall of the under cover 354 is flexed while the under cover 354 is turned relative to the cushion main frame 206. Accordingly, independently of stowing of the seat 440, the thicknesses of the cushion side portion 30B and the cushion main portion 30A are flexed in the region at the face side and the region at the reverse side relative to the cushion main frame 206, and can be adjusted.

Fortieth Embodiment

Figure 85A:
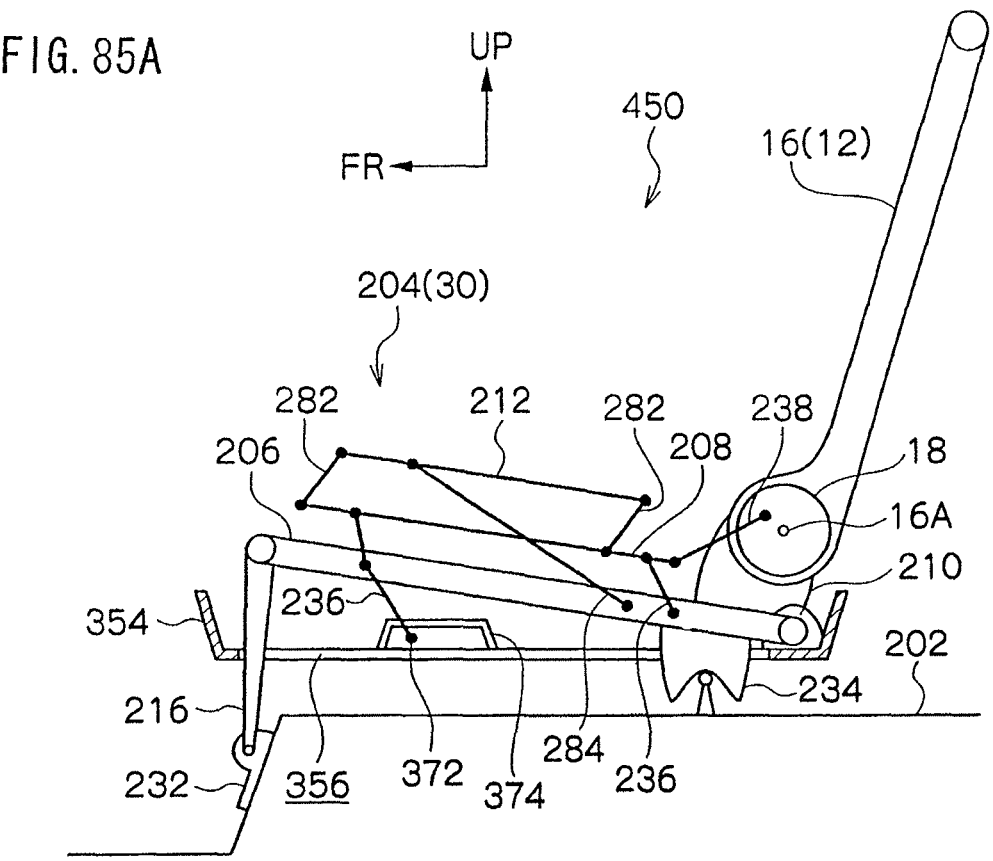
FIG. 85A is a side view, viewed from leftward, showing principal elements of a seat relating to a fortieth embodiment of the present invention.

FIG. 85A shows a side view, viewed from leftward, of principal elements of a seat 450 relating to a fortieth embodiment that is structured with the seat structure of the present invention.

The seat 450 relating to the present embodiment has a substantially similar structure to the above-described thirty-eighth embodiment, but differs in the following respects.

In the present embodiment, the cabin floor surface 202 at the front side of the seat 450 is made lower than the cabin floor surface 202 directly below the seat 450.

The seat 450 relating to the present embodiment is formed as what is known as a back forward-folding stowing type.

The lower end of the cushion front link 216 is turnably joined to the front bracket 232 at the vehicle side. The cushion front link 216 is turnably joined, at the upper end, to the front portion of the cushion main frame 206. The cushion front link 216 does not function as the cushion connection mechanism, and is not directly joined to the cushion support portion 208. Further, the restricting portion 352 of the above-described thirty-eighth embodiment is not provided at the cushion front link 216.

At the lower side of the rear portion of the cushion main frame 206, at both the left and the right side region, the rear locking mechanism 234 which serves as the locking mechanism is engaged. The rear locking mechanism 234 is locked to the vehicle side. Thus, the cushion main frame 206 is supported at the rear locking mechanism 234 and the cushion front link 216, and the seat cushion 30 is supported at the vehicle side. Further, the rear locking mechanism 234 passes through the aperture 356 of the under cover 354. Accordingly, joining of the cushion main frame 206 with the vehicle side by the rear locking mechanism 234 is enabled.

The lower end of the back main frame 16 is turnably joined to the arm 210 to be tiltable around the tilting center 16A. Accordingly, the back main frame 16 is supported at the vehicle side via the arm 210, the cushion main frame 206, the rear locking mechanism 234 and the cushion front link 216, and the seat back 12 is supported at the vehicle side.

The predetermined number (two in the present embodiment) of the cushion joint links 236, which serve as the cushion joining component of the cushion flexing component, are turnably joined, at the upper ends, to the cushion support portion 208. The cushion joint link 236 at the front portion of the cushion support portion 208 is turnably joined, at an intermediate portion, to the cushion main frame 206, along with which the cushion joint link 236 other than that cushion joint link 236 is turnably joined, at the lower end, to the cushion main frame 206.

The circular shaft-form slide shaft 372 is fixed, at the lower end, to the cushion joint link 236 at the front portion of the cushion support portion 208. The slide shaft 372 protrudes outward in the left-right direction from this cushion joint link 236.

At both the left and the right side region, the guide plate 374 with the inverted letter-U form plate shape in cross-section, which serves as the guide member, is fixed to the vicinity of the front portion of the upper face of the lower wall of the under cover 354. The upper wall of the guide plate 374 is formed in the flat plate form. The slide shaft 372 passes into the guide plate 374. Accordingly, the upper wall of the guide plate 374 engages with the slide shaft 372, and turning of the under cover 354 to downward is restricted. Thus, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

The front end of the cushion joint link 238 which serves as the cushion connection mechanism is turnably joined to the rear end of the cushion sub frame 212 or the upper end (anywhere other than the lower end is acceptable) of the cushion joint link 236 at the rear portion of the cushion support portion 208. The rear end of the cushion joint link 238 is turnably joined to the back main frame 16 at the upper side of the tilting center 16A (a position which is offset from the tilting center 16A). Accordingly, turning of the cushion joint links 236, the cushion support portion 208, the fifth links 282, the cushion sub frame 212, the sixth link 284, the cushion joint link 238 and the under cover 354 is locked, and operation of the cushion link mechanism 204 is restricted.

Operation of the present embodiment will be described.

In the seat 450 of the structure described above, in a state in which the cushion main frame 206 is supported at the rear locking mechanism 234 and the cushion front link 216, tilting of the back main frame 16 around the tilting center 16A is locked by the reclining mechanism 18. Thus, turning of the cushion main frame 206, the arm 210, the cushion joint links 236, the cushion support portion 208, the fifth links 282, the cushion sub frame 212, the sixth link 284, the cushion joint link 238 and the under cover 354 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 450, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Figure 85B:
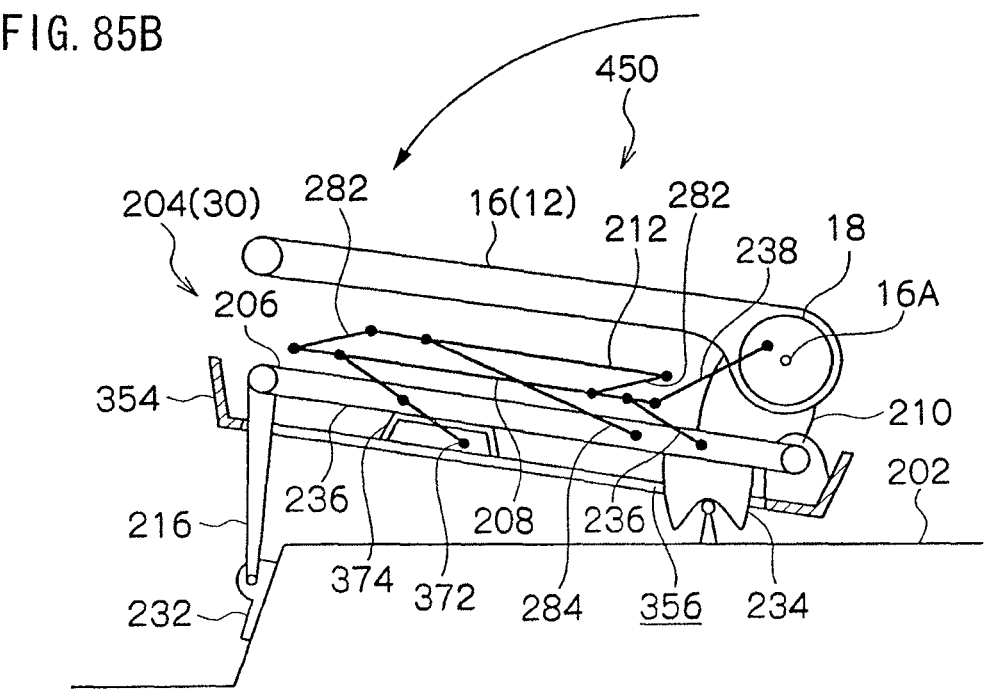
FIG. 85B is a side view, viewed from leftward, showing a stowed state of the principal elements of the seat relating to the fortieth embodiment of the present invention.

By the reclining mechanism 18 being controlled and the seat back 12 being tilted forward around the tilting center 16A, the seat back 12 is folded onto the upper side of the seat cushion 30, and the seat 450 is stowed (known as fold-forward stowing) (see FIG. 85B).

When the seat 450 is being stowed, the back main frame 16 (the seat back 12) is tilted forward around the tilting center 16A, and the cushion joint link 238 is moved forward. Thus, by movement of the cushion support portion 208 which is to say the cushion joint links 236 forward, the cushion joint links 236 are turned forward and the separation in the seat cushion 30 thickness direction between the cushion main frame 206 and the cushion support portion 208 is contracted. Along with this, by movement of the cushion support portion 208 forward, the fifth links 282 are turned forward and the separation in the seat cushion 30 thickness direction between the cushion support portion 208 and the cushion sub frame 212 is contracted. Moreover, by sliding of the slide shaft 372 of the cushion joint link 236 in the guide plate 374, the separation in the seat cushion 30 thickness direction between the cushion joint link 236 at the position of joining to the cushion main frame 206 and the slide shaft 372 is contracted and, while the under cover 354 is turned toward the cushion main frame 206 relative to the cushion main frame 206, the separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 450, the thicknesses of the cushion side portion 30B and the cushion main portion 30A are contracted in the region at the front side and the region at the reverse side relative to the cushion main frame 206 and can be made equal, and space (space at the upper side of the seat 450) in the cabin at times of stowage of the seat 450 (a luggage compartment) can be made larger.

Therefore, with the present embodiment too, effects the same as in the above-described thirty-eighth embodiment can be produced.

Figure 86:
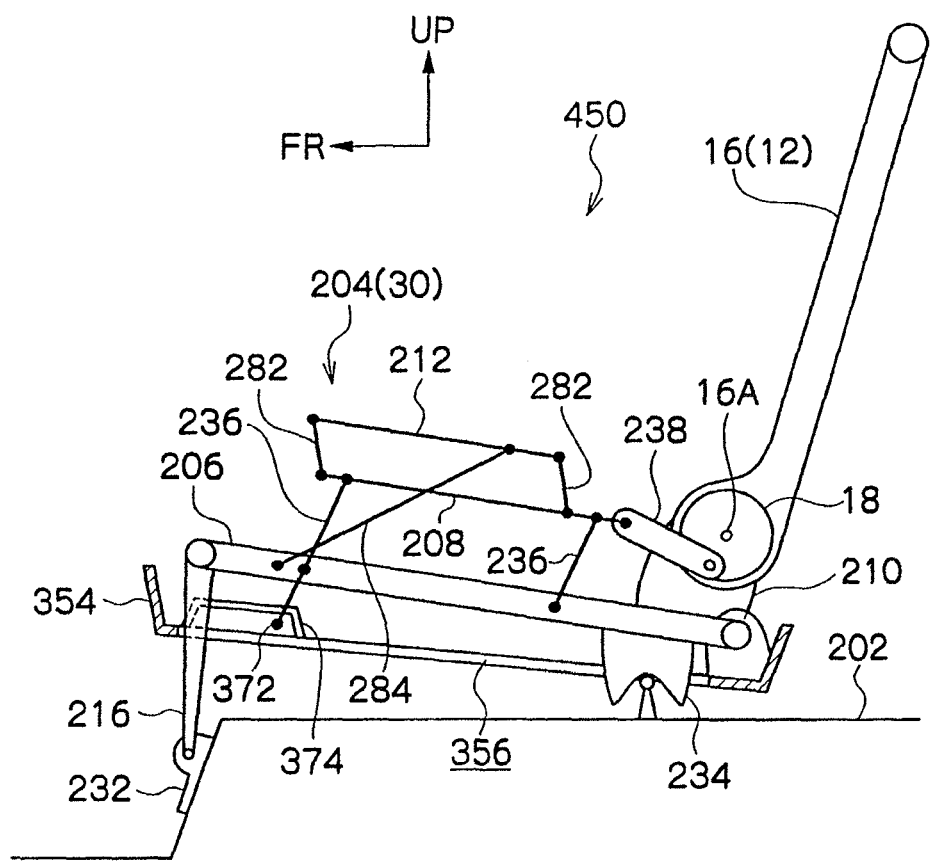
FIG. 86 is a side view, viewed from leftward, showing principal elements of a seat of an alternative example relating to the fortieth embodiment of the present invention.

Here, in the present embodiment, a structure is formed in which the rear end of the cushion joint link 238 is turnably joined to the back main frame 16 at the upper side of the tilting center 16A. However, as shown in FIG. 86, a structure may be formed in which the rear end of the cushion joint link 238 is turnably joined to the back main frame 16 at the lower side of the tilting center 16A (a position which is offset from the tilting center 16A). In this case, the front end of the sixth link 284 is turnably joined to the cushion main frame 206, along with which the rear end of the sixth link 284 is turnably joined to the cushion sub frame 212 or a position other than the lower end (turning center) of the fifth links 282. Furthermore, when the seat 450 is being stowed, the back main frame 16 (the seat back 12) is tilted forward around the tilting center 16A, and the cushion joint link 238 is moved rearward. Thus, by movement of the cushion support portion 208 which is to say the cushion joint links 236 rearward, the cushion joint links 236 are turned rearward, and the separation in the seat cushion 30 thickness direction between the cushion main frame 206 and the cushion support portion 208 is contracted, along with which, by movement of the cushion support portion 208 rearward, the fifth links 282 are turned rearward, and the separation in the seat cushion 30 thickness direction between the cushion support portion 208 and the cushion sub frame 212 is contracted. Moreover, by sliding of the slide shaft 372 of the cushion joint link 236 in the guide plate 374, the separation in the seat cushion 30 thickness direction between the cushion joint link 236 and the position of joining to the cushion main frame 206 and the slide shaft 372 is contracted and, while the under cover 354 is turned toward the cushion main frame 206 relative to the cushion main frame 206, the separation in the seat cushion 30 thickness direction between the cushion main frame 206 and the lower wall of the under cover 354 is contracted.

Forty-First Embodiment

Figure 87:
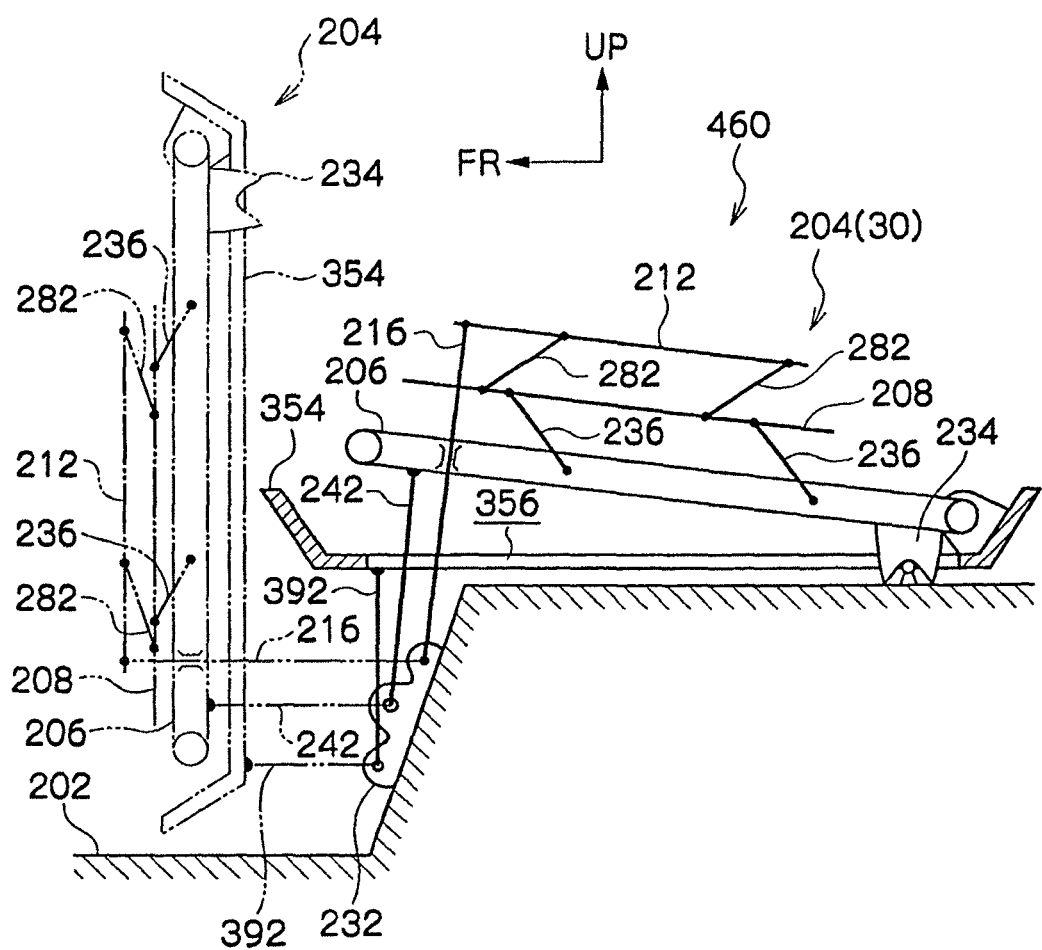
FIG. 87 is a side view, viewed from leftward, showing principal elements of a seat relating to a forty-first embodiment of the present invention.

FIG. 87 shows a side view, viewed from leftward, of principal elements of a seat 460 relating to a forty-first embodiment that is structured with the seat structure of the present invention.

The seat 460 relating to the present embodiment has a substantially similar structure to the above-described thirty-eighth embodiment, but differs in the following respects.

In the present embodiment, the cabin floor surface 202 at the front side of the seat 460 is made lower than the cabin floor surface 202 directly below the seat 460.

The seat 460 relating to the present embodiment is formed as what is known as a double-folded stowing type.

At both the left and the right side region, the upper end of the fourth link 242 is non-turnably joined to the lower side of the front portion of the cushion main frame 206. The lower end of the fourth link 242 is turnably joined to the front bracket 232 at the vehicle side. In the present embodiment, the arm 210 of the above-described thirty-eighth embodiment is not provided.

At both the left and the right side region, the rear locking mechanism 234 which serves as the locking mechanism is engaged at the lower side of the rear portion of the cushion main frame 206, and the rear locking mechanism 234 is locked to the vehicle side. Thus, the cushion main frame 206 is supported at the rear locking mechanism 234 and the fourth link 242, and the seat cushion 30 is supported at the vehicle side.

Further, the rear locking mechanism 234 and the fourth link 242 pass through the aperture 356 of the under cover 354. Accordingly, joining of the cushion main frame 206 with the vehicle side by the rear locking mechanism 234 and the fourth link 242 is enabled.

The predetermined number (two in the present embodiment) of the cushion joint links 236 are turnably joined, at the lower ends, to both the left and the right side region of the cushion main frame 206. The predetermined number of the cushion joint links 236 are turnably joined, at the upper ends, to both the left and the right side region of the cushion support portion 208.

The lower end of the cushion front link 216 is turnably joined to the front bracket 232 at the vehicle side, at the rear side of the position of joining to the front bracket 232 (turning center) of the fourth link 242 (at a position which is offset from this joining position). The cushion front link 216 is joined in a condition of being movable, in the length direction, at the cushion main frame 206. The cushion front link 216, at the upper end, is non-turnably joined to the cushion sub frame 212. Accordingly, turning of the cushion front link 216, the cushion joint links 236, the cushion support portion 208, the fifth links 282 and the cushion sub frame 212 is locked. Further, the restricting portion 352 of the thirty-eighth embodiment is not provided at the cushion front link 216. Further yet, in the present embodiment, the sixth link 284 of the thirty-eighth embodiment is not provided.

At the lower side of both the left and the right side region, the upper end of the seventh link 392 which structures the cushion connection mechanism is non-turnably joined to the front portion of the lower wall of the under cover 354. The lower end of the seventh link 392 is turnably joined to the front bracket 232 at the vehicle side, at the front side of the position of joining to the front bracket 232 (turning center) of the fourth link 242 (at a position which is offset from this joining position). Accordingly, turning of the seventh link 392 and the under cover 354 is locked, and operation of the cushion link mechanism 204 is restricted. In addition to this, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

Next, operation of the present embodiment will be described.

In the seat 460 of the structure described above, in the state in which the cushion main frame 206 is supported at the rear locking mechanism 234 and the fourth link 242 and locked, the lower ends of the cushion front link 216 and the seventh link 392 are turnably joined to the vehicle side. Thus, turning of the fourth link 242, the cushion main frame 206, the cushion front link 216, the cushion sub frame 212, the cushion joint links 236, the cushion support portion 208, the fifth links 282, the cushion sub frame 212, the seventh link 392 and the under cover 354 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 460, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 90° forward, the seat cushion 30 is stood up substantially vertically. Then, the reclining mechanism 18 is controlled, the seat back 12 is tilted forward around the tilting center 16A, and thus the seat back 12 is disposed substantially horizontally at the rear side of the seat cushion 30, and the seat 460 is stowed (known as double-folded stowing) (similarly to FIG. 10).

When the seat 460 is being stowed (when the seat cushion 30 is being turned forward), the fourth link 242, the cushion front link 216 and the seventh link 392 are turned substantially 90° forward. Thus, a separation in the seat cushion 30 thickness direction between the fourth link 242 at the position of joining to the cushion main frame 206 and the cushion front link 216 at the position of joining to the cushion sub frame 212 is contracted due to the difference in turning paths of the fourth link 242 and the cushion front link 216 and, while the cushion joint links 236 and the fifth links 282 are turned, the separation in the seat cushion 30 thickness direction between the cushion main frame 206 and the cushion support portion 208 and the separation in the seat cushion 30 thickness direction between the cushion support portion 208 and the cushion sub frame 212 are contracted. Moreover, a separation in the seat cushion 30 thickness direction between the fourth link 242 at the position of joining to the cushion main frame 206 and the seventh link 392 at the position of joining to the under cover 354 is contracted due to the difference in turning paths of the fourth link 242 and the seventh link 392, and the cushion main frame 206 is turned toward the under cover 354 relative to the under cover 354 and the separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 460, the thicknesses of the cushion side portion 30B and the cushion main portion 30A are contracted in the region at the face side and the region at the reverse side relative to the cushion main frame 206 and can be made equal, and space (space at the front side and rear side of the seat cushion 30) in the cabin at times of stowage of the seat 460 (a luggage compartment) can be made larger, along with which a possible angle of tilting (reclining), to rearward, of a seat (not shown) at the front side of the seat 460 can be made larger.

Forty-Second Embodiment

Figure 88:
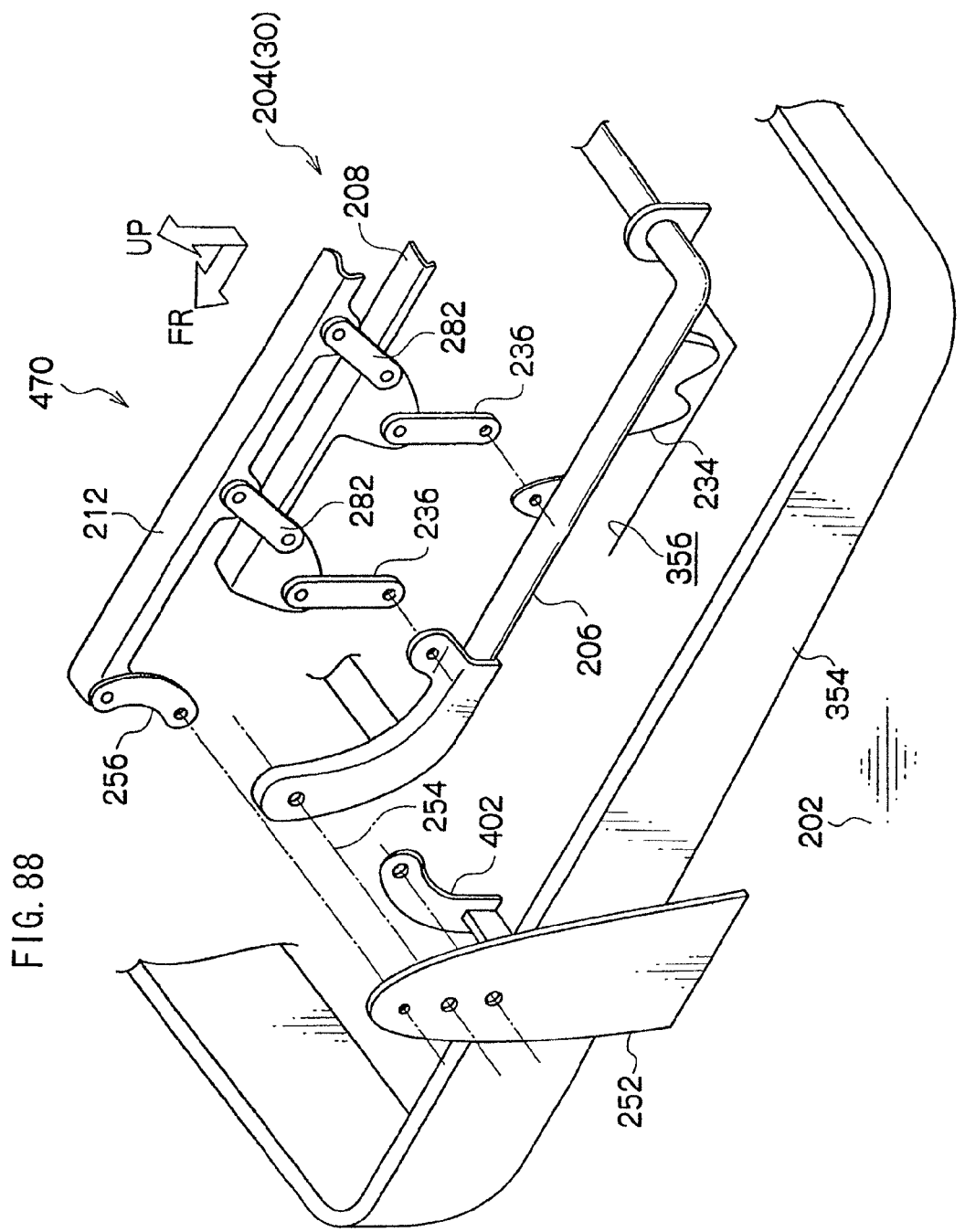
FIG. 88 is an exploded perspective view, viewed from diagonally left rearward, showing principal elements of a seat relating to a forty-second embodiment of the present invention.

FIG. 88 shows an exploded perspective view, viewed from diagonally left rearward, of principal elements of a seat 470 relating to a forty-second embodiment that is structured with the seat structure of the present invention.

The seat 470 relating to the present embodiment has a substantially similar structure to the above-described thirty-eighth embodiment, but differs in the following respects.

The seat 470 relating to the present embodiment is formed as what is known as a double-flat stowing type.

At both the left and the right side region, the front portion of the cushion main frame 206 is turnably joined to the fixed bracket 252 at the vehicle side by the first joint shaft 254. Further, in the present embodiment, the arm 210 and the cushion front link 216 (including the restricting portion 352) of the above-described thirty-eighth embodiment is not provided.

At both the left and the right side region, the rear locking mechanism 234 which serves as the locking mechanism is engaged with the lower side of the rear portion of the cushion main frame 206, and the rear locking mechanism 234 is locked to the vehicle side. Thus, the cushion main frame 206 is supported at the rear locking mechanism 234 and the fixed bracket 252, and the seat cushion 30 is supported at the vehicle side. Further, the rear locking mechanism 234 passes through the aperture 356 of the under cover 354. Accordingly, joining of the cushion main frame 206 with the vehicle side by the rear locking mechanism 234 is enabled.

The predetermined number (two in the present embodiment) of the cushion joint links 236 are turnably joined, at the lower ends, to both the left and the right side region of the cushion main frame 206. The predetermined number of the cushion joint links 236 are turnably joined, at the upper ends, to both the left and the right side region of the cushion support portion 208.

The upper end of the cushion joint link 256 which structures the cushion connection mechanism is non-turnably joined to the front portion of the cushion sub frame 212, and the lower end of the cushion joint link 256 is turnably joined to the fixed bracket 252 at an upper side (a position which is offset from the first joint shaft 254) of the first joint shaft 254 (a turning center of the cushion main frame 206). Accordingly, turning of the cushion joint link 256, the cushion joint links 236, the cushion support portion 208, the fifth links 282 and the cushion sub frame 212 is locked. Further, in the present embodiment, the sixth link 284 of the above-described thirty-eighth embodiment is not provided.

At both the left and the right side region, the lower end of the cover interlocking link 402 which structures the cushion connection mechanism is non-turnably joined to the front portion of the under cover 354. The upper end of the cover interlocking link 402 is turnably joined to the fixed bracket 252, at the lower side (a position which is offset from the first joint shaft 254) of the first joint shaft 254 (the turning center of the cushion main frame 206). Accordingly, turning of the cover interlocking link 402 and the under cover 354 is locked, and operation of the cushion link mechanism 204 is restricted. In addition to this, the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

Next, operation of the present embodiment will be described.

In the seat 470 of the structure described above, in the state in which the cushion main frame 206 is supported at the rear locking mechanism 234 and the fixed bracket 252 and locked, the lower end of the cushion joint link 256 and the upper end of the cover interlocking link 402 are turnably joined to the fixed bracket 252. Thus, turning of the cushion main frame 206, the cushion joint link 256, the cushion joint links 236, the cushion support portion 208, the fifth links 282, the cushion sub frame 212, the cover interlocking link 402 and the under cover 354 is locked, and operation of the cushion link mechanism 204 is restricted. Therefore, a supporting rigidity of the cushion side portion 30B from the lower side can be enhanced by the cushion link mechanism 204 (the cushion sub frame 212), and even when a load in the left-right direction acts on the cushion side portion 30B from a crew sitting in the seat 470, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of the rear locking mechanism 234 to the vehicle side being released and the seat cushion 30 being turned substantially 180° forward, the seat cushion 30 is inverted to be substantially horizontal. Then, the reclining mechanism 18 is controlled, the seat back 12 is tilted forward around the tilting center 16A, and thus the seat back 12 is disposed substantially horizontally at the rear side of the seat cushion 30, and the seat 470 is stowed (known as double-flat stowing) (similarly to FIG. 11).

When the seat 470 is being stowed (when the seat cushion 30 is being turned forward), the cushion main frame 206, the cushion sub frame 212 (including the cushion joint link 256) and the under cover 354 (including the cover interlocking link 402) are turned substantially 180° forward. Thus, the separation in the seat cushion 30 thickness direction between the first joint shaft 254 and the cushion joint link 256 at the position of joining to the cushion sub frame 212 is contracted due to the difference in turning paths of the cushion main frame 206 and the cushion sub frame 212 and, while the cushion joint links 236 and the fifth links 282 are turned, the separation in the seat cushion 30 thickness direction between the cushion main frame 206 and the cushion support portion 208 and the separation in the seat cushion 30 thickness direction between the cushion support portion 208 and the cushion sub frame 212 are contracted. Moreover, the separation in the seat cushion 30 thickness direction between the first joint shaft 254 and the cover interlocking link 402 at the position of joining to the under cover 354 is contracted due to the difference in turning paths of the cushion main frame 206 and the under cover 354, and the under cover 354 is turned toward the cushion main frame 206 relative to the cushion main frame 206 and the separation in the seat cushion 30 thickness direction between the cushion main frame 206 and the lower wall of the under cover 354 is contracted. Accordingly, even in a case in which thicknesses of the cushion side portion 30B and the cushion main portion 30A for times of usual use are made thicker, in accordance with stowing of the seat 470, the thicknesses of the cushion side portion 30B and the cushion main portion 30A are contracted in the region at the face side and the region at the reverse side relative to the cushion main frame 206 and can be made equal, and space (space at the upper side of the seat cushion 30) in the cabin at times of stowage of the seat 470 (a luggage compartment) can be made larger, along with which interference of the seat cushion 30 with the cabin floor surface 202 can be suppressed.

Forty-Third Embodiment

Figure 89:
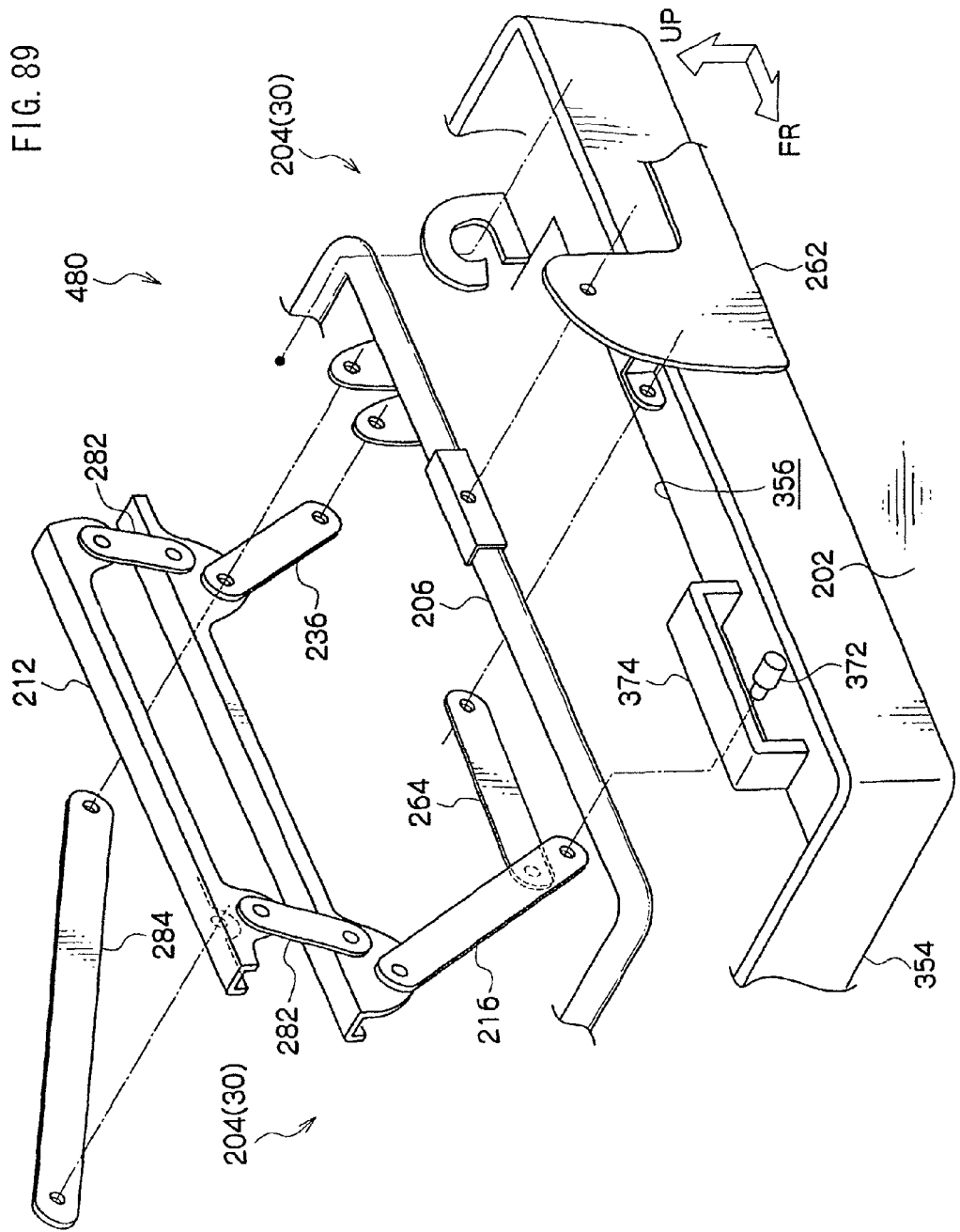
FIG. 89 is an exploded perspective view, viewed from diagonally left forward, showing principal elements of a seat relating to a forty-third embodiment of the present invention.

FIG. 89 shows an exploded perspective view, viewed from diagonally left forward, of principal elements of a seat 480 relating to a forty-third embodiment that is structured with the seat structure of the present invention.

The seat 480 relating to the present embodiment has a substantially similar structure to the above-described thirty-eighth embodiment, but differs in the following respects.

The seat 480 relating to the present embodiment is formed as what is known as a tip-up stowing type.

At both the left and the right side region, a front-rear direction intermediate portion of the cushion main frame 206 is turnably joined to the leg 262 at the vehicle side, and turning of the cushion main frame 206 relative to the leg 262 is locked. Accordingly, the cushion main frame 206 is supported at the leg 262, and the seat cushion 30 is supported at the vehicle side. In the present embodiment, the arm 210 of the above-described thirty-eighth embodiment is not provided.

The cushion front link 216 structures the cushion flexing component, and the lower end of the cushion front link 216 is joined to the cushion main frame 206 and the vehicle side. Further, the restricting portion 352 of the above-described thirty-eighth embodiment is not provided at the cushion front link 216.

The front end of the cushion operation link 264 which serves as the cushion connection mechanism is turnably joined to the cushion front link 216, at a position other than the upper end (turning center). The rear end of the cushion operation link 264 is turnably joined to the leg 262 at the lower side of the position of joining of the cushion main frame 206 (at a position which is offset from this position of joining). Accordingly, turning of the cushion operation link 264, the cushion front link 216, the cushion joint links 236, the cushion support portion 208, the fifth links 282, the cushion sub frame 212 and the sixth link 284 is locked.

The circular shaft-form slide shaft 372 is fixed to the lower end of the cushion front link 216. The slide shaft 372 protrudes outward in the left-right direction from the cushion front link 216.

At both the left and the right side region, the guide plate 374 with the inverted letter-U form plate shape in cross-section, which serves as the guide member, is fixed to the vicinity of the front portion of the upper face of the lower wall of the under cover 354. The upper wall of the guide plate 374 is formed in the flat plate form. The slide shaft 372 passes into the guide plate 374. Accordingly, the upper wall of the guide plate 374 engages with the slide shaft 372, and turning of the under cover 354 to downward is restricted. Thus, operation of the cushion link mechanism 204 is locked, in addition to which the under cover 354 covers the lower side of the seat cushion main body 30C, along with which the lower wall of the under cover 354 and the cushion main frame 206 are separated, and a gap is formed between the lower wall of the under cover 354 and the lower face of the seat cushion main body 30C.

Next, operation of the present embodiment will be described.

In the seat 480 of the structure described above, in a state in which the cushion main frame 206 is joined to the leg 262 while turning is locked, the cushion operation link 264 is turnably joined to the leg 262. Thus, turning of the cushion operation link 264, the cushion front link 216, the cushion joint links 236, the cushion support portion 208, the fifth links 282, the cushion sub frame 212, the sixth link 284 and the under cover 354 is locked, and operation of the cushion link mechanism 204 is restricted. Therefore, a supporting rigidity from the lower side of the cushion side portion 30B can be enhanced by the cushion link mechanism 204 (the cushion sub frame 212), and even when a load in the left-right direction acts on the cushion side portion 30B from a crew sitting in the seat 480, the cushion side portion 30B can thoroughly retain the crew.

Moreover, the operation plane of the cushion link mechanism 204 (the turning plane of the cushion sub frame 212) is made perpendicular to the left-right direction of the seat cushion 30. Therefore, a supporting rigidity of the cushion side portion 30B with respect to a load in the left-right direction of the seat cushion 30 can be enhanced by the cushion link mechanism 204, and even when a load in the left-right direction acts on the cushion side portion 30B from a crew sitting in the seat 10, the cushion side portion 30B can even more thoroughly retain the crew.

Further, by the locking of turning of the cushion main frame 206 relative to the leg 262 being released and the seat cushion 30 being turned rearward, the seat cushion 30 is disposed substantially vertically at the front side of the seat back 12, and the seat 480 is stowed (known as tip-up stowing) (similarly to FIG. 17).

When the seat 480 is being stowed (when the seat cushion 30 is being turned rearward), the cushion main frame 206 and the cushion operation link 264 (including the cushion front link 216) are turned substantially 90° rearward. Thus, due to the difference in turning paths of the cushion main frame 206 and the cushion operation link 264, the cushion front link 216 turns relative to the cushion main frame 206 and the cushion operation link 264 and, while the cushion joint links 236 and the fifth links 282 are turned, the separation in the seat cushion 30 thickness direction between the cushion main frame 206 and the cushion support portion 208 and the separation in the seat cushion 30 thickness direction between the cushion support portion 208 and the cushion sub frame 212 are contracted. Moreover, by sliding of the slide shaft 372 of the cushion front link 216 in the guide plate 374, while the under cover 354 is turned toward the cushion main frame 206 relative to the cushion main frame 206, the separation in the seat cushion 30 thickness direction between the cushion main frame 206 and the lower wall of the under cover 354 is contracted. Accordingly, even in a case in which thicknesses of the cushion side portion 30B and the cushion main portion 30A for times of usual use are made thicker, in accordance with stowing of the seat 480, the thicknesses of the cushion side portion 30B and the cushion main portion 30A are contracted in the region at the face side and the region at the reverse side relative to the cushion main frame 206 and can be made equal, and space (space at the front side and rear side of the seat 480) in the cabin at times of stowage of the seat 480 (a luggage compartment) can be made larger.

Further, similarly to the above-described twenty-second embodiment, this can have a structure in which the seat 480 is formed as what is known as a tumble-storing type (see FIG. 5A), a structure in which the seat 480 is formed as what is known as a space-increasing storage type (see FIG. 5B), or a structure in which the seat 480 is formed as what is known as a rearward under-floor storage type (see FIG. 5C).

Here, in the present embodiment, a structure is formed in which the cushion operation link 264 is turnably joined at the lower side of the position of joining with the cushion main frame 206 of the leg 262. However, a structure may be formed in which the rear end of the cushion operation link 264 is turnably joined at the upper side of the position of joining with the cushion main frame 206 of the leg 262 (at a position which is offset from this position of joining).

Furthermore, in the present embodiment, a structure is formed in which turning of the cushion main frame 206 relative to the leg 262 is locked. However, a structure may be formed in which the lower end of the cushion front link 216 is made lockable at the vehicle side. In this case, a necessity of locking turning of the cushion main frame 206 relative to the leg 262 can be eliminated.

Further, in the present embodiment, a structure is formed in which the cushion front link 216 is slidably joined to the under cover 354, along with which it is turnably joined to the cushion support portion 208. However, a structure may be formed in which the cushion front link 216 is turnably joined to the under cover 354 along with which it is slidably joined to the cushion support portion 208. In this case, the structure is acceptable as long as the cushion operation link 264 is turnably joined to a position of the cushion front link 216 other than the position of joining to the under cover 354.

Forty-Fourth Embodiment

Figure 90:
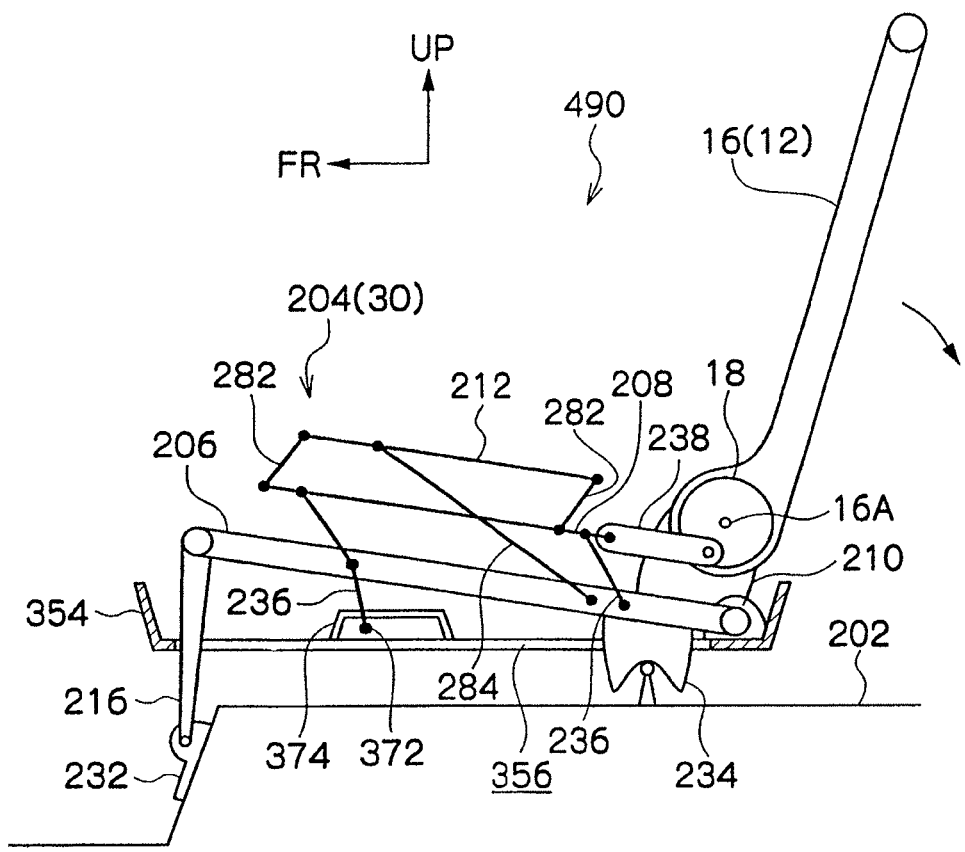
FIG. 90 is a side view, viewed from leftward, showing principal elements of a seat relating to a forty-fourth embodiment of the present invention.

FIG. 90 shows a side view, viewed from leftward, of principal elements of a seat 490 relating to a forty-fourth embodiment that is structured with the seat structure of the present invention.

The seat 490 relating to the present embodiment has a substantially similar structure to the above-described fortieth embodiment, but differs in the following respects.

The seat 490 relating to the present embodiment is formed as what is known as a back rearward-folding stowing type.

The rear end of the cushion joint link 238 is turnably joined to the back main frame 16 at the lower side of the tilting center 16A (a position which is offset from the tilting center 16A). Accordingly, turning of the cushion joint links 236, the cushion support portion 208, the fifth links 282, the cushion sub frame 212, the sixth link 284, the cushion joint link 238 and the under cover 354 is locked, and operation of the cushion link mechanism 204 is restricted.

Here, with the present embodiment too, effects the same as in the above-described fortieth embodiment can be produced.

In particular, the reclining mechanism 18 is controlled, the seat back 12 is tilted rearward around the tilting center 16A, and thus the seat back 12 is disposed substantially horizontally at the rear side of the seat cushion 30, and the seat 490 is stowed (known as rearward-folding stowing).

When the seat 490 is being stowed, the back main frame 16 (the seat back 12) is tilted rearward around the tilting center 16A, and the cushion joint link 238 is moved forward. Thus, by movement of the cushion support portion 208 which is to say the cushion joint links 236 to forward, the cushion support portion 208 which is to say the cushion joint links 236 are turned forward, and the separation in the seat cushion 30 thickness direction between the cushion main frame 206 and the cushion support portion 208 is contracted. Along with this, by movement of the cushion support portion 208 forward, the fifth links 282 are turned forward, and the separation in the seat cushion 30 thickness direction between the cushion support portion 208 and the cushion sub frame 212 is contracted. Moreover, a separation in the seat cushion 30 thickness direction between the cushion joint link 236 at a position of joining to the cushion main frame 206 and the slide shaft 372 is contracted by sliding of the slide shaft 372 of the cushion joint link 236 in the guide plate 374 and, while the under cover 354 is turned toward the cushion main frame 206 relative to the cushion main frame 206, the separation in the seat cushion 30 thickness direction between the cushion main frame 206 and the lower wall of the under cover 354 is contracted. Therefore, even in a case in which thicknesses of the cushion side portion 30B and the cushion main portion 30A for times of usual use are made thicker, in accordance with stowing of the seat 490, the thicknesses of the cushion side portion 30B and the cushion main portion 30A are contracted in the region at the face side and the region at the reverse side relative to the cushion main frame 206 and can be made equal, and space (space at the upper side of the seat cushion 30) in the cabin at times of stowage of the seat 490 (a luggage compartment) can be made larger.

Further, similarly to the above-described twenty-third embodiment, a structure can be formed in which the seat 490 is formed as what is known as a space-increasing storage type (see FIG. 15).

Figure 91:
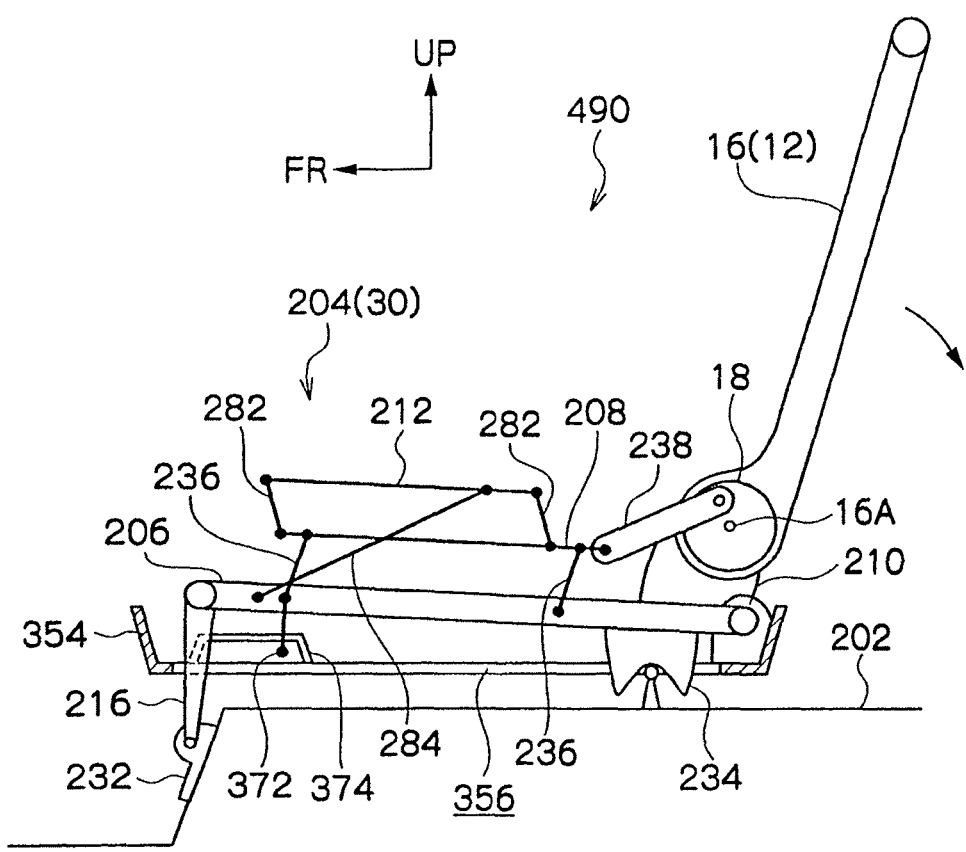
FIG. 91 is a side view, viewed from leftward, showing principal elements of a seat of an alternative example relating to the forty-fourth embodiment of the present invention.

Here, in the present embodiment, a structure is formed in which the rear end of the cushion joint link 238 is turnably joined to the back main frame 16 at the lower side of the tilting center 16A. However, as shown in FIG. 91, a structure may be formed in which the rear end of the cushion joint link 238 is turnably joined to the back main frame 16 at the upper side of the tilting center 16A (a position which is offset from the tilting center 16A). In this case, the front end of the sixth link 284 is turnably joined to the cushion main frame 206, along with which the rear end of the sixth link 284 is turnably joined to the cushion sub frame 212 or a position other than a lower end (turning center) of the fifth links 282. Furthermore, when the seat 490 is being stowed, the back main frame 16 (the seat back 12) is tilted rearward around the tilting center 16A, and the cushion joint link 238 is moved rearward. Thus, by movement to rearward of the cushion support portion 208 which is to say the cushion joint links 236, the cushion joint links 236 are turned rearward, and the separation in the seat cushion 30 thickness direction between the cushion main frame 206 and the cushion support portion 208 is contracted. Along with this, by movement to rearward of the cushion support portion 208, the fifth links 282 are turned rearward, and the separation in the seat cushion 30 thickness direction between the cushion support portion 208 and the cushion sub frame 212 is contracted. Moreover, the separation in the seat cushion 30 thickness direction between the cushion joint link 236 at the position of joining to the cushion main frame 206 and the slide shaft 372 is contracted by sliding of the slide shaft 372 of the cushion joint link 236 in the guide plate 374 and, while the under cover 354 is turned toward the cushion main frame 206 relative to the cushion main frame 206, the separation in the seat cushion 30 thickness direction between the cushion main frame 206 and the lower wall of the under cover 354 is contracted.

In the above-described thirty-first embodiment to forty-fourth embodiment, structures are formed in which the under cover 354 is provided outside of the cushion face skin 218. However, structures may be formed in which the under cover 354 is accommodated inside the cushion face skin 218.

EXPLANATION OF REFERENCE NUMERALS

10 Seat
12 Seat back
12B Back side portion (seat side portion)
14 Back link mechanism (link mechanism)
16 Back main frame
20 Back backrest (back flexing component, back face side frame)
22 First link 22 (back flexing component)
24 Back sub frame (back flexing component, back face side frame, back face frame)
26 Back joint link (back joint mechanism)
28 Back face skin (back cover member)
30 Seat cushion
30B Cushion side portion (seat side portion)
40 Seat
50 Seat 60 Seat
70 Seat
72 Second link (back flexing component)
74 Third link (back flexing component)
80 Seat
90 Seat
100 Seat
110 Seat
112 Back frame (back flexing component, back reverse side frame)
120 Seat
130 Seat
140 Seat
150 Seat
160 Seat
170 Seat
180 Seat
200 Seat
204 Cushion link mechanism (link mechanism)
206 Cushion main frame
208 Cushion support portion (cushion flexing component, cushion face side frame)
212 Cushion sub frame (cushion flexing component, cushion face side frame, cushion face frame)
214 Cushion joint shaft (cushion flexing component, cushion joining component)
216 Cushion front link (cushion connection mechanism, cushion flexing component)
218 Cushion face skin (cushion cover member)
220 Seat
230 Seat
236 Cushion joint link (cushion flexing component, cushion joining component)
240 Seat
242 Fourth link
250 Seat
256 Cushion joint link (cushion connection mechanism)
260 Seat
264 Cushion operation link (cushion connection mechanism)
270 Seat
280 Seat
282 Fifth link (cushion flexing component)
284 Sixth link (cushion flexing component)
290 Seat
300 Seat
310 Seat
320 Seat
330 Seat
340 Seat
350 Seat
354 Under cover (cushion flexing component, cushion reverse side member)
370 Seat
380 Seat
390 Seat
392 Seventh link (cushion connection mechanism)
400 Seat
402 Cover interlocking link (cushion connection mechanism)
410 Seat
420 Seat
430 Seat
440 Seat
450 Seat
460 Seat
470 Seat
480 Seat
490 Seat

The invention claimed is:

1. A seat structure comprising:
a seat side portion provided at a left-right direction side portion of a seat cushion; and
a link mechanism that, along with supporting the seat side portion, is joined to at least one of a seat back and a vehicle side, operation being locked in a condition of use of a seat, is operated by operation of at least one of the seat back and the seat cushion, and flexes a thickness of the seat side portion,
wherein the link mechanism includes:
a cushion main frame provided inside the seat cushion;
a cushion flexing component including a cushion face side frame, which is provided in the seat cushion at a face side relative to the cushion main frame, and a cushion joining component, which turnably joins the cushion main frame and the cushion face side frame;
a cushion connection mechanism that, along with being turnably joined to the vehicle side, is connected to the cushion flexing component, and operates the cushion flexing component in accordance with operation of at least one of the seat back and the seat cushion; and
a fourth link that, along with being joined to the cushion main frame, is turnably joined to the vehicle side at a position which is offset from a turning center of the cushion connection mechanism.

2. A vehicle provided with a seat that is structured with the seat structure of claim 1.

3. A seat structure comprising:
a seat side portion provided at a left-right direction side portion of a seat cushion; and
a link mechanism that, along with supporting the seat side portion, is joined to at least one of a seat back and a vehicle side, operation being locked in a condition of use of a seat, is operated by operation of at least one of the seat back and the seat cushion, and flexes a thickness of the seat side portion,
wherein the link mechanism includes:
a cushion main frame provided inside the seat cushion and turnably joined to the vehicle side;
a cushion flexing component including a cushion face side frame, which is provided in the seat cushion at a face side relative to the cushion main frame, and a cushion joining component, which turnably joins the cushion main frame and the cushion face side frame; and
a cushion connection mechanism that, along with being turnably joined to the vehicle side at a position which is offset from a turning center of the cushion main frame, is connected to the cushion flexing component, and operates the cushion flexing component in accordance with operation of at least one of the seat back and the seat cushion.

4. A vehicle provided with a seat that is structured with the seat structure of claim 3.

* * * * *